(12) United States Patent
Simpson

(10) Patent No.: US 12,152,894 B2
(45) Date of Patent: Nov. 26, 2024

(54) MULTI-DIMENSION CLASSIFICATION OBJECT MATRICES TO ESTIMATE MULTI-DIMENSIONAL REPRESENTATIONS WITH MULTI FUNCTION DEVICE

(71) Applicant: CirclesX LLC, Houston, TX (US)

(72) Inventor: Erik Mowery Simpson, Houston, TX (US)

(73) Assignee: CIRCLESX LLC, Houston, TX (US)

( * ) Notice: Subject to any disclaimer, the term of this patent is extended or adjusted under 35 U.S.C. 154(b) by 722 days.

(21) Appl. No.: 17/358,429

(22) Filed: Jun. 25, 2021

(65) Prior Publication Data

US 2021/0318132 A1 Oct. 14, 2021

Related U.S. Application Data

(63) Continuation-in-part of application No. 17/349,829, filed on Jun. 16, 2021, which is a continuation-in-part
(Continued)

(51) Int. Cl.
*G01C 21/34* (2006.01)
*G01C 21/32* (2006.01)

(52) U.S. Cl.
CPC ......... *G01C 21/3484* (2013.01); *G01C 21/32* (2013.01); *G01C 21/3415* (2013.01); *G01C 21/3469* (2013.01)

(58) Field of Classification Search
CPC ........ G08G 5/02; B64C 39/024; B64D 31/00; G05D 1/0011; G05D 1/0676; B64U 10/25;
(Continued)

(56) References Cited

U.S. PATENT DOCUMENTS

D209,710 S 12/1967 Bruce
4,476,954 A 10/1984 Johnson et al.
(Continued)

FOREIGN PATENT DOCUMENTS

CN 107341968 A 11/2017
GB 2539556 A 12/2016
(Continued)

OTHER PUBLICATIONS

PCT International Search Report and Written Opinion; PCT/US2020/027543; Jul. 1, 2020.
(Continued)

*Primary Examiner* — Richard M Camby
(74) *Attorney, Agent, or Firm* — Pramudji Law Group PLLC; Ari Pramudji

(57) ABSTRACT

Various implementations directed to price time priority queue routing for a optimized multi-dimension map matrix tile data exchange linked database are provided. Implementations of various computer methods to organize a multi-dimension map tile data exchange linked database with associated social networking elements and multi dimension coordinate object optimization and price time priority queues and securitization to organize the data and create a fluid system for trading value within the system for the data over a plurality of devices and network members.

20 Claims, 79 Drawing Sheets

Related U.S. Application Data of application No. 17/324,051, filed on May 18, 2021, which is a continuation-in-part of application No. 17/082,254, filed on Oct. 28, 2020, and a continuation-in-part of application No. 17/069,597, filed on Oct. 13, 2020, and a continuation-in-part of application No. 16/589,229, filed on Oct. 1, 2019, now abandoned, and a continuation-in-part of application No. 16/556,838, filed on Aug. 30, 2019, now Pat. No. 11,555,709, and a continuation-in-part of application No. 16/397,685, filed on Apr. 29, 2019, and a continuation-in-part of application No. 16/359,841, filed on Mar. 20, 2019, and a continuation-in-part of application No. 16/357,241, filed on Mar. 18, 2019, and a continuation-in-part of application No. 16/274,490, filed on Feb. 13, 2019, now Pat. No. 11,215,466, which is a continuation-in-part of application No. 16/258,658, filed on Jan. 27, 2019, now Pat. No. 11,035,682, application No. 17/358,429 is a continuation-in-part of application No. 16/257,032, filed on Jan. 24, 2019, now abandoned, and a continuation-in-part of application No. 16/242,981, filed on Jan. 8, 2019, now abandoned, and a continuation-in-part of application No. 16/242,967, filed on Jan. 8, 2019, now Pat. No. 12,001,999, and a continuation-in-part of application No. 16/239,485, filed on Jan. 3, 2019, and a continuation-in-part of application No. 16/183,647, filed on Nov. 7, 2018, now Pat. No. 11,861,527, and a continuation-in-part of application No. 16/167,525, filed on Oct. 22, 2018, now Pat. No. 11,810,023, and a continuation-in-part of application No. 15/877,393, filed on Jan. 23, 2018, and a continuation-in-part of application No. 15/266,326, filed on Sep. 15, 2016, now Pat. No. 11,138,827.

(60) Provisional application No. 63/052,159, filed on Jul. 15, 2020, provisional application No. 63/051,373, filed on Jul. 13, 2020, provisional application No. 63/044,997, filed on Jun. 26, 2020, provisional application No. 63/039,918, filed on Jun. 16, 2020, provisional application No. 63/027,344, filed on May 19, 2020, provisional application No. 62/927,081, filed on Oct. 28, 2019, provisional application No. 62/914,427, filed on Oct. 12, 2019.

(58) Field of Classification Search
CPC ........ B64U 30/10; B64U 50/13; B64U 50/19; B64U 70/00; B64U 2101/30; B64U 2201/00; B64U 2201/20; B64U 30/20; B64U 30/40; B64U 60/50; B64U 70/83
See application file for complete search history.

(56) References Cited

U.S. PATENT DOCUMENTS

| | | |
|---|---|---|
| D318,073 S | 7/1991 | Jang |
| 5,249,259 A | 9/1993 | Harvey |
| 5,412,560 A | 5/1995 | Dennison |
| 5,604,676 A | 2/1997 | Penzias |
| 5,726,885 A | 3/1998 | Klein et al. |
| 5,751,245 A | 5/1998 | Janky et al. |
| 5,973,619 A | 10/1999 | Paredes |
| 6,175,831 B1 | 1/2001 | Weinreich et al. |
| 6,240,396 B1 | 5/2001 | Walker et al. |
| 6,285,999 B1 | 9/2001 | Page |
| D453,945 S | 2/2002 | Shan |
| 6,356,838 B1 | 3/2002 | Paul |
| 6,400,996 B1 * | 6/2002 | Hoffberg ............... G06F 3/0481 700/86 |
| D460,952 S | 7/2002 | Kataoka |
| 6,421,606 B1 | 7/2002 | Asai et al. |
| 6,434,530 B1 | 8/2002 | Sloane et al. |
| D468,738 S | 1/2003 | Lin |
| D469,089 S | 1/2003 | Lin |
| 6,609,103 B1 | 8/2003 | Kolls |
| 6,618,062 B1 | 9/2003 | Brown et al. |
| 6,646,659 B1 | 11/2003 | Brown et al. |
| 6,663,564 B2 | 12/2003 | Miller-Kovach et al. |
| 6,708,879 B2 | 3/2004 | Hunt |
| 6,850,907 B2 | 2/2005 | Lutnick et al. |
| 7,090,638 B2 | 8/2006 | Vidgen |
| 7,373,320 B1 | 5/2008 | Mcdonough |
| D590,396 S | 4/2009 | Lo |
| 7,584,123 B1 | 9/2009 | Karonis et al. |
| 7,634,442 B2 | 12/2009 | Alvarado et al. |
| 7,680,690 B1 | 3/2010 | Catalano |
| 7,680,770 B1 | 3/2010 | Buyukkokten et al. |
| 7,711,629 B2 | 5/2010 | Laurent et al. |
| 7,747,739 B2 | 6/2010 | Bridges et al. |
| 7,756,633 B2 | 7/2010 | Huang et al. |
| 7,788,207 B2 | 8/2010 | Alcorn et al. |
| D628,171 S | 11/2010 | Hakopian |
| 7,886,166 B2 | 2/2011 | Shnekendorf et al. |
| D638,879 S | 5/2011 | Suto |
| 7,987,110 B2 | 7/2011 | Cases et al. |
| 8,024,234 B1 | 9/2011 | Thomas et al. |
| 8,065,191 B2 | 11/2011 | Senior |
| D650,385 S | 12/2011 | Chiu |
| 8,121,780 B2 | 2/2012 | Gerdes et al. |
| 8,249,946 B2 | 8/2012 | Froseth et al. |
| 8,296,335 B2 | 10/2012 | Bouve et al. |
| 8,388,451 B2 | 3/2013 | Auterio et al. |
| 8,570,244 B2 | 10/2013 | Mukawa |
| 8,762,035 B2 | 6/2014 | Levine et al. |
| 8,798,593 B2 | 8/2014 | Brown et al. |
| 8,918,411 B1 | 12/2014 | Latif et al. |
| 8,920,175 B2 | 12/2014 | Black et al. |
| 8,930,490 B2 | 1/2015 | Brown et al. |
| 8,968,099 B1 | 3/2015 | Hanke et al. |
| 9,011,153 B2 | 4/2015 | Bennett et al. |
| 9,020,763 B2 | 4/2015 | Faaborg et al. |
| 9,077,204 B2 | 7/2015 | More et al. |
| 9,092,826 B2 | 7/2015 | Deng et al. |
| 9,159,088 B2 | 10/2015 | Dillahunt et al. |
| 9,213,957 B2 | 12/2015 | Stefik et al. |
| 9,274,540 B2 | 3/2016 | Anglin et al. |
| 9,292,764 B2 | 3/2016 | Yun et al. |
| 9,387,928 B1 | 7/2016 | Gentry et al. |
| 9,389,090 B1 | 7/2016 | Levine et al. |
| 9,389,094 B2 | 7/2016 | Brenner et al. |
| 9,410,963 B2 | 8/2016 | Martin et al. |
| 9,436,923 B1 | 9/2016 | Sriram et al. |
| D772,828 S | 11/2016 | Kusumoto |
| 9,528,972 B2 | 12/2016 | Minvielle |
| 9,558,515 B2 | 1/2017 | Babu et al. |
| 9,665,983 B2 | 5/2017 | Spivack |
| 9,880,577 B2 | 1/2018 | Dyess et al. |
| 9,952,042 B2 | 4/2018 | Abovitz et al. |
| 9,960,637 B2 | 5/2018 | Sanders et al. |
| 9,978,282 B2 | 5/2018 | Lambert et al. |
| 10,082,793 B1 | 9/2018 | Glaser |
| D832,355 S | 10/2018 | Castro |
| 10,262,289 B2 | 4/2019 | Vaananen |
| 10,395,332 B1 | 8/2019 | Konrardy et al. |
| 10,403,050 B1 | 9/2019 | Beall et al. |
| 10,460,520 B2 | 10/2019 | Simpson et al. |
| 10,533,850 B2 | 1/2020 | Abovitz et al. |
| 10,586,084 B2 | 3/2020 | Burch et al. |
| 10,685,503 B2 | 6/2020 | Ricci |
| 10,737,585 B2 | 8/2020 | Chaudhary et al. |
| D896,315 S | 9/2020 | Castro |
| 10,832,337 B1 | 11/2020 | Floyd et al. |
| 10,872,381 B1 | 12/2020 | Leise et al. |
| D910,758 S | 2/2021 | Leong |
| 11,138,827 B2 | 10/2021 | Simpson |
| D938,375 S | 12/2021 | Zhang |

(56) References Cited

U.S. PATENT DOCUMENTS

| | | |
|---|---|---|
| 11,288,563 B2 | 3/2022 | Lee et al. |
| 11,296,897 B2 | 4/2022 | Endress et al. |
| 11,298,017 B2 | 4/2022 | Tran |
| 11,298,591 B2 | 4/2022 | Evancha |
| 11,537,953 B2 | 12/2022 | Beaurepaire |
| 11,555,709 B2 * | 1/2023 | Simpson ............ G01C 21/3438 |
| 11,586,993 B2 | 2/2023 | Handler et al. |
| D980,210 S | 3/2023 | Wu |
| 11,651,464 B2 | 5/2023 | Park |
| D993,316 S | 7/2023 | Lin |
| 11,734,618 B2 | 8/2023 | Ogden |
| D1,000,137 S | 10/2023 | Shuster |
| D1,007,451 S | 12/2023 | Im et al. |
| D1,024,065 S | 4/2024 | Kim |
| 2002/0004788 A1 | 1/2002 | Gros et al. |
| 2002/0013718 A1 | 1/2002 | Cornwell |
| 2002/0013761 A1 | 1/2002 | Bundy |
| 2002/0017997 A1 | 2/2002 | Wall |
| 2002/0065738 A1 | 5/2002 | Riggs et al. |
| 2002/0065766 A1 | 5/2002 | Brown et al. |
| 2002/0128952 A1 | 9/2002 | Melkomaian |
| 2002/0133456 A1 | 9/2002 | Lancaster et al. |
| 2002/0161689 A1 | 10/2002 | Segal |
| 2003/0055776 A1 | 3/2003 | Samuelson |
| 2003/0191725 A1 | 10/2003 | Ratliff et al. |
| 2003/0233311 A1 | 12/2003 | Bramnick et al. |
| 2004/0019552 A1 | 1/2004 | Tobin |
| 2004/0115596 A1 | 6/2004 | Snyder et al. |
| 2004/0249742 A1 | 12/2004 | Laurent et al. |
| 2004/0260581 A1 | 12/2004 | Baranowski et al. |
| 2005/0021346 A1 | 1/2005 | Nadan et al. |
| 2005/0027637 A1 | 2/2005 | Kohler |
| 2005/0132070 A1 | 6/2005 | Redlich et al. |
| 2005/0288974 A1 | 12/2005 | Baranowski et al. |
| 2005/0288986 A1 | 12/2005 | Barts et al. |
| 2006/0104224 A1 | 5/2006 | Singh et al. |
| 2006/0184321 A1 | 8/2006 | Kawakami et al. |
| 2007/0005224 A1 | 1/2007 | Sutardja |
| 2008/0033833 A1 | 2/2008 | Senior |
| 2008/0040232 A1 | 2/2008 | Perchthaler |
| 2008/0077309 A1 | 3/2008 | Cobbold |
| 2008/0129490 A1 | 6/2008 | Linville et al. |
| 2008/0140557 A1 | 6/2008 | Bowlby et al. |
| 2008/0157990 A1 | 7/2008 | Belzer et al. |
| 2008/0195432 A1 | 8/2008 | Fell et al. |
| 2008/0262892 A1 | 10/2008 | Prager et al. |
| 2009/0221338 A1 | 9/2009 | Stewart |
| 2009/0231687 A1 | 9/2009 | Yamamoto |
| 2009/0271236 A1 | 10/2009 | Ye et al. |
| 2009/0275002 A1 | 11/2009 | Hoggle |
| 2009/0276154 A1 | 11/2009 | Subramanian et al. |
| 2009/0287401 A1 | 11/2009 | Levine et al. |
| 2009/0309729 A1 | 12/2009 | Nichols |
| 2010/0042421 A1 | 2/2010 | Bai et al. |
| 2010/0081548 A1 | 4/2010 | Labedz |
| 2010/0114790 A1 | 5/2010 | Strimling et al. |
| 2010/0191834 A1 | 7/2010 | Zampiello |
| 2010/0211441 A1 | 8/2010 | Sprigg et al. |
| 2010/0217680 A1 | 8/2010 | Fusz et al. |
| 2010/0228574 A1 | 9/2010 | Mundinger et al. |
| 2010/0280748 A1 | 11/2010 | Mundinger et al. |
| 2010/0280884 A1 | 11/2010 | Levine et al. |
| 2010/0306078 A1 | 12/2010 | Hwang |
| 2011/0025267 A1 | 2/2011 | Kamen et al. |
| 2011/0059693 A1 | 3/2011 | O'Sullivan |
| 2011/0098056 A1 | 4/2011 | Rhoads et al. |
| 2011/0106660 A1 | 5/2011 | Aljarapu et al. |
| 2011/0202418 A1 | 8/2011 | Kempton et al. |
| 2012/0023032 A1 | 1/2012 | Visdomini |
| 2012/0075067 A1 | 3/2012 | Attaluri |
| 2012/0078743 A1 | 3/2012 | Betancourt |
| 2012/0101629 A1 | 4/2012 | Olsen et al. |
| 2012/0158762 A1 | 6/2012 | IwuchukWu |
| 2012/0303259 A1 | 11/2012 | Prosser |
| 2012/0323645 A1 | 12/2012 | Spiegel et al. |
| 2013/0024041 A1 | 1/2013 | Golden et al. |
| 2013/0035973 A1 | 2/2013 | Desai et al. |
| 2013/0132261 A1 | 5/2013 | Ebersole |
| 2013/0147820 A1 | 6/2013 | Kalai et al. |
| 2013/0173326 A1 | 7/2013 | Anglin et al. |
| 2013/0179205 A1 | 7/2013 | Slinin |
| 2013/0191237 A1 | 7/2013 | Tenorio |
| 2013/0211863 A1 | 8/2013 | White |
| 2013/0265174 A1 | 10/2013 | Scofield et al. |
| 2013/0268325 A1 | 10/2013 | Dembo |
| 2013/0275156 A1 | 10/2013 | Kinkaid et al. |
| 2013/0304522 A1 | 11/2013 | Cundle |
| 2013/0311264 A1 | 11/2013 | Solomon et al. |
| 2014/0038781 A1 | 2/2014 | Foley |
| 2014/0052500 A1 | 2/2014 | Vallapuzha et al. |
| 2014/0075528 A1 | 3/2014 | Matsuoka |
| 2014/0098009 A1 | 4/2014 | Prest et al. |
| 2014/0122190 A1 | 5/2014 | Wolfson et al. |
| 2014/0129302 A1 | 5/2014 | Amin et al. |
| 2014/0149157 A1 | 5/2014 | Shaam et al. |
| 2014/0162598 A1 | 6/2014 | Villa-Real |
| 2014/0180732 A1 | 6/2014 | Rotchin |
| 2014/0220516 A1 | 8/2014 | Marshall et al. |
| 2014/0229258 A1 | 8/2014 | Seriani |
| 2014/0236641 A1 | 8/2014 | Dawkins |
| 2014/0244413 A1 | 8/2014 | Senior |
| 2014/0310019 A1 | 10/2014 | Blander et al. |
| 2014/0310149 A1 | 10/2014 | Singh |
| 2014/0324633 A1 | 10/2014 | Pollak et al. |
| 2014/0349672 A1 | 11/2014 | Kern et al. |
| 2015/0006428 A1 | 1/2015 | Miller et al. |
| 2015/0016777 A1 | 1/2015 | Abovitz et al. |
| 2015/0058051 A1 | 2/2015 | Movshovich |
| 2015/0097864 A1 | 4/2015 | Alaniz |
| 2015/0154516 A1 | 6/2015 | Joachim |
| 2015/0161564 A1 | 6/2015 | Sweeney et al. |
| 2015/0178642 A1 | 6/2015 | Abboud |
| 2015/0198459 A1 | 7/2015 | MacNeille et al. |
| 2015/0206443 A1 | 7/2015 | Aylesworth et al. |
| 2015/0220916 A1 | 8/2015 | Prakash et al. |
| 2015/0241236 A1 | 8/2015 | Slusar et al. |
| 2015/0248689 A1 | 9/2015 | Paul et al. |
| 2015/0260474 A1 | 9/2015 | Rublowsky et al. |
| 2015/0269865 A1 | 9/2015 | Volach et al. |
| 2015/0324831 A1 | 11/2015 | Barua et al. |
| 2015/0348282 A1 | 12/2015 | Gibbon et al. |
| 2015/0371186 A1 | 12/2015 | Podgurny et al. |
| 2016/0041628 A1 | 2/2016 | Verma |
| 2016/0117657 A1 | 4/2016 | Forbes, Jr. et al. |
| 2016/0117756 A1 | 4/2016 | Carr et al. |
| 2016/0148289 A1 | 5/2016 | Altschuler |
| 2016/0162989 A1 | 6/2016 | Cole et al. |
| 2016/0171891 A1 | 6/2016 | Banatwala et al. |
| 2016/0203422 A1 | 7/2016 | Demarchi et al. |
| 2016/0224935 A1 | 8/2016 | Burnett |
| 2016/0225115 A1 | 8/2016 | Levy et al. |
| 2016/0253662 A1 | 9/2016 | Sriram |
| 2016/0307276 A1 | 9/2016 | Young |
| 2016/0297316 A1 | 10/2016 | Penilla et al. |
| 2016/0298977 A1 | 10/2016 | Newlin |
| 2016/0300296 A1 | 10/2016 | Alonso Cembrano |
| 2016/0307288 A1 | 10/2016 | Yehuda et al. |
| 2016/0307373 A1 | 10/2016 | Dean et al. |
| 2016/0321609 A1 | 11/2016 | Dube et al. |
| 2016/0349835 A1 | 12/2016 | Shapira |
| 2016/0364679 A1 | 12/2016 | Cao |
| 2017/0019496 A1 | 1/2017 | Orbach |
| 2017/0039770 A1 | 2/2017 | Lanier et al. |
| 2017/0046658 A1 | 2/2017 | Jones et al. |
| 2017/0046664 A1 | 2/2017 | Haldenby et al. |
| 2017/0046799 A1 | 2/2017 | Chan et al. |
| 2017/0046806 A1 | 2/2017 | Haldenby et al. |
| 2017/0048216 A1 | 2/2017 | Chow et al. |
| 2017/0053461 A1 | 2/2017 | Pal et al. |
| 2017/0061509 A1 | 3/2017 | Rosenberg et al. |
| 2017/0089710 A1 | 3/2017 | Slusar |
| 2017/0122746 A1 | 5/2017 | Howard et al. |
| 2017/0146360 A1 | 5/2017 | Averbuch |
| 2017/0232300 A1 | 8/2017 | Tran et al. |

(56) References Cited

U.S. PATENT DOCUMENTS

| | | |
|---|---|---|
| 2017/0243286 A1 | 8/2017 | Castinado et al. |
| 2017/0243310 A1 | 8/2017 | Dawkins |
| 2017/0249626 A1 | 8/2017 | Marlatt |
| 2017/0276500 A1 | 9/2017 | Margalit et al. |
| 2017/0293881 A1 | 10/2017 | Narkulla |
| 2017/0293950 A1 | 10/2017 | Rathod |
| 2017/0330274 A1 | 11/2017 | Conant, II et al. |
| 2017/0356749 A1 | 12/2017 | Shelby |
| 2017/0357914 A1 | 12/2017 | Tulabandhula |
| 2018/0012149 A1 | 1/2018 | Yust |
| 2018/0013211 A1 | 1/2018 | Ricci |
| 2018/0025417 A1 | 1/2018 | Brathwaite et al. |
| 2018/0046431 A1 | 2/2018 | Thagadur Shivappa et al. |
| 2018/0053226 A1 | 2/2018 | Hutton et al. |
| 2018/0053237 A1 | 2/2018 | Hayes et al. |
| 2018/0068355 A1 | 3/2018 | Garry |
| 2018/0075695 A1 | 3/2018 | Simpson |
| 2018/0095471 A1 | 4/2018 | Allan et al. |
| 2018/0102053 A1 | 4/2018 | Hillman et al. |
| 2018/0111494 A1 | 4/2018 | Penilla et al. |
| 2018/0117447 A1 | 5/2018 | Bao et al. |
| 2018/0121958 A1 | 5/2018 | Aist et al. |
| 2018/0129276 A1 | 5/2018 | Nguyen et al. |
| 2018/0140903 A1 | 5/2018 | Poure |
| 2018/0143029 A1 | 5/2018 | Nikulin et al. |
| 2018/0157999 A1 | 6/2018 | Arora |
| 2018/0173742 A1 | 6/2018 | Liu et al. |
| 2018/0173800 A1 | 6/2018 | Chang et al. |
| 2018/0209803 A1 | 7/2018 | Rakah |
| 2018/0240542 A1 | 8/2018 | Grimmer |
| 2018/0278984 A1 | 9/2018 | Aimone et al. |
| 2018/0293638 A1 | 10/2018 | Simpson |
| 2018/0313798 A1 | 11/2018 | Chokshi et al. |
| 2018/0342106 A1 | 11/2018 | Rosado |
| 2018/0348863 A1 | 12/2018 | Aimone et al. |
| 2018/0357899 A1 | 12/2018 | Krivacic et al. |
| 2018/0365598 A1 | 12/2018 | Jamail |
| 2018/0365904 A1 | 12/2018 | Holmes |
| 2018/0374268 A1 | 12/2018 | Niles |
| 2019/0019144 A1 | 1/2019 | Gillen |
| 2019/0020973 A1* | 1/2019 | Harish ............... G08G 1/0112 |
| 2019/0047427 A1 | 2/2019 | Pogorelik |
| 2019/0050634 A1* | 2/2019 | Nerayoff ............... G06F 18/22 |
| 2019/0066528 A1 | 2/2019 | Hwang et al. |
| 2019/0102946 A1 | 4/2019 | Spivack et al. |
| 2019/0108686 A1 | 4/2019 | Spivack et al. |
| 2019/0139448 A1 | 5/2019 | Marshall et al. |
| 2019/0143828 A1 | 5/2019 | Sawada et al. |
| 2019/0146974 A1 | 5/2019 | Chung et al. |
| 2019/0158603 A1 | 5/2019 | Nelson et al. |
| 2019/0160958 A1 | 5/2019 | Chaudhary et al. |
| 2019/0178654 A1 | 6/2019 | Hare |
| 2019/0186942 A1 | 6/2019 | Rubin |
| 2019/0188450 A1 | 6/2019 | Spivack et al. |
| 2019/0204110 A1 | 7/2019 | Dubielzyk |
| 2019/0228269 A1 | 7/2019 | Brent et al. |
| 2019/0236741 A1 | 8/2019 | Bowman et al. |
| 2019/0236742 A1 | 8/2019 | Tomskii et al. |
| 2019/0251503 A1 | 8/2019 | Simpson |
| 2019/0251509 A1 | 8/2019 | Simpson |
| 2019/0271553 A1 | 9/2019 | Simpson |
| 2019/0272589 A1 | 9/2019 | Simpson |
| 2019/0293438 A1 | 9/2019 | Simpson |
| 2019/0304000 A1 | 10/2019 | Simpson |
| 2019/0318286 A1 | 10/2019 | Simpson |
| 2019/0333166 A1 | 10/2019 | Simpson |
| 2019/0333181 A1 | 10/2019 | Simpson |
| 2019/0353499 A1 | 11/2019 | Stenneth |
| 2020/0013498 A1 | 1/2020 | Gelber |
| 2020/0027096 A1 | 1/2020 | Cooner |
| 2020/0047055 A1 | 2/2020 | Ward |
| 2020/0098071 A1 | 3/2020 | Jackson |
| 2020/0151816 A1 | 5/2020 | Simpson |
| 2020/0156495 A1 | 5/2020 | Lindup |
| 2020/0160461 A1 | 5/2020 | Kaniki |
| 2020/0173808 A1 | 6/2020 | Beaurepaire et al. |
| 2020/0219017 A1 | 7/2020 | Simpson |
| 2020/0226853 A1 | 7/2020 | Ahmed et al. |
| 2020/0317074 A1 | 10/2020 | Miller et al. |
| 2020/0317075 A1 | 10/2020 | Yokoyama et al. |
| 2020/0389301 A1 | 12/2020 | Detres et al. |
| 2021/0012278 A1 | 1/2021 | Alon et al. |
| 2021/0158447 A1 | 5/2021 | Simpson |
| 2021/0166317 A1 | 6/2021 | Simpson |
| 2021/0248633 A1 | 8/2021 | Simpson |
| 2021/0318132 A1* | 10/2021 | Simpson ............ G06Q 30/0641 |
| 2021/0326872 A1 | 10/2021 | Robotham |
| 2021/0379447 A1 | 12/2021 | Lee |
| 2022/0020073 A1 | 1/2022 | Farmer |
| 2022/0068081 A1 | 3/2022 | Pariseau |
| 2022/0100731 A1 | 3/2022 | Tirapu Azpiroz et al. |
| 2022/0122026 A1 | 4/2022 | Okabe et al. |
| 2023/0157579 A1 | 5/2023 | Sato |
| 2023/0377409 A1 | 11/2023 | Rye |

FOREIGN PATENT DOCUMENTS

| | | |
|---|---|---|
| JP | 2003177034 A | 12/2001 |
| KR | 20170078094 A1 | 12/2015 |
| WO | 2001041084 A2 | 6/2001 |
| WO | 2015059691 A1 | 4/2015 |
| WO | 2015161307 A1 | 4/2015 |
| WO | 2018024844 A1 | 2/2018 |
| WO | 2019/134005 A1 | 7/2019 |
| WO | 2019183468 A1 | 9/2019 |
| WO | 2021/163675 A1 | 8/2021 |

OTHER PUBLICATIONS

PCT International Search Report and Written Opinion; PCT/US2020/023223; Jun. 19, 2020.

PCT International Search Report and Written Opinion; PCT/US2020/023729; Jun. 18, 2020.

PCT International Search Report and Written Opinion; PCT/US2020/021546; Jun. 8, 2020.

PCT International Search Report and Written Opinion; PCT/US2020/018012; Apr. 21, 2020.

PCT International Search Report and Written Opinion; PCT/US2020/012208; Mar. 24, 2020.

Westerman; Longitudinal Analysis of Biomarker Data from a Personalized Nutrition Platform in Healthy Subjects; Nature, Scientific Reports; vol. 8; Oct. 2, 2018 (retrieved Jun. 10, 2020). https://www.nature.com/articles/s41598-018-33008-7.

Ahmed, et al.; Energy Trading with Electric Vehicles in Smart Campus Parking Lots; Applied Sciences; Sep. 7, 2018.

Fitzsimmons; Uber Hit with Cap as New York City Takes Lead in Crackdown; New York Times; Aug. 8, 2018 (retrieved Feb. 29, 2020). https://www.wral.com/uber-hit-with-cap-as-new-york-city-takes-lead-in-crackdow/17755819/?version=amp?

Soccer ball-shaped drone might be the safest flying robot yet https://mashable.com/2015/12/21/soccer-ball-drone/ ; 2015.

Pentland; After Decades of Doubt, Deregulation Delivers Lower Electricity Rates; Forbes; Oct. 13, 2013 (retrieved Feb. 29, 2020). https://www.forbes.com/sites/williampentland/2013/10/13/after-decades-of-doubt-deregulation-delivers-lower-electricity-prices/#201d4a9c1d13.

Sun, et al.; Real-Time MUAV Video Augmentation with Geo-Information for Remote Monitoring; 2013 Fifth International Conference on Geo-Information Technologies for Natural Disaster Management; pp. 114-118; IEEE; 2013.

U.S. Appl. No. 60/035,205, filed Jan. 10, 1997; Page.

PCT International Search Report and Written Opinion; PCT/US2022/027077; Nov. 1, 2022.

Wei, et al. "impact of aircraft size and seat availability on airlines demand and market share in duopoly markets" Published by Elsevier, 2005, pp. 315-327.

PCT International Search Report and Written Opinion; PCT/US2022/052969; Mar. 21, 2023.

(56) References Cited

OTHER PUBLICATIONS

Little, T.D., et al., On the Joys of Missing Data, Journal of pediatric psychology, 2014, pp. 151-162.
Honaker, J., et al., What to do About Missing Values in Time-Series Cross-Section Data, American Journal of Political Science, Sep. 6, 2008, pp. 561-581.
Westerhoff, Market Depth and Price Dynamics: A Note, University of Osnabrueck, Department of Economics Rolandstrasse 8, D-49069 Osnabrueck, German, Mar. 30, 2004, pp. 1-8.
PCT International Search Report and Written Opinion; PCTUS2022/051998; Mar. 8, 2023.
EP23153137.7 European Search Report, May 24, 2023, pp. 1-10.
EP20787830.7 European Search Report, May 12, 2023, pp. 1-10.
Zheyong, Bian, et al., "Planning the Ridesharing Route for the First-Mile Service Linking to Railway Passenger Transportation," Joint Rail Conference, Apr. 2017, pp. 1-11.
EP23168879.7 European Search Report, Jul. 5, 2023, pp. 1-13.
Papa, U., & Del Core, G., "Design of Sonar Sensor Model for Safe Landing of an UAV," IEEE Metrology for Aerospace, 2015, pp. 346-350.
Freebeat, Smart Exercise Bike; retrieved from internet: https://www.amazon.com/Resistance-Cushioned-Detection-Altorithm-Instructors/dp/BOBZKKZ6B3/?th=1; Mar. 3, 2023; p. 1.
Li, Jundong, et al., "Multi-network Embedding", pp. 1-9, 2018.
Speediance, All-in-One Smart Home Gym; retrieved from internet: https://www.amazon.com/Speediance-Equipment-Resistance-Training-Machine-Works/dp/B0C4KF7844/?th=1; May 8, 2023; p. 1.
Peters, et al.; Student Support Services for Online Learning Re-Imagined and Re-Invigorated: Then, Now and What's To Come; Contact North | Contact Nord; Sep. 2017.
Fleishman; Use Parking Apps to Find Lots, Garages, Valet, and Meters; Macworld; Jul. 19, 2015.
Borras, et al. Intelligent Tourism Reminder Systems: A Survey; Expert Systems with Applications 41; Elsevier; Jun. 9, 2014.
The Wayback Machine, Interest Rate Swaps, https://web.archive.org/web/20171006212154/https://global.pimco.com/en/gbl/resources/education/understanding-interest-rate-swaps, 2016, pp. 1-7.
Freight Derivatives—a Vital Tool For YOur Business, https://www.reedsmith.com/-/media/files/perspectives/2007/02/freight-derivatives—a-vital-tool-for-your-business/files/freight-derivatives—a vital-tool-for-your-business/fileattachment/etcfreightderivativesavitaltoolforyourbusiness.pdf (Year: 2007), Energy, Trade & Commodities, pp. 1-3.
Barry, Kieth, App lets drivers auction public parking spaces, Wired, Aug. 11, 2011, pp. 1-4.
Jiang, Landu, et al., Sun Chase: Energy-Efficient Route Planning for solar-powered Evs, IEEE 37th international conference on distrubuted computing systems, 2017, pp. 1-11.
Netlingo, https://web.archive.org/web/20170122184857/https://www.netlingo.com/word/electronic-exchange.php, dated Oct. 22, 2017.
Laseter, Tim, "B2B benchmark: The State of Electronic Exchanges", Tech & Innovation, dated Oct. 1, 2001.
Directed Graph, https://en.wikipedia.org/wiki/Directed_graph, pp. 1-6, 2022.
About IBM Food Trust, https://www.ibm.com/downloads/cas/E9DBNDJG, pp. 1-17, 2019.
IBM Blockchain Transparent Supply, https://www.ibm.com/downloads/cas/BKQDKOM2, pp. 1-14, Aug. 2020.
Radocchia, Samantha, 3 Innovative Ways Blockchain Will Build Trust In The Food Industry, https://www.forbes.com/sites/samantharadocchia/2018/04/26/3-innovative-ways-blockchain-will-build-trust-in-the-food-industry/?sh=65bc79f42afc, Forbes, pp. 1-5, Apr. 26, 2018.
Change the World, https://fortune.com/change-the-world/2019/ibm/, Fortune Media IP Limited, pp. 1-5, 2022.
IBM Food Trust, https://www.constellationr.com/node/17601/vote/application/view/588, Constellation Research Inc., pp. 1-4, 2010-2022.
Dey, Somdip, et al., FoodSQRBlock: Digitizing Food Production and the Supply Chain with Blockchain and QR Code in the Cloud, https://www.mdpi.com/2071-1050/13/6/3486/htm, MDPI, pp. 1-27, Mar. 22, 2021.
Ramasubramanian, Vasant, "Quadrasense: Immersive UAV-based cross-reality environmental sensor networks," phD diss., Massachusetts Institute of Technology, pp. 1-75, 2015.
Wyzant, https://web.archive.org/web/20190327185429/https://www.wyzant.com/hotitworks/students, Wyzant tutoring, pp. 1-13, Mar. 27, 2019.
PCT International Search Report and Written Opinion; PCT/US2021/065855; Mar. 29, 2022.
PCT International Search Report and Written Opinion; PCT/US2022/012717; Mar. 30, 2022.
Zhao, et al., Incentives in Ridesharing with Deficit Control, Proceedings of the 13th International Conference on Autonomous Agents and Multiagent Systems (AAMAS 2014), May 5-9, 2014, pp. 1021-1028.
Aratani, Lori, "This app wants to reward you for smart commuting choices," The Washington Post, Aug. 18, 2018, pp. 1-3.
Yu, Haicong et al.; "A Multi-Modal Route Planning Approach with an Improved Genetic Algorithm", The International Archives of the Photogrammetry, Remote Sensing and Spaital Information Sciences, vol. 38, Part 1, 2010.
"Node Influence Metric", Wikipedia, Nov. 6, 2020, pp. 1-5.
EP21916571 European Search Report, Jun. 18, 2024, pp. 1-9.
Bortolini, et al.; "Fresh food sustainable distribution: cost, delivery time and carbon footprint three-objective optimization," 2016, pp. 1-12.

* cited by examiner

800

1300

1400

1500

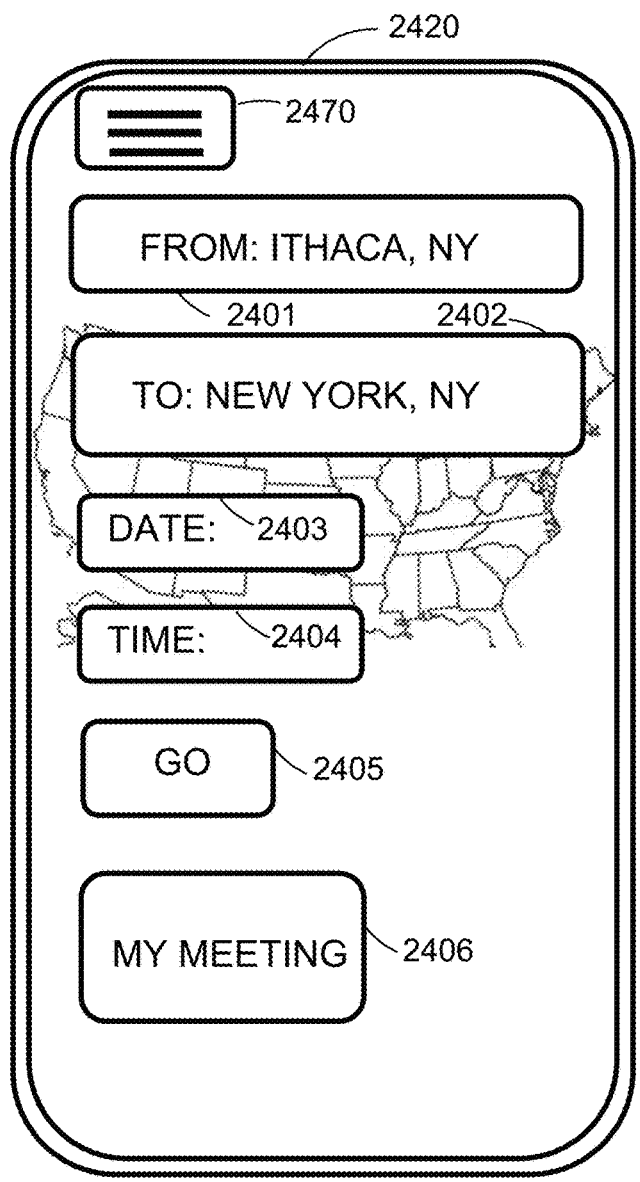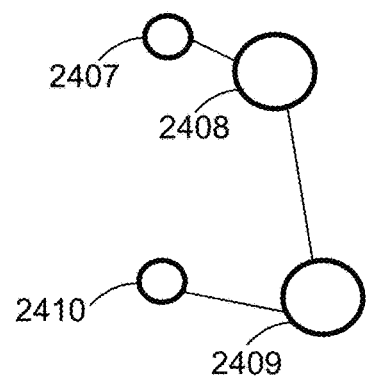
FIG. 24

360 Degree Incremental Hiking View with natural environment

360 Degree Micro and Nano Zoom Hiking View with natural environment

Private 360 Degree High Tea with Queen View with natural altitude environment

Public 360 Degree High Tea with Queen View with natural altitude environment

3800

Public 360 Degree High Tea with Queen View with natural altitude environment

Request Conversation with Virtual People in the Public Room

Private 360 Degree Weight Lifting Venice Beach View with natural altitude environment Public 360 Degree Weight Lifting Venice Beach View with natural altitude environment

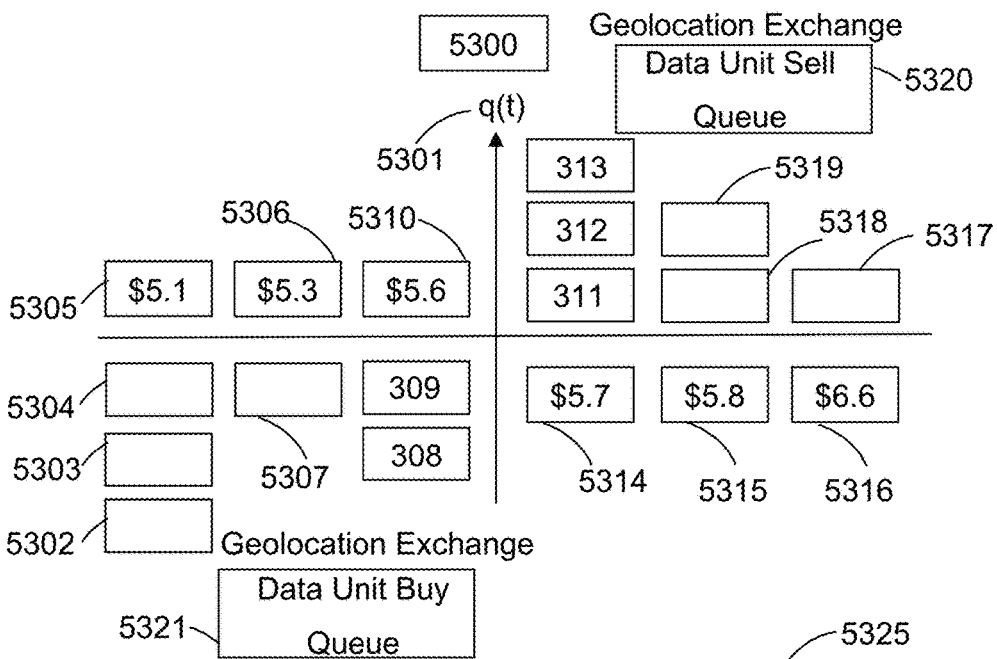

Geolocation Data unit specification limit order book ("LOB") is represented by vector q(t) such that the i-th coordinate for i>0, $q_i(t)$, is the number of sell limit orders that are waiting in the LOB at time t at price $i\delta$ ($\delta$ is the price unit tick size) The number of buy limit orders at $i\delta$ are represented with a negative sign $q_i(t)$ 5326: $s(t) = s(q(t)) = \min(\min\{0 < i\delta: q_i(t) > 0\})$
if $q_i(t) \leq 0$ for all $i > 0$, then $s(q(t)) = \infty$ 5327: $b(t) = b(q(t)) = \max(\max\{i\delta > 0: q_i(t) < 0\})$
if $q_i(t) \geq 0$ for all $i > 0$, then $b(q(t)) = -\infty$ 5328: If $s(t) = b(t)$, then match geolocation exchange data unit specification and move to confirmation process 5329: If $s(t) > b(t)$, maintain queue position 5330: If $s(t)$ or $b(t)$ is cancelled, remove from queue 5331: If $s(t)$ or $b(t)$ is new, insert $s(t)$ or $b(t)$ with priority of price, then time into price time priority queue of LOB

FIG. 53

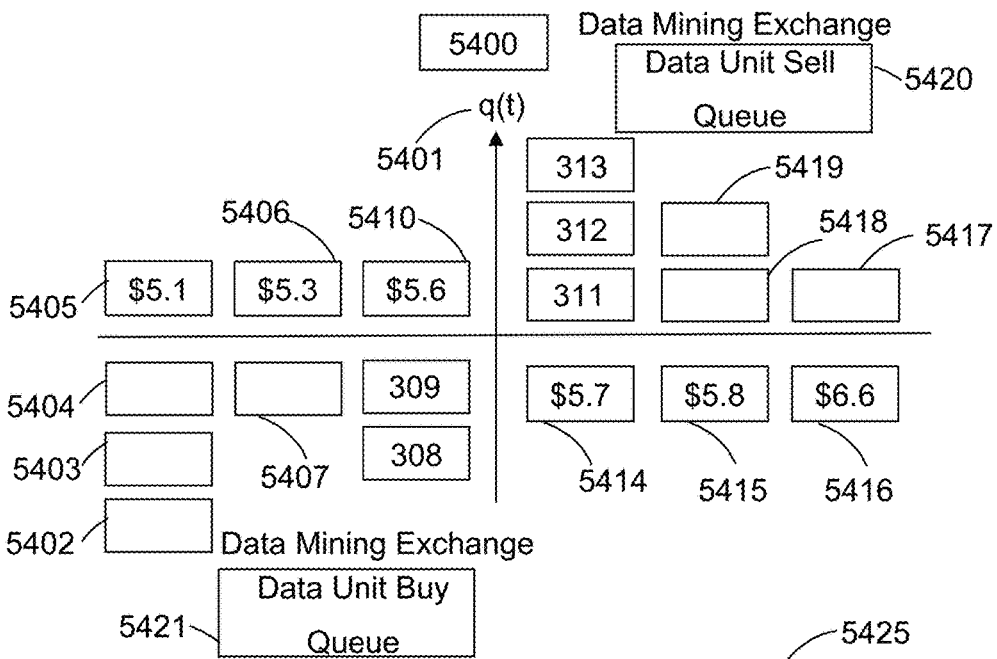
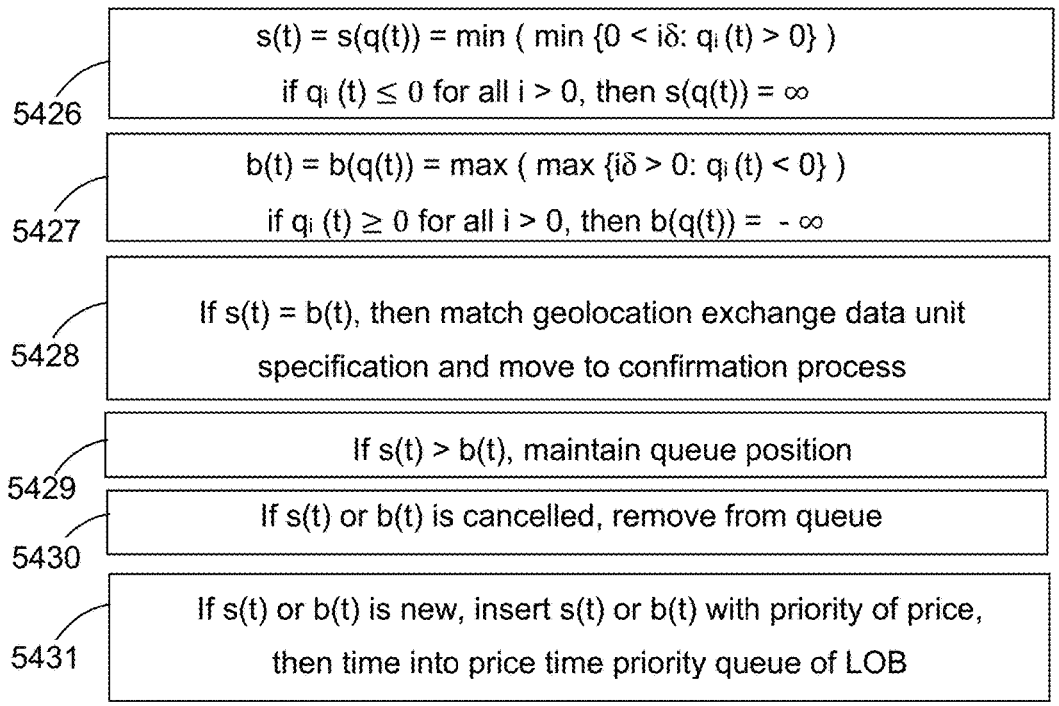
FIG. 54

6400

6410

$$M_{\text{multi-dimension object score (MDOS)}} = E(B_{MDCO}) - 0.005A\, \sigma^2_{MDCO}$$

Take an initial Multi-Dimension Object Coordinate with a vector of attributes and assume two possible results after inputting MDCO that is an object with a vector of MDCO attributes.

With a probability p

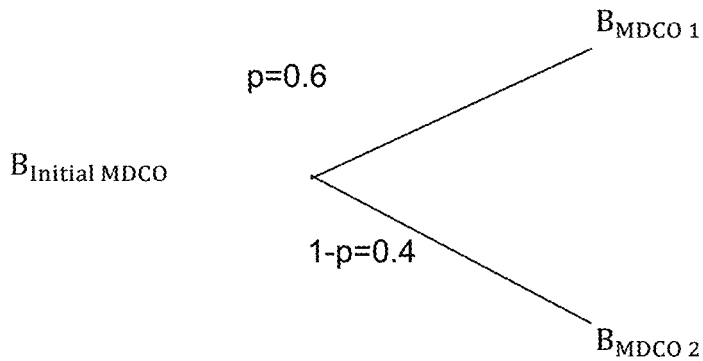

6430

So the expected value of MDOC is:

$$E(B_{MDCO}) = p(B_{MDCO\,1}) + (1-p)(B_{MDCO\,2})$$

6440

The variance $\sigma^2$ of the MDOC is $$\sigma^2 = p[B_{MDCO1} - E(B_{MDCO})]^2 + (1-p)[B_{MDCO2} - E(B_{MDCO})]^2$$

The standard deviation of MDCO is $\sigma = \sqrt{\sigma^2}$

| | State 1 | State 2 | State 3 |
|---|---|---|---|
| Sound MDCO Probability | 0.5 | 0.3 | 0.2 |
| Sound MDCO Toward target | 25% Increase to target | 10% Increase to target | -25% decrease to target |

The mean or expected return of an object is a probability weighted return

In all scenarios:

$$E(r) = \sum_s \Pr(s)\, r(s)$$

Applying the aformentioned formula to 6710 above we have $$E(r_{object}) = 0.5 \times 25 + 0.3 \times 10 + 0.2 \times (-25)$$

The variance of sound object on MDCO is $$\sigma^2 = \sum_s \Pr(s)\, [r(s) - E(r)]^2$$

Applying the aformentioned formula to 6710 above we have $$\sigma^2_{object} = (0.5(25 - 10.5)^2 + 0.3(10 - 10.5)^2 + 0.2(-25 - 10.5)^2 = 357.25$$

Or $\sigma_{object} = \sqrt{357.25} = 18.99\%$

$$E(r_{object}) = 0.5(E(r_{object\,1})) + 0.5(E(r_{object\,2}))$$

= 0.5×10.5 +0.5×5 = 7.75%, when object 1 is combined with object 2

$$\sigma_{MDOS} = 0.5(\sigma_{object\,1}) + 0.5(\sigma_{object\,2})$$

The standard deviation of the combination of objects

$$[r_{object\,1} - E(r_{object\,1})][r_{object\,2} - E(r_{object\,2})]$$

$$Cov(r_{object\,1}, r_{object\,2}) = \sum_{s} Pr(s)[r_{object\,1}(S) - E(r_{object\,1})][r_{object\,2}(s) - E(r_{object\,2})]$$

$$\rho(object\ 1, object\ 2) = \frac{Cov[r_{object\ 1}, r_{object\ 2}]}{\sigma_{object\ 1}\sigma_{object\ 2}}$$

6910

FIG. 69A $$\sigma^2_{MDCO} = w_1^2\sigma^2 + w_2^2\sigma_2^2 + 2w_1w_2 Cov(r_1 r_2)$$

Where subscript 1 is object 1 or another MDCO object and

Subscript 2 is object 2 or another MDCO object

6920

FIG. 69B $$\max_{vector\ of\ MDCO}[M_{MDCO\ score}] = E\left(r_{MDCO \atop Object}\right) - 0.005A\sigma^2_{MDCO \atop Object}$$

Where term A is the MDCO Objects's user preference index

|  | Ojects$_1$ or obj$_1$ | objects$_2$ or obj$_2$ |
|---|---|---|
| Oject or Objects weight | $w_{obj\,1}$ | $w_{obj2}$ |
| $w_{obj\,1}$ | $\sigma^2_{obj\,1}$ | $Cov(r_{obj1}, r_{obj2})$ |
| $w_{obj\,2}$ | $Cov(r_{obj\,1}, r_{obj2})$ | $\sigma^2_{obj\,2}$ |

|  | Object 1 | Object 2 |
|---|---|---|
| Expected MDCO ; E(r) | 8% | 13% |
| Standard deviation ; $\sigma$ | 12% | 20% |
| Covariance; $Cov(r_{obj1}, r_{obj2})$ | 72 ||
| Correlation Coefficient ; $\rho_{obj1,obj2}$ | 0.30 ||

| $w_{object\,1}$ | $w_{object\,2}$ | $\rho = -1$ | $\rho = 0$ | $\rho = 0.3$ | $\rho = 1$ |
|---|---|---|---|---|---|
| 0.0 | 1.00 | 20.00% | 20.00% | 20.00% | 20.00% |
| 0.25 | 0.75 | 12.00 | 15.3 | 16.16 | 18.00 |
| 0.50 | 0.50 | 4 | 11.66 | 13.11 | 16.00 |
| 0.75 | 0.25 | 4.00 | 10.30 | 11.53 | 14.00 |
| 1.00 | 0.0 | 12.00 | 12.00 | 12.00 | 12.00 |
| Minimum $\sigma_m$ | | 0.00 | 10.29 | 11.45 | - |
| $w_{object\,1}@\min\sigma_m$ | | 0.63 | 0.74 | 0.82 | - |

$$\text{Slope}_{\text{MDCO Allocation Line (A)}} = \frac{E(MDCO)_{\text{object 1, object 2} - \text{object}_{no\,\sigma}}}{\sigma_{\text{object 1, object 2}}}$$

$$= \frac{8.9-5}{11.45} = 0.34$$

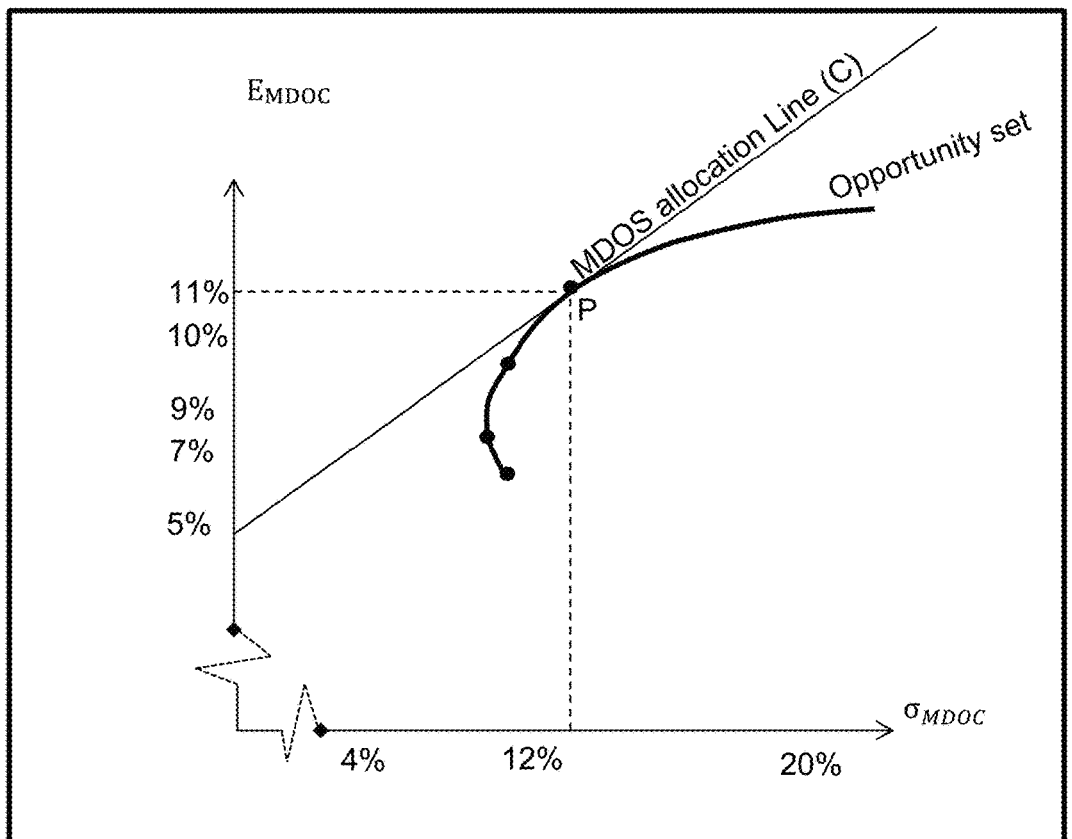

FIG. 74A $$\text{Slope}_{\text{MDOS allocation line}} = \frac{E_{\text{MDCO}} - \text{MDCO Original}_{\text{MDOC}}}{\sigma_{\text{MDOC}}}$$

$$E_{\text{MDCO(MC)}} \text{ of combination} = w_{object\ 1} E_{\text{object 1(MC)}} + w_{object\ 2} E_{\text{object 2(MC)}}$$

$$= 8 w_{\text{object 1}} + 13 w_{\text{object 2}}$$

$$\sigma_{\text{object combination}} = [w_{\text{obj1}}^2 \sigma_{\text{obj1}}^2 + w_{\text{obj2}}^2 \sigma_{\text{obj2}}^2 + 2 w_{\text{obj1}} w_{\text{obj2}} \text{Cov}(r_{\text{obj1}} r_{\text{obj2}})]^{\frac{1}{2}}$$

$$= [144 w_{\text{obj1}}^2 + 400 w_{\text{obj2}}^2 + 2 \times 72 w_{\text{obj1}} w_{\text{obj2}}]^{\frac{1}{2}}$$

$$\max_{w_i} \text{Slope}_{\text{MDOS allocation line}} = \frac{\text{MDCO} - \text{MDCO Orginal}_{\text{MDOC}}}{\sigma_{\text{MDOC}}}$$

Subject to $\sum w_i = 1$, which is the standard problem in calculus.

7510                    FIG. 75A $w_{obj1}$
$$= \frac{[E(r_{obj1MC}) - \text{MDCO Orig}_{MC}]\sigma^2_{obj2BC} - [E(r_{obj2MC}) - \text{MDCO Orgi}_{MC}]\text{Cov}(r_{obj1MC}, r_{obj2MC})}{[E(r_{obj1MC}) - \text{MDCO Orig}_{MC}]\sigma^2_{obj2MC} + [E(r_{obj2BC}) - \text{MDCO Orig}_{MC}]\sigma^2_{obj1MC} -}$$
$$[E(r_{obj1MC}) - \text{MDCO Orig}_{MC} + E(r_{obj2mC}) - \text{MDCO Orig}_{MC}]\text{Cov}(r_{obj1MC,obj2MC})$$

$$w_{object\,2} = 1 - w_{object\,1}$$

$$w_{object\,1} = \frac{(8-5)400 - (13-5)72}{(8-5)400 + (13-5)144 - (8-5+13-5)72}$$
$$= 0.40$$
$$w_{object\,2} = 1 - 0.40$$
$$= 0.6$$

7520

FIG. 75B $$y = \frac{E(r_{combination\,objects}) - \text{MDCO Orig}_{MC}}{0.01 \times A\sigma^2_{combination\,objects}}$$

$$= \frac{11-5}{0.01 \times 4 \times 14.2^2} = 0.7439$$

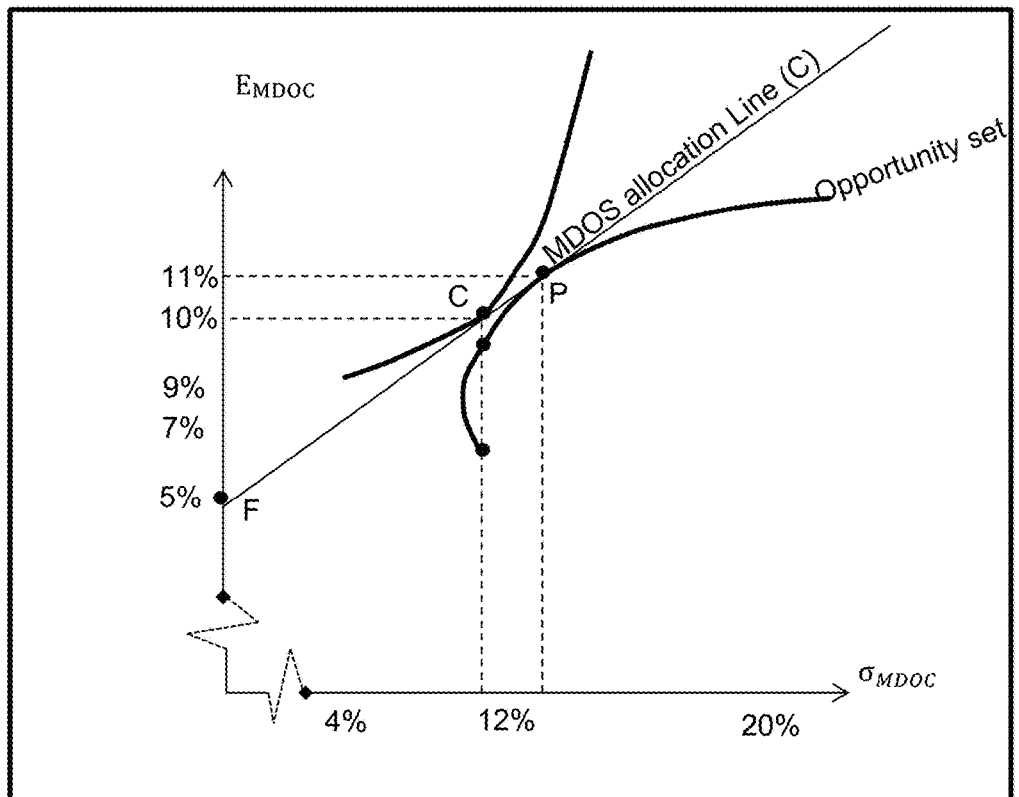

FIG. 76A

Specify the MDOC of all objects (expected MDCO, variances and covariances)

Establish the combination of MDCO

Calculate the optimal MDCO combination

Calculate the properties of the MDCO combination using weights determined by optimization.

Allocate object weights between obects combo and original object.

Calculate the fraction of the complete object towards the objects and original object Calculate the share of objects in each object and original object

$$E(r_p) = \sum_{i=1}^{n} w_i E(r_i)$$

$$\sigma_p^2 = \sum_{i=1}^{n} w_i^2 \sigma_i^2 + \sum_{\substack{i=1 \\ i \neq j}}^{n} \sum_{j=1}^{n} w_i w_j Cov(r_i, r_j)$$

7810

7900

$$w \in R^d$$

Vector w is a set of object weights $w = \begin{bmatrix} w_1 \\ w_2 \\ \vdots \\ w_d \end{bmatrix}$ where $w_1 + w_2 + \cdots + w_d = 1$ Let the expected object portfolio MDCO vector be $$r = \begin{bmatrix} r_1 \\ r_1 \\ \cdot \\ \cdot \\ r_d \end{bmatrix}, E(r) = \begin{bmatrix} E(r_1) \\ E(r_2) \\ \cdot \\ \cdot \\ E(r_d) \end{bmatrix}$$

Variance – covariance Matrix of objects in the object MDCO combination $$\sum = \begin{bmatrix} \sigma_1^2 & \cdots & \sigma_{1d} \\ \vdots & \ddots & \vdots \\ \sigma_{1d} & \cdots & \sigma_d^2 \end{bmatrix}$$

$$r_p = w'x\,r = [w_1 \; \cdots \; w_d] x \begin{bmatrix} r_1 \\ \vdots \\ r_d \end{bmatrix}$$

$$E(r_p) = w'x\,E(r)$$

$$\sigma_p^2 = w'x \sum x\,w = [w_1 \ldots w_d] \begin{bmatrix} \sigma_1^2 & \cdots & \sigma_{1d} \\ \vdots & \ddots & \vdots \\ \sigma_{1d} & \cdots & \sigma_d^2 \end{bmatrix} \begin{bmatrix} w_1 \\ \vdots \\ w_d \end{bmatrix}$$

FIG. 79

MULTI-DIMENSION CLASSIFICATION OBJECT MATRICES TO ESTIMATE MULTI-DIMENSIONAL REPRESENTATIONS WITH MULTI FUNCTION DEVICE

CROSS-REFERENCE TO RELATED APPLICATIONS

This application claims the benefit of and priority to Provisional Patent Application Number U.S. 63/044,997, filed 2020 Jun. 26 and titled MULTI-DIMENSION CLASSIFICATION OBJECT MATRICES TO ESTIMATE MULTI-DIMENSIONAL REPRESENTATIONS WITH MULTI FUNCTION DEVICE; Provisional Patent Application Number U.S. 63/051,373, filed 2020 Jul. 13 and titled VIRTUAL POWER PLANT OPTIMIZATION METHOD AND SYSTEM; and Provisional Patent Application Number U.S. 63/052,159, filed 2020 Jul. 15 and titled MULTI-DIMENSION INFORMATION SERVICE HELMET METHOD AND SYSTEM; each of which is herein incorporated by reference.

This application is a continuation-in-part of each of the following: U.S. patent application Ser. No. 17/349,829, filed 2021 Jun. 16 and titled VIRTUAL REALITY, AUGMENTED REALITY, MIXED REALITY DATA EXCHANGE SOCIAL NETWORK WITH MULTI DIMENSIONAL MAP TILE PORTING, which claims priority to U.S. 63/039,918, filed 2020 Jun. 16; U.S. patent application Ser. No. 17/324,051, filed 2021 May 18 and titled TIME INTERVAL GEOLOCATION COMMUNITY OBJECTS WITH PRICE-TIME PRIORITY QUEUES FOR TRANSFORMED TIME INTERVAL GEOLOCATION UNITS, which claims the benefit of and priority to Provisional Application Number U.S. 63/027,344, filed 2020 May 19; U.S. patent application Ser. No. 17/082,254, filed 2020 Oct. 28 and titled TOLL AND CONGESTION COMMUNITY OBJECTS WITH PRICE-TIME PRIORITY QUEUES FOR TRANSFORMED TOLL AND CONGESTION CAPACITY UNITS, which claims the benefit of and priority to Provisional Application Number U.S. 62/927,081 filed 2019 Oct. 28; U.S. patent application Ser. No. 17/069,597, filed 2020 Oct. 13 and titled PRICE TIME PRIORITY QUEUE ROUTING FOR TRANSPORTATION CAPACITY UNITS, which claims the benefit of and priority to Provisional Application Number U.S. 62/914,427 filed 2019 Oct. 12; U.S. patent application Ser. No. 16/589,229, filed 2019 Oct. 1 and titled TRANSPORTATION AND FREIGHT CAPACITY UNITS; U.S. patent application Ser. No. 16/556,838, filed 2019 Aug. 30 and titled FINANCIAL SWAP INDEX METHOD AND SYSTEM ON TRANSPORTATION CAPACITY UNITS AND TRADING DERIVATIVE PRODUCTS BASED THEREON; U.S. patent application Ser. No. 16/397,685, filed 2019 Apr. 29 and titled TUTORING COMMUNITY OBJECTS WITH PRICE-TIME PRIORITY QUEUES FOR TRANSFORMED TUTORING UNITS; U.S. patent application Ser. No. 16/359,841, filed 2019 Mar. 20 and titled PARKING COMMUNITY OBJECTS WITH PRICE-TIME PRIORITY QUEUES FOR TRANSFORMED PARKING UNITS; U.S. patent application Ser. No. 16/357,241, filed 2019 Mar. 18 and titled RENEWABLE ENERGY COMMUNITY OBJECTS WITH PRICE-TIME PRIORITY QUEUES FOR TRANSFORMED RENEWABLE ENERGY UNITS; U.S. patent application Ser. No. 16/274,490, filed 2019 Feb. 13, titled ROUTE COMMUNITY OBJECTS WITH PRICE-TIME PRIORITY QUEUES FOR TRANSFORMED TRANSPORTATION UNITS, which is a continuation-in-part of U.S. patent application Ser. No. 16/258,658, filed 2019 Jan. 27, now U.S. patent Ser. No. 11/035,682, and titled NAVIGATION ROUTES AS COMMUNITY OBJECT VIRTUAL HUB SEQUENCES TO WHICH USERS MAY SUBSCRIBE; U.S. patent application Ser. No. 16/257,032, filed 2019 Jan. 24 and titled SECURITIZATION OF TRANSPORTATION UNITS; U.S. patent application Ser. No. 16/242,981, filed 2019 Jan. 8 and titled STRATEGY GAME LAYER OVER PRICE BASED NAVIGATION; U.S. patent application Ser. No. 16/242,967, filed 2019 Jan. 8 and titled PRICE BASED NAVIGATION; U.S. patent application Ser. No. 16/239,485, filed 2019 Jan. 3 and titled MARKET LAYER PRICE QUEUE MAP ROUTING FOR MULTI-LAYERED NODAL NETWORK TOPOLOGY FOR A MULTI-MODAL SECURE FORWARD MARKET AUCTION IN TRANSPORTATION CAPACITY AND SPACE; U.S. patent application Ser. No. 16/183,647, filed 2018 Nov. 7 and titled FINANCIAL SWAP PAYMENT STRUCTURE METHOD AND SYSTEM ON TRANSPORTATION CAPACITY UNIT ASSETS; U.S. patent application Ser. No. 16/167,525, filed 2018 Oct. 22 and titled MULTI-LAYERED NODAL NETWORK TOPOLOGY FOR A MULTI-MODAL SECURE FORWARD MARKET AUCTION IN TRANSPORTATION CAPACITY AND SPACE; U.S. patent application Ser. No. 15/877,393, filed 2018 Jan. 23 and titled ELECTRONIC FORWARD MARKET EXCHANGE FOR TRANSPORTATION SEATS AND CAPACITY IN TRANSPORTATION SPACES AND VEHICLES; U.S. patent application Ser. No. 15/266,326, filed 2016 Sep. 15 and titled IMPLEMENTATIONS OF A COMPUTERIZED BUSINESS TRANSACTION EXCHANGE FOR VARIOUS USERS; each of which is herein incorporated by reference.

BACKGROUND OF THE INVENTION

Field of the Invention

The following descriptions and examples are not admitted as prior art by virtue of their inclusion within this section.

In some scenarios, virtual environments and the ability to replicate physical environments are becoming increasingly important as chip processing speeds and data storage continue to become more efficient improving user experience. Current virtual environments are a long way from physical environments in software implementation and software and hardware tools remain considerably challenged and limited in scope and mostly residing in static or very limited dynamic environments. Open source data tools such as open street maps have expanded greatly, but it is exceptionally challenging to programmatically interface with the data or maintain the data in an organized framework. Further, most mapping is very limited to three, four or five dimension tensor modeling which is incapable and deficient of the dimensions a typical human is able to capture and experience. Two, three, four and five dimension tensor modeling of image data is deficient from incorporating time, sensory, sound, weather, scale, micro-scale, nano-scale, temperature, and other string theory dimensions possible of additional universes, starting points in history of different universes and alternative laws of physics. Current objective functions for mapping are very limited. This situation is unfortunate as many people in the world simply have limited means to travel, personal safety and general health may be compromised with some forms of physical interaction and travel and organizations do not have the resources to send workers all over the world. Lastly, learning and physical travel is very high cost and most people simply never leave their home area which causes lack of education. Further, physical travel uses a great deal of limited environmental resources which can be very costly to the environment.

To avoid problems associated with limited resources and high cost physical experiences, computing devices may be improved by integrating a plurality of dimensions from map tile database structures with social networks, optimization of user objective functions and price time priority queue exchanges and securitization transformations may add additional dimensions to improve user experience and engagement while reducing the cost of personal interaction.

Accordingly, due to the aforementioned deficiencies, there is a need for implementations of various methods to couple a multi-dimension mapping database (latitude, longitude, altitude, sound, sensory, time, weather, temperature, scale, micro-scale, nano-scale, chemistry dimension, cross-product dimension, nth dimension), multi dimension coordinate object portfolio optimization, data exchange, rendering engine, CPU devices (Central Processing Unit, "CPU"), GPU devices (Graphic Processing Unit, "GPU"), securitization transformations, social networking and time exchange.

SUMMARY

Described herein are implementations of various technologies relating to price time priority queues for multi-dimensional mapping database exchange (latitude, longitude, altitude, sound, sensory, time, weather, temperature, picture, scale, micro-scale, nano-scale, chemistry dimension, cross-product dimension, nth dimension), multi dimension coordinate object portfolio optimization, data exchange, rendering engine, CPU devices (Central Processing Unit, "CPU"), GPU devices (Graphic Processing Unit, "GPU"), securitization transformations, social networking and time exchange. The above deficiencies and other problems associated with systems incapable of dynamically changing the users virtual environment with a dynamic multi-dimensional map tile database and data exchange with private and public social networks are eliminated or reduced by the disclosed multifunction device and method. Current systems of technology to integrate computing into everyday life have largely been accepted when human users can trust the other users of the technology. Many users simply are unable to travel and mapping software does not function like a social network in any dynamic relational method. Social networks rely on static content pictures, static videos, live videos and delayed messaging systems. Video conferencing allows live dynamic conversations, but they don't allow dynamic multi dimension mapped object environments or virtual objects from multiple dimensions to mix. The isolated nature of CPU, desktop, laptop or mobile computing is accepted because it remains obvious if one user is recording another user and typically this is forbidden in standard social settings because it violates a human social contract of trust between each other. Innovations such as Google Glass or Microsoft HaloLens or other augmented or virtual reality devices have struggled with adoption because they violate social contracts between humans and breach trust between humans. Another large deficiency in these models is data ownership. Information is power and if humans know they have different levels of power, they will typically not interact freely. This problem has caused a rift to form between humans and humans with technology. Further, augmented and virtual reality requires mapping a user's environment so that the virtual objects can interact with real objects that have been mapped into a database. Two dimension and three dimension mapping databases are not designed as social networks and social networks are not designed for mapping hence virtual experiences are void of the dynamic real world in any dynamic sense or implementation. Virtual, augmented or mixed reality software does not integrate with dynamic maps and the dimensionality is very limited. Typical companies are protective over captured data and do not share data openly. Open source solutions for data tend to require massive overhead to maintain as the architecture is brought together by a non-unified volunteer workforce. Further, there are not consistent compensation schemes for open source software, so solutions tend to lack architecture, unification, completeness and continuity. Implementations of alternative methods thus far have introduced non-sharing technologies which then pit one user against another user in turn causing low levels of adoption and violate human social contracts of trust. Lastly, implementations of alternative methods and systems thus far have dealt with the first person perspective rather than the proposed invention which allows the first person and third person omniscient perspective and multi dimension object perspective, which, alongside methods and systems of social networks, dynamic multi-dimension map tile databases, data exchanges, machine learning optimization iterative feedback, the ability for a user to not only listen to music, but be part of the band, it allows not only the ability to watch a movie, but to be in the movie alongside existing actors and actresses, it allows not only the ability to watch a lesson in cooking or music or athletics, it allows a blind person to see a crack in a side walk with audio mechanotransduction translation, it allows an elderly person riding a bike to see other objects coming behind them without the need to turn their head, the ability to allow not only learning, but to be alongside the teacher or instructing professional in an augmented or mixed reality environment in a dynamic social network and multi-dimension map tile database virtual environment perspective.

In some embodiments, the invention of systems and methods to accelerate the adoption of mixed reality, augmented reality and virtual reality is directed towards a multi-function CPU or GPU devices with a geolocation multi-dimension map object tiled database and data exchange with a CPU or GPU rendering engine view over a plurality of social networks and virtual travel modes in route to destination in the context of private and public social networks. In some embodiments, the geolocation multi-dimension map tiled database and data exchange with a CPU or GPU rendering engine view over a plurality of social networks and virtual travel modes has the ability to record/map environments while pairing to other users in a private or public social network group. In some embodiments, the shared device or single user device has the function of building social contract trust so that users can equally build the groups information advantage rather than destroying group trust because the technology is potentially being used against a group member creating biased or skewed information advantage. In some embodiments, the shared device or single user device also has the functional ability to display a first person or third person omniscient or multi dimension omniscient object perspective with machine learning optimization iterative feedback, for a user to not only listen to music, but be part of the band, it allows not only the ability to watch a movie, but to be in the movie alongside existing actors and actresses, it allows not only the ability to watch a lesson in cooking or music or athletics, but to be alongside the teacher or instructing professional in an augmented environment, it allows not only the ability to invent something, but to be alongside the inventor or mentor in an augmented or mixed reality environment.

In some embodiments, a plurality of users may be communicatively paired with the device for group interaction settings. In some embodiments, the plurality of users may command the device independently for the benefit of the private group. In some embodiments, the plurality of users is then connected to the local or remote application server through the ball device or a general use CPU device or mechanotransduction device. In some embodiments, the ball CPU or general use CPU or mechanotransduction device and application host or the network server then connects users to a plurality of application functions. In some embodiments, the ball CPU or general use CPU device or mechanotransduction device is not only capable of pairing users to transmit data and electromagnetic light to users, but it also maps the user's environment for interaction with the application server and a data exchange interface to a multi-dimensional geolocation tile server database which is iteratively optimizing dimensions for the user utility function. In some embodiments, the users may use the device privately as one would use a mobile smart phone or they may pair with other users for group purposes to ease social contract stress. In some embodiments, the shared or private applications may include but are not limited to multi-dimension map data exchange, calendar, photos, camera, videos, maps, weather, credit cards, crypto currency, digital currency, notes, clocks, music, application hosting servers, settings, physical fitness, news, video conferencing, hologram conferencing, home security, home lighting, home watering systems, home energy or temperature settings, home cooking, phone, texting services, mail, internet, social networking, blogs, investments, books, television, movies, device location, flashlights, music tuners, airlines, transportation, identification, translation, gaming, real estate, shopping, food, commodities, technology, memberships, applications, web applications, audio media, visual media, touch media, general communication, internet, or other common data exchange interface applications.

In one embodiment of the invention, the application server may use price-time priority queues with multi-dimension geolocation data transformations to provide an algorithm to more efficiently provide the user with organized services or applications that are needed after the device has scanned the common area for the group or private user who has been paired with the device. In some embodiments, the application server may display through the ball or CPU display device most frequently used applications as well as recommending more efficient application for data patterns of the user or group of users.

In another embodiment of the invention, the application server uses machine learning clustering to analyze and contrast the user's biomechanical movement for such exercises as athletics, music, performing arts, cooking, teaching, conferencing, or other behavior against more efficient methods of movement. In some embodiments, the visualization allows both the first person and third person omniscient perspective because of the positioning of the camera and projection relative to the waveguide lens or CPU display device. In some embodiments, the ball or general CPU device may be able to provide the user of the CPU ball or general CPU device with an augmented reality companion to teach them. In some embodiments, the augmented reality companion may be a professional at the service such as but not limited to tennis with John McEnroe or football with Nick Sabin or cooking with Julia Child or piano with Beethoven or acting alongside Harrison Ford in Star Wars or singing alongside Carrie Underwood on stage or in a private performance or many other examples. In some embodiments, the ball CPU or general CPU device may analyze the user's movements and provide customized feedback and interaction with other projected human holograms and objects based on machine learning k-clustering to optimize the differences in movements inherent in the augmented reality system.

In another embodiment of the invention, the ball CPU and GPU or general CPU and GPU device or mechanotransduction CPU and GPU device, may iteratively optimize objects with the method algorithm to render multi dimension coordinate objects which maximize user utility according to the function and distribution of weighting schemes.

In another embodiment of the invention, the ball CPU or GPU or general CPU or mechanotransduction CPU or GPU device is docked on a drone that will then transport the device within a fixed set radius of the user to scan the associated area of the user into a database. In some embodiments, the drone docked CPU ball or general CPU or mechanotransduction device may use the ability to scan the user's area and navigate hallways, stairways, rooms, and outside places within a fixed radius of the user as well as the users movements. In some embodiments, the application server that the ball CPU or generalized CPU device accesses locally or remotely may then be able to draw upon the database to speed processing times and reduce memory leak.

In another embodiment of the invention, multiple users who each have the CPU ball or cube device or general CPU or mechanotransduction device may lock the other devices to a common group share over a network if a group of users is working together. In some embodiments, the bounded group lock features are in place to build technology trust amongst users while not violating human social contracts. In some embodiments, the implementation allows for all users to experience the common recording in their viewing through the planar waveguide lens or general CPU or GPU to disallow asymmetric information which violates human social contracts of trust.

In another embodiment of the invention, reflective light and electromagnetic waves are projected from the CPU device or mechanotransduction CPU or GPU device onto the eyeglasses then from the eyeglasses through the aqueous humor lens and vitreous humor which then project onto the photo receptors of the retina. In some embodiments, the projected images to provide the augmented reality experience reside within the structures at reactive variable depths of the eyeglasses or contact lenses. In some embodiments, the impulses then synapse with the optic nerve to transmit images to the brain. In some embodiments, the adjustments to the pupil and lens allow for the adjustment of light transmission to the retina. In some embodiments, the features augment the users visual experience from not only the natural world but also the CPU ball generated objects to make a mixed reality or augmented reality experience. In some embodiments, the multi-dimension map tile data exchange database images may also be on a more traditional CPU display. In yet other embodiments, the multi-dimension map tile data exchange database may transform multi dimension coordinate objects to mechanotransduction objects through the mechanotransduction device.

In some embodiments, the users may use eye glasses or contacts because the cornea and the length of the eye are often mismatched. In some embodiments, the name for the mismatch is correlation error in optometry. In some embodiments, the user one is near sighted the cornea does not project all the way back to the retina and when user one is far sighted the image is projected too far past the retina. In some embodiments, the glasses to correct near sightedness are thinner in the middle and thicker on the edges which allows light to diffuse and diverge and project images further back toward the retina. In some embodiments, the user may correct far sightedness, the glasses are thicker in the middle and thinner on the edges which allows for light to converge more quickly and the images are brought in further to project onto the retina accurately which allows for focus. In some embodiments, the more or less glasses "trick" the eye by moving the light toward different focal points and these optic changes may be present on the CPU display to reduce or eliminate the need for glasses.

In some embodiments, the coherent laser light and electromagnetic waves are projected from the mobile CPU ball or general CPU or simply refracted on the CPU surface or translated into mechnotransduction audio objects. In some embodiments, the refracted images from light transmission into the structures in the glasses or contacts make the holographic images inside the contacts or eyeglasses. In some embodiments, the refraction allows for the laser image that is projected to the head mounted eye glasses or contacts to be properly transmitted to the optic nerves for interpretation.

The disclosed price-time priority queue organized multi-dimension map tile data and data exchange with multi-dimension coordinate object optimization over the user utility function allow electronic devices to behave and organize social networks, virtual objects, augmented reality objects, mixed reality objects and actual objects in a manner that greatly improves the time and efficiency by which the objects may be utilized by a plurality of users despite former lack of organizational structure to the data.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

FIG. 24 illustrates an exemplary multi-stop virtual trip and messaging interface between users of the social network structure as the transaction gateway of virtual travel for the multi-dimension map database and data exchange linked with associated price-time priority queues in accordance with some embodiments.

FIG. 53 illustrates an exemplary price time priority queue for multi-dimension mapping data geolocation exchange data objects and construction of a limit order book to organize the value of the objects for the database to exchange.

FIG. 54 illustrates an exemplary price time priority queue for multi-dimension mapping data mining geolocation exchange data objects and construction of a limit order book to organize the value of the objects for the database to exchange.

FIGS. 64A and 64B illustrate an exemplary implementation of methods utilizing a plurality of linear and non-linear equations to maximize multi dimension user portfolio object utility in accordance with some embodiments.

FIGS. 67A and 67B and 67C illustrate one exemplary probability distribution of a Multi Dimension Coordinate object utilizing a plurality of linear and non-linear equations to maximize multi dimension user portfolio object utility.

FIGS. 68A and 68B and 68C and 68D illustrate a Multi Dimension Coordinate Object portfolio, expected value of the portfolio object, standard deviation of the object portfolio and covariance of the object portfolio.

FIGS. 69A and 69B and 69C illustrate how the covariance and correlation equations of multi dimension coordinate objects relate to the maximization of the multi dimension object score for the portfolio of objects.

FIGS. 70A and 70B illustrate some descriptive objects and object portfolios sampling analysis statistics of a partial implementation of a simple two object multi dimension coordinate object embodiment of the system and method.

FIG. 72B illustrates the multi dimension coordinate object combination opportunity set for various correlation factors.

FIGS. 74A and 74B illustrate the highest sloping Multi Dimension Object Score allocation line (C) at point P intersecting with the opportunity set.

FIGS. 75A and 75B and 75C illustrate the framework to maximize the slope of the Multi Dimension Object Score allocation line subject to the condition that the sum of the weight of all the multi dimension coordinate object will sum to one which is a standard calculus problem.

FIGS. 76A and 76B illustrate the graphical solution of FIGS. 75A and 75B and 75C as well as the summarization of a two or more multi dimension coordinate object embodiment to a general embodiment.

FIG. 79 illustrates the expected general exemplary case of the method with vectors to illustrate any general combination of multi dimension coordinate object components, multi dimension coordinate objects and combinations and how they interact with any multi dimension coordinate object components or elements.

DETAILED DESCRIPTION

Figure 1:
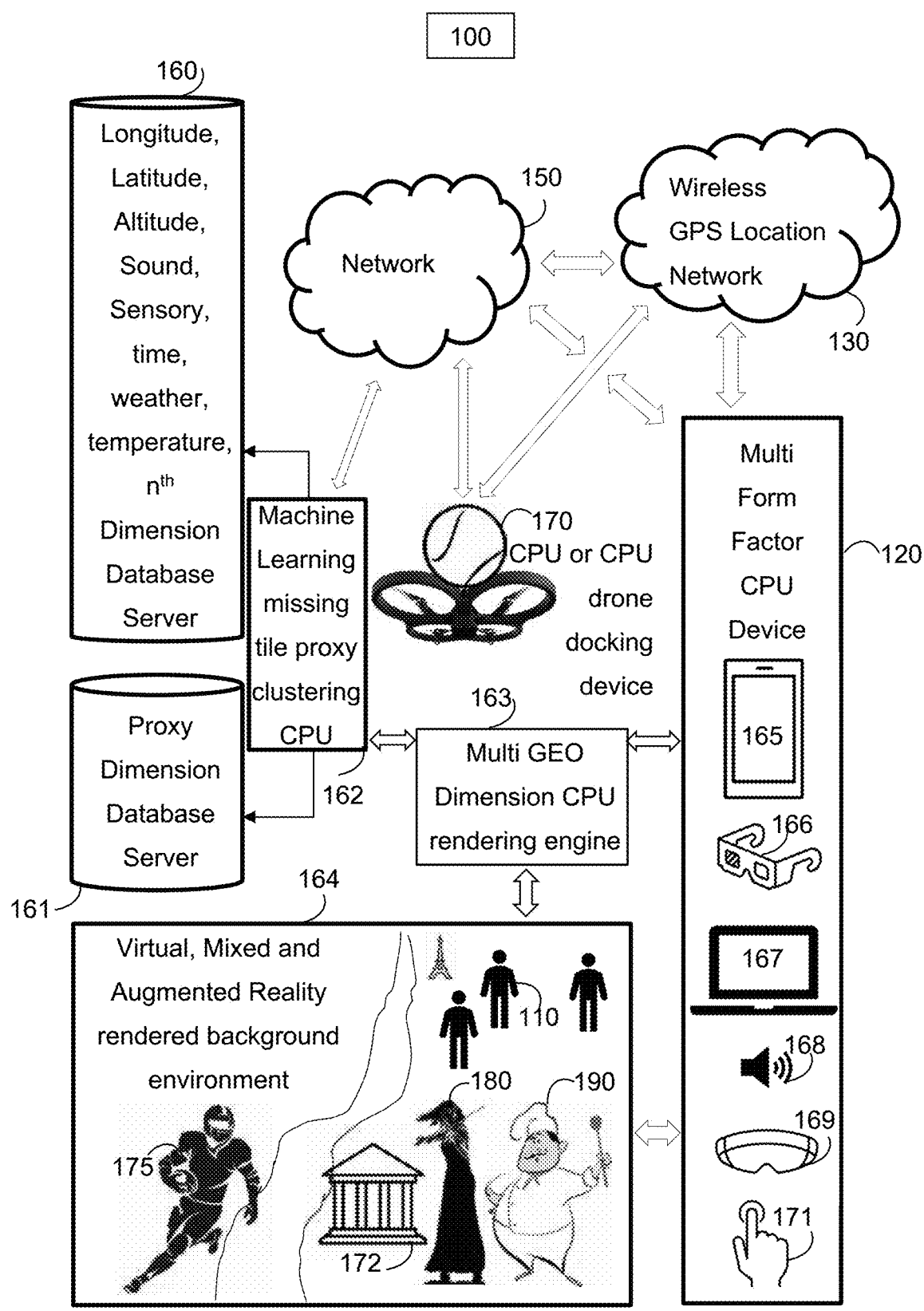
FIG. 1 illustrates an exemplary schematic diagram of implementations of the mobile CPU and plurality of multi-form factored CPU or GPU devices networked with the multi-dimension map tile database, proxy database and data exchange to present virtual, mixed and augmented reality rendered background environments and virtual objects in a single or multi-user virtual environment.

The discussion below is directed to certain specific implementations. It is to be understood that the discussion below is only for the purpose of enabling a person with ordinary skill in the art to make and use any subject matter defined now or later by the patent "claims" found in any issued patent herein. In other instances, well-known methods, procedures, components, circuits and networks have not been described in detail so as not to unnecessarily obscure aspects of the embodiments.

It will also be understood that, although certain elements of the invention and subject matter will be described in a certain order, the order is not intended to be limiting to the invention as many steps may be performed in a plurality of configurations to accomplish the invention of using various technologies to participate, trade and transact virtual trip data community linked transmission and virtual trip data units with associated price-time priority queues as a physical forward commodity. It will be further understood that the terms "comprises" or "comprising," when used in this specification, specify the presence of stated features, integers, steps, operations, elements, and/or components, but do not preclude the presence or addition of one or more other features, integers, steps, operations, elements, components, and/or groups thereof.

The terminology used in the description of the invention herein is for the purpose of describing particular embodiments only and is not intended to be limiting of the invention. As used in the description of the invention, the singular forms "a", "an" and "the" are intended to also include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

A computing device, as described herein, may include any computing implementation known to those skilled in the art, including mobile computing devices. In some implementations, a fixed stationary computing device, a virtual reality headset, a mixed reality headset, an augmented reality headset, or an audio interfaced computer device may be used instead. In another implementation, the computing device may be used in conjunction with a projection computing device. The computing device may be used with or include any device which communicates and integrates the use of: a network, community route processor, my route processor, sequence route processor, global positioning system (GPS) network, routing algorithms based on dynamic market inputs, servers, forward commodity forward market auction database, grouping software instructions for hubs, securitization transformations and specifications, game servers, indexing algorithms for transportation and freight unit securities, forwards, futures, options, swaps and contracts on various navigation routes, navigation servers, routing sequence algorithms, virtual hub topology methods and systems, transparent open access user interface pricing systems with price time priority queues, blockchain audit and safety methods, facial recognition, fingerprint recognition or photo recognition of users for security and identity check, and/or algorithms for no arbitrage conditions and constraints. A computing device, as described herein, may utilize a user interface (e.g., a graphical user interface) formatted on mobile or stationary computing devices over various mediums. Such devices may be connected through a network for the purpose of grouping users into virtual hub sequences of community objects as a gateway to participating, transacting, and/or trading transportation or freight capacity units between combinations of virtual hubs as a forward commodity in an auction.

Various implementations directed to price time priority queue routing for transportation capacity units will now be described in the following paragraphs with reference to FIGS. 1-79.

In some embodiments, elements of the system have the ability to be docked in a drone cradle which creates a database map of the user's nearby environment while not being utilized by the user for an immediate task. In some embodiments, the CPU or CPU(s) or GPU form factor may be expressed as a CPU or GPU mobile device, tablet device, stationary computing device, augmented reality device, virtual reality device, sensory device, audio device, visual device or other general computing device, such as those described in U.S. patent Ser. Nos. 10,460,520 B2, "Computer Ball Device for Mixed Reality, Virtual Reality or Augmented Reality," filed Jan. 13, 2017, the contents of which are hereby incorporated by reference in their entirety. In some embodiments, the CPU or GPU form factor may be mechanotransduction devices such as earphones or headphones with cameras to optimize across dimensions. In some embodiments, multi-dimensional map tile database elements may replicate virtual environments or immerse social network participants in virtual environments. In some embodiments, multi dimension coordinate objects may be optimized with an objective function to improve the user experience. In some embodiments, social network participants may virtually appear on with other virtual participants in common or non-common virtual background environments. The device may decouple the traditional design of head mounted virtual and mixed reality wherein the traditional design places the camera or central processing unit ("CPU") or GPU addition to the standard eyeglass which then violates human social contracts or concern the user or nearby bystanders are being recorded. The mobile computer ball device may in some embodiments be decoupled from the waveguide lens so that a third person view of the user can be obtained in addition to a first person view. The multi form factor CPU or GPU device may also simply record the participation of the social network member and place them inside multi-dimensional virtual user environments with a plurality of users. The multi form factor CPU or GPU device may also simply record the participation of the social network member and place them inside multi-dimensional virtual user environments with a plurality of users. In some embodiments, the plurality of user social networks may include both public and private views. In some embodiments, the plurality of user social network private view may display invite only participants. In some embodiments, the plurality of user social network public view may display multiple virtual environment participants with their derived placement in the database virtual, augmented or mixed reality environment. In some embodiments, the computerized ball device may embody standard shape eyeglasses to be coupled with the device in both a private user to ball setting or a device (ball) to private group setting. In some embodiments, the device may have superior design to existing implementations of mixed and virtual reality technology with bulky head mounted apparatus which add weight that disturbs social contracts and bio-mechanical movement and weight distribution and does not allow for both first person and third person view points in the waveguide display. In some embodiments, the family use of the technology may allow for natural sharing of a coupled group technology sharing of experience. In some embodiments, the commercial and industrial work team use of the technology may allow for natural sharing of a coupled group sharing of technology experience. In some embodiments, the technology may be a superior implementation of the way humans collaborate and work in groups. In some embodiments, the technology may be a superior implementation to extend natural human interaction without drawing attention to the technology instead of the shared human experience. In some embodiments, the current technology deployment for computerized devices has focused on individual experience at the expense of group interaction. In some embodiments, the implementation of the multi-dimensional virtual, mixed and augmented reality environment allows for a superior group experience. In some embodiments, the plurality of form factors for the multi-dimensional map tile database, data exchange, proxy dimension database and machine learning proxy algorithm provide efficient user experiences for virtual travel as well as arranged meetings from the time exchange as described in U.S. provisional patent application Ser. No. 63/027,344, "Time interval geolocation community objects with price-time priority queues for transformed time interval geolocation units," filed May 19, 2020, the contents of which are hereby incorporated by reference in their entirety.

The following paragraphs provide a brief summary of various techniques described herein such as illustrated in FIG. 1. In one implementation as illustrated in FIG. 1, the ball CPU device 170 may be mounted on a drone charging base 170. In yet another implementation, the multi-form factor CPU 120 may come in the form of a tablet CPU 165 or waveguide lens device 166 or laptop or stationary CPU 167 or audio CPU 168 or headset augmented, mixed or virtual reality device 169 or internet of things edge CPU device 171 or mechanotransduction to audio device 6100. The multi-form factor CPU device 120, 170 may gather preliminary information to complete and transmit a map tile database 160 utilizing the wireless network 150 and wireless GPS location network 130 of the users environment from a fixed radius from the users 110. The map tiles from the database server 160 are then transferred to the multi-form factor CPU device 170, 120 on a wireless network 150 from the database server 160. In some embodiments, the multi-dimension map tile database 160 by interpolate missing data within the multi-dimension map tile database 160 with a proxy dimension database server 161 which relies upon algorithms in a machine learning missing tile proxy clustering CPU 162 to replicate missing data in the primary multi-dimension map tile database 160. In some embodiments, the multi-form factor CPUs 170, 120, 6100 render multi-dimension geolocation data with a multi-dimension rendering CPU engine 163 which presents multi-dimension map tile database data over multiple coordinate matrices and vectors to render the requested user configuration from the multi-form factor CPU devices 170, 120, 6100. The users 164 environment is periodically scanned for change analysis to the map tiles by the CPU devices 120 and 170. Multi dimension coordinate objects may also be projected by laser light to the user 120. In some embodiments, the virtual, mixed and augmented reality rendered background 164 may dynamically render virtual representations of other members of the network 150 such as athletes 175, musicians 180, cooks and chefs 190 or a plurality of other persons 110 and users 110. In some embodiments, users 110 may configure various elements of the multi-dimension map tile database with dimensions that include but are not limited to longitude, latitude, altitude, sounds, sensory, time, weather, temperature, scale, micro-scale, nano-scale, chemistry, color, lens filters, aperture filters, type filters, cross-product combination dimensions and nth dimension vectors and matrices 160 of coordinate tiles to mix and match dimensions for user rendering for the user network 150. In some embodiments, users 110 may use the multi-form factor CPUs 120 and 170 and 6100 to upload multi-dimension map tile data 160 over the network 150 with GPS coordinates from the GPS location network 130 which are uploaded using a data exchange method 5200, 5300, 5400, 5500 covered in greater detail with respect to the formulas and transformations of data to organize the system and method.

Figure 2:
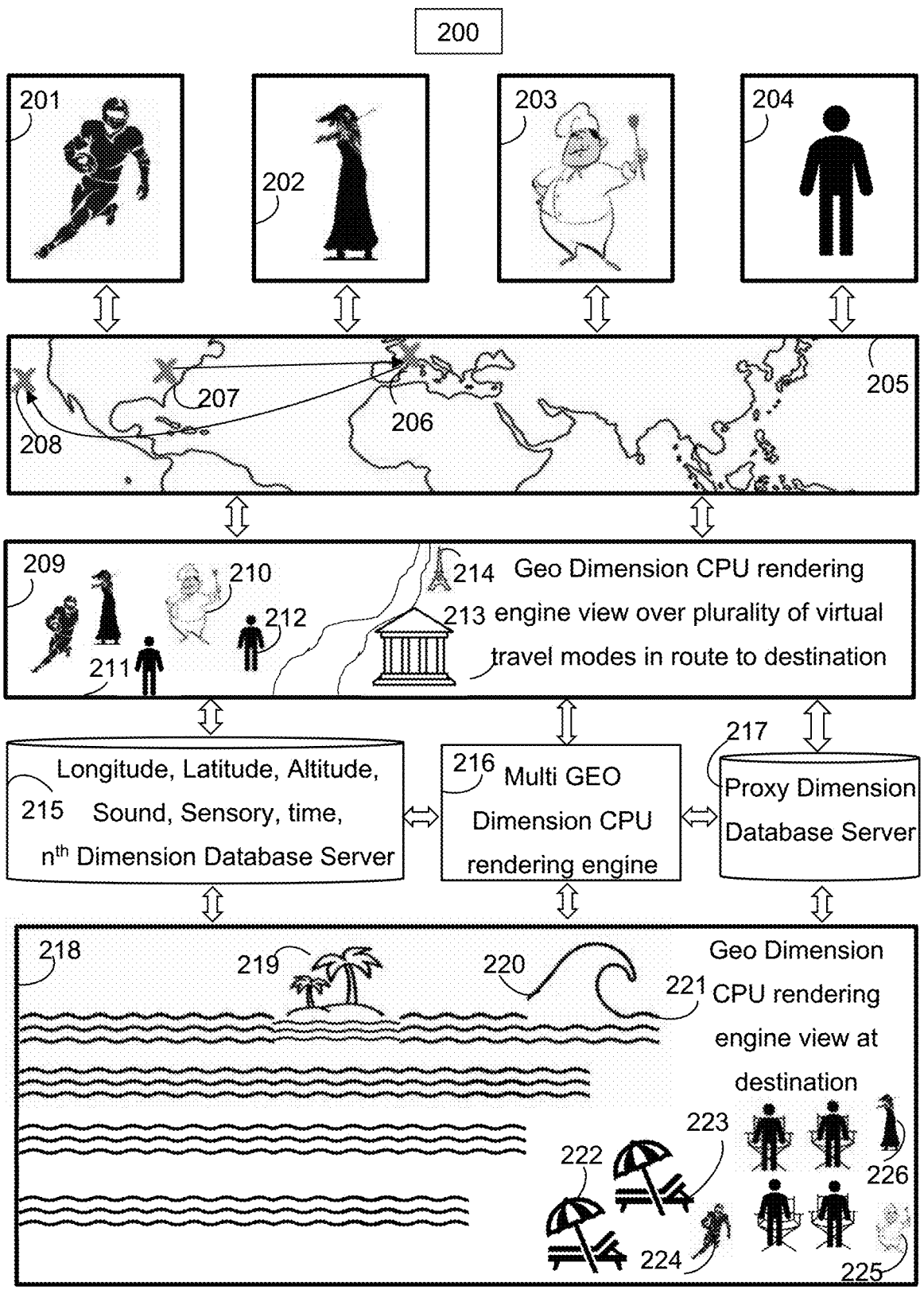
FIG. 2 illustrates an exemplary schematic diagram of implementations of methods considering multiple users using the method and system to schedule a multi-stop virtual trip utilizing the multi-dimension map tile database server, rendering engine, proxy dimension database server, data exchange server and multi-dimension rendering CPU or GPU device for both multi-user virtual objects and virtual backgrounds in virtual, mixed or augmented reality settings.

The embodiment illustrated in FIG. 2 illustrates an exemplary network sequencing from a plurality of users 201, 202, 203, 204 of the social network configuration setting a mapping sequence for a virtual trip 205 originating in New York, New York 207 in route to Paris, France 206 with a final destination of Hawaii 208. In some embodiments, the multi-dimension map tile rendered trip sequence 205 may render a plurality of users 210, 212 whereby social network object users of the trip sequence 205 may use a plurality of modes such as scooter, motorcycle, drone view, airplane view, underwater view, eagle view or many other views with many dimensions with the geo-dimension rendering CPU engine 211 over a plurality of buildings such as the Eiffel tower 214 along the Seine river or the louvre 213 or a plurality of other virtual images which have been acquired by the multi-dimension map tile database 215 with gap rendering by the proxy dimension database server 217 and the multi-dimension geo CPU rendering engine 216 to a plurality of multi-form factor devices such as in the screen view 218 rendered by the multi-dimensional map tile database server 215. In some embodiments, the user 212 may pair with a plurality of other users and personalities such as musicians 226 and chefs 225 and athletes 224 with a plurality of virtual objects such as a beach chair 222 or beach chair(s) 222, 223. In some embodiments, the virtual background 218 may have the dimension of water and land with trees 219, the virtual background 218 may have the dimension of waves 220 and 221. In some embodiments, the virtual background 218 rendered may correspond to a destination 208 or stop 207, 206 on the virtual trip 205. In some embodiments, the users 226, 225, 224, 212, 210, 201, 202, 203, 204 may join with other users 212 in the virtual background 218 along the virtual trip 205. In some embodiments, the users 226, 225, 224, 212, 210, 201, 202, 203, 204 may upload virtual background data through the network with vector and matrix coordinates for the data exchange 5200 and 5300 to earn money from the data exchange platform in exchange for data.

Figure 3A:
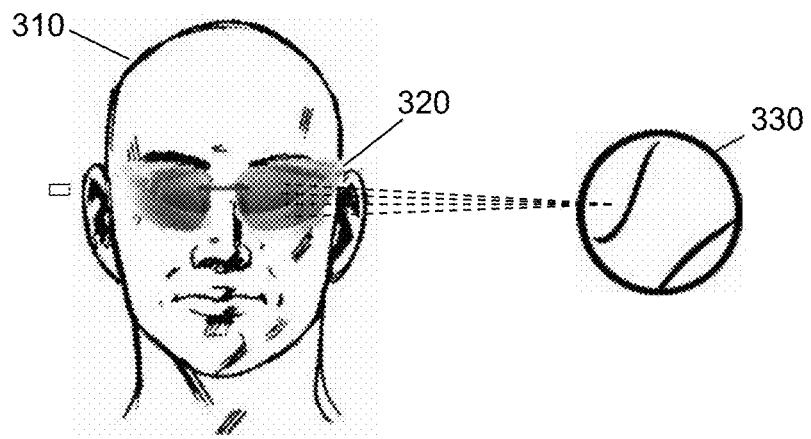
FIGS. 3A and 3B illustrate an exemplary schematic diagram of implementations of methods considering the separation of the CPU or GPU device from the breakable head-mounted glasses which increases the technological capability while increasing durability and reducing stress from adding technology near the head which decreases biomechanical movement and balance as well as adding unwanted magnetic and radio waves near the brain.

The embodiment illustrated in FIG. 3A. Illustrates the network based ball CPU device 330 projecting laser light and infrared light 370 to the users 310 head mounted glasses 320 or contacts 320.

Figure 3B:
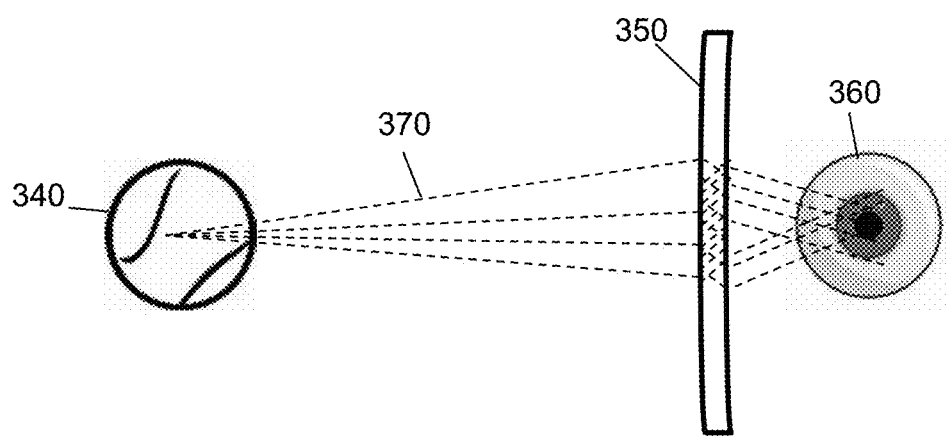

The embodiment illustrated in FIG. 3B Illustrates the mobile network based ball CPU projection device 340 projecting laser light and infrared light 370 to the head mounted glass or contact lens 350. FIG. 3B shows a side view of the lens 350 taken from the front view if FIG. 3A glasses or contacts 320. Laser light and infrared light is refracted internally in 350 to project holographic images inside the lens 350 such that the user's eye 360 can interpret the images against the real world from both a first person and third person omniscient perspective. In some embodiments, the CPU projection device may take multiple forms such as a mobile CPU device 330 or a plurality of other form factors 120 including but not limited to the form of a tablet CPU 165 or waveguide lens device 166 or laptop or stationary CPU 167 or audio CPU 168 or headset augmented, mixed or virtual reality device 169 or other internet of things edge CPU device 171.

Figure 4A:
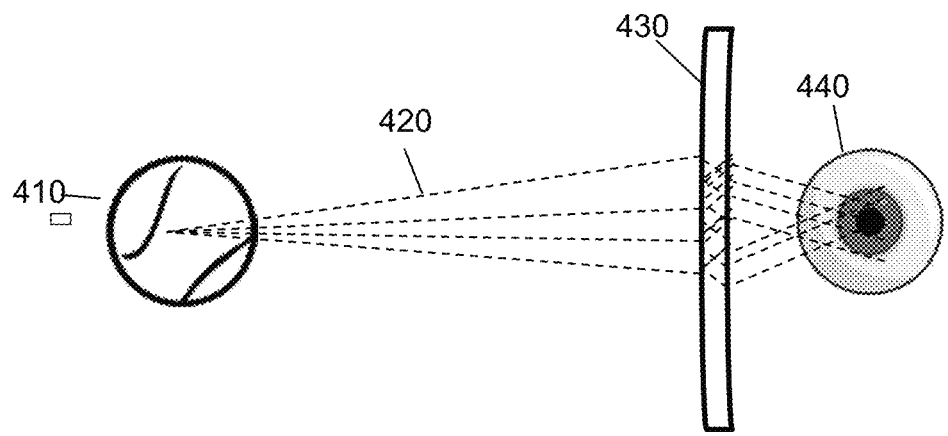
FIGS. 4A and 4B illustrate an exemplary schematic in further detail the holographic images inside the eyeglass or contact lens structures projected from the mobile networked CPU or GPU device. Refraction allows for the augmented reality hologram to be seen by the user against the real physical world from both a first person and third person omniscient perspective.
Figure 4B:
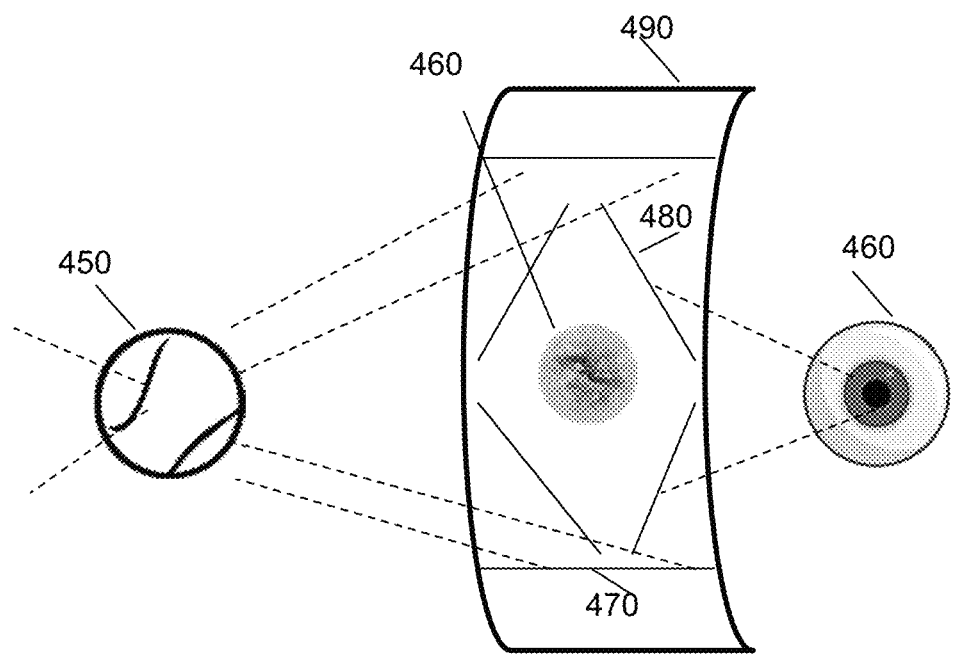

The embodiment illustrated in FIG. 4A illustrates the same embodiment as FIG. 3B, but is repeated so it can be compared and expanded for the purposes of FIG. 4B which expands the explanation and the physical mechanics of light refraction to the users eye 440.

The embodiment illustrated in FIG. 4B. Illustrates the infrared and laser light 420 projecting from the wireless network based CPU ball 410 in greater detail as it moves through the waveguide lens 490 to project the hologram 460. Again laser light and infrared light are projected from the wireless network based CPU ball to the lens 490 where light is refracted by structures 480 within the lens 490 that then project the holographic image 460 to the user's eye 460. Both structures 470 and 480 allow for refraction to project the hologram to the user's eye 460 within the lens structure 490. Many of these structures are present within the lens 490 so that the user may change the angles as which they look at both the real world and holograms 460 against the real world.

The embodiment illustrated in FIG. 4B. further Illustrates the use of the infrared light and laser light transmission 420 in sequence with the users eyeball 460. The laser light and infrared light may scan the users eyeball 460 to recognize the user 310 for purposes of identity security.

The embodiment illustrated in FIG. 4B could be any object 460 hologram such as but not limited to a word processor application, spreadsheet application, presentation application, keyboard, voice activated assistant, voice activated recorder, productivity application, movie application, music application, health application, companion chef instructor, companion to talk with who is remotely connected through network chat or messaging or video text, companion personal coach, companion athletic trainer, companion music or performing arts instructor, companion reading application, companion writing application for authors, companion personal trainer, or any personal instructor of any type that performs analysis through the camera in the ball CPU device 450 that transmits user 310 movements for analysis to the wireless network 130 and database server 160. The database server 160 and wireless network 150 can then transmit analysis from the database server or processors in the database server 160 or CPU devices 120, 170, 6100 to then project a holographic image 460 to the user 310 for interaction, companionship, and self-improvement, analysis or a plurality of other uses. Similarly, in some embodiments, the rendered background 160 from the multi-dimension map tile database 160 with a plurality of virtual network members 110, 180, 190, 175 over a virtual trip 205 with a single destination or multi-stop itinerary 206, 207, 208 may render to multiple device display mechanisms 120, 170 or form factors.

Figure 5A:
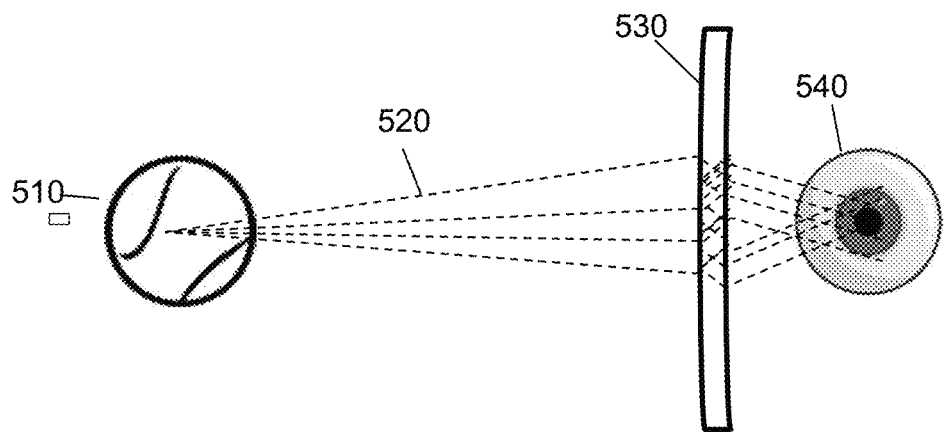
FIGS. 5A and 5B illustrate an exemplary schematic diagram of the implementation of methods from the system of the user's projected image to allow the user to visualize both a first person and third person omniscient augmented interactive artificial intelligence iterative environments where the users not only are able watch the band or musical performing artist but also may participate in the band as a singer, drummer, guitar player or other instrument player with interaction such that the user is a band member.

The embodiment illustrated in FIG. 5A illustrates the mobile network based CPU projection device 510 projecting laser light and infrared light 520 to the head mounted glass or contact lens 530. Laser light and infrared light and electromagnetic waves are refracted internally in the lens 530 to project holographic images inside the lens 530 such that the user's eye 540 can interpret the images against the real world from both a first person and third person omniscient perspective. In other embodiments the rendered virtual images and virtual trip and experience backgrounds 164 may be presented on a plurality of device form factors 120, 170.

Figure 5B:
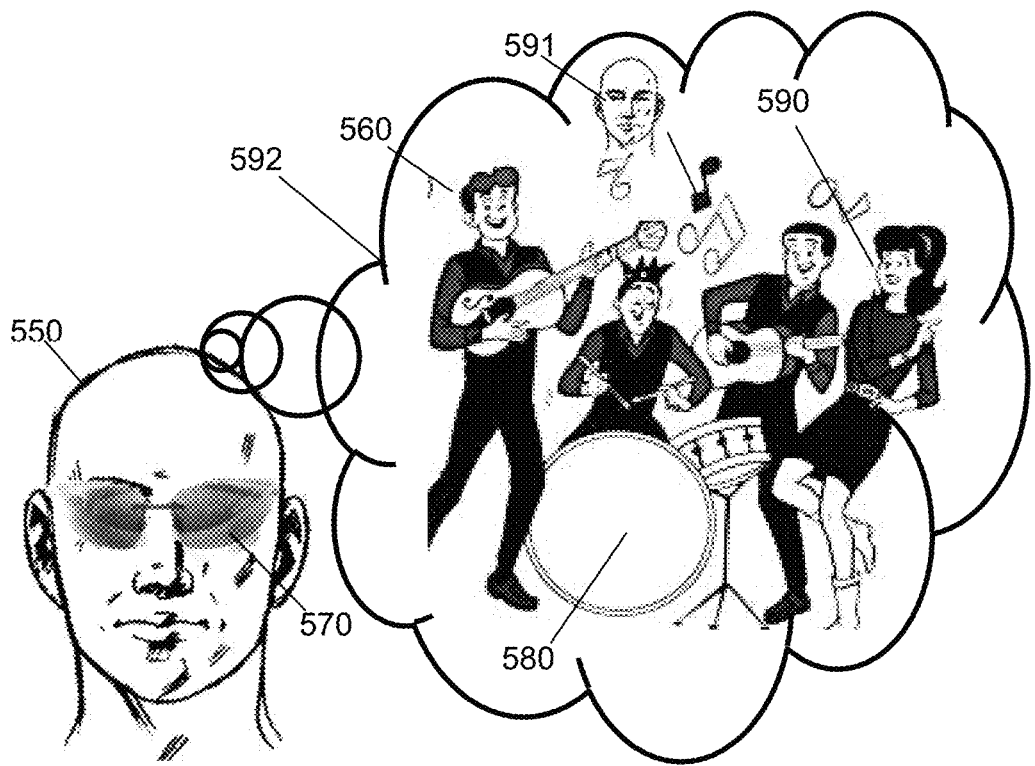

The embodiment illustrated in FIG. 5B illustrates a schematic diagram of the implementation of methods from the system 510 and 570 of the user's projected image 560 to allow the user 550 to visualize both a first person 550 and third person omniscient 592 augmented interactive artificial intelligence interactive environments where the users 591 and 590 not only are able watch the band 560 or musical performing artist 590 but also may participate in the band as a singer 591, drummer 580, guitar player 560 or other instrument player with interaction such that the user 591 is a band member. The multi-dimension map tile database 160 of the system 510 and methods change music from an observed experience to an immersive and participatory experience with a plurality of users 591 and 590 over the network 150. The dynamic multi-dimension map tile database 160 content allows for a variety of trip endings or trip paths based on the user's interaction with the existing content. The camera 1113 also allows for the user 550 to record the music with the user 550 in the band for posting to social media or other local or cloud based networks subject to copyright laws. In some embodiments, the content of the multi-dimension map tile database 160 may include the environment of the musicians when they were inspired by the story or song or the virtual environment of the origin of the story and song itself as the music or story was being produced. In some embodiments, natural language processors in the rendering engine 163 and multi-dimension map tile database 160 may present virtual backgrounds which have been linked by the proxy database and multi-dimension map tile database 160 to the natural language processing instructions in the rendering engine 163. In some embodiments, a user may upload content for the multi-dimension map tile database 160 through the data exchange 5200, 5300, 5400, 5500 method.

Figure 6A:
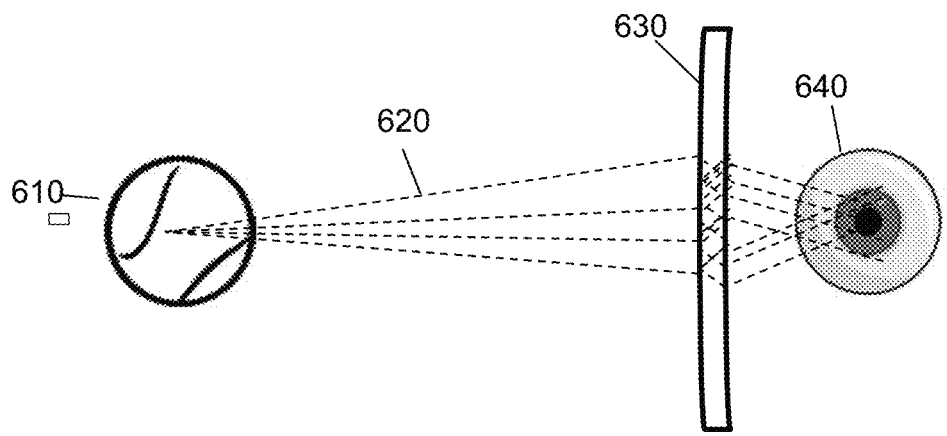
FIGS. 6A and 6B illustrate an exemplary schematic diagram of the implementation of methods from the system of the user's projected image to allow the user to visualize both a first person and third person omniscient augmented interactive artificial intelligence iterative environments where the users not only are able to watch the movie or performing artist but also may participate in the movie as an actor or actress, with interaction such that the user is a band member.

The embodiment illustrated in FIG. 6A illustrates the mobile network based CPU projection device 610 projecting laser light and infrared light 620 to the head mounted glass or contact lens 630. Laser light and infrared light and electromagnetic waves are refracted internally in the lens 630 to project holographic images inside the lens 630 such that the user's eye 640 can interpret the images against the real world from both a first person and third person omniscient perspective. In other embodiments the rendered virtual images and virtual trip and experience backgrounds 164 may be presented on a plurality of device form factors 120, 170.

Figure 6B:
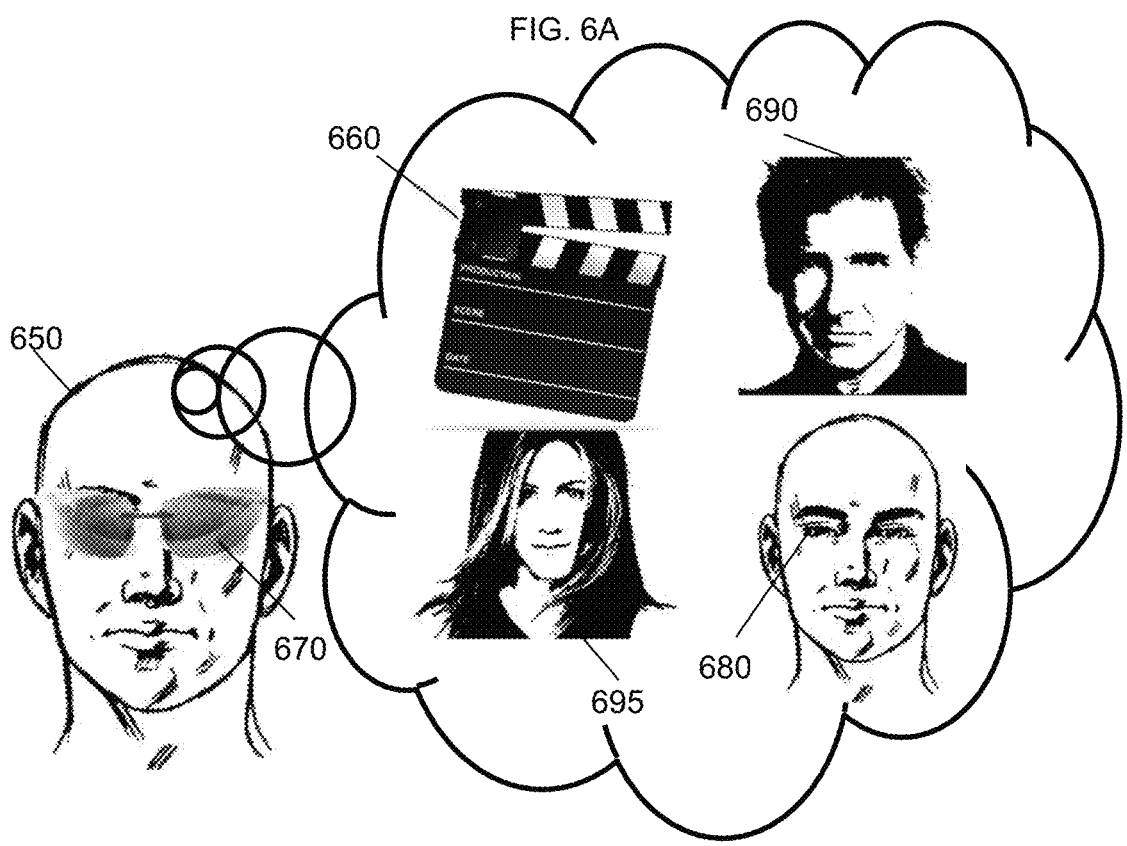

The embodiment illustrated in FIG. 6B illustrates a schematic diagram of the implementation of methods from the system 610 and 670 of the user's projected image 680 to allow the user 650 to visualize both a first person 650 and third person omniscient 680 augmented interactive multi-dimension map tile database 160 interactive environments where the users 650 and 680 not only are able watch the movie 660 or performing artist 690 but also may participate in the movie as an actor 690 or actress 680, with interaction such that the user 650 is an actor or actress in the movie or theatrical production. The multi-dimension map tile database 160 of the system 610 and methods change movies and theatrical arts from an observed experience to an immersive and participatory experience with a plurality of users 680 and 690. The multi-dimension map tile database 160 dynamic content allows for a variety of trip endings or trip paths 205 based on the user's interaction with the existing content. The camera 1113 also allows for the user 680 to record the movie with the user 680 in the movie for posting to social media or other local or cloud based networks subject to copyright laws. In some embodiments, the content of the multi-dimension map tile database 160 may include the environment of the actors or actresses and movie directors and movie producers when they were inspired by the story or the virtual environment of the origin of the story itself as the movie or story was being produced. In some embodiments, natural language processors in the rendering engine 163 and multi-dimension map tile database 160 may present virtual backgrounds which have been linked by the proxy database and multi-dimension map tile database 160 to the natural language processing instructions in the rendering engine 163. In some embodiments, a user may upload content for the multi-dimension map tile database 160 through the data exchange 5200, 5300, 5400, 5500 method.

Figure 7A:
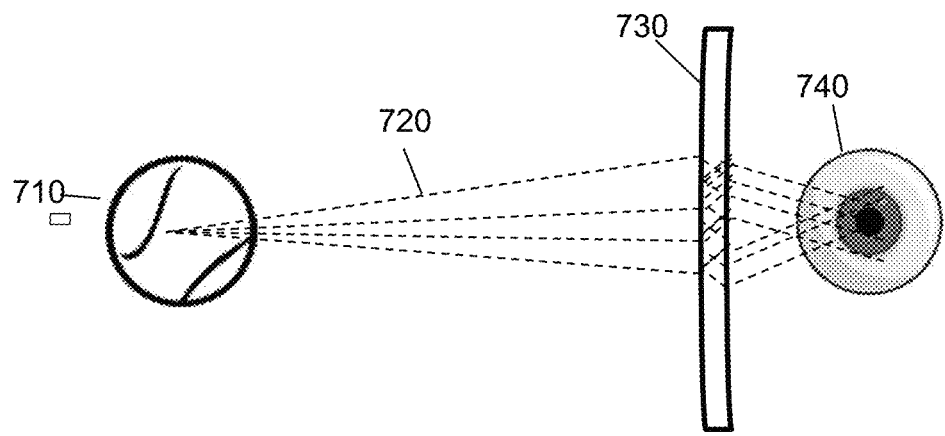
FIGS. 7A and 7B illustrate an exemplary schematic diagram of the implementation of methods from the system of the user's projected image to allow the user to visualize both a first person and third person omniscient augmented interactive artificial intelligence iterative environments where the users not only are able to watch the chef or cook but also may participate in the cooking experience, with interaction such that the user is a chef.

The embodiment illustrated in FIG. 7A. illustrates the mobile network based 150 CPU projection device 710 projecting laser light and infrared light 720 to the head mounted glass or contact lens 730. Laser light and infrared light and electromagnetic waves 720 are refracted internally in the lens 730 to project holographic images inside the lens 730 such that the user's eye 740 can interpret the images against the real world from both a first person and third person omniscient perspective. In other embodiments the rendered virtual images and virtual trip and experience backgrounds 164 may be presented on a plurality of device form factors 120, 170.

Figure 7B:
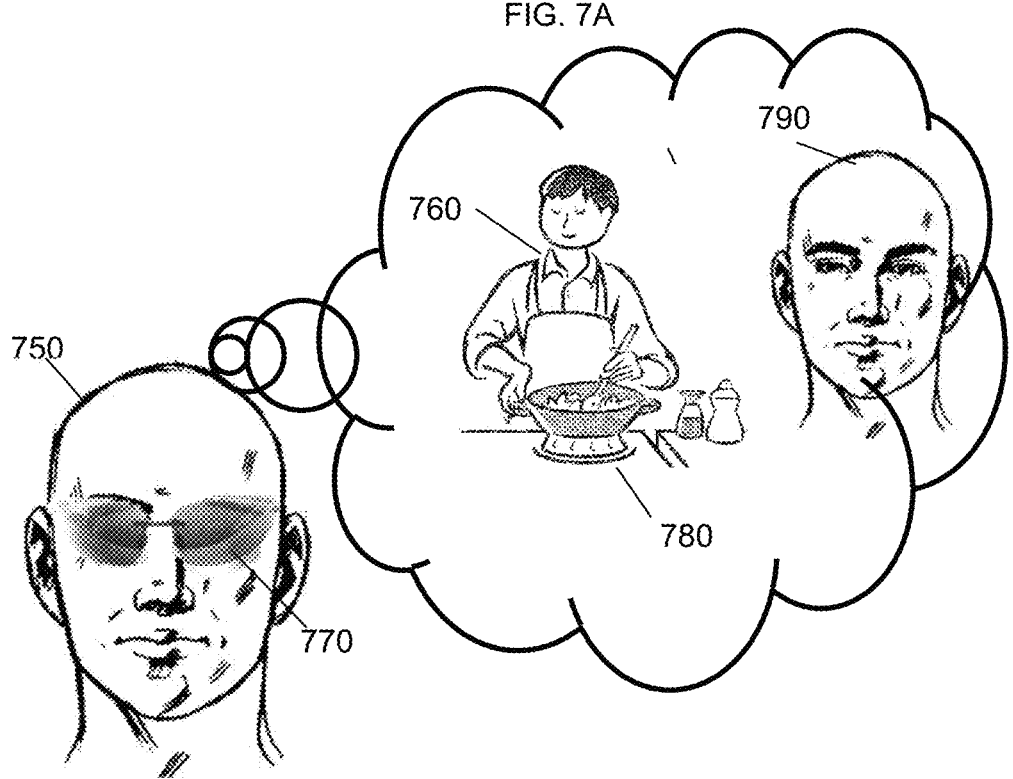

The embodiment illustrated in FIG. 7B illustrates a schematic diagram of the implementation of methods from the system 710 and 770 of the user's projected image 760 to allow the user 750 to visualize both a first person and third person omniscient augmented interactive multi-dimension map tile database 160 interactive environments 790 where the users 790 not only are able to watch the chef 780 or cook 780 but also may participate in the cooking experience 760, with interaction such that the user is a chef 780. The multi-dimension map tile database 160 of the system 710 and 770 and methods change cooking instruction 780 from an observed experience to an immersive and participatory experience with a plurality of users 750 and 790. The multi-dimension map tile database 160 content allows for a variety of endings or paths based on the user's interaction with the existing content and other users. The camera 1113 also allows for the user 790 to record the cooking experience with the user 790 in the cooking experience for posting to social media or other local or cloud based networks subject to copyright laws. In some embodiments, the content of the multi-dimension map tile database 160 may include the environment of the chef when they inspired by the recipe or the virtual environment of the origin of the food itself as the recipe is being prepared. In some embodiments, natural language processors in the rendering engine 163 and multi-dimension map tile database 160 may present virtual backgrounds which have been linked by the proxy database and multi-dimension map tile database 160 to the natural language processing instructions in the rendering engine 163. In some embodiments, a user may upload content for the multi-dimension map tile database 160 through the data exchange 5200, 5300, 5400, 5500 method.

Figure 8A:
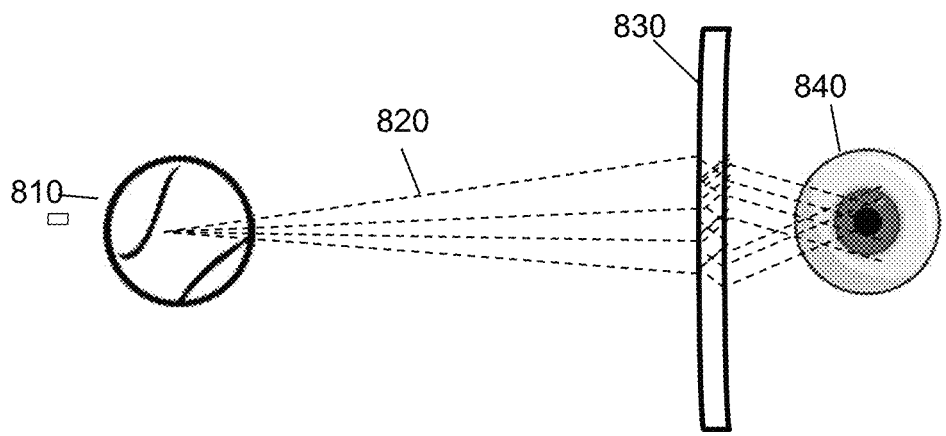
FIGS. 8A and 8B illustrate an exemplary schematic diagram of the implementation of methods from the system of the user's projected image to allow the user to visualize both a first person and third person omniscient augmented interactive artificial intelligence iterative environments where the users not only are able to watch the author or reader read but also may participate in the story telling experience, with interaction such that the user is a co-story teller or author.

The embodiment illustrated in FIG. 8A illustrates the mobile network based ball CPU projection device 810 projecting laser light and infrared light 820 to the head mounted glass or contact lens 830. Laser light and infrared light and electromagnetic waves 820 are refracted internally in the lens 830 to project holographic images inside the lens 830 such that the user's eye 840 can interpret the images against the real world from both a first person and third person omniscient perspective. In other embodiments the rendered virtual images and virtual trip and experience backgrounds 164 may be presented on a plurality of device form factors 120, 170.

Figure 8B:
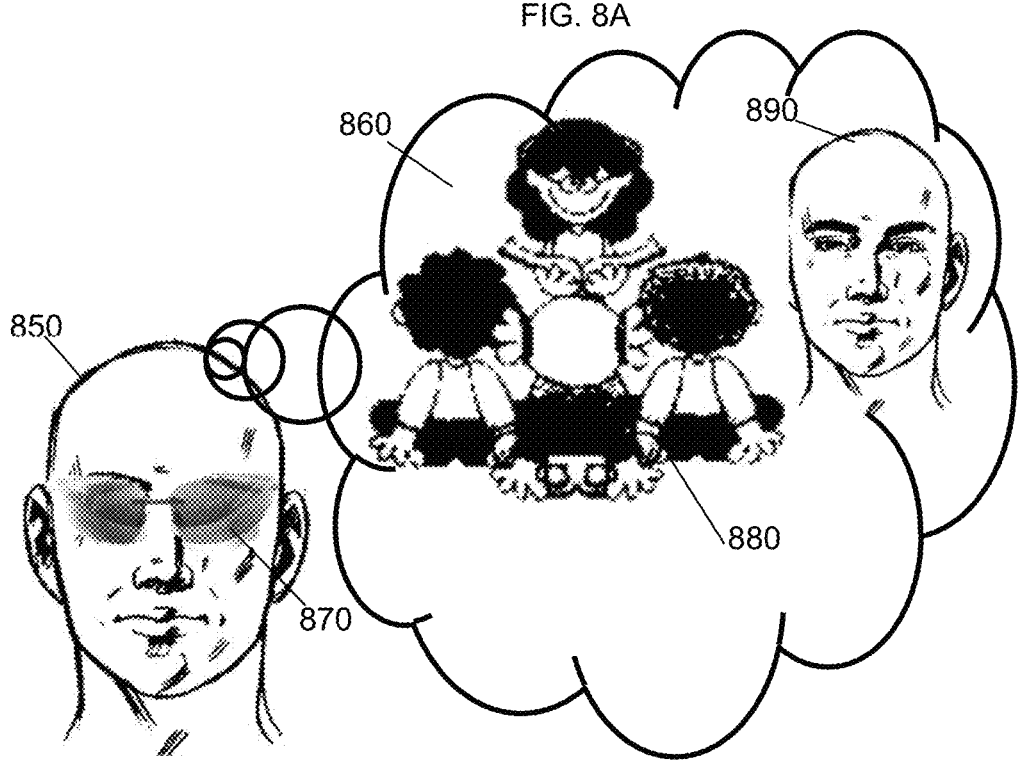

The embodiment illustrated in FIG. 8B illustrates a schematic diagram of the implementation of methods from the system 810 and 870 of the user's projected image 860 to allow the user 850 to visualize both a first person and third person omniscient augmented interactive multi-dimension map tile database 160 interactive environments 890 where the users 890 not only are able to watch the author 880 or reader 880 read but also may participate in the story telling experience 860, with interaction such that the user 850 is a co-story teller or author 890. The multi-dimension map tile database 160 of the system and methods change reading from an observed experience to an immersive and participatory experience with a plurality of users. The multi-dimension map tile database 160 content allows for a variety of endings or paths based on the user's interaction with the existing content. The camera 1113 also allows for the user 890 to record the reading experience with the user 890 in the reading experience for posting to social media or other local or cloud based networks subject to copyright laws. In some embodiments, the content of the multi-dimension map tile database 160 may include the environment of the author of the book when he wrote the book or the virtual environment of the story itself as the story is being told. In some embodiments, natural language processors in the rendering engine 163 and multi-dimension map tile database 160 may present virtual backgrounds which have been linked by the proxy database and multi-dimension map tile database 160 to the natural language processing instructions in the rendering engine 163. In some embodiments, a user may upload content for the multi-dimension map tile database 160 through the data exchange 5200, 5300, 5400, 5500 method.

Figure 9A:
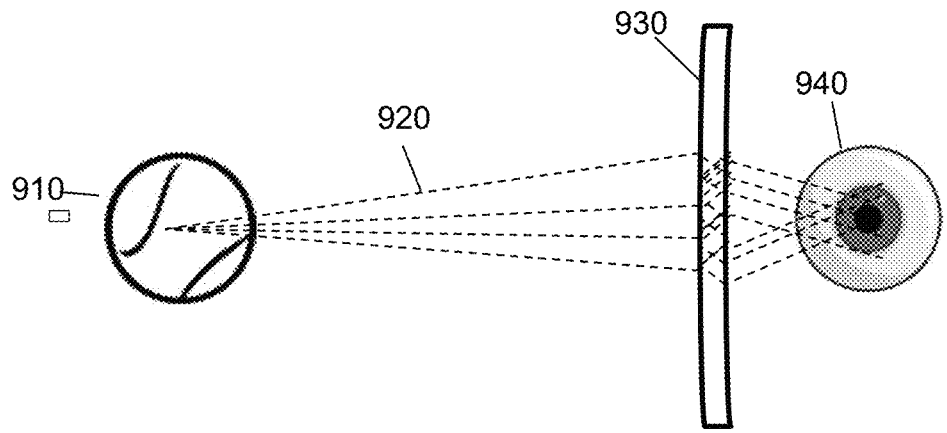
FIGS. 9A and 9B illustrate an exemplary schematic diagram of the implementation of methods from the system of the user's projected image to allow the user to visualize both a first person and third person omniscient augmented interactive artificial intelligence iterative environments where the users not only are able to watch the inventor, architect or educator but also may participate in the creative experience, with interaction such that the user is a co-inventor or architect or educator.

The embodiment illustrated in FIG. 9A illustrates the mobile network based ball CPU projection device 910 projecting laser light and infrared light 920 to the head mounted glass or contact lens 930. Laser light and infrared light and electromagnetic waves 920 are refracted internally in the lens 930 to project holographic images inside the lens 930 such that the user's eye 940 can interpret the images against the real world from both a first person and third person omniscient perspective. In other embodiments the rendered virtual images and virtual trip and experience backgrounds 164 may be presented on a plurality of device form factors 120, 170.

Figure 9B:
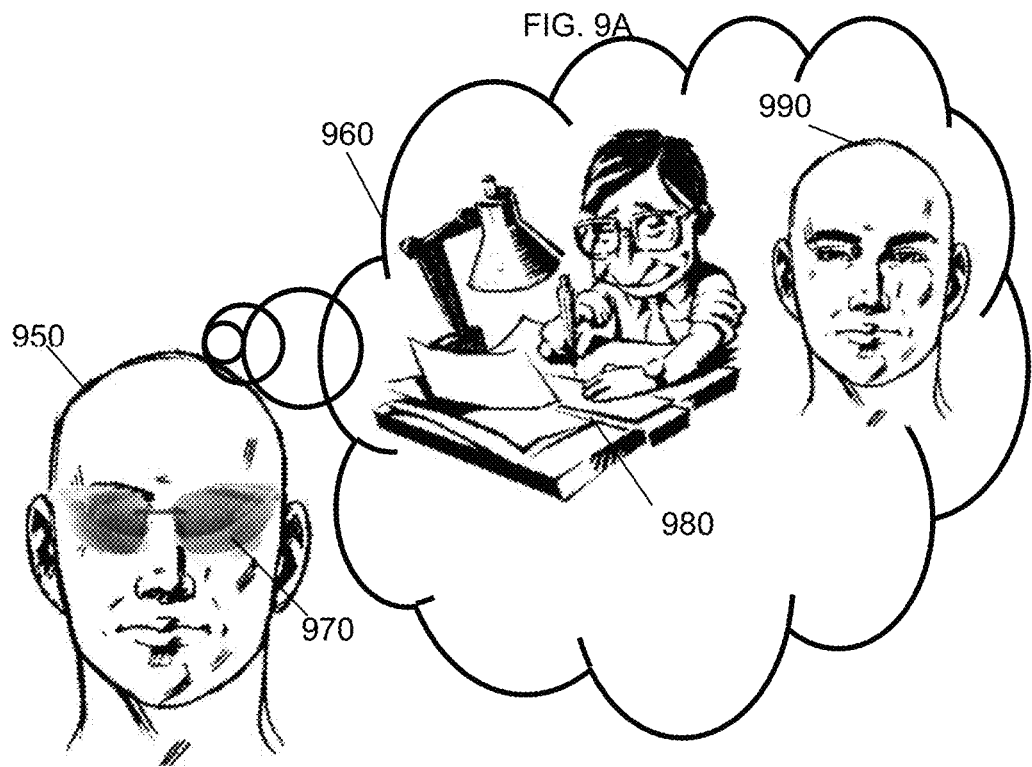

The embodiment illustrated in FIG. 9B illustrates a schematic diagram of the implementation of methods from the system 910 and 970 of the user's projected image 960 to allow the user to visualize both a first person and third person omniscient augmented interactive artificial intelligence interactive environments 990 where the users 990 not only are able to watch the inventor 980, architect 980 or educator 980 but also may participate in the creative experience 960, with interaction such that the user 950 is a co-inventor or co-architect or co-educator 990. The artificial intelligence of the system and methods will change the creative process from an observed experience to an immersive and participatory experience with a plurality of users 990. The artificial intelligence content allows for a variety of endings or paths based on the user's interaction with the existing content. The camera 1113 also allows for the user 990 to record the co-invention or co-architect or co-educator with the user 990 in the co-invention or co-architect or co-educator for posting to social media or other local or cloud based networks subject to copyright laws. In some embodiments, the content of the multi-dimension map tile database 160 may include the environment of the inventor of the idea when they originally wrote down or were inspired to create the idea or the virtual environment of the invention itself as the invention is being produced. In some embodiments, natural language processors in the rendering engine 163 and multi-dimension map tile database 160 may present virtual backgrounds which have been linked by the proxy database and multi-dimension map tile database 160 to the natural language processing instructions in the rendering engine 163. In some embodiments, a user may upload content for the multi-dimension map tile database 160 through the data exchange 5200, 5300, 5400, 5500 method.

Figure 10A:
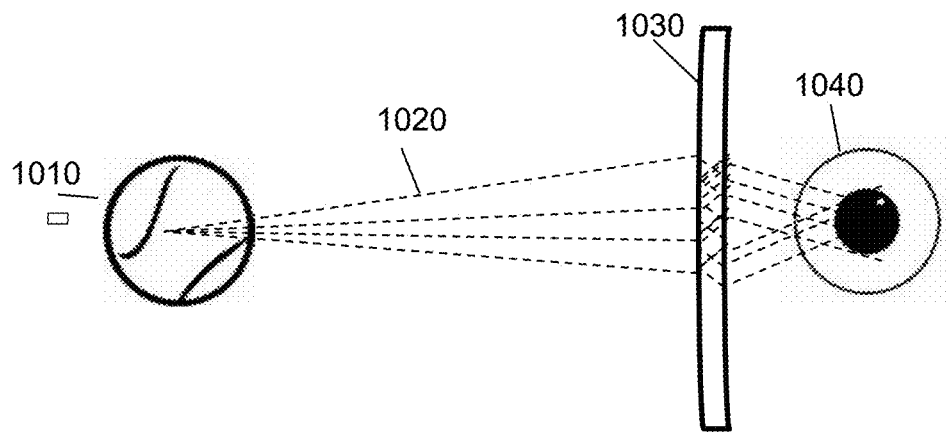
FIGS. 10A and 10B illustrate an exemplary schematic diagram of the implementation of methods from the system of the user's projected image to allow the user to visualize both a first person and third person omniscient augmented interactive artificial intelligence iterative environments where the users not only are able to watch the athlete or coach but also may participate in the sporting experience, with interaction such that the user is a participant.

The embodiment illustrated in FIG. 10A illustrates the mobile network based ball CPU projection device 1010 projecting laser light and infrared light 1020 to the head mounted glass or contact lens 1030. Laser light and infrared light and electromagnetic waves 1020 are refracted internally in the lens 1030 to project holographic images inside the lens 1030 such that the user's eye 1040 can interpret the images against the real world from both a first person and third person omniscient perspective. In other embodiments the rendered virtual images and virtual trip and experience backgrounds 164 may be presented on a plurality of device form factors 120, 170.

Figure 10B:
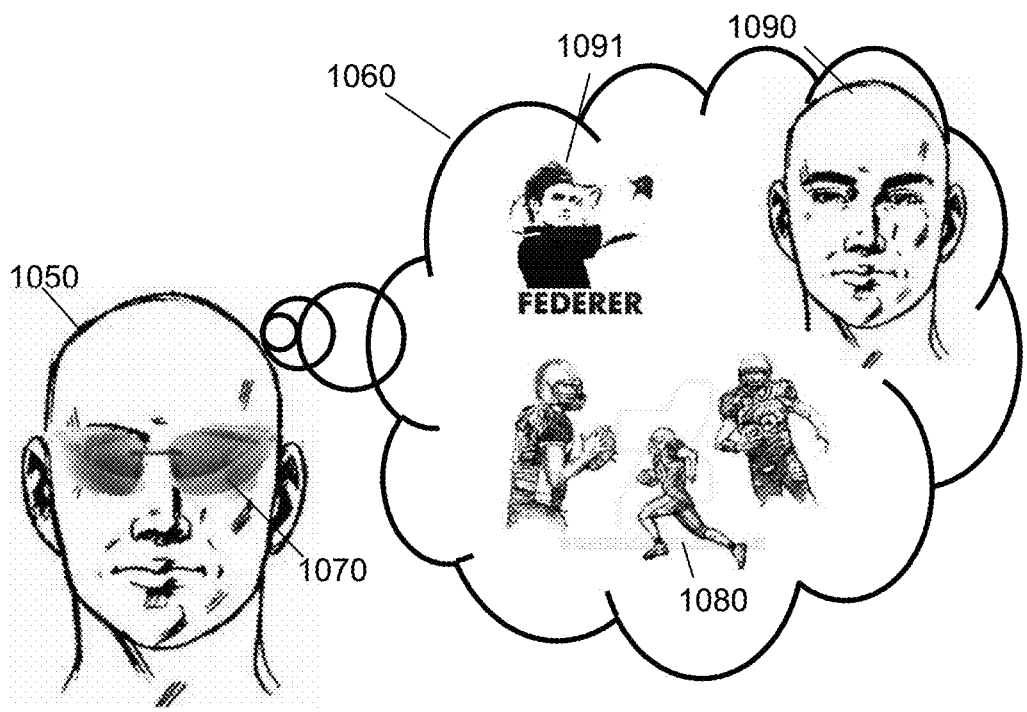

The embodiment illustrated in FIG. 10B illustrates a schematic diagram of the implementation of methods from the system 1010 and 1070 of the user's projected image 1060 to allow the user 1070 to visualize both a first person and third person omniscient augmented interactive artificial intelligence interactive environments 1090 where the users 1090 not only are able to watch the athlete 1091 or coach 1080 but also may participate in the sporting experience, with interaction such that the user 1090 is a participant. The artificial intelligence of the system and methods will change the video from an observed experience to an immersive and participatory experience with a plurality of users 1090. The artificial intelligence content allows for a variety of endings or paths based on the user's interaction with the existing content. The camera 1113 also allows for the user 1090 to record the sporting experience with the user 1090 in the sporting experience for posting to social media or other local or cloud based networks subject to copyright laws. In some embodiments, the content of the multi-dimension map tile database 160 may include the environment of the athlete while competing in a competition or providing athletic instruction or the virtual environment of the competition itself as the invention is being produced. In some embodiments, natural language processors in the rendering engine 163 and multi-dimension map tile database 160 may present virtual backgrounds which have been linked by the proxy database and multi-dimension map tile database 160 to the natural language processing instructions in the rendering engine 163. In some embodiments, a user may upload content for the multi-dimension map tile database 160 through the data exchange 5200, 5300, 5400, 5500 method.

Figure 11:
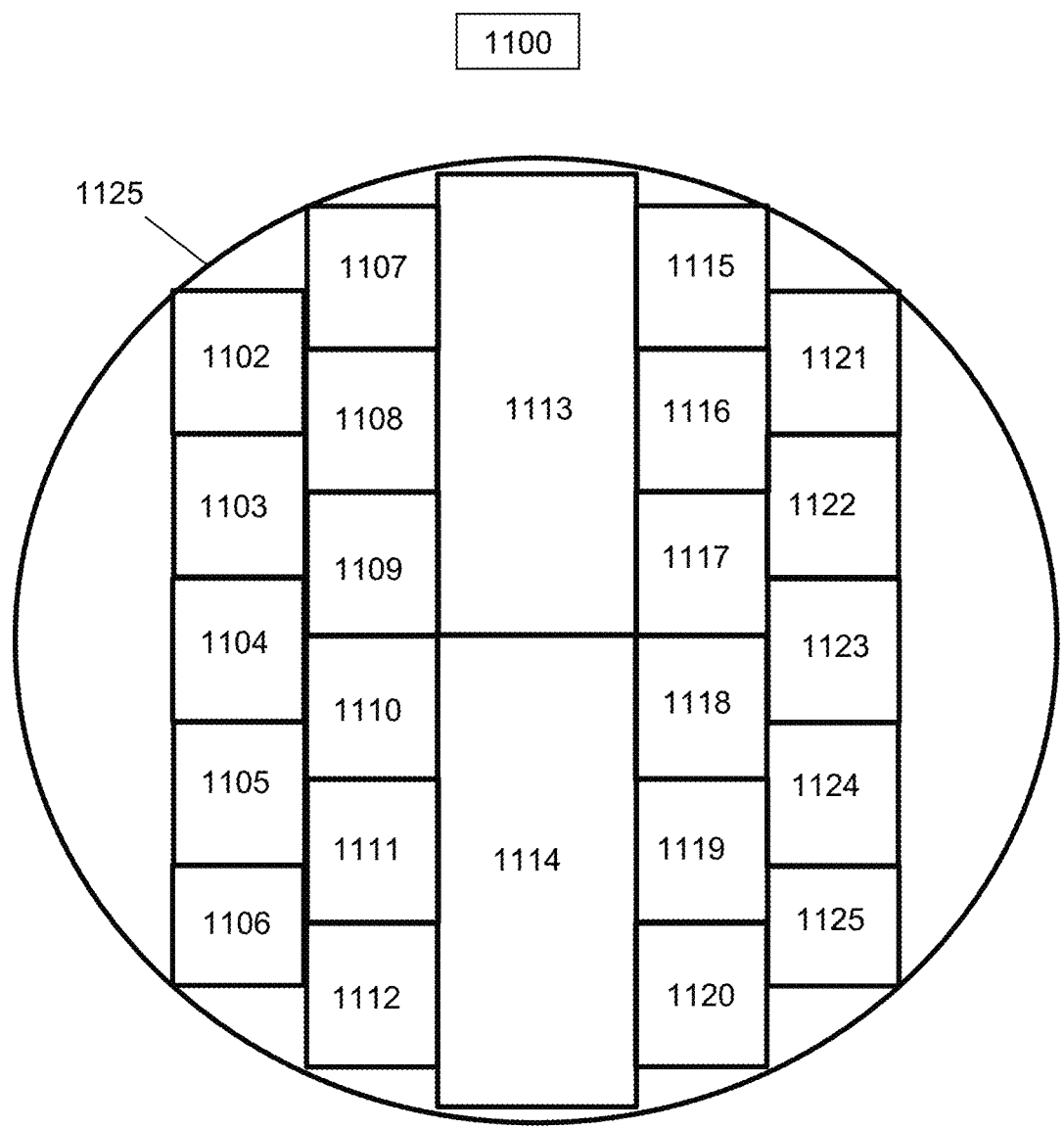
FIG. 11 illustrates an exemplary diagram of the mobile computer ball device or general CPU device in accordance with some embodiments.

The embodiment illustrated in FIG. 11 illustrates the mobile network based CPU projection device 1125. The device 1125 may include a memory 1102, a memory controller 1103, one or more processing units (CPUs) 1104, a peripherals interface 1105, RF circuitry 1106, audio circuitry 1108, one or more speakers 1107 and 1115, a microphone 1109, an input/output (I/O) subsystem 1110, input control devices 1111, an external port 1112, optical sensors 1116, camera 1113, one or more laser projection systems 1114, power supply 1117, battery 1118, wifi module 1119, GPS receiver 1120, accelerometer 1121, Ambient light sensor 1122, location sensor 1123, barometer 1124, USB port 1125. The device 1125 may include more or fewer components or may have a different configuration or arrangement of components The CPUs 1104 run or execute various instructions compiled by software and applications which are stored in the memory 1102 that perform various functions on the device 1125. The RF circuitry 1106 receives and sends RF signals. The RF circuitry 1106 converts electrical signals to/from electromagnetic signals and communicates with communications networks 150 and 130 and other communication devices via the electromagnetic signals. The RF circuitry may be comprised of but not limited to an antenna system, a tuner, a digital signal processor, an analogue signal processor, various CODECs, a SIM card, memory, amplifiers, an oscillator and a transceiver. The wireless communication components may use a plurality of standard industry protocols such as Global System for Mobile Communication ("GSM"), Voice over internet protocol ("VOIP"), long-term evolution ("LTE"), code division multiple access ("CDMA"), Wireless Fidelity ("WiFi"), Bluetooth, Post office Protocol ("POP"), instant messaging, Enhanced Data GSM Environment ("EDGE"), short message service ("SMS"), or other communication protocol invented or not yet invented as of the filing or publish date of this document.

The input/output subsystem 1110 couples with input/output peripherals 1105 and other control devices 1111 and other laser projection systems 1114 to control the device 1125. The laser projection system 1114 and camera 1113 take infrared tracking information feedback from the user 120 into the peripheral interface 1105 and CPU 1104 to combine the data with instructions in the CPU 1104 and memory 1102 that provide an iterative instruction for the graphical user interface which is displayed in the waveguide lens 240 or 210 after comparison with information in the memory from the database server 260. The input control devices 1111 may be controlled by user 120 movements that are recorded by the laser projection system 1114 and camera 1113. The input control devices 1111 may include instructions from the user 110 movements based on interactions with the graphical user interface module that is a hologram 460 in the waveguide lens 350 or image on a multi-form factor CPU device 120. Holograms 460 may take the form of representations of such things as graphical user interface modules which represent virtual keyboards, voice recognition, translation services, physical buttons, dials, sliders, joysticks, video game controllers, physical sporting equipment 1091, user 1050, comparisons of the user 1050 to a professional athlete 1080 or inventor 980 or author 880 or chef 780 or actress 680 or actor 690 or a musician 590, fashion apparel designer 980, weapons, cooking utensils 780, musical instruments 580, microphones, tools, books 880, movies 660, music 580, ordering food 1360 or drink 1380 with geofence location services, or ordering clothing 1460 or 1490, ordering retail goods in a virtual store 1460 or 1490, comparing the user 1591 and 1590 to a professional athlete 1560 using artificial intelligence on the database server 160 through interaction with the device 140 through the wireless network 150 or 130, virtual shopping 1225, virtual restaurant drive thru 1224 or other equipment for completing tasks.

The audio circuitry 1108, one or more speakers 1107 and 1115 and the microphone 1119 provide an audio interface between the user and the device 1125. The audio circuitry 1108 receives audio data from the peripherals interface 1105, converting the data to an electrical signal, and transmits the electrical signal to the speakers 1107 and 1115. The speakers 1107 and 1115 convert the electrical signals to human audible sound waves which are mechanotransducted into electrical impulses along auditory nerve fibers and further processed into the brain as neural signals. The audio circuitry 1108 also receives electrical signals converted by the microphone 1109 from sound waves. The audio circuitry 1108 converts the electrical signal to audio data and transmits the audio data to the peripherals interface 1105 for processing. Audio data may be retrieved and/or transmitted to memory 1102 and/or the RF circuitry 1106 by the peripherals interface 1105. In some embodiments the RF circuitry may produce ultra-high frequency waves that transmit to wireless headphones which then convert the electrical signals to human audible sound waves which are mechanotransducted into electrical impulses along auditory nerve fibers and further processed into the brain as neural signals.

In some embodiments, the graphical user interface hologram objects 460, 592, 660, 760, 860, 960, 1060. 1360, 1492, 1592 and other objects and representations of humans or objects interact with the user 110 through the general CPU projection system 120 or laser projection system 1114 and camera 1113 take infrared tracking information feedback from the user 120 into the peripheral interface 1105 and CPU 1104 to combine the data with instructions in the CPU 1104 and memory 1102 that provide an iterative instruction for the graphical user interface which is displayed in the waveguide lens 490 or 410 after comparison with information in the memory from the database server 160. Both a first person and third person omniscient perspective mode are available due to the remote separation of the camera 1113 and laser projection system from the waveguide lens 490. The user 1550 may compare their movement 1590 from a third person omniscient perspective to the movements of a professional athlete 1560. The artificial intelligence algorithms on the network 150 and database server 160 provide real time analytical feedback to the user 110 on the biomechanical motion differences between the user 1550 and professional athlete 1590.

The device 1125 also includes a power supply 1117 and battery 1118 for powering the various components. The USB port 1125 may be used for providing power to the battery 1118 for storage of power.

Optical sensors 1116 are used in conjunction with the camera 1113 and laser projection system 1114 to capture images and movements by the user 110 and its environment 164 to capture images or video. If other users 180 are near the user 110, both users may couple to the device 120 utilizing the laser projection system 1114, RF circuitry 1106 and optical sensors 1116 to allow both users 175 and 190 or a plurality of users to view the same digital projection which then reduces the technological problem of asymmetric information or the "are you recording me" syndrome and assimilates the technology into more common social conventions and unwritten trust contracts.

The location sensor 1123 couples with the peripherals interface 1105 or input/output subsystem 1110 to disable the device if the device 1125 is placed in a pocket, purse or other dark area to prevent unnecessary power loss when the device 1125 is not being used.

The device 1125 may also utilize data from an accelerometer 1121 to assist in the detection of user motion in addition to the infrared laser light projection system to more efficiently process the location of the user 120 in relation to the device 120 and other objects 660 projected by the laser light projection system 1114 to the waveguide lens 670.

Figure 12:
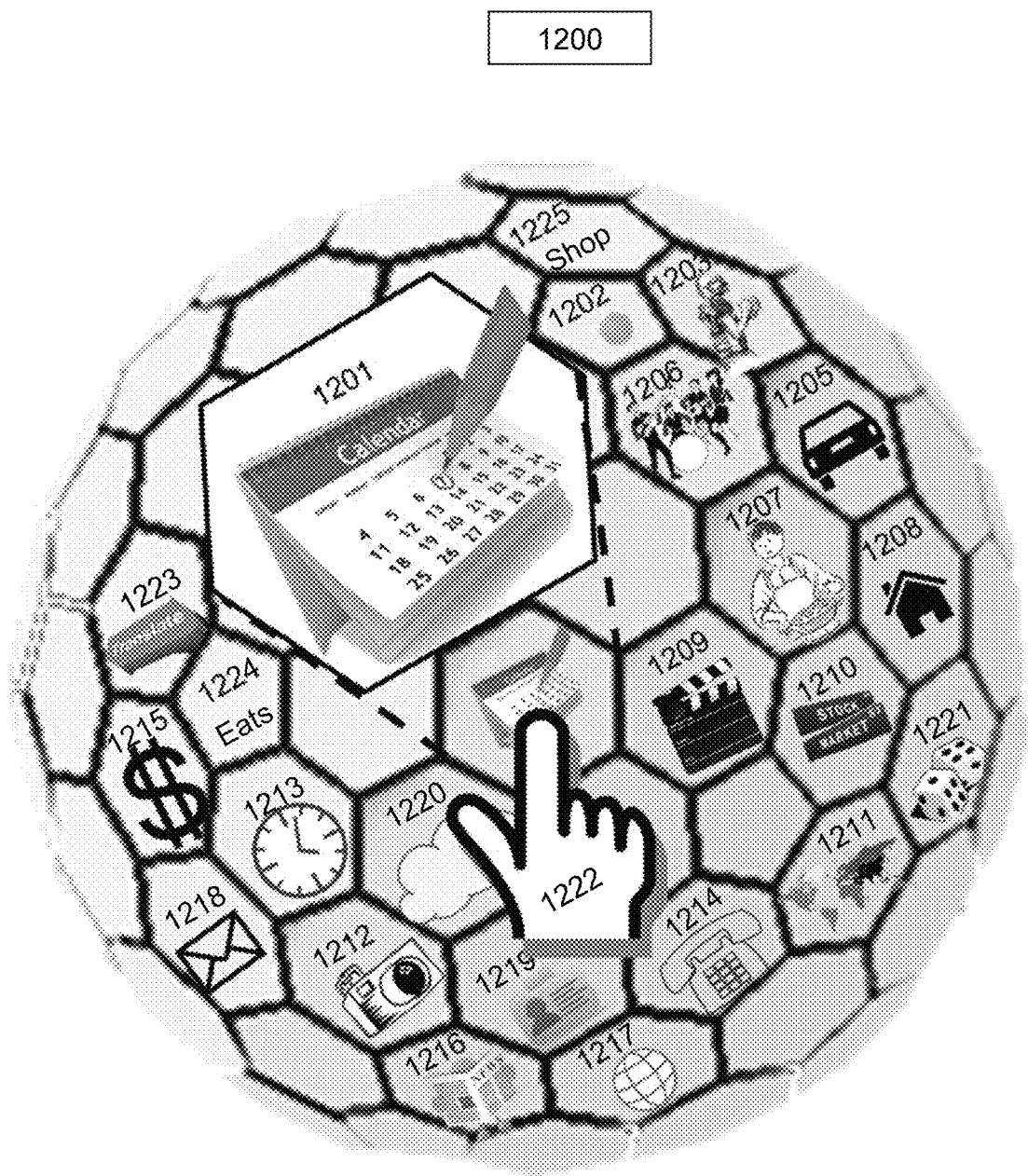
FIG. 12 illustrates an exemplary user interface for selecting a plurality of applications in accordance with some embodiments.

In some embodiments, FIG. 12 the software instructions stored in the memory 1102 may include an operating system (LINUX, OS X, WINDOWS, UNIX, or a proprietary operating system) of instructions of various graphical user interfaces 592, 660, 760, 860, 960, 1060 or other variations which include instructions for object hologram embodiments of a calendar 1201, photos 1212, camera 1212, videos 1209, maps 1211, weather 1202, credit cards 1215, banking 1215, crypto currency 1215, notes, clocks 1213, music 1206, application hosting servers 1220, settings 1220, physical fitness 1203, news 1216, video conferencing 1209, home security 1208, home lighting 1208, home watering systems 1208, home energy 1208 or temperature settings 1208, home cooking 1207, phone 1214, texting services, mail 1218, internet 1217, social networking 1219, blogs 1219, investments 1210, books, television 1209, movies 1209, device location, flashlights, music tuners 1206, airlines 1205, transportation 1205, identification 1219, translation, gaming 1221, real estate 1208, shopping, food 1207, commodities 1215, technology 1217, memberships, applications 1220, web applications 1217, audio media 1206, visual media 1209, mapping or GPS 1211, touch media 1217, general communication 1214, internet 1217, mail 1218, contacts 1219, cloud services 1220, games 1221, translation services 1223, virtual drive through with geofence location services for nearby restaurants to allow advance ordering of food and payment 1224, virtual shopping with custom measurements through infrared scans 1225, etc. . . . and facilitates communication between various hardware and software components. Artificial Intelligence algorithms on the network 150 and database server 160 provide iterative analytical feedback to the user 110. Software applications are not limited to the aforementioned embodiments. The operating system includes various software components and/or drivers for controlling and managing general system tasks such as but not limited to memory management, storage device control, power management, etc. . . . )

Examples of other applications in FIG. 12 hat may be stored in memory 1102 include voice and word processing application, JAVA applications, HTML5 or subsequent web version language applications, encryption, digital rights management, voice recognition, human movement recognition, or human electromagnetic impulse recognition. In conjunction with images projected onto the planar waveguide lens 1030, the mobile CPU device 1125 and laser projection system and infrared tracking system 1114 may be used to manage the calendar 1201 or contacts 1214, including: adding name(s) to the calendar or address book; deleting names from the calendar and address contact list or book; associating names or contacts with phone numbers or emails or social networks or other networks; verifying identity from a network database; sorting names; distributing communication identity for voice, video or hologram communication, third person omniscient analysis 1560 and 1590 with network 150 and 130 database server 160 feedback using artificial intelligence to interact with the user 110.

In conjunction with RF circuitry 1106, audio circuitry 1108, speakers 1107, microphone 1109, laser projection and infrared detection laser systems 1114 the graphical user interface may be used to communicate with other users through the hologram connection communication system 1214. Hologram communication may be recorded for delayed delivery or conducted live. The remote recording capability of the recording CPU computing device may allow the user 120 to transmit text like communication as holograms or in script text. The artificial intelligence of the CPU 140 and database 160 may be used to communicate in multiple languages to any user 120 on the network 150. Hologram communication may be used to speak a language such as English and have the receiving user hear the hologram speak in Chinese. The translation module 1223 compiles network neurons to provide phrase mapping across various literary styles of writing in various languages. Phrase mapping is used along with neural networks for translation services 1223. Cooking assisted lessons from famous chefs 190 are on the cooking application 1207 with the ability to provide feedback in cooking technique and recipe variation from artificial intelligence on the network 150 and database server 160.

In conjunction with laser projection and infrared detection laser systems 1114, optical sensors 1116, camera 1113, microphone 1109, the graphical user interface may be used to capture still images or video (including a video stream) or hologram representation and store them into memory 1102. The user 110 may modify characteristics of a still image or video or hologram or delete them. The user 110 may arrange, modify, manipulate, present, store of delete still images or videos or holograms. The user 110 may play back videos, hologram representations stored in memory 1102 or accessed through the network 150 and multi-dimension map tile database server 160.

In conjunction with laser projection and infrared detection laser systems 1114, optical sensors 1116, camera 1113, microphone 1109, the graphical user interface may be used to browse the internet module 1217 with traditional still representations, video representation or holographic representation.

In conjunction with laser projection and infrared detection laser systems 1114, optical sensors 1116, camera 1113, microphone 1109, calendar module 1201, contact module 1219, email module 1218, the graphical user interface may be used to search for a plurality of widgets or modules. In some embodiments a widget or module may include an HTML5 (recent or future version of a Hypertext Markup Language), CSS (cascading style sheets) or JavaScript or any future set of instructions the CPU can process for the holographic representation of the module or CPU device 120 form factor representation of the module and data exchange 5200, 5300, 5400, 5500 for the multi-dimension map tile database 160.

In conjunction with RF circuitry 1106, audio circuitry 1108, speakers 1107, microphone 1109, GPS receiver 1120, laser projection and infrared detection laser systems 1114 the graphical user interface may utilize the virtual transportation module 1205 which provides mathematical algorithms to minimize cost and transportation time across a variety of transportation systems. One embodiment of the transportation module 1205 utilizes the hub and spoke model which is more efficient than the point to point model. The point to point model consists of 45 routes for a network of N nodes where N=10 destination points. The hub and spoke model in the transportation module 1205 utilizes N-1 routes to optimize on miles driven subject to the constraint of maximizing persons in each vehicle. The hub and spoke model in the transportation module 1205 utilizes only 9 routes to service all 45 possible point combinations in a system of N=10 destination nodes subject to the constraint of maximizing vehicle capacity.

In conjunction with RF circuitry 1106, audio circuitry 1108, speakers 1107, microphone 1109, GPS receiver 1120, laser projection and infrared detection laser systems 1114, the graphical user interface may utilize the Shopping module 1225 which provides consumer good design creators the ability to display merchandise with three dimensional holograms. The three dimensional holograms have the ability to show the user 110 in both the first person and third person omniscient perspective where the graphical user interface shows the clothing on the user 110 by utilizing the laser projection and infrared detection laser systems 1114 to detect the current size and shape of the user to appropriately match and size consumer goods in the shopping module with the user 120.

In conjunction with RF circuitry 1106, audio circuitry 1108, speakers 1107, microphone 1109, GPS receiver 1120, laser projection and infrared detection laser systems 1114, the graphical user interface may utilize the real estate module 1208 to buy or sell houses or rent properties on an exchange based system. The user 120 may buy or sell capacity in a house on a temporary or permanent basis through the real estate module 1208. The graphical user interface utilizes the laser projection and infrared projection system 1114 to display three dimensional hologram renderings and property tours for rent or purchase.

In conjunction with RF circuitry 1106, audio circuitry 1108, speakers 1107, microphone 1109, GPS receiver 1120, laser projection and infrared detection laser systems 1114, the graphical user interface may utilize the stock trading and commodity, currency and bond module 1210 to buy or sell securities on an exchange based system. The user 110 may tour the factory facilities of an investment with a hologram experience provided by the company whom is seeking investment or is publicly or privately traded. The user 110 may participate in three dimensional hologram analyst calls or presentation with the management in real time. The infrared and laser detection system 1114 may record the eye movements and body language of company management to assess risky behavior or lying from the artificial intelligence database server 160 and network 150 to alert the user 110 of potential risk analysis.

In conjunction with RF circuitry 1106, audio circuitry 1108, speakers 1107, microphone 1109, GPS receiver 1120, laser projection and infrared detection laser systems 1114, the graphical user interface may the weather module 1202 to see hologram renderings of rain, cloud formations, sunrise or sunsets, tornado warnings, hurricane warnings, flood watches, and other weather data relevant to the user 110. The weather module 1202 may synchronize with the user's 120 calendar 1201 to alert the user for activities that will correspond to the users 110 calendar 1201 to alert the user 110 of proper clothing to wear or to reschedule appointments or outside activities that are at odds with the then current forecast in the weather module 1202.

In conjunction with RF circuitry 1106, audio circuitry 1108, speakers 1107, microphone 1109, GPS receiver 1120, laser projection and infrared detection laser systems 1114, the graphical user interface may be used for gaming and social media module 1221 to link everyday activity and transactions with helping people in developing areas of the world. Additional description of the module to link everyday transactions with helping people in developing areas of the world can be found in U.S. patent application Ser. No. 15/266,326, "Business exchange transaction method," filed Sep. 15, 2016, the content of which is hereby incorporated by reference in its entirety.

In conjunction with RF circuitry 1106, audio circuitry 1108, speakers 1107, microphone 1109, GPS receiver 1120, laser projection and infrared detection laser systems 1114, the graphical user interface may be used for listening to music with the music module 1206 with a live band in the room. The holograms of band members and instruments may be interactive with the laser projection and infrared detection laser system 1114 to include the user 110 in the band as a singer or musician. Artificial intelligence feedback from the database server 160 and network 150 may provide the user with interactive feedback and dialogue with band members. The camera 1113 may also record renderings of the user 591 performing with the band for posting on social media or local or cloud based network platforms. In some embodiments, the content of the multi-dimension map tile database 160 may include the environment of a plurality of users 110 on the network 150. In some embodiments, natural language processors in the rendering engine 163 and multi-dimension map tile database 160 may present virtual backgrounds which have been linked by the proxy database and multi-dimension map tile database 160 to the natural language processing instructions in the rendering engine 163. In some embodiments the natural language processing interface instructions may render virtual environments 164 and virtual network user representations 175, 180, 190, 110 of the social network and rendering engine 163 for the virtual trip sequence 205, 207, 206, 208, 209. In some embodiments, a user 110 may upload content for the multi-dimension map tile database 160 through the data exchange 5200, 5300, 5400, 5500 method.

Figure 13A:
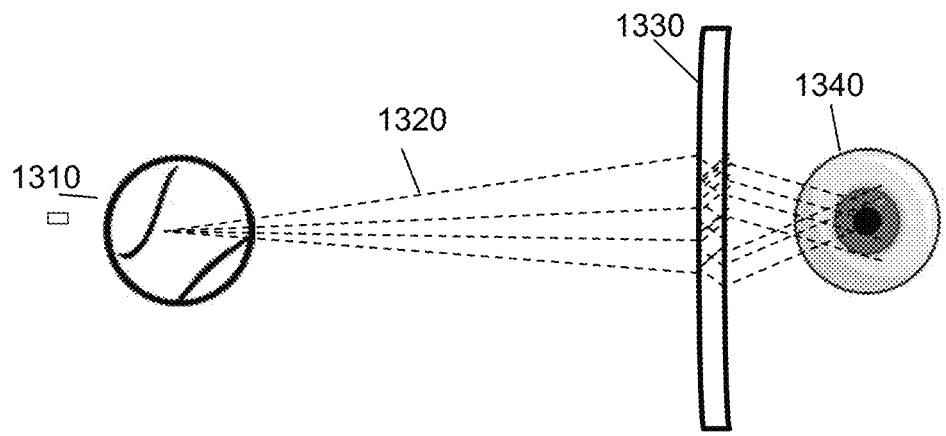
FIGS. 13A and 13B illustrate an exemplary schematic diagram of the implementation of methods from the system where the exemplary user is able to visualize 3d augmented reality food menus and food options at a plurality of establishments using interactive artificial intelligence iterative environments and geofence and geolocation technology where the users may order food and prepay for food delivered at any participating restaurant or food retailer while being transported in a vehicle or from a static location.
Figure 13B:
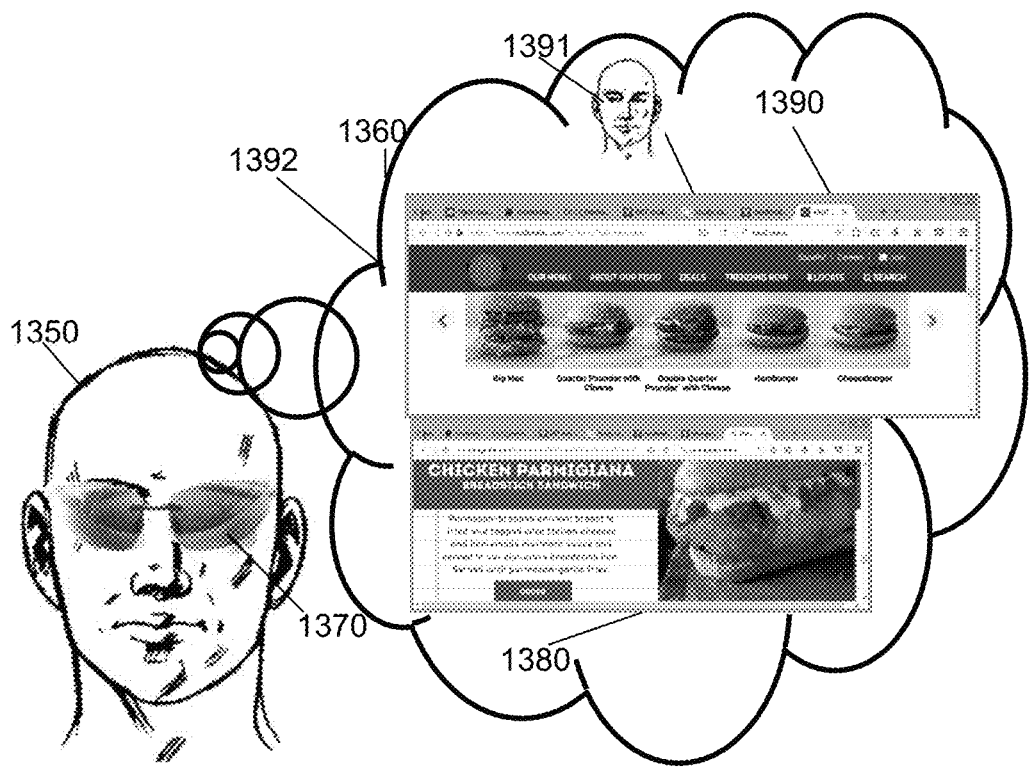

In some embodiments, FIGS. 13A and 13B, in conjunction with RF circuitry 1106, audio circuitry 1108, speakers 1107, microphone 1109, GPS receiver 1120, laser projection and infrared detection laser systems 1114, the graphical user interface may be used to order food with the cooking and food module 1207 and 1225. The GPS receiver locates prepared and raw ingredient alternative shopping locations within a geofence near the user 1350 where the user 1350 sees three dimensional holograms rendering of the prepared or raw product. In some embodiments, a user 110 may upload restaurant content 1390 for the multi-dimension map tile database 160 through the data exchange 5200, 5300, 5400, 5500 method. The multi-dimension map tile database and rendering engine processing algorithms based on analysis from the user's 1350 blood markers and saliva markers provide mathematically optimized food intake based on the science of the user's 1350 specific body chemistry. Based on the user's 1350 selection of the three dimensional rendering of the food product 1390, the food product 1390 may be delivered to the user's 1350 place of work or residence or another alternative meeting point including but not limited to, the place at which the food was produced or prepared. The transaction for the food product 1390 is connected to the user's 1350 financial account information where the user 1350 stored the information in the memory 1102 or multi-dimension map tile database server 160 to provide instant payment to the vendor or service provider.

Figure 14A:
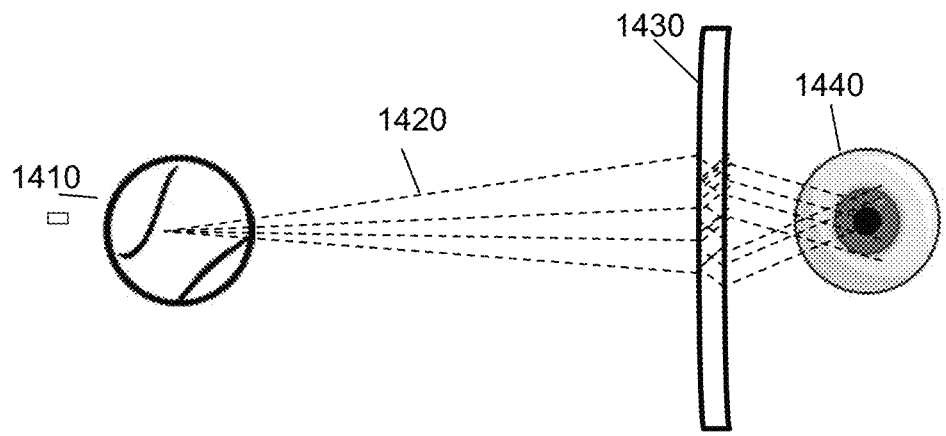
FIGS. 14A and 14B illustrate an exemplary schematic diagram of the implementation of methods from the system where the exemplary user is able to visualize themselves in a 3d augmented reality clothing or textiles or consumer good both in a first person and third person omniscient augmented interactive artificial intelligence iterative environments for the purpose of customized manufacturing, purchases and delivery.
Figure 14B:
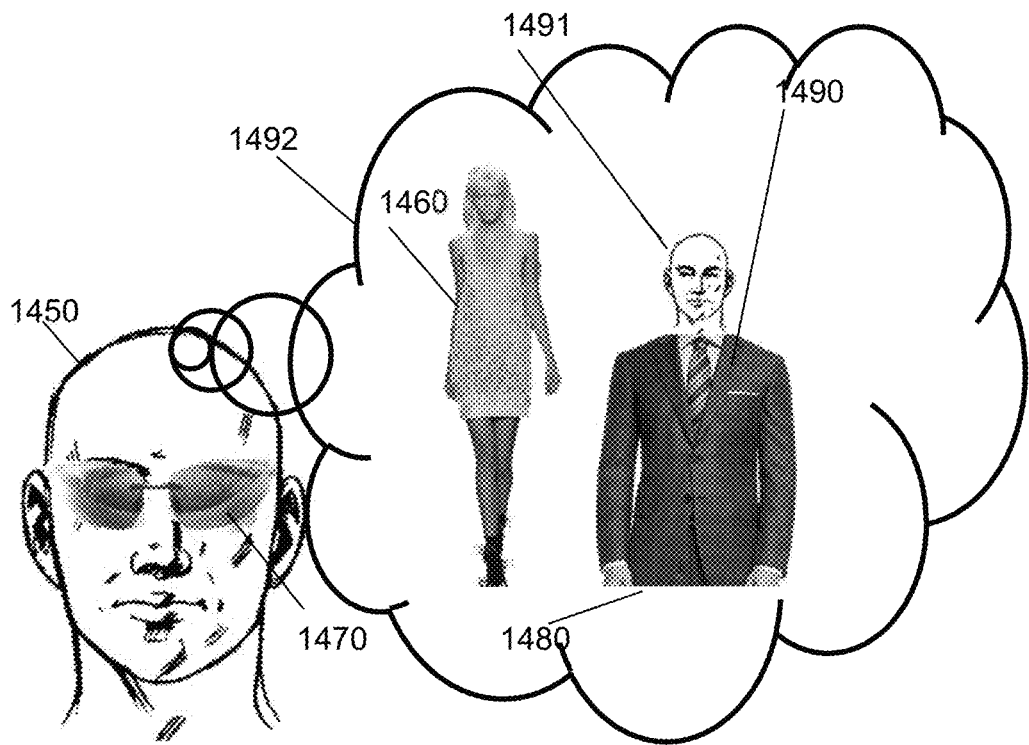

In some embodiments, FIGS. 14A and 14B, in conjunction with RF circuitry 1106, audio circuitry 1108, speakers 1107, microphone 1109, GPS receiver 1120, laser projection and infrared detection laser systems 1114, the graphical user interface may be used to order custom fit clothing 1460 or consumer goods 1490 based upon the measurements provided by the laser projection and infrared detection laser systems 1114. In some embodiments, a user 110 may upload fashion content 1490 for the multi-dimension map tile database 160 through the data exchange 5200, 5300, 5400, 5500 method. The three dimensional rendering of the clothing or consumer goods has the option to view with a model rendered by the merchant or from a third person omniscient perspective placing the clothing or consumer good on the user 1491 and 1490. Based on the user's 1450 selection of the three dimensional rendering of the clothing 1490 or consumer good 1460, the product may be delivered to the user's 1450 place of work or residence or another alternative meeting point including but not limited to the place at which the product was produced or prepared. The transaction for the product 1490 is connected to the user's 1450 financial account information where the user 1450 stored the information in the memory 1102 or database server 160 to provide instant payment to the vendor or service provider.

Figure 15A:
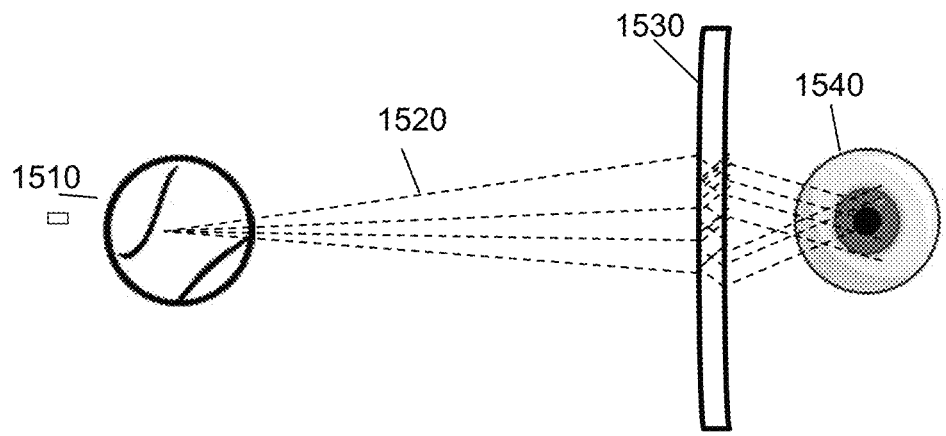
FIGS. 15A and 15B illustrate an exemplary schematic diagram of the implementation of methods from the system of the user's projected image to allow the user to visualize both a first person and third person omniscient augmented interactive artificial intelligence iterative environment where the users not only are able to see a demonstration of a professional athlete, but compare their movement variances for analysis.
Figure 15B:
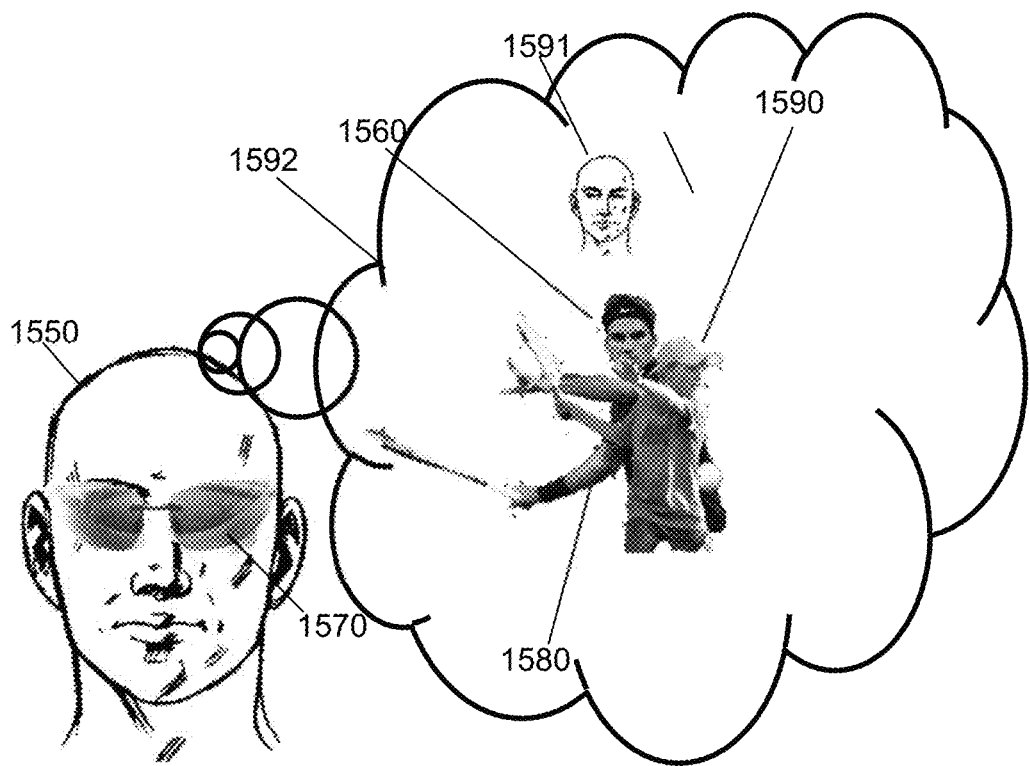
Figure 16:
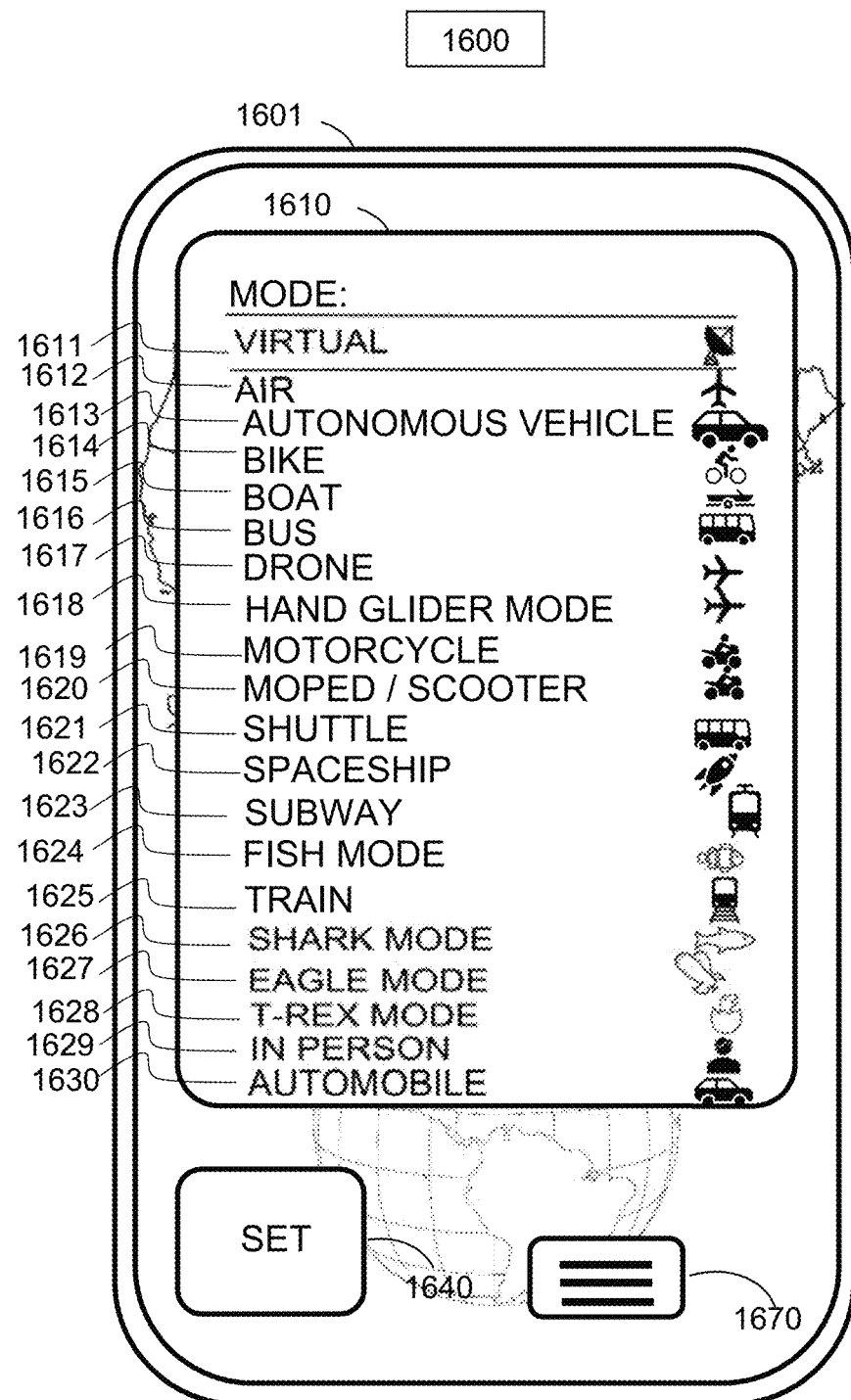
FIG. 16 illustrates an exemplary user interface with various modes of virtual travel for the multi-dimension map database and data exchange linked with associated price-time priority queues in accordance with some embodiments.

In some embodiments, FIGS. 15A and 15B, in conjunction with RF circuitry 1106, audio circuitry 1108, speakers 1107, microphone 1109, GPS receiver 1120, laser projection and infrared detection laser systems 1114, the graphical user interface may be used to perform analysis on the biomechanical movements of the user 1550 or 1590 or 1591 compared to the movements of a professional athlete 1560 or trained professional 1560 based upon the measurements of the user's 1590 movements provided by the laser projection and infrared detection laser systems 1114 and in contrast to the movements of the trained professional 1560. In some embodiments, a user 110 may upload athletic movement and biomechanic movement content 1390 for the multi-dimension map tile database 160 through the data exchange 5200, 5300, 5400, 5500 method. The change analysis between the two three dimensional holographic renderings are geared towards competitive training and instruction in any given field of athletics, music, work or other trained skill. The three dimensional rendering of the trained professional has the option to view stand alone or from a third person omniscient perspective placing the trained professional hologram on the user 1591 and 1590. Based on the user's 1550 movement of the three dimensional rendering of the trained professional 1560, an instructive video may be rendered for the user 1550 or for the user 1550 to post to social media or another cloud based network subject to copyright laws.

FIG. 1600 illustrates an exemplary user interface 1601 for selecting virtual travel modes for the virtual environments 164 as a single dimension of the multi-dimension map tile database 160 and associated data exchange 5200, 5300, 5400, 5500 on a portable multifunction device in accordance with some embodiments. In some embodiments, the user interface 1601 includes the following elements, or a subset or superset thereof:

virtual hub and virtual travel path 205 unit modes 1610 (a data transformation);

setting button 1640 to transmit the virtual hub and virtual travel path community linked virtual hub transmission capacity unit modes 1610;

hamburger button 1670 to instruct the GUI 1610 to take the user 110 to the menu screen.

In some embodiments, user interface 1610 may be used by the user 110 to select a plurality of virtual hub and virtual travel modes for the virtual travel path 205 community linked virtual hub transformed transmission capacity unit security modes 1610 specifications. In some embodiments, virtual travel path and virtual environment community linked virtual hub transmission capacity unit mode selections 1610 may include a subset or superset thereof: virtual 1611; air 1612; autonomous vehicle 1613; bike 1614; boat 1615; bus 1616; drone 1617; hand glider 1618; motorcycle 1619; moped and scooter 1620; shuttle 1621; space 1622; subway 1623; underwater fish mode 1624; train 1625; underwater shark mode 1626; air eagle mode 1627; t-rex dinosaur mode 1628; in person mode 1629; automobile 1630. In some embodiments, virtual travel hub community linked transmission capacity unit modes are simply that a user 110 would have a virtual transmission or travel capacity unit on their t-rex dinosaur mode 1628 or underwater fish mode 1624 as examples, but not limiting by example. In some embodiments, the user 110 may bid on in person 1629 or data export capacity 1628 in any mode or multi-modal of transformed virtual social network travel rendering community linked transmission or virtual travel capacity between a combination of virtual travel capacity community linked transmission hub locations. In some embodiments, the user 110 may use one or multiple modes of virtual travel capacity community linked transmission between a combination of virtual travel capacity community linked virtual transmission hub capacity points. In some embodiments, the user 110, may contact the "set" button 1640 to transmit the transformed virtual travel capacity community linked transmission or virtual travel capacity unit specification mode data by using the GUI 1610 may instantiate instructions in the memory of the mobile computing device 1610 which then transmits virtual travel capacity community linked transmission or virtual travel capacity data 241 through the network 150 or wireless GPS network 130 to call upon instruction routines and instruction sub-routines on the virtual travel capacity community linked transmission forward market multi-dimension map tile database server 160, proxy dimension database server 161, network member database server 3050, virtual travel capacity community route processor 3085, virtual hub database server 3080, and memory which all interface together to make one system which may deliver virtual travel path data and backgrounds community linked transmission or virtual travel capacity units to users 110 from and to a plurality of virtual hubs 3030, 3040, 3020, 3010 with a plurality of specifications at specific market prices on the data exchange processors 5200, 5300, 5400, 5500. In some embodiments, the plurality of virtual travel modes 1610 may render in a plurality of virtual environments 164 provided by the multi-user network 150 data exchanges 5200, 5300, 5400, 5500.

Figure 17:
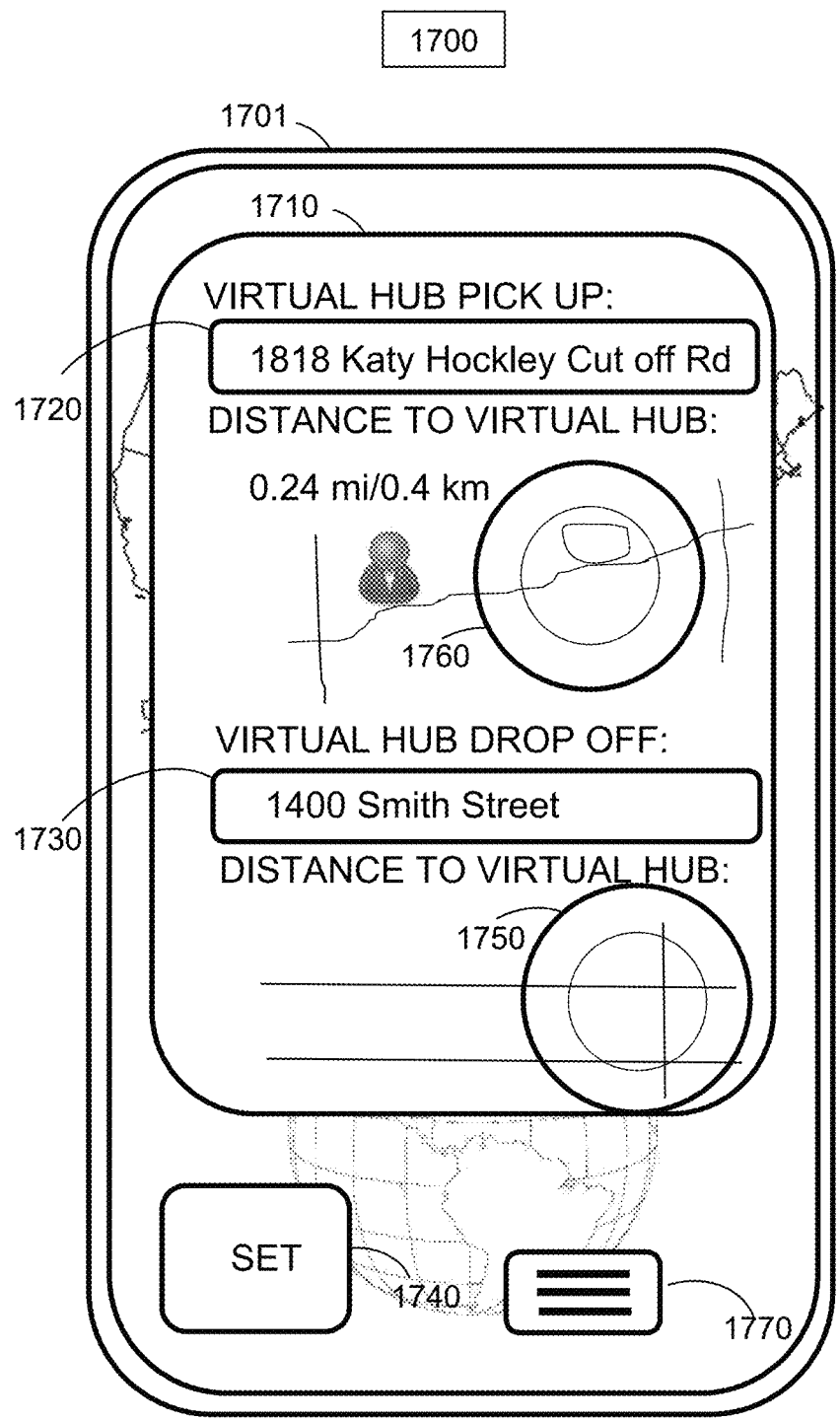
FIG. 17 illustrates an exemplary user interface with various modes and distances before the launch of virtual travel for the multi-dimension map database and data exchange linked with associated price-time priority queues in accordance with some embodiments.

FIG. 17 illustrates an exemplary virtual trip user interface 1710 with location information between the two users and the suggested virtual trip path between two multi-dimensional spaces in the multi-dimension map tile database 160. In some embodiments, a multi-form factor CPU device may be in the form of a portable multifunction device such as is illustrated in 1701, but not limited to this exemplary form factor. In some embodiments, a user 110 may select a topic or person or subject with then may have associated multi-dimension vector and matrix coordinates in the multi-dimension map tile database 160. In some embodiments, the dimension in the multi-dimension map tile database may be comprised of latitude, longitude and altitude coordinate vectors 1720 as a physical or virtual address as well as a plurality of other dimensions. In some embodiments, a virtual time exchange may arrange a meeting between two more users 110 using processes and methods described in U.S. provisional application Ser. No. 63,027,344, "Time Interval Geolocation community objects with price time priority queues for transformed time interval geolocation units", filed on May 19, 2020, which is hereby incorporated by reference in its entirety. As an example, but not limiting by example the time exchange may associate a virtual pick up address 1720 and a virtual drop off address 1730 for the virtual trip between two locations for users 110 on the social network. In some embodiments, the map location elements of the user interface 1710 may be adjusted or scrolled to change the virtual points or to explore other activity around the virtual locations 1760, 1750.

Figure 18:
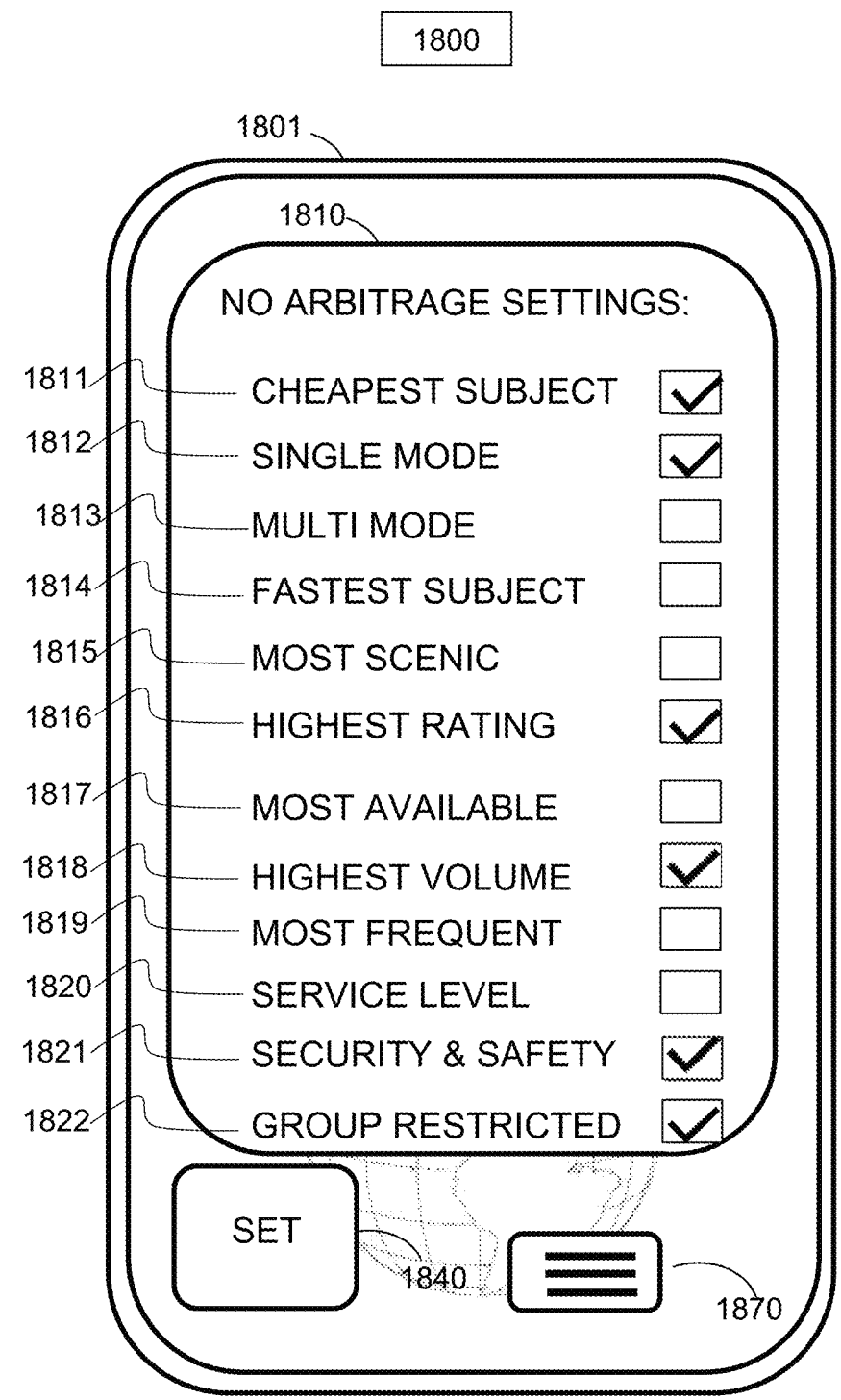
FIG. 18 illustrates an exemplary user interface with various virtual travel options for the rendering of virtual travel for the multi-dimension map database and data exchange linked with associated price-time priority queues in accordance with some embodiments.

FIG. 18 illustrates an exemplary virtual trip user interface constraint settings 1810 with location information between the two users and the suggested virtual trip path between two multi-dimensional spaces in the multi-dimension map tile database 160. In some embodiments, the user interface 1810 on a multi-form factor plurality of devices 120 may toggle a plurality of constraints to the virtual trip and virtual trip background 164 such as cheapest mode subject 1811, single mode 1812, multi-mode 1813, fastest subject mode 1814, most scenic virtual route 1815, highest rated virtual trip background rendering 1816, most available virtual trip background 1817, highest volume virtual trip background 1818, most frequent virtual trip background 1819, service level for virtual trip background 1820, security and safety level setting for virtual trip background 1821 and group restriction constraints 1822. In some embodiments, the user interface 1810 may including fixing the settings 1840 and moving to the application menu through the application menu button 1870 on the user interface 1810. In some embodiments, the user 110 may select the most scenic 1815 virtual travel route for a meeting as defined by other users in the rating system to explore new methods of taking a virtual trip such as a voyage to the moon on the way to Beijing, China from New York, New York with a plurality of users on the network. In yet other embodiments, the user 110 may select multi-mode 1813 which may link multiple trip methods such as eagle view 1627 with fish mode 1624 with hand glider mode 1618 on the way from Paris, France to Berlin, Germany with a plurality of users 110 on the network 150. In some embodiments, users 110 may select security mode 1821 for end to end encryption or group restricted mode 1822 which would not allow other users to join a specified trip or virtual experience on the network 150.

Figure 19:
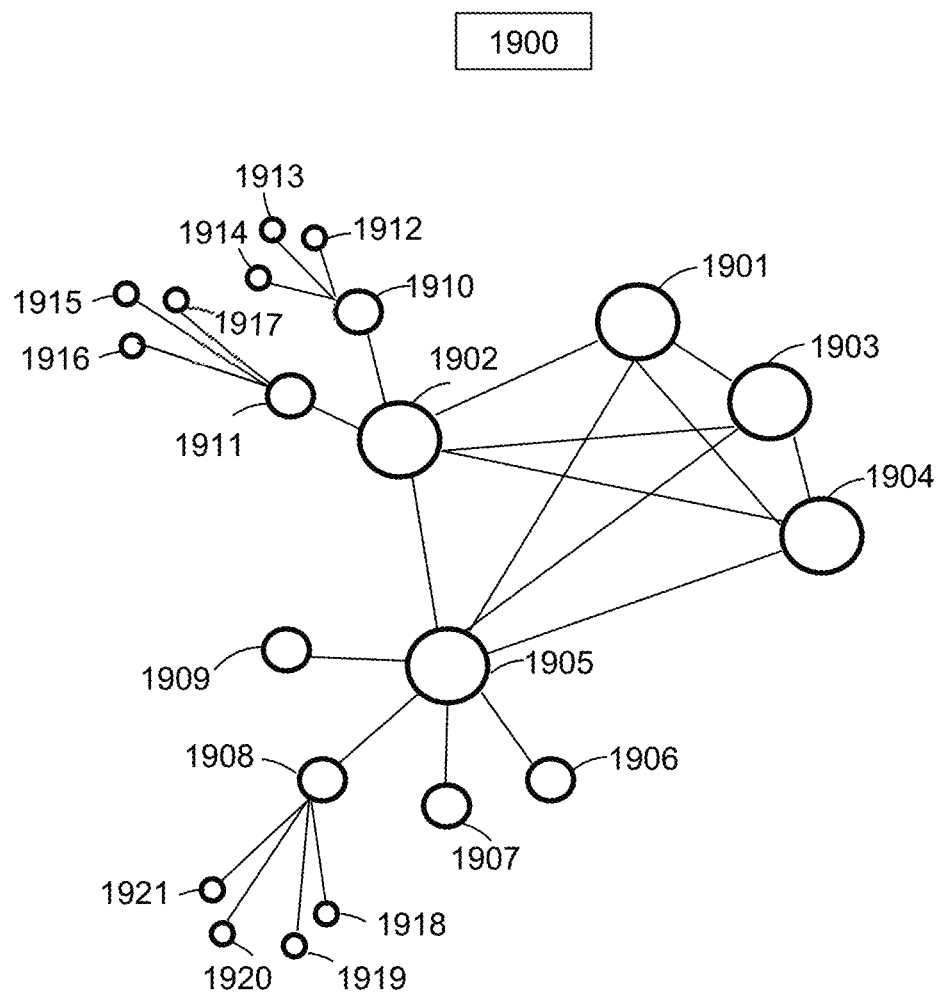
FIG. 19 illustrates an exemplary multi-node, multi-stop virtual travel for the multi-dimension map database and data exchange linked with associated price-time priority queues in accordance with some embodiments.

FIG. 19 illustrates an exemplary multi-node and multi-dimension vector matrix of coordinates on the multi-dimension map tile database 160. In some embodiments, certain configurations of the system may provide for multi-stop trips with latitude, longitude and altitude coordinates 1913, 1910, 1902, 1905, 1907 which may also combine new dimensions such as a sound tile dimension vector to add the sound of walking in the woods if that element were requested in the multi-dimension map tile database 160. Pluralities of dimensions, modes, settings, paths or other system combinations may be mixed and matched by the rendering engine 163 from the multi-dimension map tile database 160 to render the experience 164.

Figure 20:
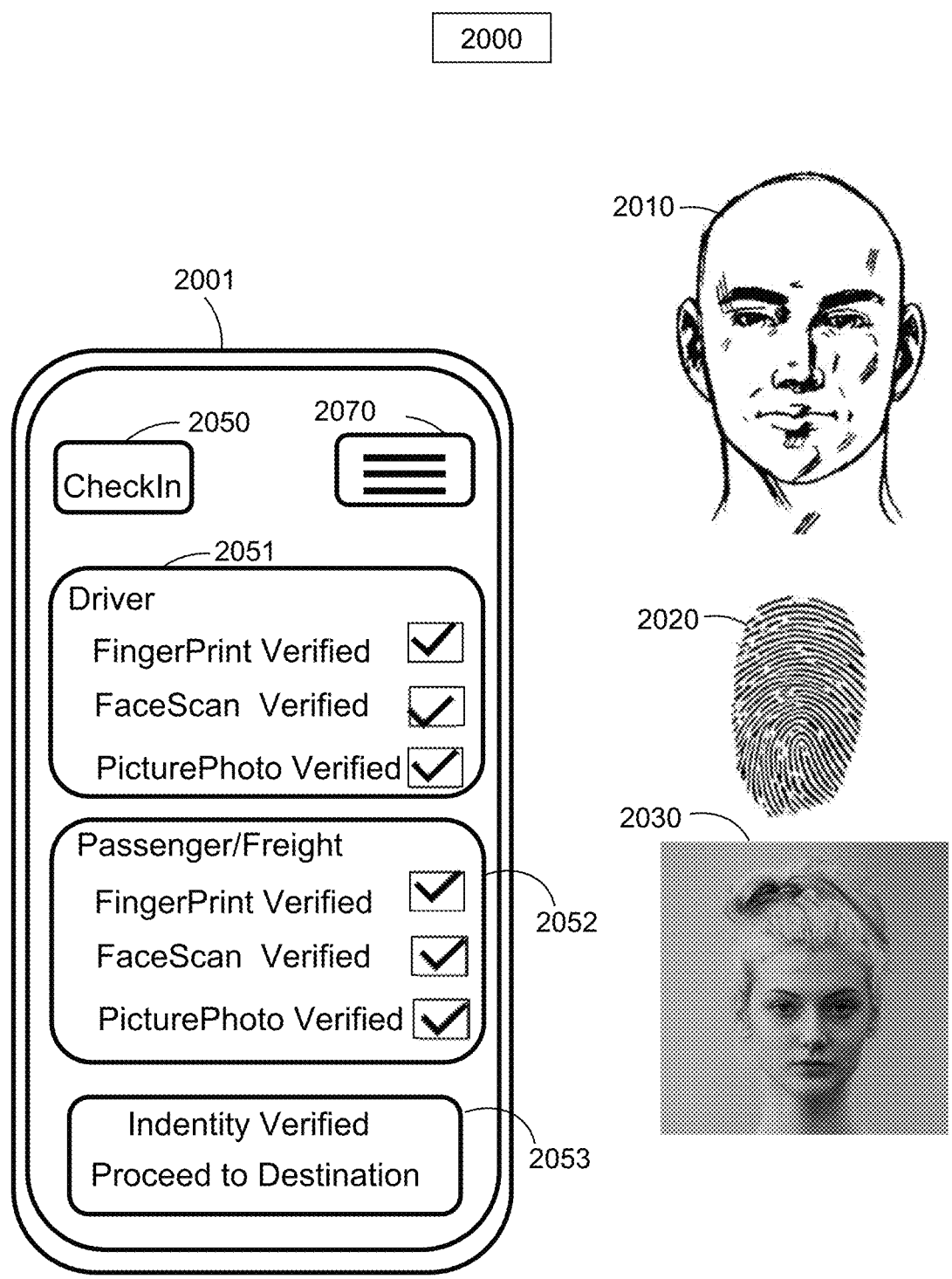
FIG. 20 illustrates an exemplary multi-factor user verification prior to rendering of virtual travel for the multi-dimension map database and data exchange linked with associated price-time priority queues in accordance with some embodiments.

FIG. 20 illustrates an exemplary check in and security database configuration 2000 for a virtual background trip community linked transmission or virtual background trip unit multi layered network node topology in one exemplary implementation of participating, transacting and/or trading transformed virtual background trip community linked transmission or virtual background trip capacity units or securities in accordance with some embodiments. In some embodiments, the multi layered network node topology of participating, transacting and/or trading virtual background trip community linked transmission or virtual background trip capacity configuration 2000 includes the following security configuration elements, or a subset or superset thereof:
  exemplary user interface 2001;
  exemplary checkin 2050 for multi-factor authentication 2050;
  exemplary user interface menu 2070;
  exemplary multi-factor verification of the seller of the virtual unit 2051;
  exemplary multi-factor verification of the buyer of the virtual unit 2052;
  exemplary user 2010;
  exemplary fingerprint scan 2020 of a buyer and seller user;
  exemplary facial recognition or retina scan of a buyer and seller user 2030;
  exemplary virtual trip community linked seller transport or virtual trip or transport seller unit user interface 2051 to confirm identity verification against a plurality of crime databases;
  exemplary virtual trip community linked passenger unit or virtual trip unit user interface 2052 to confirm identity verification against a plurality of crime databases;
  exemplary handshake verification user interface 2053 to confirm both buyer and seller of virtual trip community linked transmission or virtual trip units were correctly verified against crime databases;
In some embodiments, a plurality of crime databases UCR Database 2854, State and Province Database 2855, NIBRS database 2856, INTERPOL database 2857, API/ABC database 2860, National database 2858, Internal system database 2859 are used to confirm a user 110, has been confirmed not to have criminal history in accordance with instructions on the method and system. In some embodiments, virtual trip community linked transmission or virtual trip unit security may be a subset or superset of the aforementioned in the formation of an open forward market auction for a multi layered network node topology for a forward market of virtual trip community linked transmission and virtual trip units. Such security checks are standard in airports, but they are not automated and they are not utilized in other modes of transmission which degrades the overall safety of other transmission methods if they are not utilized. In some embodiments, the check in instructions may reject a user from confirmed verified transmission if they fail the plurality of safety checks. In some embodiments, confirmed no crime history users 110 do not have activity reported in the plurality of crime databases UCR Database 2854, State and Province Database 2855, NIBRS database 2856, INTERPOL database 2857, API/ABC database 2860, National database 2858, Internal system database 2859 and are confirmed to virtual trip community linked transport verified status 2853 in the system.

Figure 21:
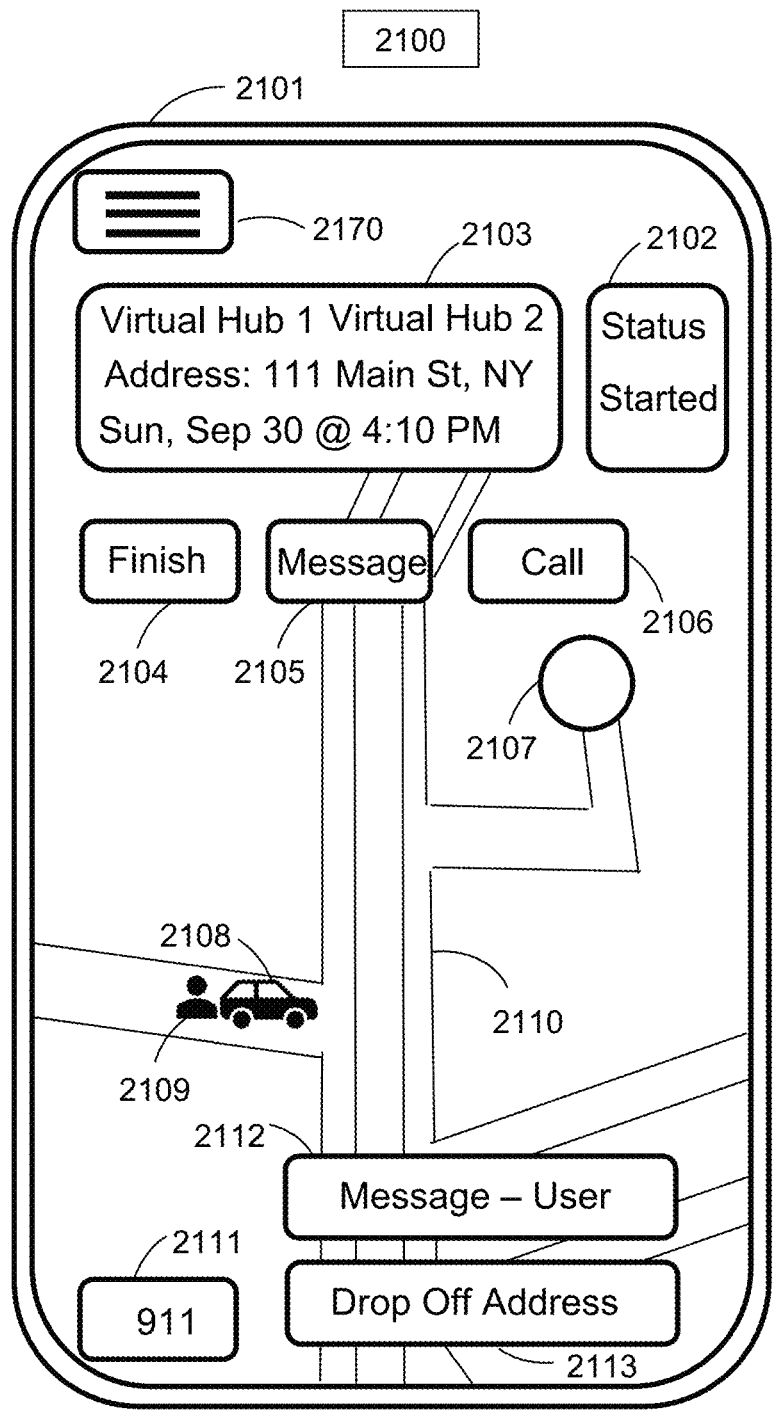
FIG. 21 illustrates an exemplary multi-stop virtual trip and messaging interface between users of the social network structure prior to start of rendering of virtual travel for the multi-dimension map database and data exchange linked with associated price-time priority queues in accordance with some embodiments.

FIG. 21 illustrates an exemplary virtual delivery and pick up status configuration 2100 once a virtual trip community linked transmission or virtual trip unit delivery has started in one exemplary implementation of participating, transacting and/or trading virtual trip community linked transmission or virtual trip capacity units in accordance with some embodiments. In some embodiments, the delivery and pick up status configuration 2100 includes the following elements, or a subset or superset thereof:
  computing device unit GUI 2101 to display method of multi layered network node topology for virtual trip community linked forward market of transmission and virtual trip data units;
  hamburger menu toggle 2170 to move between different application configurations;
  virtual trip community linked virtual Hub 1 pickup address and virtual trip community linked Virtual Hub 2 destination address at a transformed contract specification with regards to quality, day, date and time 2103 of delivery of a transmission or virtual trip data unit;
  trip status of started of virtual trip data community linked transmission or virtual trip data unit or security 2102;
  finish trip buyer or virtual trip data status for virtual trip data community linked transmission unit 2104 once a virtual trip data community linked transmission or virtual trip data unit has been delivered;
  messaging texts and instructions between users to make ingest pick-up, on-going route status and delivery complete of virtual trip data community linked transmission or virtual trip data capacity units 2105;
  call between system users with number masking for privacy security 2106;
  GPS map location of user 2109 who is a user or if virtual trip data community linked virtual trip data, user location 2109;
  GPS map location of user 2108 who is a user or if virtual trip data community linked virtual trip data, carrier unit location 2108;
  GPS map of transmission or virtual trip data unit delivery and pickup or ingest 2110;
  texting message window for virtual trip data or virtual trip data community linked transmission unit communication between users 2112;
  starting point of virtual hub for forward virtual trip data community linked transmission or virtual trip data units 2107;
  security button to report security issues to 911 and system database 2111;
  drop off address for delivery of user or virtual trip data for transmission or virtual trip data unit 2111.

In some embodiments, the GUI 210 transmits delivery instructions to the users 110 to help the user have a rendering or virtual map of their virtual or actual GPS location 2109 relative to the selling user 2108 of transformed virtual trip data community linked virtual trip data or transmission units or securities. In some embodiments, the GUI 210 displays the trips status such as Started 2102 status, the trip status may include subsets or supersets of various status conditions such as PickUp, Started, leaving, on-going, in-progress, arriving, arrived or a plurality of other trip status conditions. In some embodiments, the trip view of the GUI 210 may include a Finish 2104 button to confirm a user or virtual trip data community linked virtual trip data transmission unit has been delivered or completed by the virtual trip data community linked transmission unit object which could be a virtual environment, wire, home, business, car, airplane, autonomous vehicle, bike, boat, ship, bus, drone, limo, motorcycle, moped, shuttle, spaceship, subway, taxi, train, cargo or other types of transmission modes. In some embodiments, the user 110 may transmit a message using the message 2105 button which may transmit audio, visual or text messages between users 110, 2109, 2108. In some embodiments, the users 110, 2109, 2109 may call each other using the call 2106 button to communicate pickup or delivery instructions or other necessary communication. In some embodiments, a user 110, 2109, 2108 may message another user 110, 2109, 2108 to communicate using the Message-User window 2112 which may utilize visual, audio or text communication modes as well as log a message history between users. In some embodiments the users 110, 2109, 2108 may toggle to other modes of the application using the menu hamburger button 2170. In some embodiments the GPS display of a map with the relative position of a transformed virtual trip data community linked transmission or virtual trip data unit or security seller 2108 and a transformed virtual trip data community linked transmission or virtual trip data unit or security buyer 2109 are displayed to help users 110 understand each others relative position and location on a map 2110. In some embodiments the GPS location of the virtual trip data community linked transmission and virtual trip data unit seller 2108 and virtual trip data community linked transmission or virtual trip data unit buyer 2109 are tracked in real time with location updates on the map 2110.

Figure 22:
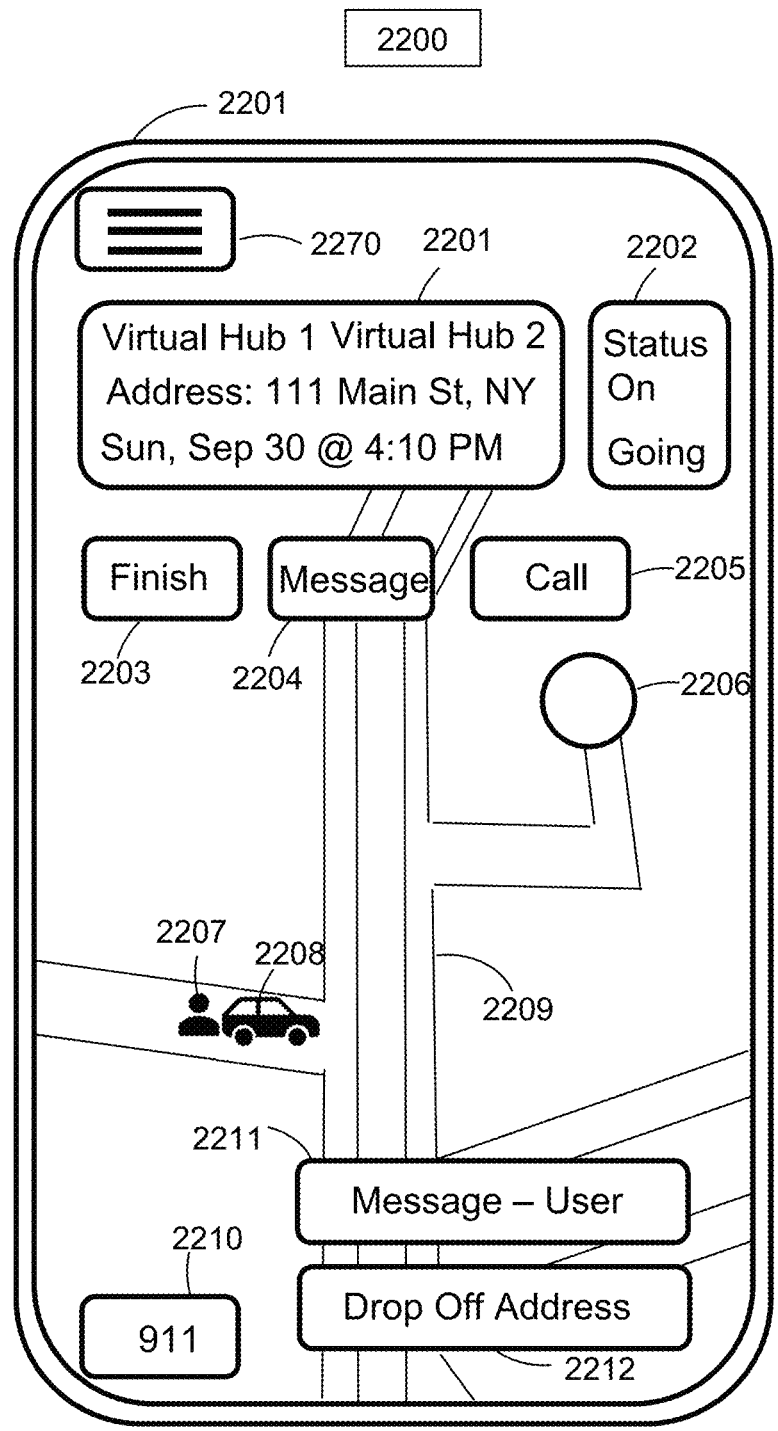
FIG. 22 illustrates an exemplary multi-stop virtual trip and messaging interface between users of the social network structure during rendering of virtual travel for the multi-dimension map database and data exchange linked with associated price-time priority queues in accordance with some embodiments.

FIG. 22 illustrates an exemplary delivery and pick up status configuration 2200 once a transmission or virtual trip data unit delivery is ongoing in one exemplary implementation of participating, transacting and/or trading transformed virtual trip data community linked transmission or virtual trip data capacity units or securities in accordance with some embodiments. In some embodiments, the delivery and pick up status configuration 2200 includes the following elements, or a subset or superset thereof:

computing device unit GUI 2201 to display method of multi layered network node topology for forward market of virtual trip data community linked transmission and virtual trip data units;

hamburger menu toggle 2270 to move between different application configurations;

virtual trip data community linked virtual Hub 1 pickup or ingest address and virtual trip data community linked virtual Hub 2 destination or delivery address at a contract specification with regards to quality, day, date and time 2201 of delivery of a virtual trip data community linked transmission or virtual trip data unit;

trip status of ongoing for virtual trip data community linked transmission or virtual trip data unit 2202;

finish trip passenger or virtual trip data status button for virtual trip data community linked transmission unit 2203 once a virtual trip data community linked transmission or virtual trip data unit has been delivered;

messaging texts and instructions between users to make pick-up or ingest, on-going route status and delivery complete of virtual trip data community linked transmission or virtual trip data capacity units 2204;

call between system users with number masking for privacy security 2205;

GPS map location of user 2209 who is a rider or if virtual trip data community linked virtual trip data, user location 2209;

GPS map location of user 2208 who is a driver or if virtual trip data community linked virtual trip data, carrier unit location 2207;

GPS map of virtual trip data community linked transmission or virtual trip data unit delivery and pickup or ingest 2206;

texting message window for virtual trip data community linked virtual trip data or transmission unit communication between users 2211;

starting point of virtual hub for forward virtual trip data community linked transmission or virtual trip data units 2206;

security button to report and record security issues to 911 and system database 2210;

drop off address for delivery of passenger or virtual trip data community linked virtual trip data for transmission or virtual trip data unit 2212.

In some embodiments, the GUI 210 transmits delivery instructions to the users 110 to help the user 110 have a rendering or map of their GPS location 2207 relative to the selling user 2208 of virtual trip data community linked virtual trip data or transmission units. In some embodiments, the GUI 2201 displays the trips status such as On-Going 2202 status, the trip status may include subsets or supersets of various status conditions such as PickUp or ingest, Started, leaving, on-going, in-progress, arriving, arrived or a plurality of other trip status conditions. In some embodiments, the trip view of the GUI 2201 may include a Finish 2203 button to confirm a passenger or virtual trip data community linked virtual trip data transmission unit or security has been delivered or completed by the transmission unit object which could be a wire, home, business, car, airplane, autonomous vehicle, bike, boat, ship, bus, drone, limo, motorcycle, moped, shuttle, spaceship, subway, taxi, train, cargo or other types of transmission modes. In some embodiments, the user 110 may transmit a message using the message 2204 button which may transmit audio, visual or text messages between users 110, 2207, 2208. In some embodiments, the users 110, 2207, 2208 may call each other using the call 2205 button to communicate pickup or delivery instructions or other necessary communication. In some embodiments, a user 110, 2207, 2208 may message another user 110, 2207, 2208 to communicate using the Message-User window 2211 which may utilize visual, audio or text communication modes as well as log a message history between users 110, 2207, 2208. In some embodiments the users 110, 2207, 2208 may toggle to other modes of the application using the menu hamburger button 2270. In some embodiments the GPS display of a map with the relative position of a virtual trip data community linked transmission or virtual trip data unit seller 2208 and a virtual trip data community linked transmission or virtual trip data unit buyer 2207 are displayed to help users 110 understand each others relative position and location on a map 2209. In some embodiments the GPS location of the virtual trip data community linked transmission and virtual trip data unit seller 2208 and virtual trip data community linked transmission or virtual trip data unit buyer 2207 are tracked in real time with location updates on the map 2209. In some embodiments, the GUI 210 may display the delivery or Drop Off Address 2212 of the virtual trip data community linked transmission or virtual trip data unit. In some embodiments a user 110, 2207, 2208 may use a 911 button 2210 to submit a recording to the system servers and to authorities who are connected to the system if anything has occurred that may compromise the security of any user or virtual trip data community linked transmission unit.

Figure 23A:
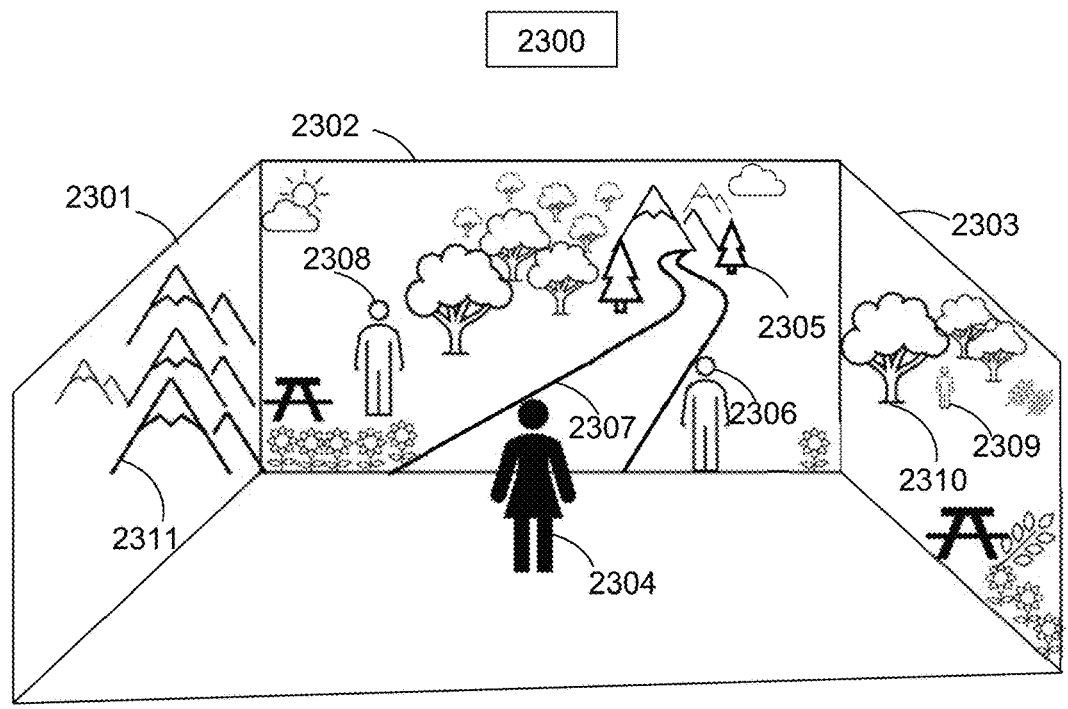
FIGS. 23A and 23B illustrate an exemplary single panel or multi-panel rendering display of virtual objects, real objects and background virtual objects during rendering of virtual travel for the multi-dimension map database and data exchange linked with associated price-time priority queues in accordance with some embodiments.
Figure 23B:
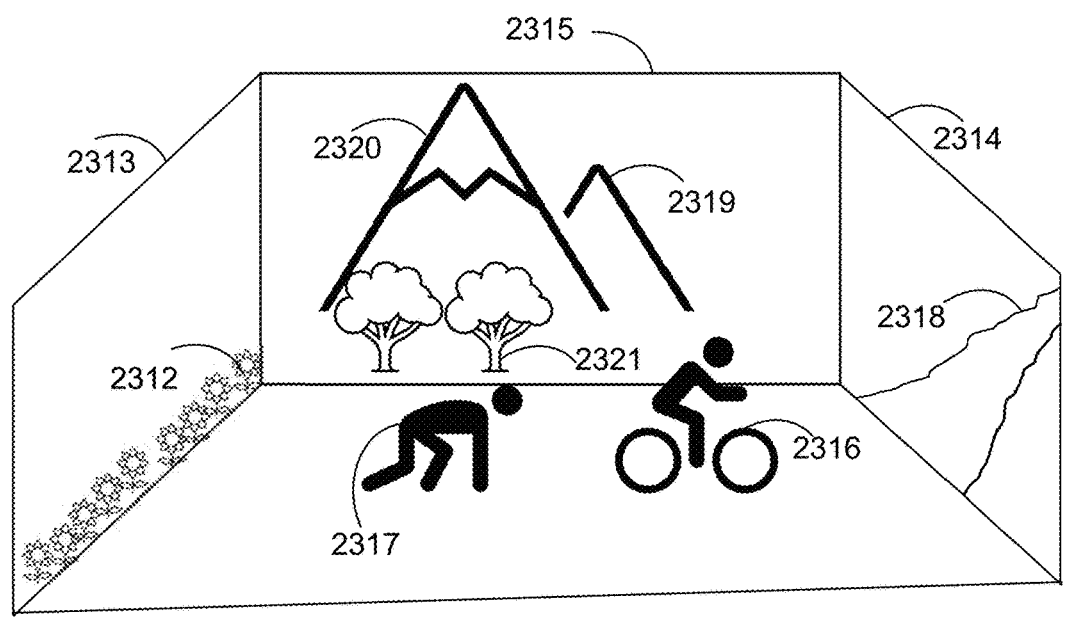

FIGS. 23A and 23B illustrates an exemplary user interface for a plurality of virtual rooms that have been rendered by the rendering engine 163 from the multi-dimension map tile database to a virtual, mixed, augmented or rendered background reality virtual trip data environment 164 to a multi-form factor CPU device 120. In some embodiments, a user 2304 may configure the rendering engine 163 to display to one single panel 2302 or structured panoramic multi-panel views 2301, 2302, 2303 which may take the form of flat surface panels, curved surface panels, holographic display panels in glasses or head mounted devices or other computing devices. In some embodiments, a user 2304 may invite multiple users 2308, 2306, 2309 who may each have disparate relative positions in the multi-dimension map tile database so that the rendering engine 163 places the virtual representations in different vector and matrix coordinate positions. In some embodiments, the rendered virtual background 164 may have a plurality of virtual objects from the multi-dimension map tile database 160 such as by example, but not limiting by example, mountains 2311, trees 2305, pathways 2307, oak trees 2310 or many other virtual objects which have been obtained in the multi-dimension map tile database 160 through the data import and export exchange 5200, 5300, 5400, 5500. In yet other embodiments, such as rendered in FIG. 23B, the virtual environment may be displayed on a plurality of panels 2313, 2315, 2314 or a single form factor panel 120 or augmented, mixed and virtual reality devices 120. In some embodiments, the virtual trip background 164 may render pluralities of flowers 2312, mountains 2320, trees 2321, distant mountains 2319, pathways or roadways 2318 with a plurality of users participating in a plurality of activities such as running 2317 or bicycling 2316 or a plurality of other activities over a network 150 of users 2317, 2316.

FIG. 24 illustrates an exemplary delivery and pick up configuration 2400 for a virtual trip data community linked transmission or virtual trip data unit multi layered network node topology in one exemplary implementation of participating, transacting and/or trading virtual trip data community linked transmission or virtual trip data capacity units in accordance with some embodiments. In some embodiments, the multi layered network node topology of participating, transacting and/or trading virtual trip data community linked transmission or virtual trip data capacity configuration 2400 includes the following elements, or a subset or superset thereof:

computing device unit GUI 2420 to display method of multi layered network node topology for forward market of virtual trip data community linked transmission and virtual trip data units;

hamburger menu toggle 2470 to move between different application configurations;

from node starting point 2401 of a multi layered network node topology for forward market of virtual trip data community linked transmission and virtual trip data units;

to or destination node ending point 2402 of a multi layered network node topology for forward market of virtual trip data community linked transmission and virtual trip data units;

date module 2403 in GUI 210 of an auction for a multi layered network node topology for virtual trip data community linked forward market of transformed transmission and virtual trip data units or securities;

time module 2404 in GUI 2470 of pickup and delivery of an auction for a multi layered network node topology for virtual trip data community linked forward market of transmission and virtual trip data units;

go button 2405 to form a price-time priority queue auction for a multi layered network node topology for virtual trip data community linked forward market of transformed transmission and virtual trip data units or securities;

my meetings button 2406 to quickly obtain common From 2401 or To 2402 points in a price-time priority auction for a multi layered network node topology for virtual trip data community linked forward market of transformed transmission and virtual trip data units for a user on the system;

multi-hub network for multi-dimension map tile database 2407, 2408, 2409, 2410 which may form a single dual node price-time priority auction 2407 to 2408 or 2407 to 2410 or any possible node combination or a multi-node auction series for a multi layered network node topology for virtual trip data community linked forward market of transmission and virtual trip data units for a user on the system.

In some embodiments, the GUI 210 transmits a From node 2401 and To node 2402 with instructions to the users 110 with a specific date 2403 and time 2404 of a multi layered network node topology for forward market of transformed virtual trip data community linked transmission and virtual trip data units for a user on the system to perform an auction by pressing the Go button 2405. The system may use a plurality of constraints such as but not limited by cheapest route 1811, single mode of virtual trip data community linked transmission 1812, multi type method mode of virtual trip data community linked transmission 1813, fastest route 1814, most scenic route 1815, highest rated route or highest rated transmission 1816, most available transmission route 1817, highest volume route 1818, most frequent route 1819, service level route 1820, security and safety of route 1821, group restricted email or group criteria 1822 to use any two node points 2407, 2408, 2409, 2410 or any combination of points 2407, 2408, 2409, 2410. In some embodiments the system may use no constraint, one constraint or a plurality of constraints to allow the user 110 to participate, transact or trade in a multi layered network node topology for virtual trip data community linked forward market of transmission and virtual trip data units in a price-time priority queue auction. In some embodiments the price-time priority queue auction for virtual trip data community linked forward market transformed transmission or virtual trip data units or securities may be comprised of an auction between only two points or a plurality of points subject to a plurality of constraints. In some embodiments the from or starting point or ingest virtual hub may be 2407, but the system selects an auction between 2408 and 2409 rather than starting at 2407 because one or more constraints were selected to frame the price-time priority queue auction for virtual trip data community linked forward market transmission or virtual trip data units. In some embodiments, an auction may be comprised of multiple modes of virtual trip data community linked transmission comprising a vehicle virtual trip data community linked transmission or virtual trip data unit auction between 2407 and 2408 points, followed by an virtual trip data community linked solar transmission or virtual trip data unit auction between 2408 and 2409, followed by an virtual trip data community linked wind auction between 2410 and 2409 for virtual trip data community linked transmission or virtual trip data units. In some embodiments the various plurality of auctions may be displayed as one price-time priority auction or a series of price-time priority auctions. In some embodiments, auctions for a multi layered network node topology for a virtual trip data community linked forward market of transmission and virtual trip data units may consist of any subset or superset of the aforementioned possibilities including any constraints 1800 or any plurality of modes 1600.

Figure 25:
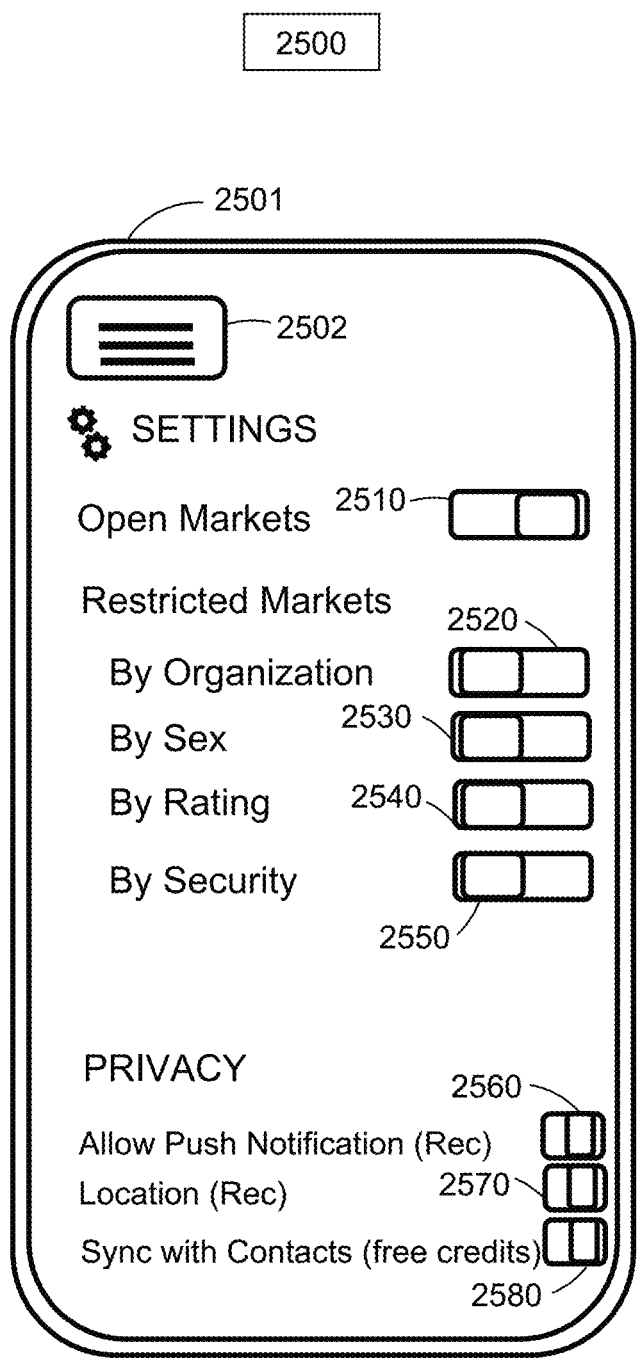
FIG. 25 illustrates an exemplary multi-stop virtual trip and setting interface between users of the social network structure as the settings and privacy gateway of virtual travel for the multi-dimension map database and data exchange linked with associated price-time priority queues in accordance with some embodiments.

FIG. 25 illustrates an exemplary setting configuration 2500 for an virtual trip data community linked transmission or virtual trip data unit multi layered network node topology in one exemplary implementation of participating, transacting and/or trading virtual trip data community linked transmission or virtual trip data capacity units in accordance with some embodiments. In some embodiments, the multi layered network node topology of participating, transacting and/or trading virtual trip data community linked transmission or virtual trip data capacity configuration 2500 includes the following setting elements, or a subset or superset thereof:

computing device unit GUI 2501 to display method of multi layered network node topology for forward market of transformed virtual trip data community linked transmission and virtual trip data units or securities.

hamburger menu toggle 2502 to move between different application configurations;

open markets setting toggle 2510 which allows a user to see all market participants of a given auction on a multi layered network node topology for a forward market of transformed virtual trip data community linked transmission and virtual trip data units or securities;

restricted markets setting By Organization 2520, By Sex 2530, By Rating 2540, By Security 2550 or by any other restriction the user 110 defines which limit the price-time priority queue auction participants for the user;

privacy settings which restrict push notifications 2560, location information 2570; Sync with contacts 2580, or other privacy settings;

In some embodiments, a user 110 may select open markets 2510 which show every participant in a given auction for a multi layered network node topology for a forward market of virtual trip data community linked transmission and virtual trip data units. In some embodiments, participants or users 110 may select to restrict the market view of the GUI such as 400 by organization email 2520 or by sex 2530 or by rating of driver 2540 or rating of user 2540 or by security 2550 or by a plurality of other restrictions but not limited to those restrictions. In some embodiments, users 110 may change privacy settings which restrict push notifications 2560, location settings 2570, Sync with Contacts settings 2580 or a plurality of other settings. In some embodiments, the toggle switches 2510, 2520, 2530, 2540, 2550, 2560, 2570, 2580 may be set to off or on depending on if they hold a right or left toggle switch position. The restricted market settings 2520, 2530, 2540, 2550 may be a subset or superset of the aforementioned in the formation of an open market price-time priority auction for a multi layered network node topology for a forward market of virtual trip data community linked transmission and virtual trip data units.

Figure 26:
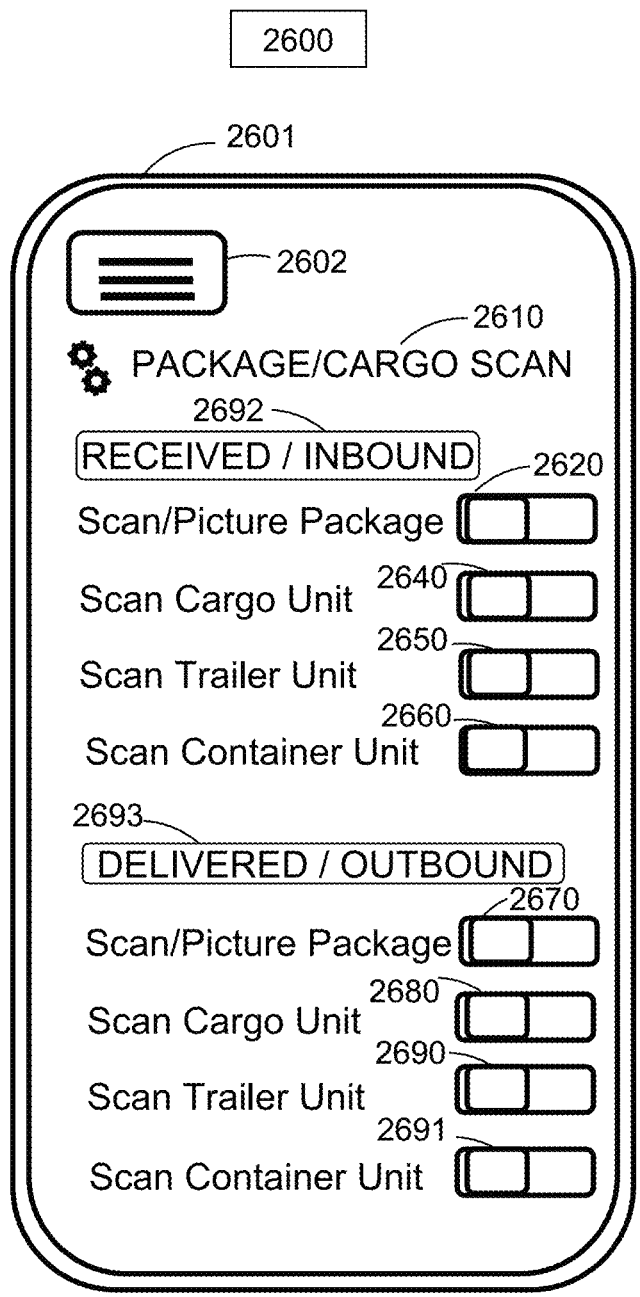
FIG. 26 illustrates an exemplary multi-stop virtual trip and virtual object package scan interface between users of the social network structure as the virtual object scan creation gateway of virtual travel for the multi-dimension map database and data exchange linked with associated price-time priority queues in accordance with some embodiments.

FIG. 26 illustrates an exemplary setting for an inbound data or outbound data configuration 2600 for a transformed virtual trip data community linked transmission or virtual trip data unit multi layered network node topology in one exemplary implementation of participating, transacting and/or trading virtual trip data community linked transmission or virtual trip data capacity units in accordance with some embodiments. In some embodiments, the multi layered network node topology of participating, transacting and/or trading virtual trip data community linked transmission or virtual trip data capacity configuration 2600 includes the following setting for a an inbound data or outbound data elements, or a subset or superset thereof:

computing device unit GUI 2601 to display method of multi layered network node topology for forward market of virtual trip data community linked transformed transmission and virtual trip data units.

hamburger menu toggle 2602 to move between different application configurations;

inbound data or outbound data module 2610 to document the status and position of transformed forward market virtual trip data or virtual trip data community linked transmission units or security;

inbound data or outbound data or received module 2692 to scan an inbound data or outbound data configuration in the context of a plurality of data sizes such as picture for a single frame, cargo for a multi-frame small video unit or trailer unit for a larger multi-frame video unit or container size for multi-frame video units with multi dimensions and scalars and attributes for the multi-dimension tile map database 160, or other transformed virtual trip data community linked transmission or virtual trip data unit identifier or security;

inbound data or outbound data Inbound scan toggle switch 2620 to scan an inbound data or outbound data configuration for the multi-dimension tile map database 160, or other transformed virtual trip data community linked transmission or virtual trip data unit identifier or security;

inbound data or outbound data toggle switch 2640 to scan an inbound data or outbound data configuration for the multi-dimension tile map database 160, or other transformed virtual trip data community linked transmission or virtual trip data unit identifier or security;

trailer battery unit Inbound scan toggle switch 2650 to scan an inbound data or outbound data configuration for the multi-dimension tile map database 160, or other transformed virtual trip data community linked transmission or virtual trip data unit identifier or security;

container battery unit Inbound scan toggle switch 2660 to scan an inbound data or outbound data configuration for the multi-dimension tile map database 160, or other transformed virtual trip data community linked transmission or virtual trip data unit identifier or security;

an inbound data or outbound data configuration for the multi-dimension tile map database 160 or delivered module 2693 to scan an inbound data or outbound data configuration for the multi-dimension tile map database 160, or other transformed virtual trip data community linked transmission or virtual trip data unit or security identifier or security;

an inbound data or outbound data configuration for the multi-dimension tile map database 160 or delivered scan toggle 2670 to scan a an inbound data or outbound data configuration for the multi-dimension tile map database 160, or other transformed virtual trip data community linked transmission or virtual trip data unit identifier or security;

an inbound data or outbound data configuration for the multi-dimension tile map database 160 scan toggle 2680 to scan an inbound data or outbound data configuration for the multi-dimension tile map database 160, or other transformed virtual trip data community linked transmission or virtual trip data unit identifier;

an inbound data or outbound data configuration for the multi-dimension tile map database 160 scan toggle 2690 to scan an inbound data or outbound data configuration for the multi-dimension tile map database 160, or other transformed virtual trip data community linked transmission or virtual trip data unit identifier;

an inbound data or outbound data configuration for the multi-dimension tile map database 160 scan toggle 2691 to scan an inbound data or outbound data configuration for the multi-dimension tile map database 160, or other transformed virtual trip data community linked transmission or virtual trip data unit identifier.

In some embodiments, a user 110 may select the package battery or cargo battery unit scan module 2610 to scan or take a picture of an inbound data or outbound data configuration for the multi-dimension tile map database 160 characteristic. In some embodiments, the user 110 may select the inbound Scan/Picture toggle 2620 which captures the identification characteristic which may include QR Codes, Uniform Product Codes, Serial Numbers, an inbound data or outbound data configuration for the multi-dimension tile map database 160 or other an inbound data or outbound data configuration for the multi-dimension tile map database 160 identification characteristics of a an inbound data or outbound data configuration for the multi-dimension tile map database 160 community linked transmission or virtual trip data unit. In some embodiments, inbound cargo may include a larger unit structure than an inbound data or outbound data configuration for the multi-dimension tile map database 160 such as a very large database or video meta file with multi-dimension tile map database unit with identification characteristics which may include QR Codes, Uniform Product Codes, Serial Numbers, an inbound data or outbound data configuration for the multi-dimension tile map database 160 or other cargo identification characteristics, for such larger units a user 110 may use the Scan an inbound data or outbound data configuration for the multi-dimension tile map database 160 Unit toggle 2640 to capture the an inbound data or outbound data configuration for the multi-dimension tile map database 160 identification characteristic for inbound receipt of the virtual trip data community linked transmission or virtual trip data unit. In some embodiments, an inbound Scan an inbound data or outbound data configuration for the multi-dimension tile map database 160 Unit toggle 2650 option may be used by a user 110 to instruct the system configuration that receipt of a an inbound data or outbound data configuration for the multi-dimension tile map database 160 unit such as an inbound data or outbound data configuration for the multi-dimension tile map database 160 unit, may be scanned to identify the virtual trip data community linked transmission or virtual trip data unit. In some embodiments, an inbound Scan Container Unit 2660 toggle may be utilized to track the receipt or location of an inbound data or outbound data configuration for the multi-dimension tile map database 160 element or virtual object. In some embodiments, a user 110 may select the outbound package or cargo unit scan module 2693 to scan or take a picture of a an inbound data or outbound data configuration for the multi-dimension tile map database 160 object identification code such as a QR code, Uniform Product code, an inbound data or outbound data configuration for the multi-dimension tile map database 160 or other identifying characteristic to confirm delivery to a delivery address of the virtual trip data community linked transmission or virtual trip data unit. In some embodiments, the user 110 may select the outbound Scan/Picture an inbound data or outbound data configuration for the multi-dimension tile map database 160 toggle 2670 which captures the identification characteristic of a package or data structure virtual trip data community linked transmission or virtual trip data unit once the unit is delivered to the delivery address which may be a server location. In some embodiments, cargo may include a larger unit structure such as a plurality of pictures and multi-dimension map tile database elements than a an inbound data or outbound data configuration for the multi-dimension tile map database 160 such as a large database or drone flyover dataset unit with identification characteristics which may include QR Codes, Uniform Product Codes, Serial Numbers, inbound data or outbound data configuration for the multi-dimension tile map database 160 or other cargo identification characteristics, for such larger units a user 110 may use the outbound Scan an inbound data or outbound data configuration for the multi-dimension tile map database 160 toggle 2680 to capture the cargo virtual trip data identification characteristic for outbound receipt of the transformed virtual trip data community linked transmission or virtual trip data unit or security. In some embodiments, an outbound Scan an inbound data or outbound data configuration for the multi-dimension tile map database 160 Unit toggle 2690 option may be used by a user 110 to instruct the system configuration that delivery of a large virtual trip data unit such as an large virtual trip database unit, may be scanned to identify the virtual trip data community linked transmission or virtual trip data unit and confirm delivery. In some embodiments, the virtual trip data unit 2680 may be installed in a home or business to allow for virtual trip data storage of the virtual trip data community linked unit. In some embodiments, an outbound Scan virtual trip data Unit 2691 toggle may be utilized to track the delivery or location of a shipping virtual trip data which has been delivered. In some embodiments, transformed virtual trip data community linked transmission or virtual trip data units or securities may be a subset or superset of the aforementioned in the formation of an open forward market auction for a multi layered network node topology for a forward market of transformed virtual trip data community linked transmission and virtual trip data units or securities. In some embodiments, CPU units 120 may be placed as dash cameras to ingest data and export to the virtual trip data exchange during the delivery of goods and services using processes described in U.S. patent application Ser. No. 15/877,393, "Electronic forward market exchange for transportation seats and capacity in transportation vehicles and spaces," filed Jan. 18, 2018, which is hereby incorporated by reference in its entirety.

Figure 27A:
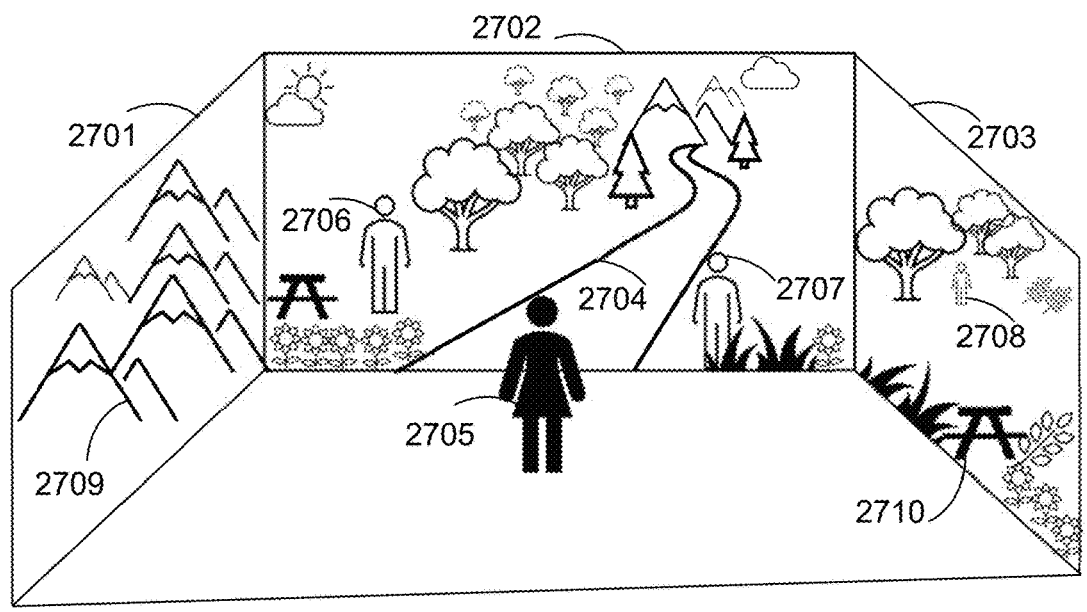
FIGS. 27A and 27B illustrate an exemplary single panel or multi-panel rendering display of virtual objects, real objects, gaming objects and background virtual objects during rendering of virtual travel for the multi-dimension map database and data exchange linked with associated price-time priority queues in accordance with some embodiments.
Figure 27B:
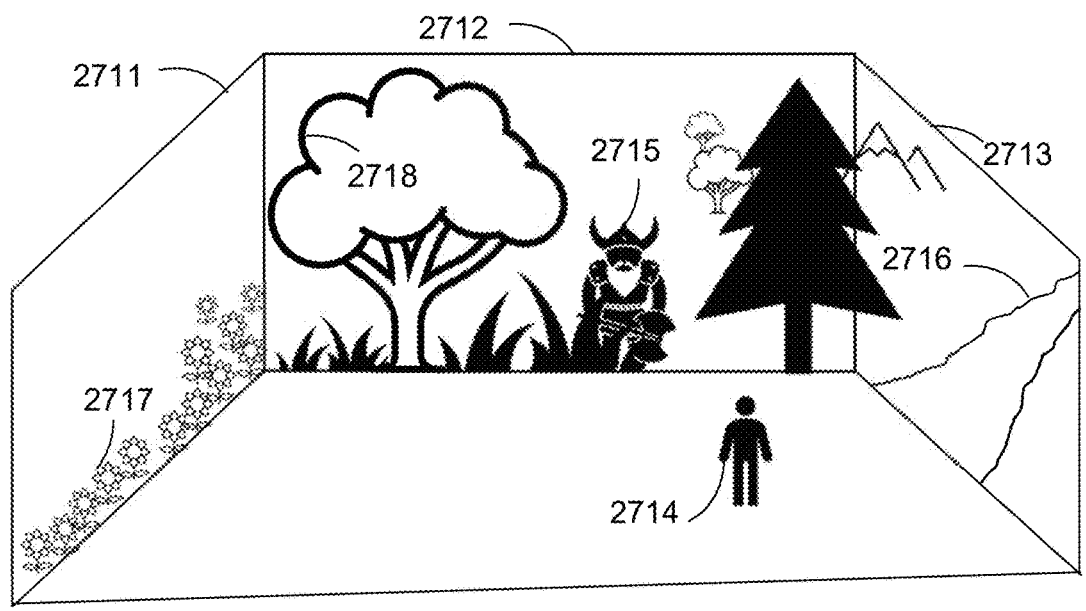

FIGS. 27A and 27B illustrate exemplary virtual trip data rendering from the virtual trip rendering engine 163 to the virtual, mixed, augmented reality rendered background 164 on multi-form factor CPU devices 120. In some embodiments, virtual environments may be rendered on a plurality of display devices and sizes of devices 2701, 2702, 2703. In some embodiments, the virtual objects may be participants 2706, 2707, 2708, 2705 in the social network for transactions such as described in U.S. patent application Ser. No. 15/266,326, "Implementations of a computerized business transaction exchange for various users," filed Sep. 15, 2016, which is hereby incorporated by reference in its entirety. In some embodiments, the images and dynamically rendered multi-dimension map tile database my render data from the data exchange 5200, 5300, 5400, 5500 which have been uploaded and processed into the multi-dimension map tile database 160 for further processing with the proxy dimension database server 161 and machine learning missing tile proxy clustering processor 162 for rendering to the multi-geolocation dimension CPU rendering engine 163 to a contextualized configured virtual environment 164. In some embodiments, the rendered images may include mountains 2709, paths 2704, table objects 271 such as shown in FIG. 27A. Similarly, in other embodiments, such as shown in FIG. 27B, rendered images may include emoji virtual objects 2715 of other members of the network 150. In some embodiments, additional virtual images such as flowers 2717, paths or roads 2716, trees 2718 or network members 2714 may be rendered by the multi-dimension CPU rendering engine 163 with dynamic objects which have been placed into the multi-dimension map tile database 160 through the data exchange 5200, 5300, 5400, 5500 which have been uploaded and processed into the multi-dimension map tile database 160 for further processing with the proxy dimension database server 161 and machine learning missing tile proxy clustering processor 162 for rendering to the multi-geolocation dimension CPU rendering engine 163 to a contextualized configured virtual environment 164.

Figure 28:
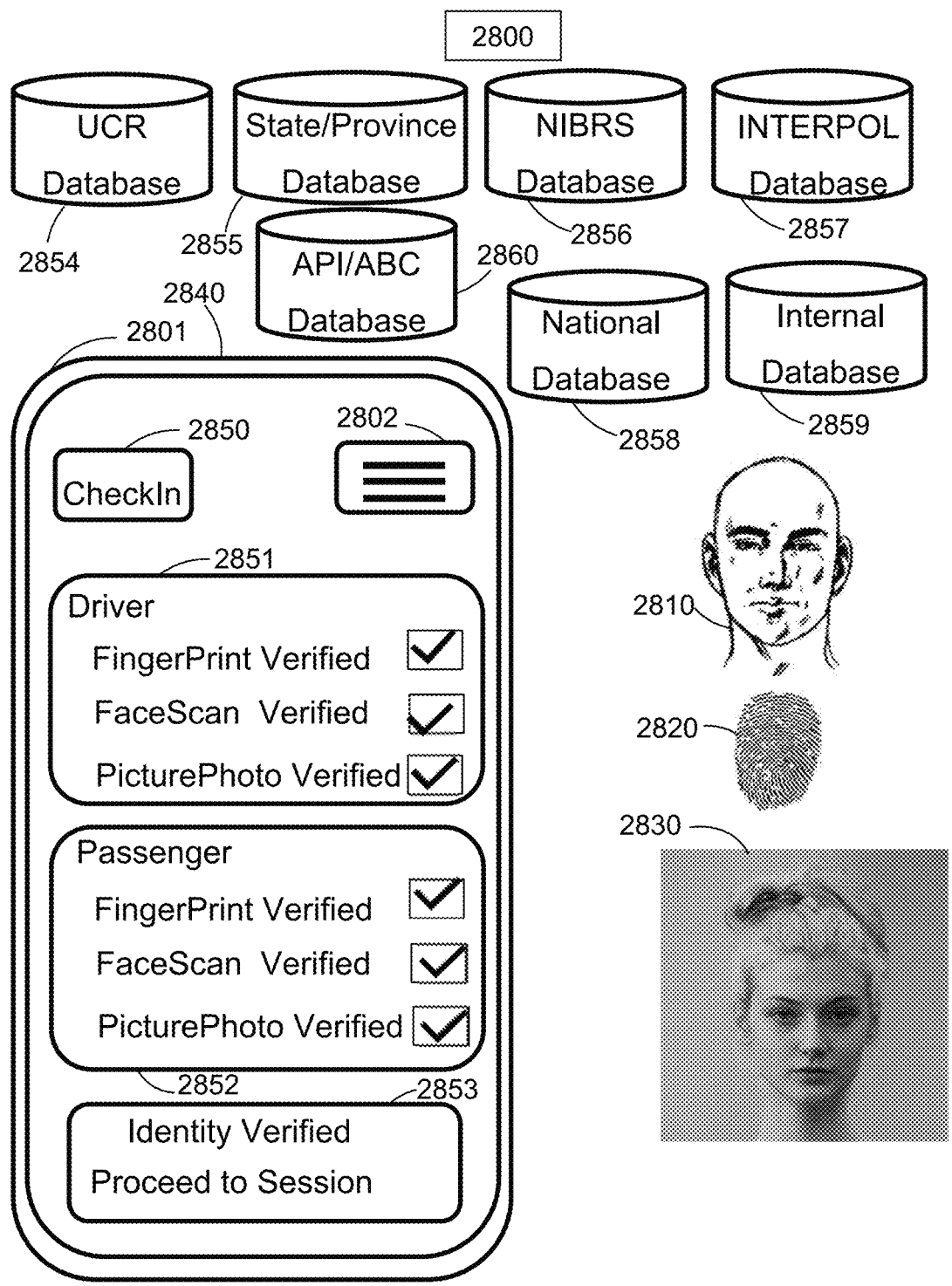
FIG. 28 illustrates an exemplary user background and security check prior to rendering of virtual travel for the multi-dimension map database and data exchange linked with associated price-time priority queues in accordance with some embodiments.

FIG. 28 illustrates an exemplary check in and security database configuration 2800 for an virtual trip data community linked transmission or virtual trip data unit multi layered network node topology in one exemplary implementation of participating, transacting and/or trading transformed virtual trip data community linked transmission or virtual trip data capacity units or securities in accordance with some embodiments. In some embodiments, the multi layered network node topology of participating, transacting and/or trading virtual trip data community linked transmission or virtual trip data capacity configuration 2800 includes the following security configuration elements, or a subset or superset thereof:

exemplary uniform crime reporting ("UCR") database 2854 from international agencies who report crime;

exemplary International State or Provincial crime reporting database 2855 from international governments who report crime;

exemplary International National Incident Based Reporting System ("NIBRS") crime reporting database 2856 from international governments who report crime;

exemplary Interpol crime reporting database 2857 from international governments who report crime which connects National Central Bureaus ("NCBs");

exemplary International application program interface and ABC ("API/ABC") crime reporting database 2860 from international governments who report crime;

exemplary national crime reporting database 2858 from international governments who report crime;

exemplary internal system crime reporting database 2859 from crimes which occurred on system;

exemplary facial scan to identify user 2810 against a plurality of crime databases;

exemplary fingerprint scan to identify user 2820 against a plurality of crime databases;

exemplary photo or photo scan to identify user 2830 against a plurality of crime databases;

exemplary voice scan to identify user 2810 against a plurality of crime databases;

exemplary Computing device unit GUI 2801 to display method of multi layered network node topology for forward market of virtual trip data community linked transmission and virtual trip data units;

hamburger menu toggle 2802 to move between different application configurations;

exemplary virtual trip data community linked Driver or Virtual trip data transport or virtual trip data or transport seller unit user interface 2851 to confirm identity verification against a plurality of crime databases;

exemplary virtual trip data community linked passenger unit or virtual trip data unit user interface 2852 to confirm identity verification against a plurality of crime databases;

exemplary handshake verification user interface 2853 to confirm both buyer and seller of virtual trip data community linked transmission or virtual trip data units were correctly verified against crime databases;

In some embodiments, a plurality of crime databases UCR Database 2854, State and Province Database 2855, NIBRS database 2856, INTERPOL database 2857, API/ABC database 2860, National database 2858, Internal system database 2859 are used to confirm a user 110, has been confirmed not to have criminal history in accordance with instructions on the method and system. In some embodiments, virtual trip data community linked transmission or virtual trip data unit security may be a subset or superset of the aforementioned in the formation of an open forward market auction for a multi layered network node topology for a forward market of virtual trip data community linked transmission and virtual trip data units. Such security checks are standard in airports, but they are not automated and they are not utilized in other modes of transmission which degrades the overall safety of other transmission methods if they are not utilized. In some embodiments, the check in instructions may reject a user from confirmed verified transmission if they fail the plurality of safety checks. In some embodiments, confirmed no crime history users 110 do not have activity reported in the plurality of crime databases UCR Database 2854, State and Province Database 2855, NIBRS database 2856, INTERPOL database 2857, API/ABC database 2860, National database 2858, Internal system database 2859 and are confirmed to virtual trip data community linked transport verified status 2853 in the system.

Figure 29:
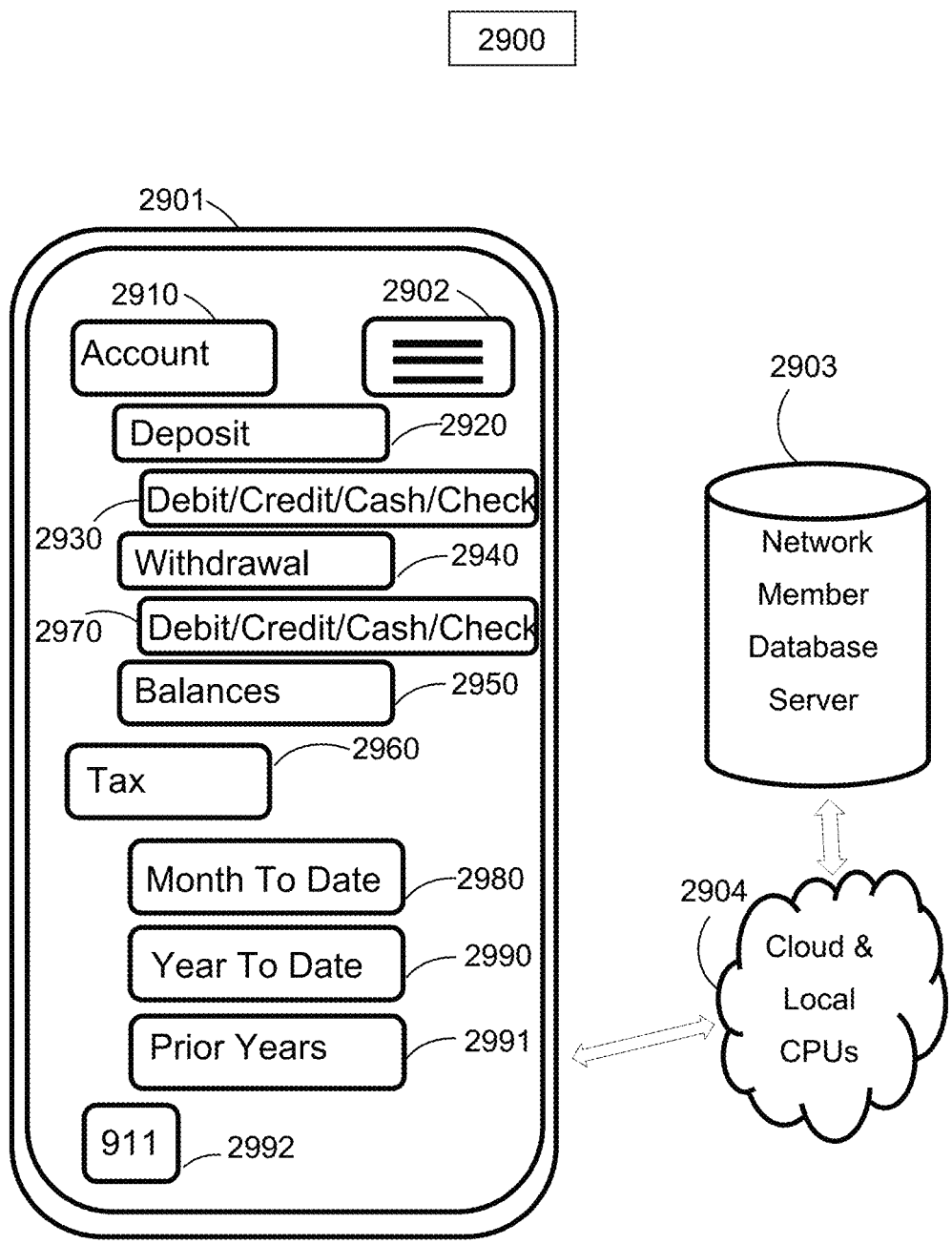
FIG. 29 illustrates an exemplary user account and tax and payment module prior to rendering of virtual travel for the multi-dimension map database and data exchange linked with associated price-time priority queues in accordance with some embodiments.

FIG. 29 illustrates an exemplary user accounting configuration 2900 for a transformed virtual trip data community linked transmission or virtual trip data unit or security multi layered network node topology in one exemplary implementation of participating, transacting and/or trading transformed virtual trip data community linked transmission or virtual trip data capacity unit auctions in accordance with some embodiments. In some embodiments, the multi layered network node topology of participating, transacting and/or trading transformed virtual trip data community linked transmission or virtual trip data capacity configuration 2900 includes the following accounting elements, or a subset or superset thereof:

computing device unit GUI 2901 to display method of multi layered network node topology for forward market of virtual trip data community linked transmission and virtual trip data units.

exemplary hamburger menu toggle 270 to move between different application configurations;

exemplary account button 2910 to edit or confirm user account data;

exemplary deposit button 2920 to add transaction funds or transaction currency or transaction balances to the user account;

exemplary deposit method button 2930 to add transaction funds or transaction currency or transaction balances to the user account through Debit, Credit, Cash, Check, virtual currency, digital currency or a plurality of other payment methods;

exemplary withdrawal button 2940 to send transaction funds or transaction currency or transaction balances to the user account in a different institution;

exemplary withdrawal method button 2970 to send transaction funds or transaction currency or transaction balances to the user account at a different institution through Debit, Credit, Cash, Check, virtual currency, digital currency or a plurality of other payment methods;

exemplary balances button 2950 to confirm user account balances;

exemplary tax button 2960 to track user account activity for taxation reporting;

exemplary month to date tax reporting button 2980;

exemplary year to date tax reporting button 2990;

exemplary prior year tax reporting button 2991;

exemplary "911" security button 2991;

exemplary Network Member Database Server 160;

exemplary cloud and CPU and Network configuration 190 to send and receive Network Member account data.

In some embodiments, user account 2910 data may be displayed with voice or screen or non-screen computing devices with instructions from the GUI 2901 in accordance with instructions on the method and system. In some embodiments, user deposit 2920 data may be displayed with voice or screen or non-screen computing devices with instructions from the GUI 2901 in accordance with instructions on the method and system. In some embodiments, user deposit method 2930 data such as Debit, Credit, Cash, Check, virtual currency, digital currency or a plurality of other payment methods may be displayed with voice or screen or non-screen computing devices with instructions from the GUI 2901 in accordance with instructions on the method and system. In some embodiments, user withdrawal 2940 data may be displayed with voice or screen or non-screen computing devices with instructions from the GUI 2901 in accordance with instructions on the method and system. In some embodiments, user withdrawal method 2970 data such as Debit, Credit, Cash, Check, virtual currency, digital currency or a plurality of other payment methods may be displayed with voice or screen or non-screen computing devices with instructions from the GUI 2901 in accordance with instructions on the method and system to place money in the system account into a different institution specified by the user 110. In some embodiments, user balances 2950 data may be displayed with voice or screen or non-screen computing devices with instructions from the GUI 2901 in accordance with instructions on the method and system. In some embodiments, user tax button 2960 data may be displayed with voice or screen or non-screen computing devices with instructions from the GUI 2901 in accordance with instructions on the method and system. In some embodiments, user month to date tax data button 2980, year to date tax data button 2990, prior year tax data button 2991 may be displayed with voice or screen or non-screen computing devices with instructions from the GUI 2901 in accordance with instructions on the method and system. In some embodiments, the accounting and tax information may be stored in the Network Member Database Server 2903 and transmitted through the cloud, network and CPUs 150, 2904 to the GUI computing device 2901. In some embodiments, transmission or virtual trip data unit accounting and fund interfaces may be a subset or superset of the aforementioned in the formation of an open forward market price-time priority auction for a multi layered network node topology for a forward market of virtual trip data community linked transmission and virtual trip data units.

Figure 30:
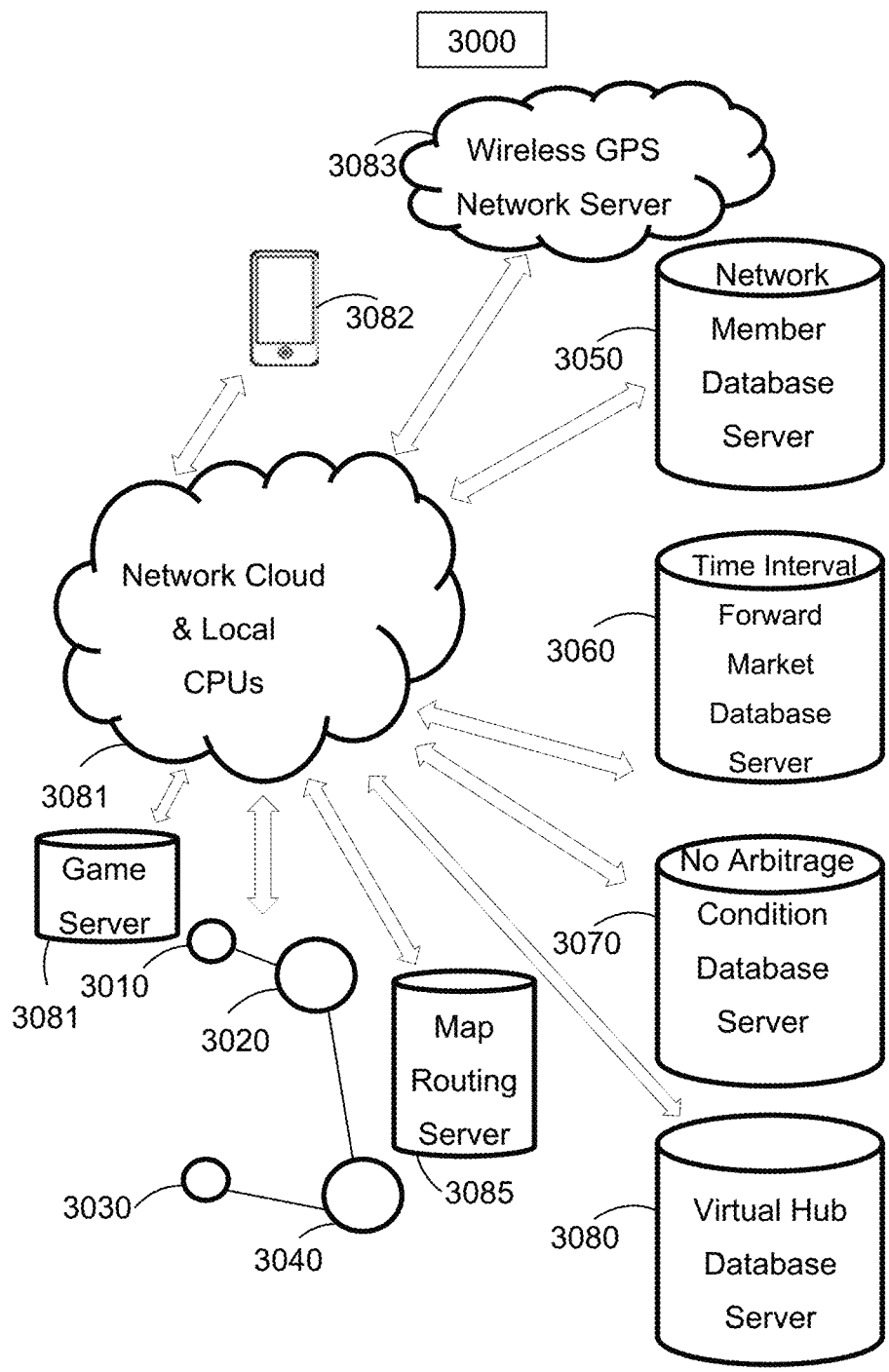
FIG. 30 illustrates an exemplary network configuration in corroboration with other embodiments.

FIG. 30 illustrates an exemplary network configuration 3000 for a virtual trip data community linked transmission or virtual trip data unit multi layered network node topology in one exemplary implementation of participating, transacting and/or trading transmission or virtual trip data capacity unit auctions in accordance with some embodiments. In some embodiments, the multi layered network node topology of participating, transacting and/or trading virtual trip data community linked transmission or virtual trip data capacity configuration 3000 includes the following accounting elements, or a subset or superset thereof:

exemplary wireless GPS Network and Server 3083;

exemplary wireless computing device that is audio, video, screen or non-screen interfaced 3082;

exemplary Network Member Database Server 3050;

exemplary virtual trip data community linked Data Transmission Forward Market Database Server 3060;

exemplary virtual trip data community linked Data Transmission Forward Market Database Server 3060;

exemplary virtual trip data community linked No Arbitrage Condition Database Server 3070;

exemplary virtual trip data community linked Virtual Hub Database Server 3080;

exemplary Network, Network Cloud, and local CPUs 3081;

exemplary Network Multi Layered Network Virtual Hub Node Topology for forward market virtual trip data community linked transmission of virtual trip data unit price-time priority auctions 3010, 3020, 3030, 3040.

In some embodiments, the network topology 3010 may utilize a voice or screen or non-screen computing device 3082 to interface with system and method instructions over a Network and Network Cloud and Networked CPUs 3081 to use instructions on CPUs to order a constrained or unconstrained virtual hub network topology auction over two or more virtual hub nodes 3010, 3020, 3030, 3040 over one or multiple modes of virtual trip data community linked transmission or virtual trip data with instructions and data from the Virtual Hub Database Server 3080, the No Arbitrage Condition Database Server 3070, the virtual trip data community linked Transmission Forward Market Database Server 3060, the Network Member Database Server 3050 and the Wireless GPS Network Server 3083. Network Data may be displayed with voice or screen or non-screen computing devices with instructions from the GUI 2901 in accordance with instructions on the method and system.

Figure 31A:
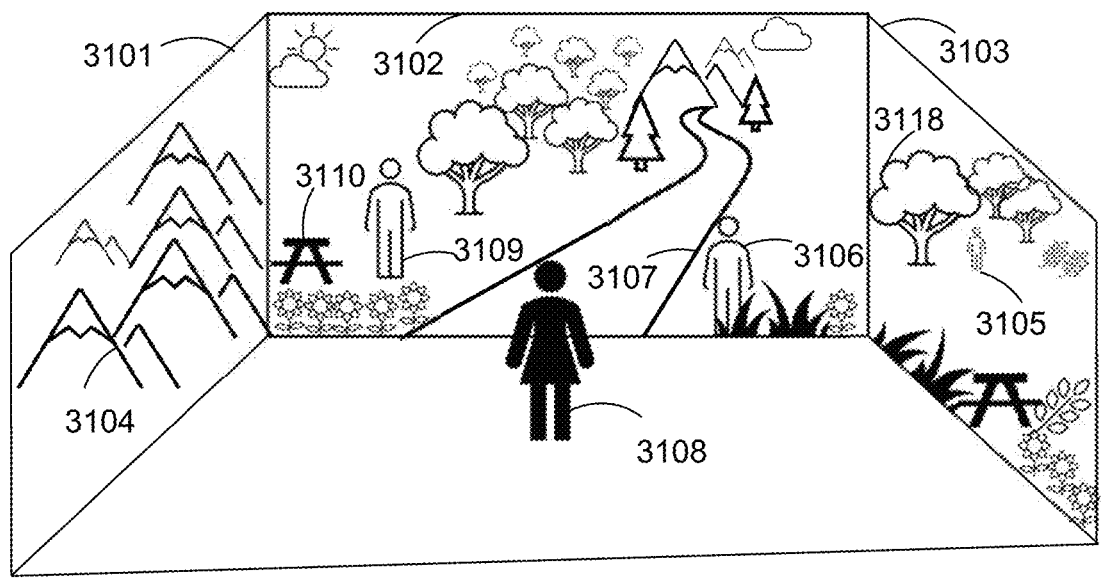
FIGS. 31A and 31B illustrate an exemplary single panel or multi-panel rendering display of virtual objects, real objects, gaming objects and background virtual objects during rendering of virtual travel for the multi-dimension map database and data exchange linked with associated price-time priority queues in accordance with some embodiments highlighting hiking in a natural environment and telemedicine in a natural environment.
Figure 31B:
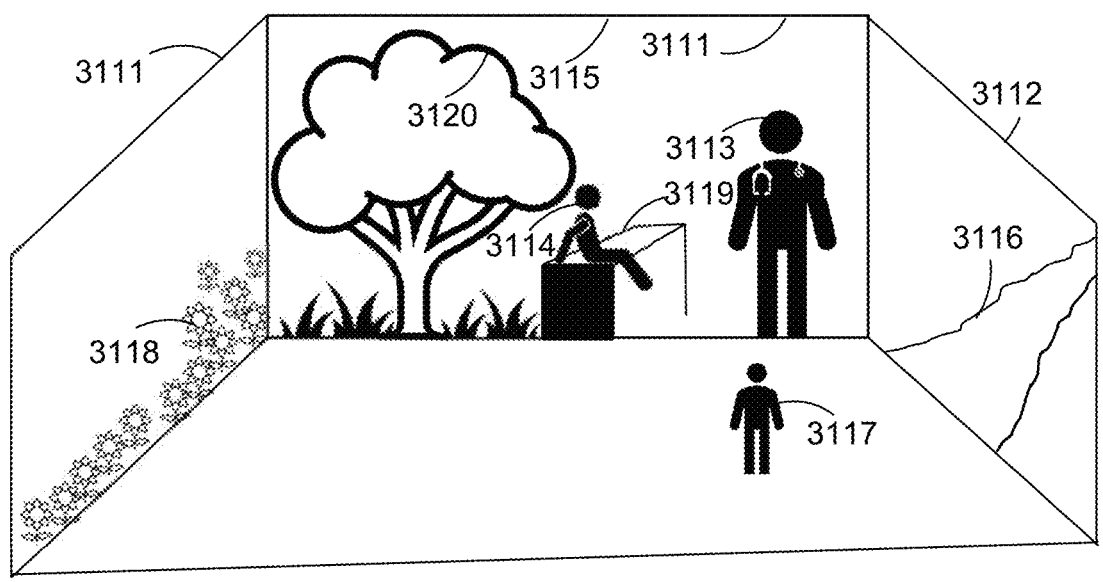

FIGS. 31A and 31B illustrate an exemplary plurality of views from the multi-dimension map tile data exchange linked database 160. FIG. 31A illustrates an exemplary three hundred and sixty degree view of hiking with a natural environment with multiple panel views 3101, 3102, 3103 from a plurality of multi-form factor CPU devices 120. In some embodiments, a user 3108 may hike with a plurality of other network 150 members 3109, 3106, 3105 through a plurality of scenes such as mountains 3104 or picnic areas in a state park 3110 or down a path in the forest 3107 with many trees 3120. In some embodiments, an accelerometer 1100 associated with the user 3108 may gauge steps into the virtual environment or movements in hand gestures from the user 3108 may gauge movement or steps or progress into the virtual environment. FIG. 31B illustrates an exemplary telemedicine appointment in a forest virtual environment by a physician using the multi-dimension map tile data exchange linked database 160. In some embodiments, device screens 3111,120 may render flowers in a field 3118 or in other embodiments, the rendering engine 163 may display on a multi-function device panel 3111 a patient 3114 on an examination table 3119 with a physician 3113 which are both members of the network 150. In some embodiments, the patient 3114 or physician 3113 may configure the virtual environment 164 as a forest examination with the multi-dimension map tile data exchange linked database 160. In some embodiments, the physician may utilize the multi-dimension map tile data exchange linked database 160 to request patient 3114 medical records and make block chained evaluation comments and analysis and encrypted health record hand offs as in U.S. provisional patent application Ser. No. 63,027,344, "Time interval geolocation community objects with price-time priority queues for transformed time interval geolocation units," filed May 19, 2020, the contents of which are hereby incorporated by reference in their entirety.

Figure 32A:
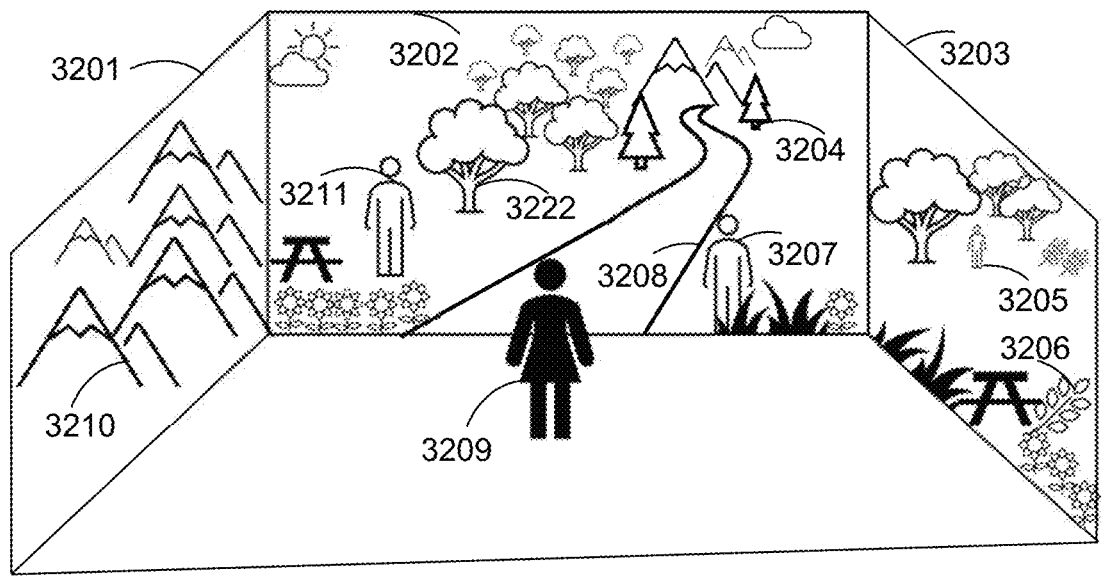
FIGS. 32A and 32B illustrate an exemplary single panel or multi-panel rendering display of virtual objects, real objects, gaming objects and background virtual objects during rendering of virtual travel for the multi-dimension map database and data exchange linked with associated price-time priority queues in accordance with some embodiments highlighting hiking in a natural environment and further steps in the hiking natural environment.
Figure 32B:
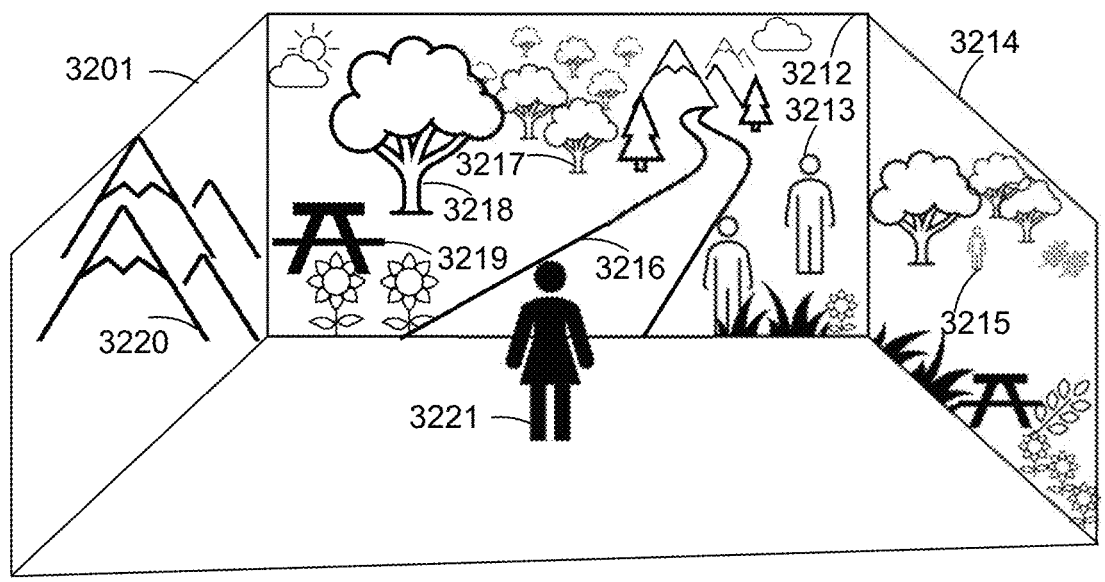

FIGS. 32A and 32B illustrate an exemplary plurality of views from the multi-dimension map tile data exchange linked database 160. FIG. 32A illustrates an exemplary three hundred and sixty degree view of hiking with a natural environment while FIG. 32B illustrates the same view with further steps or progress into the multi-dimension map tile data exchange linked database 160 as rendered with the virtual environment 164. In some embodiments, such as displayed in FIG. 32A, exemplary panels 3201 may display mountains 3210 and additional panels 3202, 3203 may display additional network 150 members 3211, 3207, 3205 in a user 3209 configured virtual environment 164. In some embodiments, the virtual environment 164 may contain trees 3204, 3222 and paths and roadways 3208 as well as incremental scenery 3206. In some embodiments, an accelerometer 1100 associated with the user 3221 may gauge steps into the virtual environment or movements in hand gestures from the user 3221 may gauge movement or steps or progress into the virtual environment. In some embodiments, incremental trees 3217, 3218 may scale from image 3222 which is more distant to image 3218 which is more near as the virtual user subject 3221 approaches the virtual object 3218 in multi-dimension map tile data exchange linked database 160. In some embodiments, incremental network 150 users 3213, 3215 may appear in the virtual environment 164 of the multi-dimension map tile data exchange linked database 160.

Figure 33A:
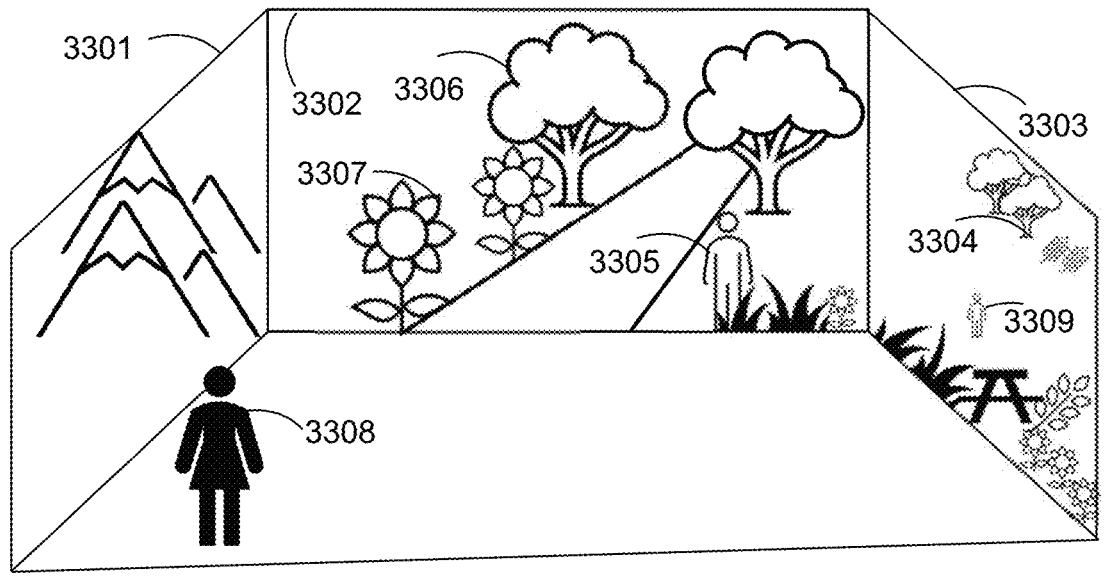
FIGS. 33A and 33B illustrate an exemplary single panel or multi-panel rendering display of virtual objects, real objects, gaming objects and background virtual objects during rendering of virtual travel for the multi-dimension map database and data exchange linked with associated price-time priority queues in accordance with some embodiments highlighting hiking in a natural environment and using the zoom and micro-zoom and nano-zoom features of the multi-dimension map database and data exchange.
Figure 33B:
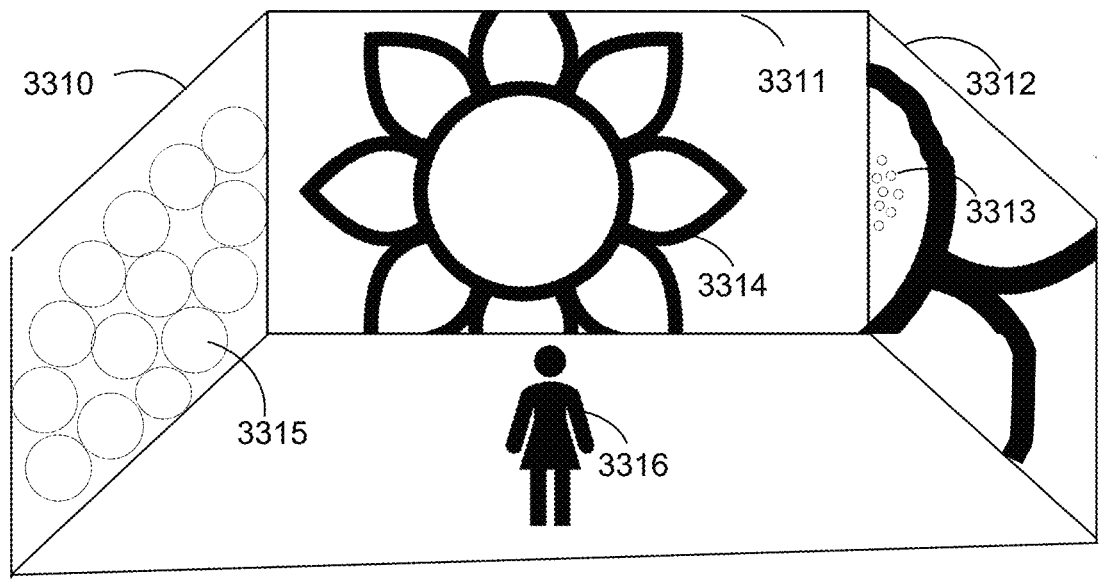

FIGS. 33A and 33B illustrate an exemplary plurality of views from the multi-dimension map tile data exchange linked database 160. FIG. 33A illustrates an exemplary three hundred and sixty degree view of hiking with a natural environment while FIG. 33B illustrates the same view with micro and nano zoom or progress into the multi-dimension map tile data exchange linked database 160 as rendered with the virtual environment 164. In some embodiments, such as displayed in FIG. 33A, exemplary panels 3301 may display mountains and additional panels 3302, 3303 may display additional network 150 members 3305 and 3309 in a user 3308 configured virtual environment 164. In some embodiments, the virtual environment 164 may contain trees 3306, 3304 and paths and roadways as well as incremental tree scenery 3306. In some embodiments, an accelerometer 1100 associated with the user 3308 may gauge steps into the virtual environment or movements in hand gestures from the user 3308 may gauge movement or steps or progress into the virtual environment. In some embodiments, incremental flowers 3307 may scale from image 3307 which is more distant to image 3314 which is more near or image 3313 which is in micro scale level or image 3315 which is nano zoom level for the same flower 3307 with different scale vectors and matrices 4808 as the virtual user subject 3316 approaches the virtual object 3307 in multi-dimension map tile data exchange linked database 160. In some embodiments, incremental network 150 users 3305, 3309 may appear in the virtual environment 164 of the multi-dimension map tile data exchange linked database 160. In some embodiments, the user 3316 may have bionic eyes to move into matter such as a flower 3307 at scale levels not seen before due to the organization of the multi-dimension map tile data exchange linked database 160 and machine learning missing tile proxy clustering CPU instructions 162 and proxy dimension database server 161.

Figure 34A:
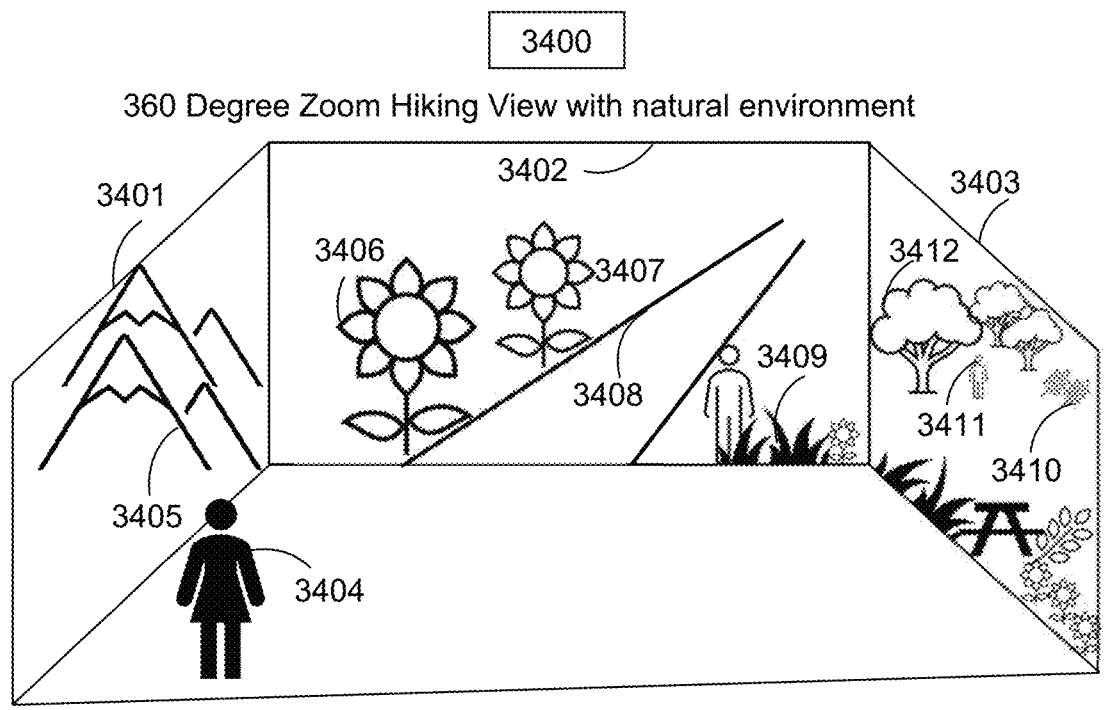
FIGS. 34A and 34B illustrate an exemplary single panel or multi-panel rendering display of virtual objects, real objects, gaming objects and background virtual objects during rendering of virtual travel for the multi-dimension map database and data exchange linked with associated price-time priority queues in accordance with some embodiments highlighting hiking in a natural environment and using the zoom and micro-zoom and nano-zoom features of the multi-dimension map database and data exchange.
Figure 34B:
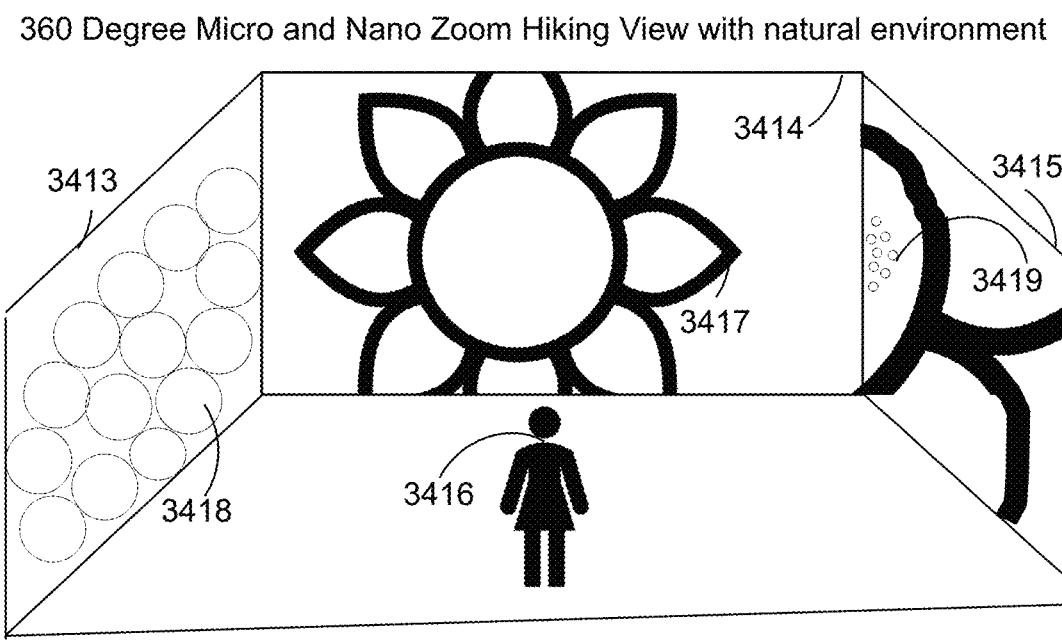

FIGS. 34A and 34B illustrate an exemplary plurality of views from the multi-dimension map tile data exchange linked database 160. FIG. 34A illustrates an exemplary three hundred and sixty degree view of hiking with a natural environment while FIG. 34B illustrates the same view with micro and nano zoom or progress into the multi-dimension map tile data exchange linked database 160 as rendered with the virtual environment 164. In some embodiments, such as displayed in FIG. 34A, exemplary panels 3401 may display mountains 3405 and additional panels 3402, 3403 may display additional network 150 members 3404 and 3411 in a user 3404 configured virtual environment 164. In some embodiments, the virtual environment 164 may contain flowers 3406 and paths 3408 and roadways as well as incremental tree scenery 3412. In some embodiments, an accelerometer 1100 associated with the user 3408 may gauge steps into the virtual environment or movements in hand gestures from the user 3404 may gauge movement or steps or progress into the virtual environment. In some embodiments, incremental flowers 3410 may scale from image 3406 which is more distant to image 3417 which is more near or image 3419 which is in micro scale level or image 3418 which is nano zoom level for the same flower 3406 with different scale vectors and matrices 4808 as the virtual user subject 3416 approaches the virtual object 3406 in multi-dimension map tile data exchange linked database 160. In some embodiments, incremental network 150 users 3411 may appear in the virtual environment 164 of the multi-dimension map tile data exchange linked database 160. In some embodiments, the user 3416 may have bionic eyes to move into matter such as a flower 3406 at scale levels not seen before due to the organization of the multi-dimension map tile data exchange linked database 160 and machine learning missing tile proxy clustering CPU instructions 162 and proxy dimension database server 161.

Figure 35A:
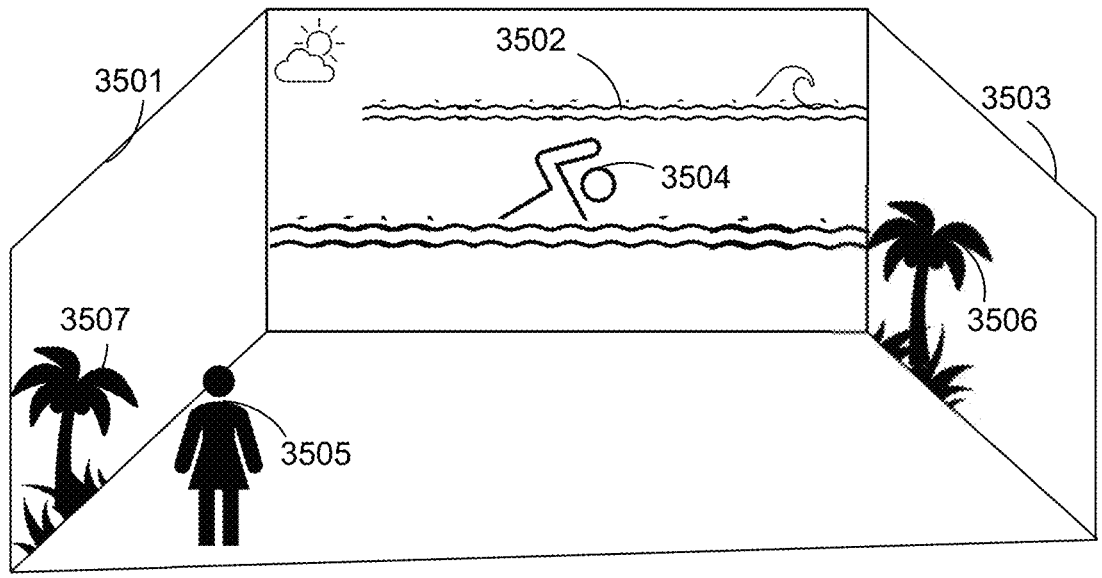
FIGS. 35A and 35B illustrate an exemplary single panel or multi-panel rendering display of virtual objects, real objects, gaming objects and background virtual objects during rendering of virtual travel for the multi-dimension map database and data exchange linked with associated price-time priority queues in accordance with some embodiments highlighting lake or ocean or water views and underwater view features of the multi-dimension map database and data exchange.
Figure 35B:
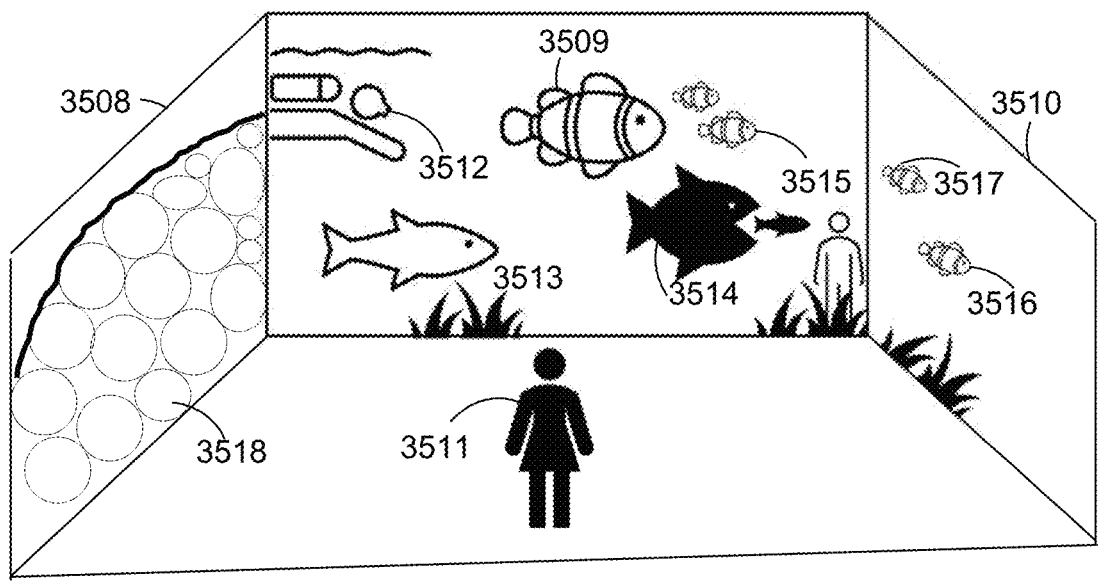

FIGS. 35A and 35B illustrate an exemplary plurality of views from the multi-dimension map tile data exchange linked database 160. FIG. 35A illustrates an exemplary three hundred and sixty degree view of a lake and ocean view with a natural environment while FIG. 35B illustrates the same view with micro and nano zoom or progress into the water or underwater view from the multi-dimension map tile data exchange linked database 160 as rendered with the virtual environment 164. In some embodiments, such as displayed in FIG. 35A, exemplary panels 3501 may display palm trees 3506, 3507 and additional panels 3503 may display additional network 150 members 3504 in a user 3505 configured virtual environment 164. In some embodiments, the virtual environment 164 may water views 3506 and network swimmers 3504 and roadways as well as incremental palm tree scenery 3506. In some embodiments, an accelerometer 1100 associated with the user 3505 may gauge steps or moving underwater into the virtual environment or movements in hand gestures from the user 3505 may gauge movement or steps or progress into the virtual environment. In some embodiments, incremental underwater virtual objects 3517 may scale from image 3516 which is more distant to image 3509 which is more near or image 3518 which is in micro scale level or image 3418 which is nano zoom level for the same fish 3516 with different scale vectors and matrices 4808 as the virtual user subject 3511 approaches the virtual object 3516 in multi-dimension map tile data exchange linked database 160. In some embodiments, incremental network 150 users 3511 may appear in the virtual environment 164 of the multi-dimension map tile data exchange linked database 160. In some embodiments, the user 3511 may have bionic eyes to move into matter such as a fish scale 3518 at scale levels not seen before due to the organization of the multi-dimension map tile data exchange linked database 160 and machine learning missing tile proxy clustering CPU instructions 162 and proxy dimension database server 161. In other embodiments, a user 3505 may request a live stream of a coordinate spot on the map from the multi-dimension map tile data exchange linked database 160, 4800, and the user 3505 is a buyer on the data exchange and the user who provides the data to the multi-dimension map tile data exchange linked database 160 is the seller of the view provided by the rendering engine 163.

Figure 36A:
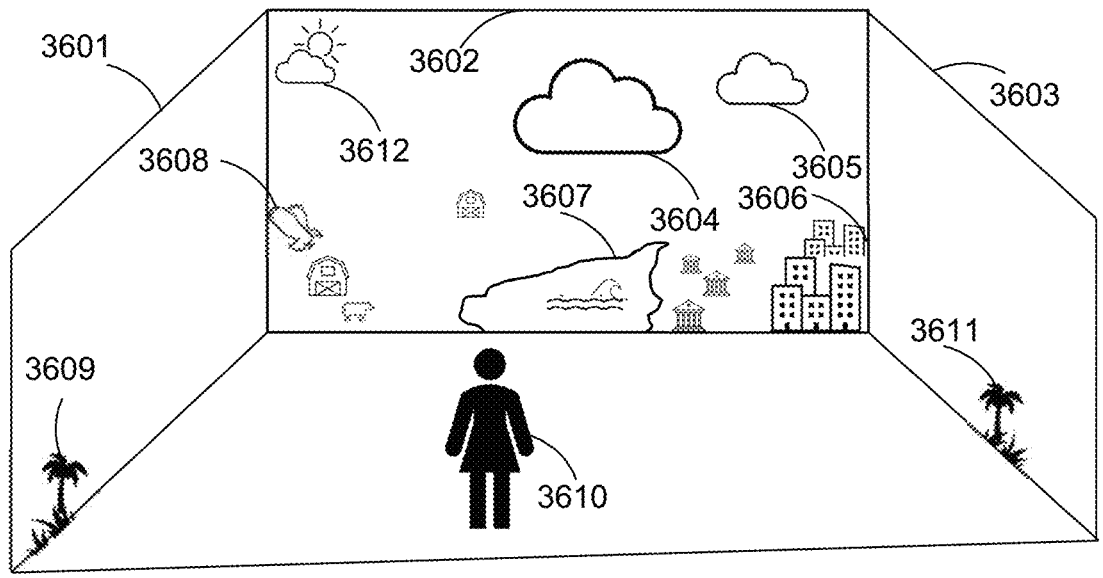
FIGS. 36A and 36B illustrate an exemplary single panel or multi-panel rendering display of virtual objects, real objects, gaming objects and background virtual objects during rendering of virtual travel for the multi-dimension map database and data exchange linked with associated price-time priority queues in accordance with some embodiments highlighting flying drone or eagle view at a plurality of altitudes to illustrate features of the multi-dimension map database and data exchange.
Figure 36B:
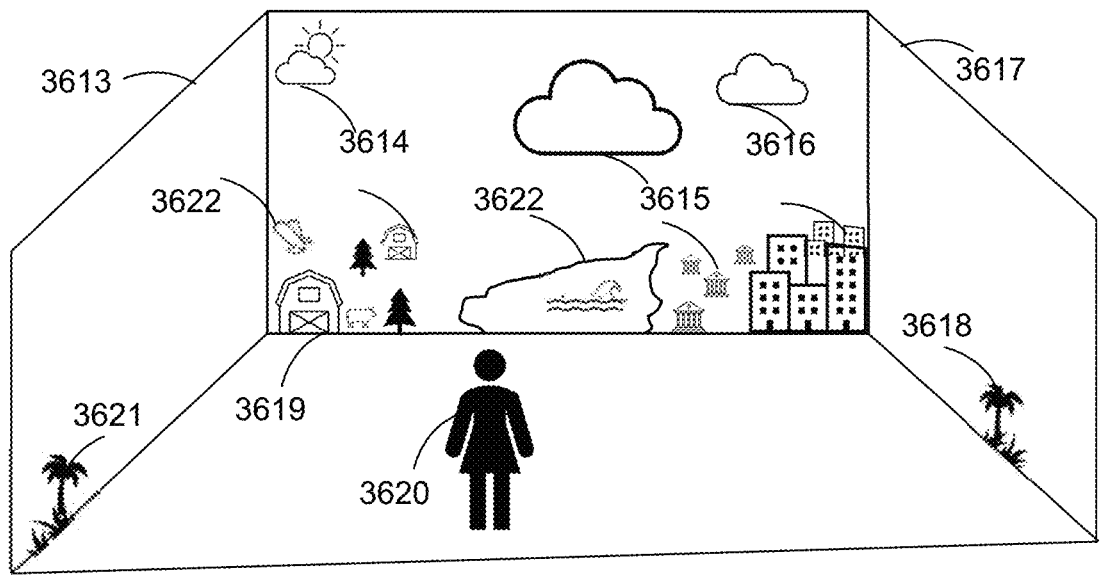

FIGS. 36A and 36B illustrate an exemplary plurality of views from the multi-dimension map tile data exchange linked database 160. FIG. 36A illustrates an exemplary three hundred and sixty degree view of an eagle altitude view with a natural environment while FIG. 36B illustrates the same view with altitude variants or progress over positional coordinates from the multi-dimension map tile data exchange linked database 160 as rendered with the virtual environment 164. In some embodiments, such as displayed in FIG. 36A, exemplary panels 3601 may display palm trees 3609, 3611 and additional panels 3602 may display additional network 150 members 3620 in a user 3610 configured virtual environment 164. In some embodiments, the virtual environment 164 may display water views 3607 and birds 3608 and weather vectors 3612 as well as incremental palm tree scenery 3611. In some embodiments, an accelerometer 1100 associated with the user 3610 may gauge steps or moving over air into the virtual environment or movements in hand gestures from the user 3610 may gauge movement or steps or air altitude, longitude, latitude progress into the virtual environment. In some embodiments, incremental building virtual objects 3606 may scale from image 3605 which is more distant to image 3615 which is more near or image 3622 which is in micro scale level or image 3621 which is nano zoom level for the same tree 3611 with different scale vectors and matrices 4808 as the virtual user subject 3610 approaches the virtual object 3622 in multi-dimension map tile data exchange linked database 160. In some embodiments, incremental network 150 users 3610 may appear in the virtual environment 164 of the multi-dimension map tile data exchange linked database 160. In some embodiments, the user 3610 may have bionic eyes to move into matter such as a eagle scale 3607 at scale levels not seen before such as fish beneath the water due to the organization of the multi-dimension map tile data exchange linked database 160 and machine learning missing tile proxy clustering CPU instructions 162 and proxy dimension database server 161. In other embodiments, a user 3610 may request a live stream of a coordinate spot on the map from the multi-dimension map tile data exchange linked database 160, 4800, and the user 3620 is a buyer on the data exchange and the user who provides the data to the multi-dimension map tile data exchange linked database 160 is the seller of the view provided by the rendering engine 163.

Figure 37A:
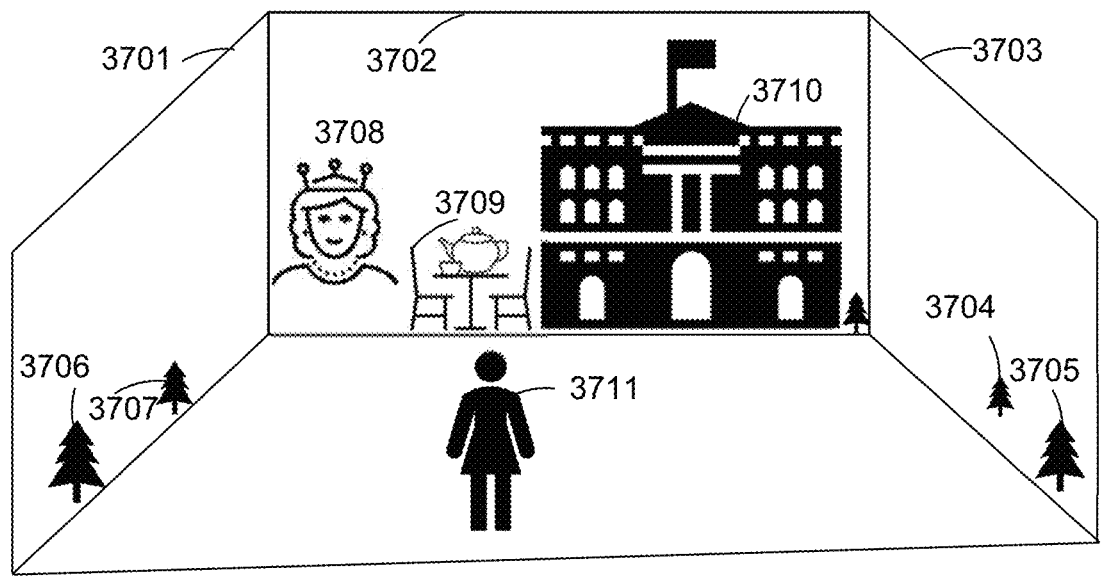
FIGS. 37A and 37B illustrate an exemplary single panel or multi-panel rendering display of virtual objects, real objects, gaming objects and background virtual objects during rendering of virtual travel for the multi-dimension map database and data exchange linked with associated price-time priority queues in accordance with some embodiments highlighting private and public virtual object views of high tea with the queen to illustrate features of the multi-dimension map database and data exchange.
Figure 37B:
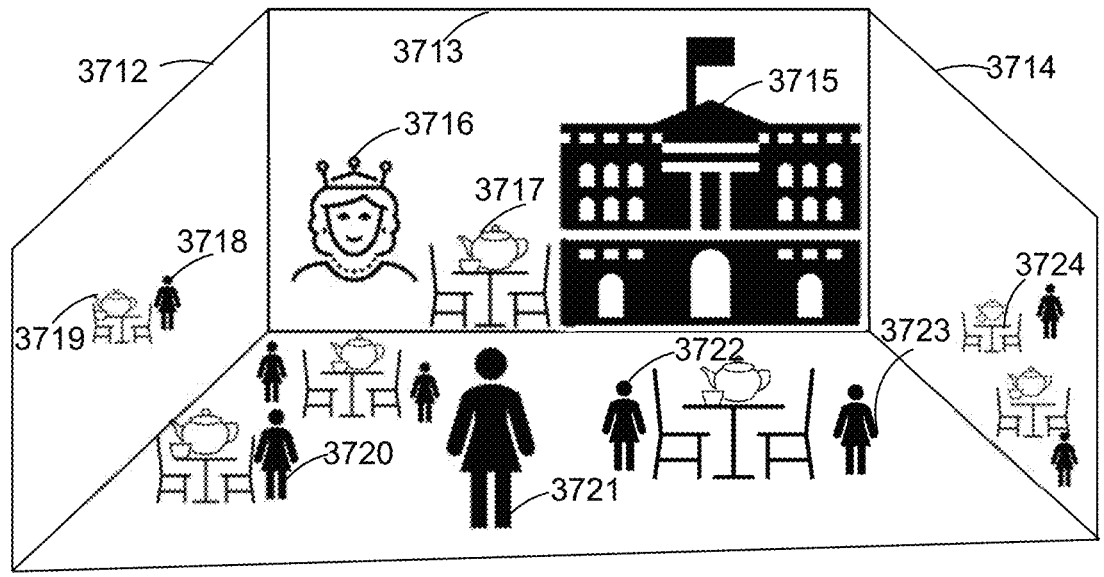

FIGS. 37A and 37B illustrate an exemplary plurality of views from the multi-dimension map tile data exchange linked database 160. FIG. 37A illustrates an exemplary three hundred and sixty degree private view of high tea with the Queen of England view with a natural environment while FIG. 37B illustrates the same view with public accessibility from network members 150 from the multi-dimension map tile data exchange linked database 160 as rendered with the virtual environment 164. In some embodiments, such as displayed in FIG. 37A, exemplary panels 3701 may display pine trees 3706, 3707 and additional panels 3702 may display additional network 150 members 3711 or the Queen of England 3708 in a live or archived buffer video in a user 3711 configured virtual environment 164. In some embodiments, the virtual environment 164 may display Buckingham Palace views 3710 and trees 3704 and weather vectors as well as incremental tree scenery 3705, 3706, 3707. In some embodiments, an accelerometer 1100 associated with the user 3711 may gauge steps or movement into the virtual environment or movements in hand gestures from the user 3711 may gauge movement or steps or air altitude, longitude, latitude progress into the virtual environment. In some embodiments, incremental building virtual objects 3715 may scale from image 3710 which is more distant to image 3715 which is more near with different scale vectors and matrices 4808 as the virtual user subject 3711 approaches the virtual object 3717 in multi-dimension map tile data exchange linked database 160. In some embodiments, incremental network 150 users 3722, 3723, 3718 may appear in the virtual environment 164 as the public view FIG. 37B allows for many network 150 members to obtain virtual presence in the virtual environment 164 and even interaction between members, whereas the private view FIG. 37A allows for exclusive meetings which may be served simultaneously by the network servers 160 without the other network members seeing each other. of the multi-dimension map tile data exchange linked database 160. In some embodiments, the user 3721 may have the ability to move between tables 3724, 3719, 3717 due to the organization of the multi-dimension map tile data exchange linked database 160 and machine learning missing tile proxy clustering CPU instructions 162 and proxy dimension database server 161. In other embodiments, a user 3721 may request a live stream of a coordinate spot on the map from the multi-dimension map tile data exchange linked database 160, 4800, and the user 3721 is a buyer on the data exchange and the user who provides the data to the multi-dimension map tile data exchange linked database 160 is the seller of the data view provided by the rendering engine 163.

Figure 38A:
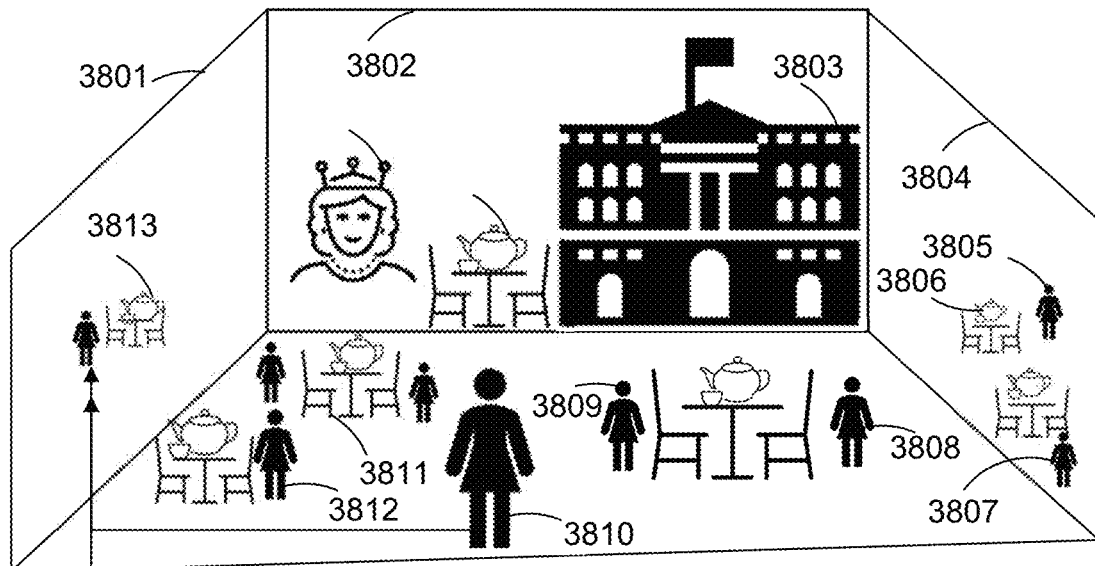
FIGS. 38A and 38B illustrate an exemplary single panel or multi-panel rendering display of virtual objects, real objects, gaming objects and background virtual objects during rendering of virtual travel for the multi-dimension map database and data exchange linked with associated price-time priority queues in accordance with some embodiments highlighting public virtual object views and virtual messaging within of the high tea with the queen virtual experience and trip with a plurality of social network users to illustrate features of the multi-dimension map database and data exchange.
Figure 38B:
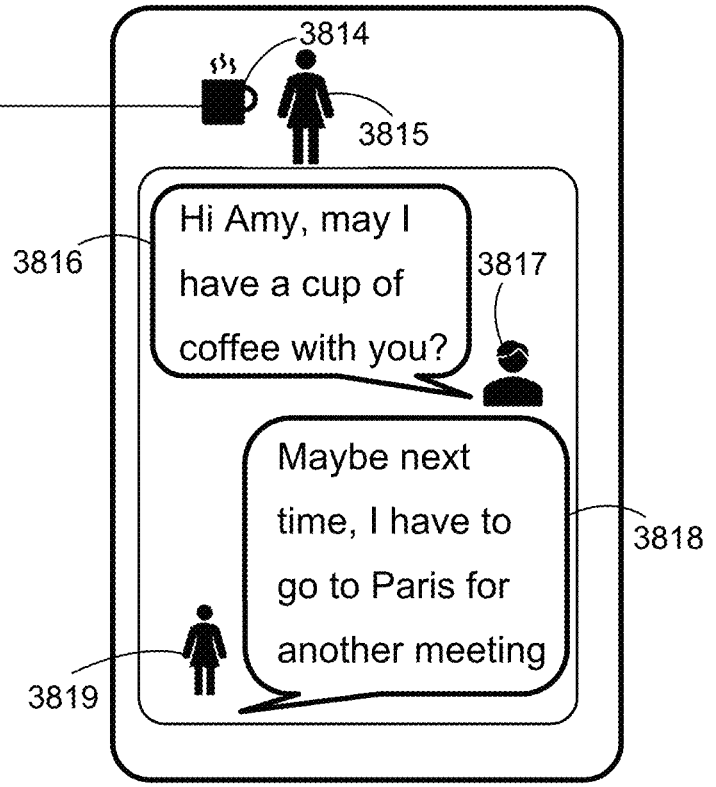

FIGS. 38A and 38B illustrate an exemplary plurality of views from the multi-dimension map tile data exchange linked database 160. FIG. 38A illustrates an exemplary three hundred and sixty degree public view of high tea with the Queen of England view with a natural environment while FIG. 38B illustrates the conversation view in the virtual environment 164 with public accessibility from network members 150 from the multi-dimension map tile data exchange linked database 160 as rendered with the virtual environment 164. In some embodiments, such as displayed in FIG. 38A, exemplary panels 3801 may display tea settings 3813, 3806 and additional panels 3804 may display additional network 150 members 3809 or the Queen of England 3708 in a live or archived buffer video in a user 3810 configured virtual environment 164. In some embodiments, the virtual environment 164 may display Buckingham Palace views 3803 and high tea 3806 and weather vectors as well as incremental scenery 3811, 3813, 3807. In some embodiments, an accelerometer 1100 associated with the user 3810 may gauge steps or movement into the virtual environment or movements in hand gestures from the user 3810 may gauge movement or steps or air altitude, longitude, latitude progress into the virtual environment. In some embodiments, incremental building virtual objects 3816 may scale from image 3816 which is more distant to image 3811 which is more near with different scale vectors and matrices 4808 as the virtual user subject 3811 approaches the virtual object 3813 in multi-dimension map tile data exchange linked database 160. In some embodiments, incremental network 150 users 3812, 3808, 3805 may appear in the virtual environment 164 as the public view FIG. 38A allows for many network 150 members to obtain virtual presence in the virtual environment 164 and even interaction between members, whereas the conversation view FIG. 38B allows for exclusive or group conversation which may be served simultaneously by the network servers 160 without the other network members seeing each other from the multi-dimension map tile data exchange linked database 160. In some embodiments, the user 3815 may have the ability to converse with another network member 3817 who they know or a member who they do not know 3819 due to the organization of the multi-dimension map tile data exchange linked database 160 and machine learning missing tile proxy clustering CPU instructions 162 and proxy dimension database server 161. In other embodiments, a user 3810 may request a live stream of a coordinate spot on the map from the multi-dimension map tile data exchange linked database 160, 4800, and the user 3815 is a buyer on the data exchange and the user who provides the data to the multi-dimension map tile data exchange linked database 160 is the seller of the data view provided by the rendering engine 163. In some embodiments, a user Amy 3817 may be requested to have a virtual cup of coffee and conversation by a participating network 150 user 3810 and Amy may choose to respond or not respond 3818.

Figure 39:
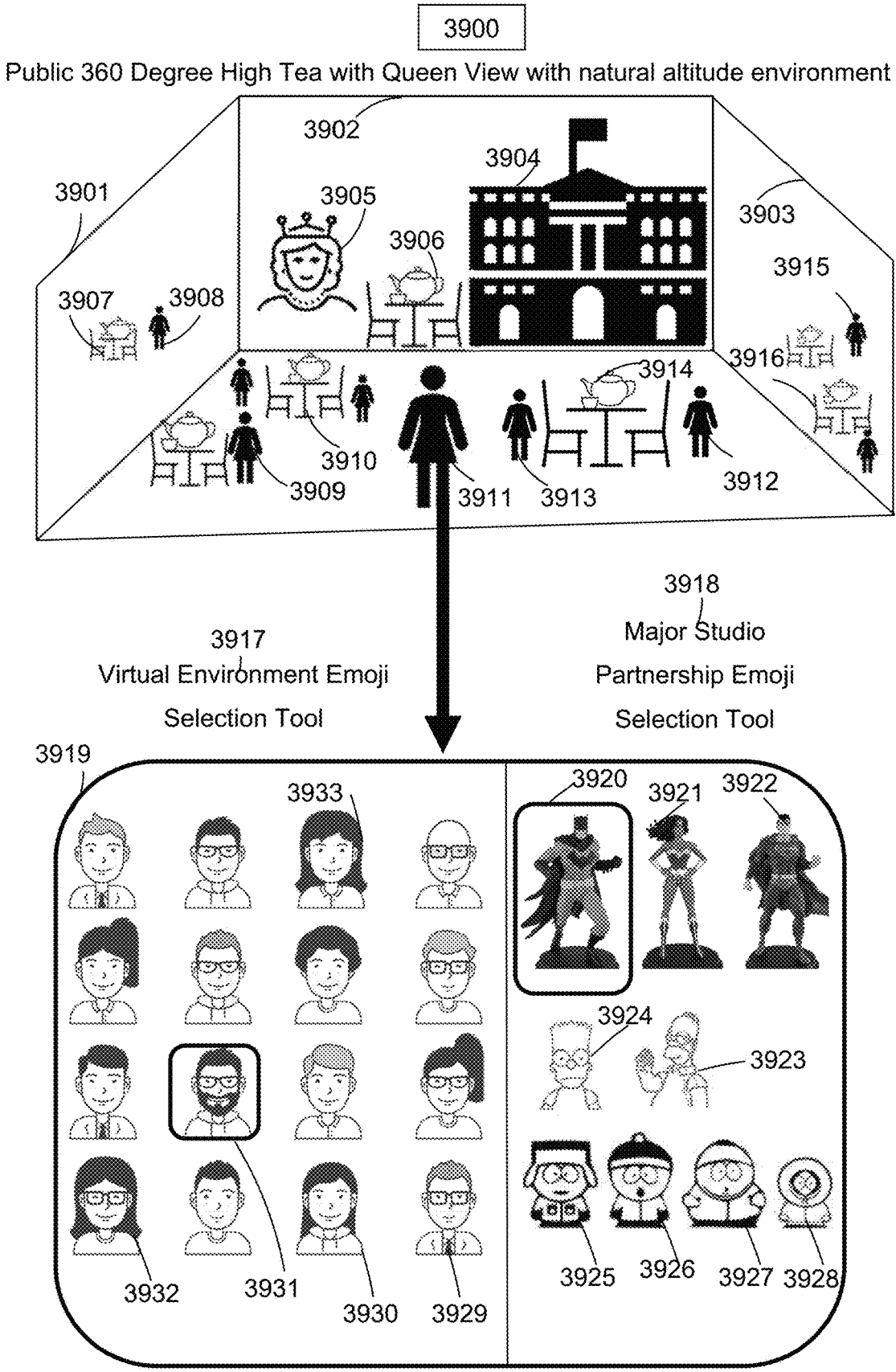
FIG. 39 illustrates an exemplary single panel or multi-panel rendering display of virtual objects, real objects, gaming objects and background virtual objects during rendering of virtual travel for the multi-dimension map database and data exchange linked with associated price-time priority queues in accordance with some embodiments highlighting virtual emoji and virtual character selection within the high tea with the queen virtual experience and trip with a plurality of social network users to illustrate features of the multi-dimension map database and data exchange.

FIG. 39 illustrates an exemplary view from the multi-dimension map tile data exchange linked database 160. FIG. 39 illustrates an exemplary three hundred and sixty degree public view of high tea with the Queen of England view with a natural environment while 3919 illustrates the emoji or virtual character option 3917 view while the user 3911 may also select from the major studio emoji partnership view 3918 in the virtual environment 164 with public accessibility from network members 150 from the multi-dimension map tile data exchange linked database 160 as rendered with the virtual environment 164. In some embodiments, such as displayed in 3900, exemplary panels 3901 may display tea settings 3907, 3916 and additional panels 3902 may display additional network 150 members 3915 or the Queen of England 3905 in a live or archived buffer video in a user 3911 configured virtual environment 164. In some embodiments, the virtual environment 164 may display Buckingham Palace views 3904 and high tea 3914 and weather vectors as well as incremental scenery 3910, 3907, 3916. In some embodiments, an accelerometer 1100 associated with the user 3911 may gauge steps or movement into the virtual environment or movements in hand gestures from the user 3911 may gauge movement or steps or air altitude, longitude, latitude progress into the virtual environment. In some embodiments, incremental building virtual objects 3904 may scale from image 3906 which is more distant to image 3914 which is more near with different scale vectors and matrices 4808 as the virtual user subject 3911 approaches the virtual object 3914 in multi-dimension map tile data exchange linked database 160. In some embodiments, incremental network 150 users 3912, 3908, 3915 may appear in the virtual environment 164 as the public view 3900 allows for many network 150 members to obtain virtual presence in the virtual environment 164 and even interaction between members, whereas the emoji selection view allows for exclusive or group conversation which may be served simultaneously by the network servers 160 without the other network members seeing each other from the multi-dimension map tile data exchange linked database 160. In some embodiments, the user 3911 may have the ability to converse with another network member 3913 who they know or a member who they do not know 3908 due to the organization of the multi-dimension map tile data exchange linked database 160 and machine learning missing tile proxy clustering CPU instructions 162 and proxy dimension database server 161. In other embodiments, a user 3911 may request a live stream of a coordinate spot on the map from the multi-dimension map tile data exchange linked database 160, 4800, and the user 3909 is a buyer on the data exchange and the user who provides the data to the multi-dimension map tile data exchange linked database 160 is the seller of the data view provided by the rendering engine 163. In some embodiments, a user 3911 may select a Batman emoji 3920 or a wonder woman emoji 3921 or a super man emoji 3922 or a Bart Simpson emoji 3924 or a Homer Simpson emoji 3923 or a standard doctor emoji 3929 or a woman emoji 3930 or a beard emoji 3931 or a woman with glasses emoji 3932 or wide variety of emojis 3933 to suit the virtual multi-dimension map tile data exchange linked database 160 and rendered view 164.

Figure 40A:
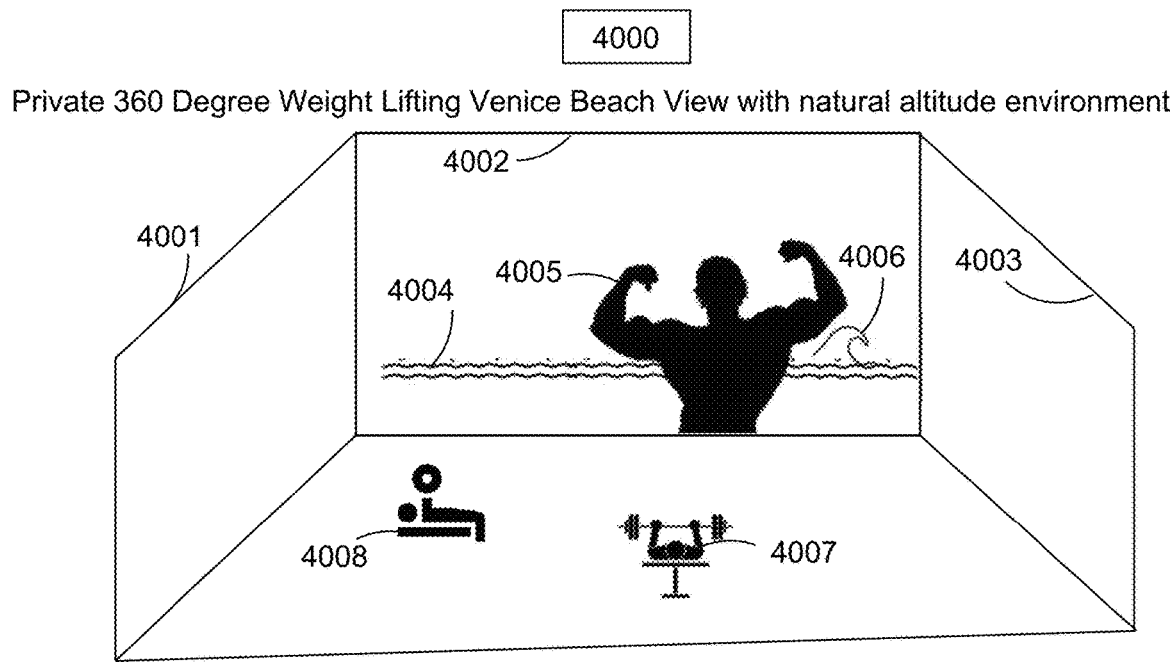
FIGS. 40A and 40B illustrate an exemplary single panel or multi-panel rendering display of virtual objects, real objects, gaming objects and background virtual objects during rendering of virtual travel for the multi-dimension map database and data exchange linked with associated price-time priority queues in accordance with some embodiments highlighting private and public virtual domains within the Venice beach lifting with Arnold Schwarzenegger or Dwayne the Rock Johnson or other lifter virtual experience and trip with a plurality of social network users to illustrate features of the multi-dimension map database and data exchange.
Figure 40B:
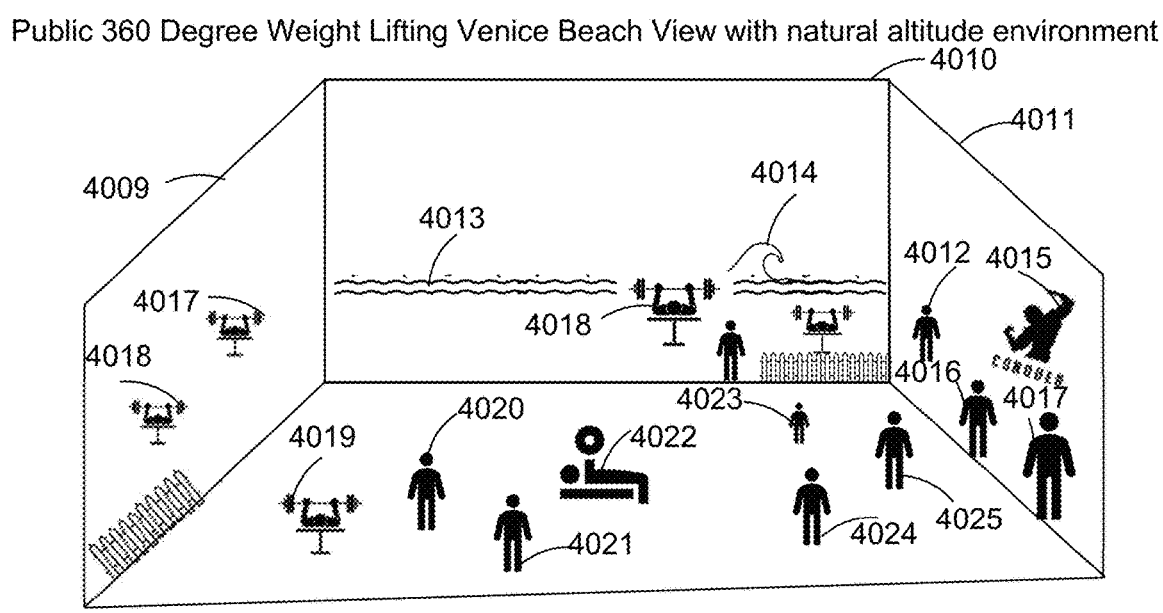

FIGS. 40A and 40B illustrate an exemplary plurality of views from the multi-dimension map tile data exchange linked database 160. FIG. 40A illustrates an exemplary three hundred and sixty degree private view of lifting on Venice Beach, California view with a natural environment while FIG. 40B illustrates the same view with public accessibility from network members 150 from the multi-dimension map tile data exchange linked database 160 as rendered with the virtual environment 164. In some embodiments, such as displayed in FIG. 40A, exemplary panels 4001 may display ocean view 4004, 4006 and additional panels 4002 may display additional network 150 members 4023 or Arnold Schwarzenegger 4005 in a live or archived buffer video in a user 5008 configured virtual environment 164. In some embodiments, the virtual environment 164 may display Venice Beach views 4010 and lifting pits 4018 and weather vectors as well as incremental lifting scenery 4015, 4019, 4022. In some embodiments, an accelerometer 1100 associated with the user 4021 may gauge steps or movement into the virtual environment or movements in hand gestures from the user 4021 may gauge movement or steps or air altitude, longitude, latitude progress into the virtual environment. In some embodiments, incremental building virtual objects 4018 may scale from image 4018 which is more distant to image 4019 which is more near with different scale vectors and matrices 4808 as the virtual user subject 4021 approaches the virtual object 4022 in multi-dimension map tile data exchange linked database 160. In some embodiments, incremental network 150 users 4020, 4012, 4017, 4018, 4022 may appear in the virtual environment 164 as the public view FIG. 40B allows for many network 150 members to obtain virtual presence in the virtual environment 164 and even interaction between members, whereas the private view FIG. 40A allows for exclusive meetings which may be served simultaneously by the network servers 160 without the other network members seeing each other of the multi-dimension map tile data exchange linked database 160. In some embodiments, the user 4021 may have the ability to move between lifting stations 4019, 4022, 4018 due to the organization of the multi-dimension map tile data exchange linked database 160 and machine learning missing tile proxy clustering CPU instructions 162 and proxy dimension database server 161. In other embodiments, a user 4021 may request a live stream of a coordinate spot on the map from the multi-dimension map tile data exchange linked database 160, 4800, and the user 4021 is a buyer on the data exchange and the user who provides the data to the multi-dimension map tile data exchange linked database 160 is the seller of the data view provided by the rendering engine 163.

Figure 41:
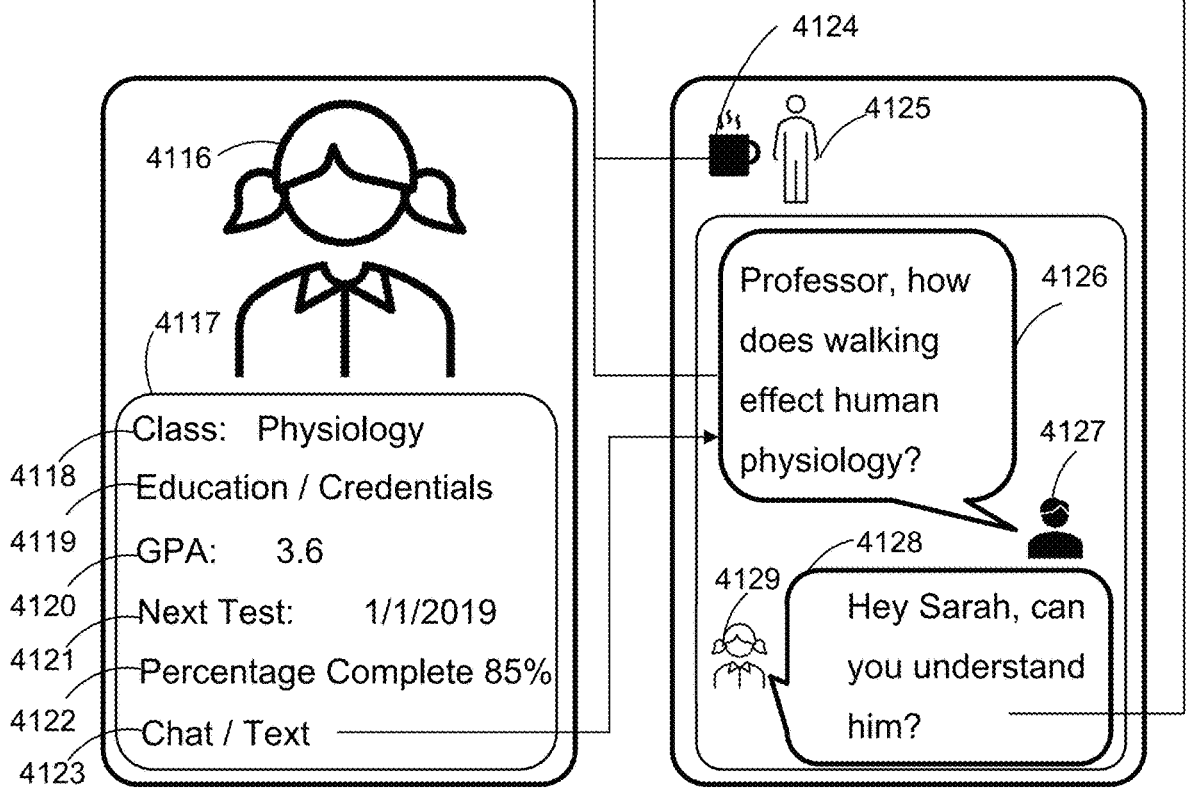
FIG. 41 illustrates an exemplary single panel or multi-panel rendering display of virtual objects, real objects, gaming objects and background virtual objects during rendering of virtual travel for the multi-dimension map database and data exchange linked with associated price-time priority queues in accordance with some embodiments highlighting public virtual domain within the walking in the woods with a Nobel laureate learning virtual experience and trip with a plurality of social network users to illustrate features of the multi-dimension map database and data exchange.

FIG. 41 illustrates an exemplary view from the multi-dimension map tile data exchange linked database 160. 4100 illustrates an exemplary three hundred and sixty degree public view of a walk with Nobel Laureate Lecture with Cornell University Harold Varmus in Physiology while walking in the woods view with a natural environment while 4116 illustrates a student or virtual character option 3917 view while the user 4125 may also select to speak with the professor while walking 4126 and other students may also join the conversation 4128 in the virtual environment 164 with public accessibility from network members 150 from the multi-dimension map tile data exchange linked database 160 as rendered with the virtual environment 164. In some embodiments, such as displayed in 4100, exemplary panels 4101 may display background hiking or walking environments 4109, 4106 and additional panels 4102 may display additional network 150 members 4110 or Harold Varmus 4108 in a live or archived buffer video in a user 4115 configured virtual environment 164. In some embodiments, the virtual environment 164 may display walking trail views 4102 and mountains 4101 and weather vectors as well as incremental scenery 4104, 4105. In some embodiments, an accelerometer 1100 associated with the user 4115 may gauge steps or movement into the virtual environment or movements in hand gestures from the user 4115 may gauge movement or steps or air altitude, longitude, latitude progress into the virtual environment. In some embodiments, incremental natural virtual objects 4104 may scale from image 4106 which is more distant to image 4109 which is more near with different scale vectors and matrices 4808 as the virtual user subject 4115 approaches the virtual object 4104 in multi-dimension map tile data exchange linked database 160. In some embodiments, incremental network 150 users 4113, 4111, 4107 may appear in the virtual environment 164 as the public view 4100 allows for many network 150 members to obtain virtual presence in the virtual environment 164 and even interaction between members, whereas the emoji selection view allows for exclusive or group conversation which may be served simultaneously by the network servers 160 without the other network members seeing each other from the multi-dimension map tile data exchange linked database 160. In some embodiments, the user 4115 may have the ability to converse with another network member 4125 who they know or a member who they do not know 4129 due to the organization of the multi-dimension map tile data exchange linked database 160 and machine learning missing tile proxy clustering CPU instructions 162 and proxy dimension database server 161. In other embodiments, a user 4115 may request a live stream of a coordinate spot on the map from the multi-dimension map tile data exchange linked database 160, 4800, and the user 4115 is a buyer on the data exchange and the user who provides the data to the multi-dimension map tile data exchange linked database 160 is the seller of the data view provided by the rendering engine 163. In some embodiments, a user 4125 may review the education student credentials 4118, 4116 with the class selection 4118, GPA 4120, next test date 4121, percentage complete of the semester or term 4122 as well as the ability to chat with the instructor 4123 in the multi-dimension map tile data exchange linked database 160 and rendered view 164.

Figure 42:
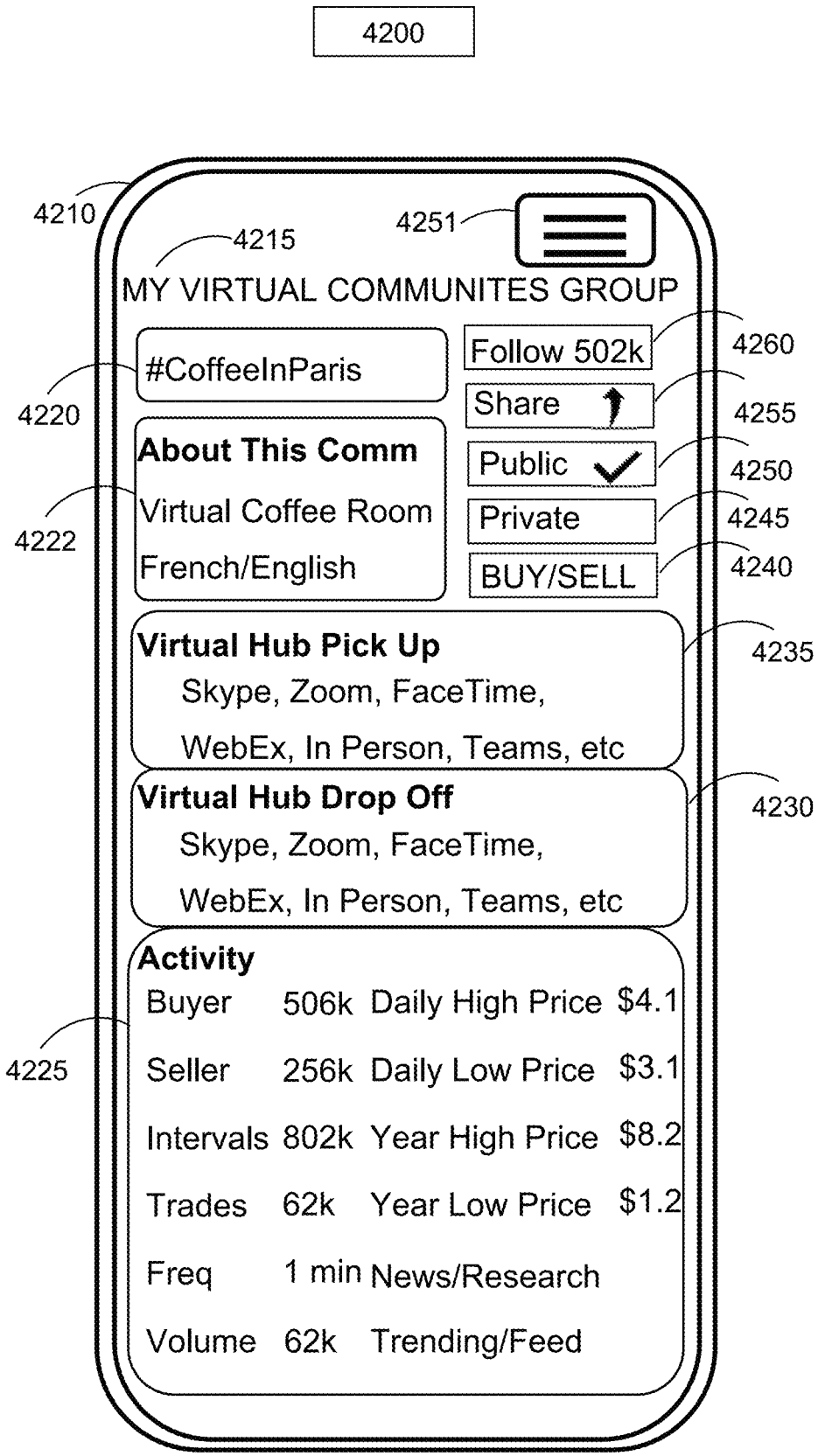
FIG. 42 illustrates an exemplary social network object of virtual objects, real objects, gaming objects and background virtual objects during rendering of virtual travel for the multi-dimension map database and data exchange linked with associated price-time priority queues in accordance with some embodiments highlighting coffee in Paris social network object community virtual experience and trip with a plurality of social network users to illustrate features of the multi-dimension map database and data exchange.

FIG. 42 illustrates an exemplary user interface 4200 for the My Virtual Communities Group 4215 for a specific transformed data structure of a transformed multi-dimension map tile data exchange linked community virtual hub sequence 4220. In some embodiments, the meta data virtual hub sequence #CoffeeInParis 4220 may list the long form route details in the About the Community 4222 community linked route section 4222. In some embodiments, the specific virtual hub sequence #CoffeeInParis 4220 may list the amount of followers and an option to follow 4260. In some embodiments, the specific hub sequence #CoffeeInParis 4220 may list the ability to share the multi-dimension map tile data exchange linked community group with another social network or text or email or other network protocol. In some embodiments, the specific hub sequence #CoffeeInParis 4220 may list group as public 4250 or private 4245. In some embodiments, the specific hub sequence #CoffeeInParis 4520 may list the gateway to buy or sell 4240 transformed transmission units using the LOB 5200, 5300, 5400, 5500 for a virtual community 4215. In some embodiments, the specific hub sequence #CoffeeInParis 4220 may list specific pick up hub address location 4235 or drop off point address 4230 which may be a physical address match or virtual delivery match with video conferencing methods. In some embodiments, the specific hub sequence #CoffeeInParis 4520 may list the activity statistics and data with respect to the number of buyers 4225, number of sellers 4225, number of intervals 4225, number of trades 4225, frequency of virtual units 4225, volume of virtual community linked transmission units 4225, daily high price for transmission units 4225, daily low price for virtual community linked transmission units on the community object of #CoffeeInParis 4220, yearly high price 4225, yearly low price 4225, news, research, trending, feeds for the #CoffeeInParis 4220 virtual hub sequence.

Figure 43:
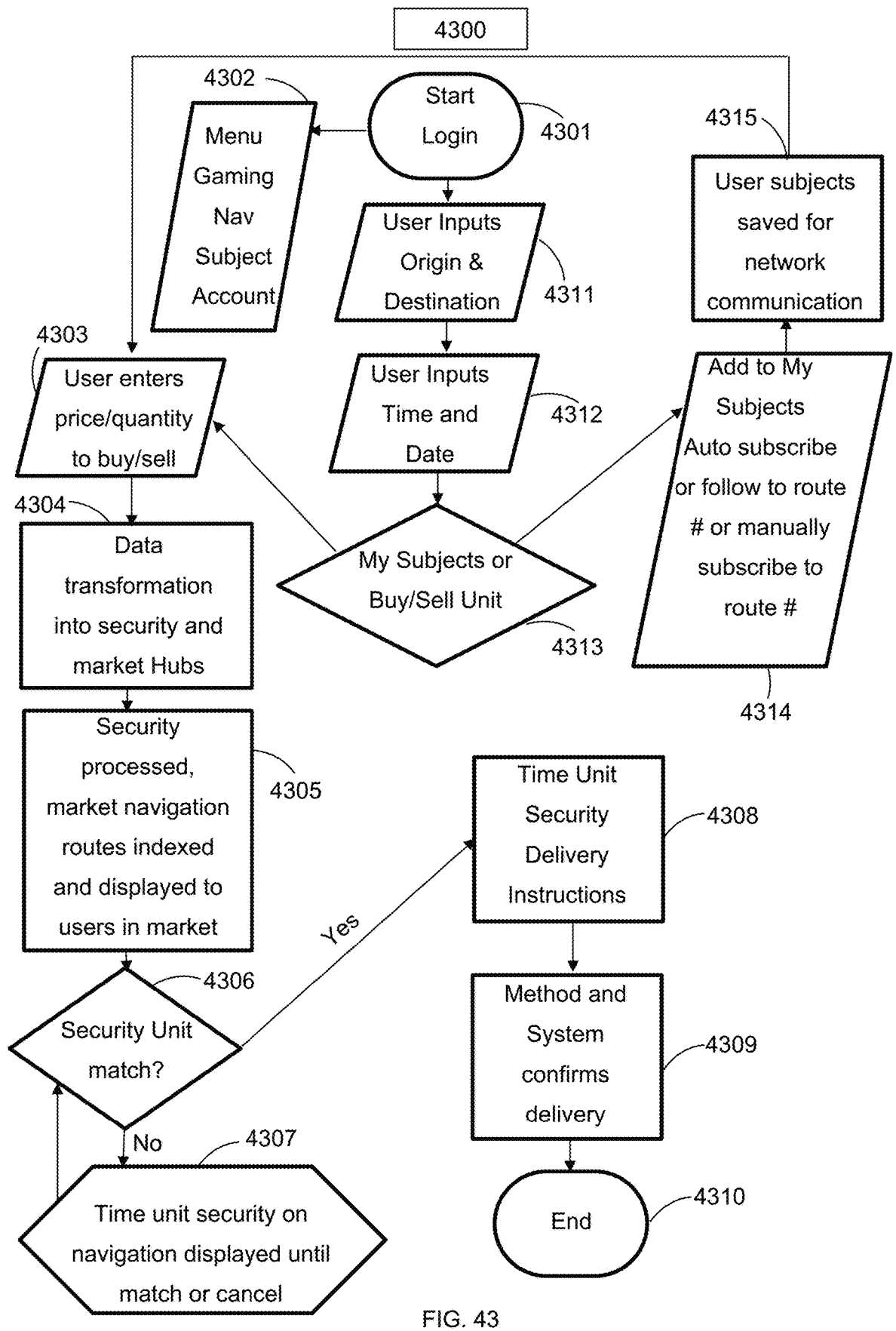
FIG. 43 illustrates an exemplary network object step diagram of virtual objects, real objects, gaming objects and background virtual objects during rendering of virtual travel for the multi-dimension map database and data exchange linked with associated price-time priority queues in accordance with some embodiments with a plurality of social network users to illustrate features of the multi-dimension map database and data exchange.

FIG. 43 illustrates an exemplary flow chart 4300 of user 110 experience during a transformed virtual transmission unit or security life cycle. In some embodiments the user 110 may login 4301 to the system which requires the user to go to a plurality of menu options 4302 or user input for origin and destination of the multi-dimension map tile data exchange linked community group 4311 alongside user inputs of time and date 4312 for a given specification that may contain a subset or superset of attributes such as virtual environment 164, virtual multi-dimension map tile data exchange linked coordinates 4800, multi-dimension map tile data exchange linked community end point 4230 and start point 4235, or a plurality of other specifications. In some embodiments, the user may save a route to the "My Subjects" 4313 in "Add My Subjects" 4314 whereby the user virtual route is saved in the system for one touch retrieval in the future. In some embodiments, the user may enter a price or quantity to buy or sell a transformed multi-dimension map tile data exchange linked community transmission unit or security of a given specification or specification combination 4303 which has many steps involved with the transformation of the multi-dimension map tile data exchange linked community transmission unit or security. In some embodiments, additional data transformations occur to process 4305, market transmission navigation virtual route options and indexing 4305, virtual hub or virtual hub combination data transformations 4305, multi-dimension map tile data exchange linked community transmission unit transformations 4305 and many other subsets or supersets of transformed transmission unit combinations and combination specifications 4305. In some embodiments, if a transformed multi-dimension map tile data exchange linked community transmission unit or security matches 4306 in price and specification, then the transformed multi-dimension map tile data exchange linked community transmission unit or security moves into delivery 4308 and the deliver process has many steps of virtual signal handoff 4308, 4309 and security checks 4308, 4309, 911 system checks 4308, 4309, GPS server and user 110 position checks 4308, 4309 as well as transmission unit rating checks 4308, 4309 and many other possible checks for all the data elements of the transformed multi-dimension map tile data exchange linked community transmission unit or security for verification of delivery 4308, 4309. In some embodiments, if prices of the buyer and seller queue do not match 4307, then the steps of processing 4304, 4305, 4306 repeat until a match is made 4306 to 4308 or an order is cancelled before it expires for the transformed multi-dimension map tile data exchange linked community transmission unit or security.

Figure 44:
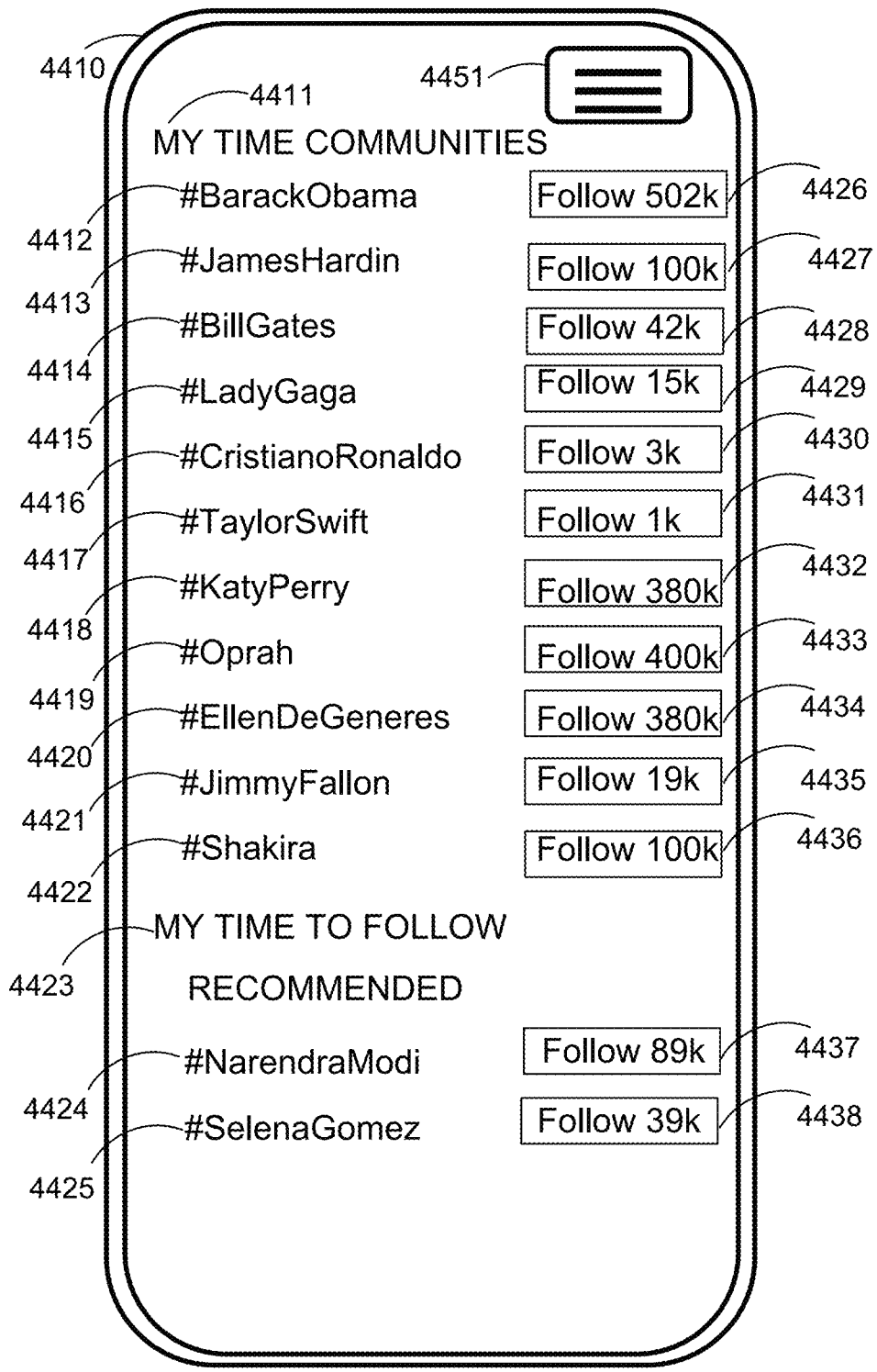
FIG. 44 illustrates an exemplary social network listing and search network object diagram of virtual objects, real objects, gaming objects and background virtual objects during rendering of virtual travel for the multi-dimension map database and data exchange linked with associated price-time priority queues in accordance with some embodiments with a plurality of social network users to illustrate features of the multi-dimension map database and data exchange.

FIG. 44 illustrates an exemplary user interface 4410 for the My Time Communities functions 4411. In some embodiments, the user interface 4410 may have a menu option 4451 to move to other areas of the method and system. In some embodiments, the virtual time community linked transmission hub sequence as an object may be meta data tag #BarackObama 4412 to represent virtual or physical time with Barack Obama. In some embodiments, #BarackObama 4412 may have an option for the user 110 to Follow or Join or subscribe, or add 4426 the virtual time community linked virtual transmission hub sequence #BarackObama 4412. In some embodiments, the number of followers or network members who are joined to that community object transformed data structure 4412 are 502k 4426. In some embodiments, the virtual transmission hub sequence as an object may be meta data tag #JamesHardin 4413 to represent virtual or physical time with James Hardin. In some embodiments, #JamesHardin 4413 may have an option for the user 110 to Follow or Join or subscribe, or add 4427 the virtual time community linked transmission hub sequence #JamesHardin 4413. In some embodiments, the number of followers or network members who are joined to that community object transformed data structure 4413 are 100k 4427. In some embodiments, the virtual time community linked transmission hub sequence as an object may be meta data tag #BillGates 4414 to represent virtual or physical time with Bill Gates. In some embodiments, #BillGates 4414 may have an option for the user 110 to Follow or Join or subscribe, or add 4428 the virtual renewable energy community linked transmission hub sequence #Bill Gates 4414. In some embodiments, the number of followers or network members who are joined to that community object transformed data structure 4414 are 42k 4428. In some embodiments, the virtual time and data community linked transmission hub sequence as an object may be meta data tag #LadyGaga 4415 to represent physical or virtual time with Lady Gaga. In some embodiments, #LadyGaga 4415 may have an option for the user 110 to Follow or Join or subscribe, or add 4429 the virtual time and data community linked transmission hub sequence #LadyGaga 4415. In some embodiments, the number of followers or network members who are joined to that community object transformed data structure 4415 are 15k 4429. In some embodiments, the virtual time and data community linked transmission hub sequence as an object may be meta data tag #ChristianoRonaldo 4416 to represent virtual or physical time with Christiano Ronaldo. In some embodiments, #ChristianoRonaldo 4416 may have an option for the user 110 to Follow or Join or subscribe, or add 4430 the virtual renewable energy community linked transmission hub sequence #ChristianoRonaldo 4416. In some embodiments, the number of followers or network members who are joined to that community object transformed data structure 4416 are 3k 4430. In some embodiments, the virtual renewable energy community linked transmission hub sequence as an object may be meta data tag #TaylorSwift 4417 to represent physical or virtual time with Taylor Swift. In some embodiments, #TaylorSwift 4417 may have an option for the user 110 to Follow or Join or subscribe, or add 4431 the virtual time and data community linked transmission hub sequence #TaylorSwift 4417. In some embodiments, the number of followers or network members who are joined to that community object transformed data structure 4417 are 1k 4431. In some embodiments, the virtual time and data community linked transmission hub sequence as an object may be meta data tag #KatyPerry 4418 to represent physical or virtual time with Katy Perry. In some embodiments, #KatyPerry 4418 may have an option for the user 110 to Follow or Join or subscribe, or add 4432 the virtual time and data community linked transmission hub sequence #KatyPerry 4418. In some embodiments, the number of followers or network members who are joined to that community object transformed data structure 4418 are 380k 4432. In some embodiments, the virtual time and data community linked transmission hub sequence as an object may be meta data tag #Oprah 4419 to represent physical or virtual time with Oprah. In some embodiments, #Oprah 4419 may have an option for the user 110 to Follow or Join or subscribe, or add 4433 the virtual time and data community linked transmission hub sequence #Oprah 4419. In some embodiments, the number of followers or network members who are joined to that community object transformed data structure 4419 are 400k 4433. In some embodiments, the virtual transmission hub sequence as an object may be meta data tag #EllenDeGeneres 4420 to represent physical or virtual time with Ellen DeGeneres. In some embodiments, #EllenDeGeneres 4420 may have an option for the user 110 to Follow or Join or subscribe, or add 4434 the virtual time and data community linked transmission hub sequence #EllenDeGeneres 4420. In some embodiments, the number of followers or network members who are joined to that community object transformed data structure 4420 are 280k 4434. In some embodiments, the virtual transmission hub sequence as an object may be meta data tag #JimmyFallon 4421 to represent physical or virtual time with Jimmy Fallon. In some embodiments, #JimmyFallon 4421 may have an option for the user 110 to Follow or Join or subscribe, or add 4435 the virtual time and data community linked transmission hub sequence #JimmyFallon 4421. In some embodiments, the number of followers or network members who are joined to that community object transformed data structure 4421 are 19k 4435. In some embodiments, the time an data community linked transmission hub sequence as an object may be meta data tag #Shakira 4422 to represent physical or virtual time with Shakira. In some embodiments, #Shakira 4422 may have an option for the user 110 to Follow or Join or subscribe, or add 4436 the virtual time and data community linked transmission hub sequence #Shakira 4422. In some embodiments, the number of followers or network members who are joined to that time and data community linked community object transformed data structure 4422 are 100k 4436. In some embodiments, the virtual time and data community linked transmission hub sequences may be recommended 4423 to follow as an object may be meta data tag #NarendraModi 4424 to represent physical or virtual time with Narendra Modi. In some embodiments, #NarendraModi 4424 may have an option for the user 110 to Follow or Join or subscribe, or add 4437 the virtual time and data community linked transmission hub sequence #NarendraModi 4424. In some embodiments, the number of followers or network members who are joined to that community object transformed data structure 4424 are 89k 4437. In some embodiments, the virtual renewable energy community linked transmission hub sequences may be recommended 4423 to follow as an object may be meta data tag #SalenaGomez 4425 to represent physical or virtual time with Salena Gomez. In some embodiments, #Salena-Gomez 4425 may have an option for the user 110 to Follow or Join or subscribe, or add 4438 the virtual time and data community linked transmission hub sequence #SalenaGomez 4425. In some embodiments, the number of followers or network members who are joined to that renewable energy community linked community object transformed data structure 4425 are 39k 4438. In some embodiments, buyers or sellers of the multi-dimension map tile data exchange linked database 160 may be notified with the notification system in the social network 150 that data opportunities to buy or sell may exist to promote filling holes in the multi-dimension map tile data exchange linked database 160 to promote actual data over proxy data.

Figure 45:
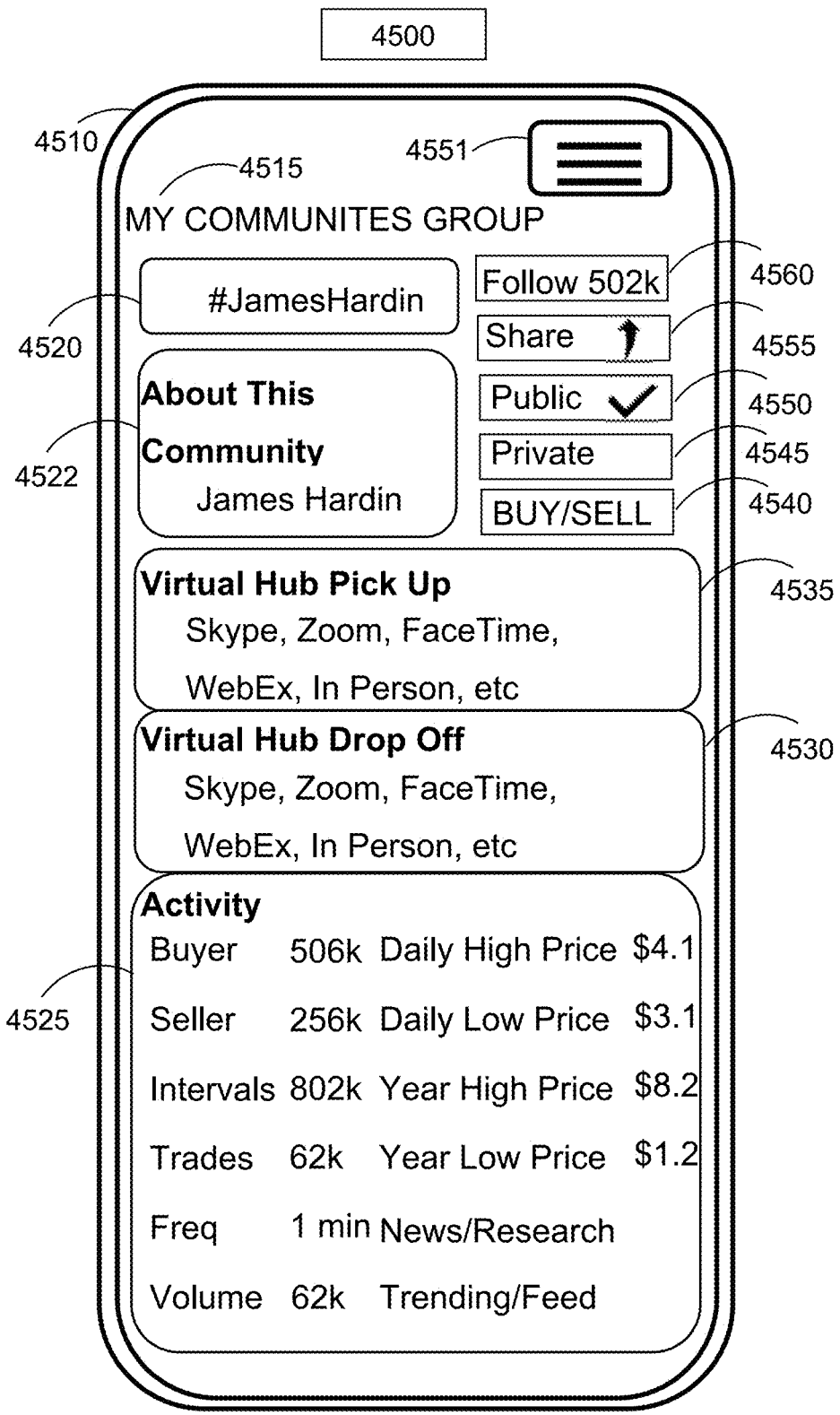
FIG. 45 illustrates an exemplary social network object of virtual objects, real objects, gaming objects and background virtual objects during rendering of virtual travel for the multi-dimension map database and data exchange linked with associated price-time priority queues in accordance with some embodiments highlighting James Hardin social network object community virtual experience and trip with a plurality of social network users to illustrate features of the multi-dimension map database and data exchange.

FIG. 45 illustrates an exemplary user interface 4500 for the My Virtual Communities Group 4515 for a specific transformed data structure of a transformed multi-dimension map tile data exchange linked community virtual hub sequence 4520. In some embodiments, the meta data virtual hub sequence #JamesHardin 4520 may list the long form details in the About the Community 4522 community linked route section 4522. In some embodiments, the specific virtual hub sequence #JamesHardin 4520 may list the amount of followers and an option to follow 4560. In some embodiments, the specific hub sequence #JamesHardin 4520 may list the ability to share the multi-dimension map tile data exchange linked community group with another social network or text or email or other network protocol. In some embodiments, the specific hub sequence #JamesHardin 4520 may list group as public 4550 or private 4545. In some embodiments, the specific hub sequence #JamesHardin 4520 may list the gateway to buy or sell 4540 transformed transmission units using the LOB 5200, 5300, 5400, 5500 for a virtual community 4515. In some embodiments, the specific hub sequence #JamesHardin 4520 may list specific pick up hub address location 4535 or drop off point address 4530 which may be a physical address match or virtual delivery match with video conferencing methods. In some embodiments, the specific hub sequence #JamesHardin 4520 may list the activity statistics and data with respect to the number of buyers 4525, number of sellers 4525, number of intervals 4525, number of trades 4525, frequency of virtual units 4525, volume of virtual community linked transmission units 4525, daily high price for transmission units 4525, daily low price for virtual community linked transmission units on the community object of #JamesHardin 4520, yearly high price 4525, yearly low price 4225, news, research, trending, feeds for the #JamesHardin 4220 virtual hub sequence.

Figure 46:
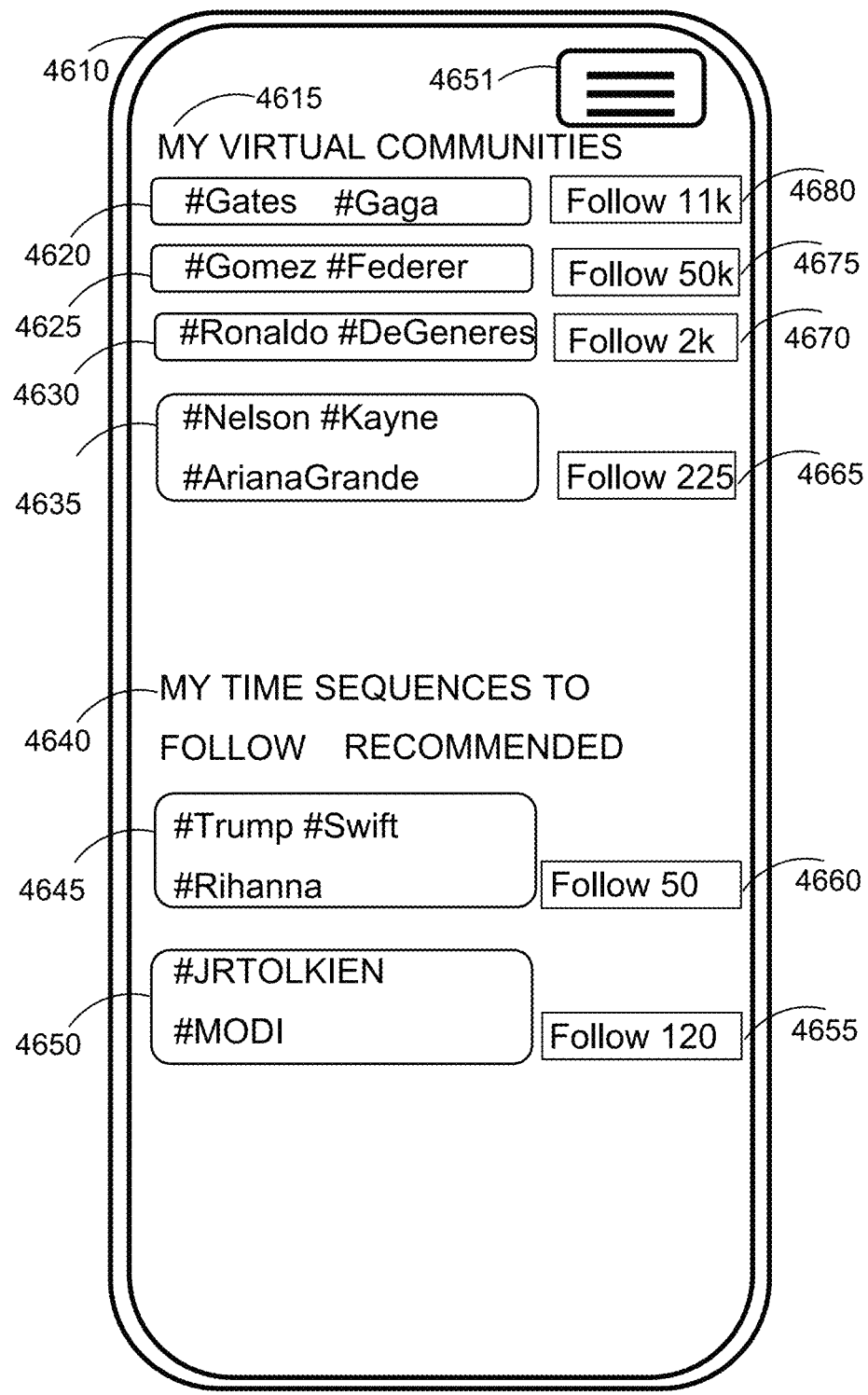
FIG. 46 illustrates an exemplary social network object of virtual objects, real objects, gaming objects and background virtual objects during rendering of virtual travel for the multi-dimension map database and data exchange linked with associated price-time priority queues in accordance with some embodiments highlighting multi linked virtual objects social network object community virtual combined experience and trip with a plurality of social network users to illustrate features of the multi-dimension map database and data exchange.

FIG. 46 illustrates an exemplary user interface 4600 with respect to My Virtual Communities 4615 which may transform sequences with more than two virtual hubs into sequences as two or three or more series of transmission route sequences 4620. In some embodiments, #Gates #Gaga 4620 may represent an origin virtual hub sequence of Bill Gates followed by a secondary sequence of Lady Gaga 4620. Multi leg virtual hub sequences allow for the power of the data transformation to link the villages, cities or states from a network virtual time and data community linked transmission topology structure from multiple providers of renewable energy community linked transmission units to provide higher levels of frequency and market opportunity to link public and private systems among many other benefits. In some embodiments, #Gates #Gaga 4620 may allow input from users to join, follow, subscribe or become a member of multi leg sequences which help solve potential last mile issues within time and data community linked transmission systems 4680. In some embodiments, #Gomez #Federer 4625, may allow for a time and data community linked transmission unit seller or buyer to connect two disparate time and data community linked transmission networks to provide last mile time and data community linked transmission to a destination at the lowest market cost because each leg or series of time and data community linked virtual hub sequences has an independent market associated with the leg or time and data community linked virtual hub sequence #Gomez #Federer 4625. In some embodiments, #Gomez #Federer 4625 may allow input from users to join, follow, subscribe or become a member of multi leg sequences which help solve potential last mile issues within renewable energy community linked transmission systems 4675. In some embodiments, three two leg sequences may be attached through data transformations such that #Nelson then takes a transmission unit to #Kayne which then takes a transmission unit to #AriannaGrande. The #Nelson #Kayne #AriannaGrande 4635 three leg virtual hub sequence combination may further solve time management issues for buyers and seller alike 4665 or users understand options and piece multiple time and data community linked transmission systems onto a single community based object to aggregate communication and transaction benefits of the system. In some embodiments, prior history navigation searches and locations may be used to build recommended additional sequences 4640 which may be recommended for users to subscribe, join, follow or become a member. In some embodiments, the virtual hub route sequence may link 4 or more virtual hub sequence pairs or even combinations of already linked community object pairs 4645. In some embodiments, #Trump #Swift #Rihanna 4645 may be linked to provide a requested user sequence. Traversing a series of linked trips, time, experiences or data may allow for the cost of non-linked trips to be dramatically lower due to using a series of connected local time and data resources. The transformed virtual hub sequence methodology allows for time and data community linked transmission systems to be integrated in ways that were not formerly possible because the systems were disparate or simply did not allow for linked trips or linked community objects that could optimize topological network structures over existing inefficient structures. In some embodiments, virtual hub sequences which have been linked 4645 may also allow users to subscribe 4660. In some embodiments, #JRTolkien #Modi 4650 may be linked to provide specific user sequences. In some embodiments, virtual hub sequences which have been linked 4650 may also allow users to subscribe 4655.

Figure 47:
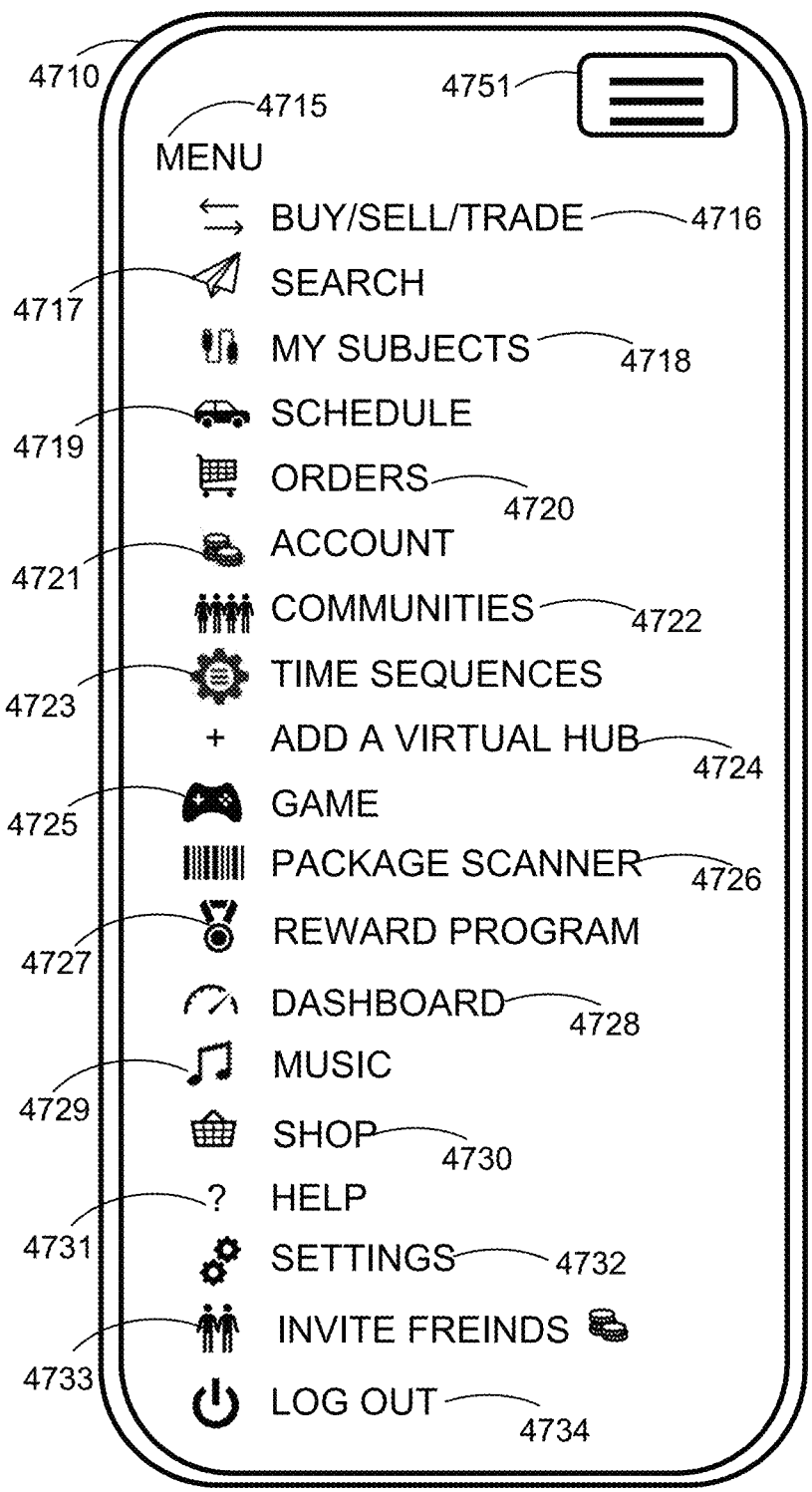
FIG. 47 illustrates exemplary menu objects of virtual travel for the multi-dimension map database and data exchange linked with associated price-time priority queues in accordance with some embodiments with a plurality of social network users to illustrate features of the multi-dimension map database and data exchange.

FIG. 47 illustrates an exemplary user menu interface 4700. In some embodiments, menu options may list as buy/sell/trade 4716 to go to the renewable energy community linked transmission unit gateway trading platform for virtual hub combinations and virtual hub sequences. In some embodiments, the user interface may allow a user to go to the transmission navigation 4717 module for price based transmission navigation or route selection based on cost or earnings from a route as described in U.S. patent application Ser. No. 16/242,967, "Price Based Navigation," filed Jan. 8, 2019; the entirety of which is incorporated by reference herein. Furthermore, as described in U.S. patent application Publication, Ser. No. 15/877,393, "Electronic Forward market exchange for transmission seats and capacity in transmission spaces and vehicles," filed Jan. 23, 2018, the entirety of which is incorporated by reference herein. In some embodiments, a user 110 may select my routes 4718 to toggle to routes that are important to their user profile or needs in the network member database. In some embodiments, trips 4719 may be selected to toggle to the trip delivery view. In some embodiments, orders 4720 may be selected to toggle to cancel or adjust orders in the system that are unfilled. In some embodiments, users may toggle to the account 4721 page or time and data community linked communities object page 4400 or the virtual route sequences page 4723. In some embodiments, users 110 may add additional hubs 4724 or may toggle to the gaming interface 3700. In some embodiments, renewable energy community linked time and data transmission units may need to be scanned on the time and data scanning module 4726. In some embodiments, users may select the reward program module 4727 or the dashboard module 4728. In some embodiments, the user may select the music 4729 or shopping module 4730. In some embodiments, the user may select help 4731 or settings 4732 to update account information or privacy settings. In some embodiments, users 110 may invite friends 4733 for rewards or bonuses or cash or credits 4733. In some embodiments, users may also logout 4734.

Figure 48:
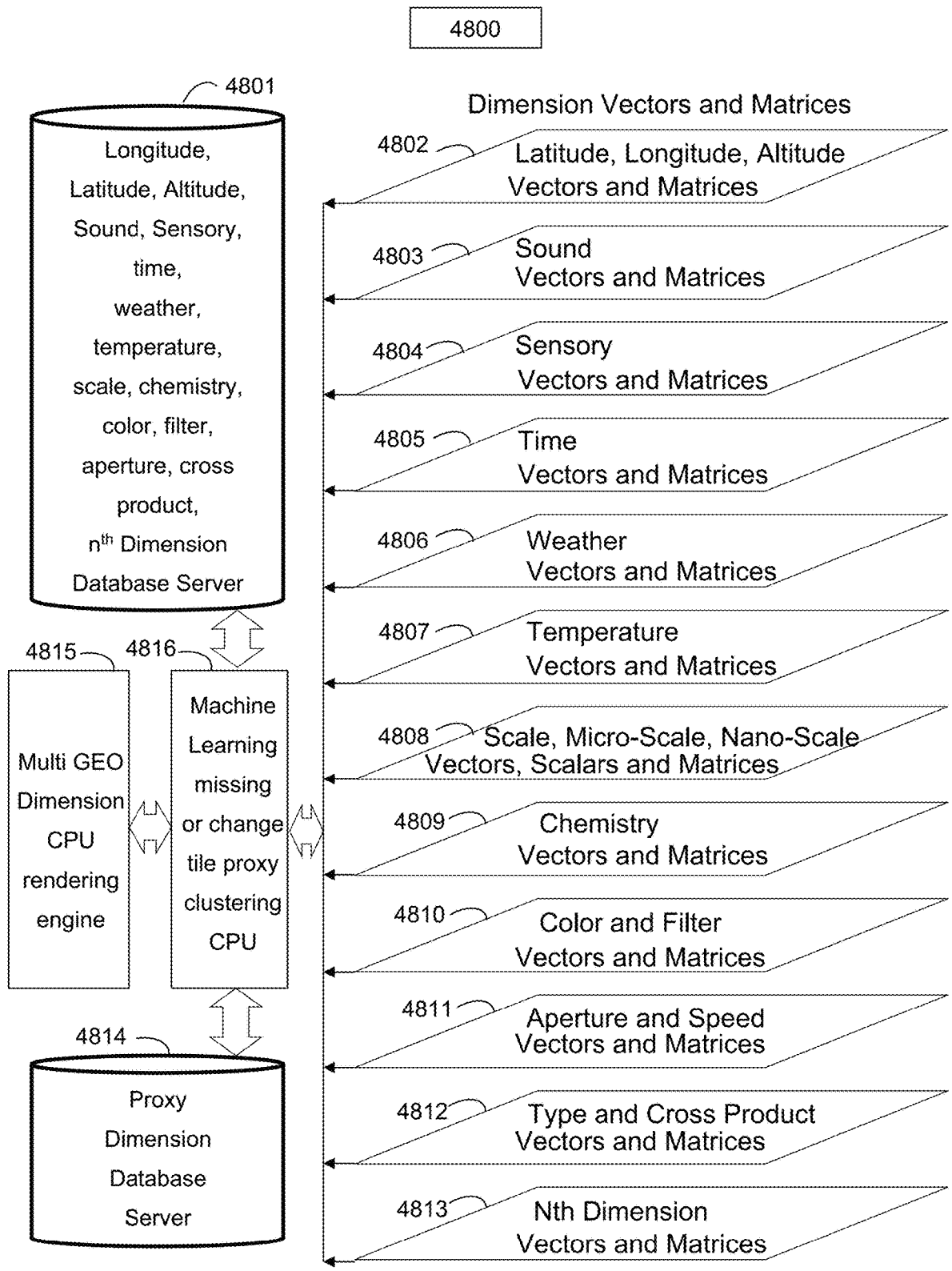
FIG. 48 illustrates an exemplary multi-dimension map tile database with such object transformations as latitude, longitude, altitude, sound, sensory, time, weather, temperature, scale, micro-scale, nano-scale, chemistry, color, aperture, speed, type, cross product combinations and nth dimensions with associated proxy database servers and CPU rendering engine.

FIG. 48 illustrates an exemplary multi-dimension map tile database structure 4801 with vector and matrix coordinate for each element of the multi-dimension map tile database structure. In some embodiments, there may be a multi-geolocation dimension CPU rendering engine 4815 as well as a machine learning missing and change data proxy map tile proxy clustering CPU 4816 that works with a proxy dimension database server 4814 to take like kind objects or high probability like kind objects to fill in missing cluster data in the primary multi-dimension map tile database 4801. In some embodiments, multi-dimension map tile database elements may be missing for the rendering engine 4815 so the proxy dimension database server 4814 may work with the machine learning missing data or change data tile proxy clustering CPU processor to fill in missing data in the primary multi-dimension map tile database server 4801. In some embodiments, the machine learning missing data processor 4816 uses a standard neural network deep learning iterative weight algorithm to process like probability weights to make a layer transformation so that the missing data in the main database 4801 may have continuity from the proxy dimension database server 4814. In some embodiments, proxy dimension data 4814 is logged in the primary original data database 4801 such that at a time when the actual data may be updated with proxy data. By example, but not limiting by example, a rendering of a dynamic walk in the woods may have certain trees that are missing at the multi-dimension map tile database such that the rendering engine may not pull the multi-dimension coordinate vector of scale 4808, so the deep learning processor 4816 may call upon the proxy dimension database server 4814 to place a tree of similar type as measured by probability weights of actual nearby data in the original database server 4801. By further example, but not limiting by example the deep learning processor 4816 may call proxy data 4814 from a sound vector 4803 for the noise of user walking steps in a forest with similar probability weights from actual dimension data 4801 that may link to the movement of the accelerometer 1100 in the CPU device 120. In some embodiments, the multi-dimension map tile database may store dimension and vector coordinate data for latitude, longitude, altitude vectors and matrices 4802, sound vectors and matrices 4803, sensory vectors and matrices 4804, time or history vectors and matrices 4805, weather vectors and matrices 4806, temperature vectors and matrices 4807, scale, micro-scale, nano-scale vectors, scalars, and matrices 4808, chemistry vectors and matrices 4809, color and filter vectors and matrices 4810, aperture and speed vectors and matrices 4811, product type and cross product combination vectors and matrices 4812 and nth dimension vectors and matrices 4813. While most machine learning processes three dimensions or four dimensions such as color channel or color depth, height, width, and sample identification measured and stored as coordinates, the multi-dimension map-tile database also stores many additional dimensions such as longitude, latitude, altitude, sound, sensory feel, sensory smell, sensory touch, sensory electromagnetic waves, time dimension, time history dimension, time style dimension, time growth dimension, weather dimension, temperatures dimension, scale of picture dimension, microscopic scale dimension, nano-scale dimension, chemistry state dimension, chemistry feeling dimension, color depth dimension, filter color dimension, lens focus aperture dimension, lens speed dimension, type dimension, cross product blend dimension of multiple dimensions blended together to make a new dimension, or a yet to be defined nth dimension, in some embodiments, tensor storage vectors and matrices may exceed traditional three, four and five dimension tensors. In some embodiments, the deep learning processor 4816 may calculate the probability distribution over the nth dimension classification vector, where output [i] is the probability that the sample belongs to class i, the best loss function in this case is categorical crossentropy which measures the distance between to probability distributions. In the aforementioned case, the distance between the probability distribution output by the deep learning network and the true distribution of the labels. By minimizing the distance between the two distributions, the deep learning network may properly classify proxy dimension database tile output as close to possible of the actual output for the true multi-dimension map tile database. In some embodiments, new dimensions may be created by using cross product vectors and matrices 4812 to combine weather dimensions 4806 with eighteen hundred and sixty-five year dimension in the United States during the civil war time period 4805 with clothing vectors and matrices 4813 and images may come in an out of focus with relative depth dimensions 4811 or water may turn into steam with the chemistry dimension 4809 or a flower in a field may be observed by zooming or expanding the view at the microscope level or nano-scale level 4808. In some other embodiments, a Tesla car may be seen at the traditional scale level 4808, or a user 110 may explore to go inside the battery to see the nano-trains providing the super conductivity for electricity storage at the nano-scale level 4808 and while the nano-scale level of that particular Tesla car may have not been observed and logged in the primary database 4801, the proxy dimension database 4814 may provide the additional scale by proxy from the deep learning cluster to associate the Tesla vehicle with the scale coordinate where a nano-scale lithium ion graphene to see morphological optimization and performance enhancement of nano-scale chemistry in component parts.

Figure 49:
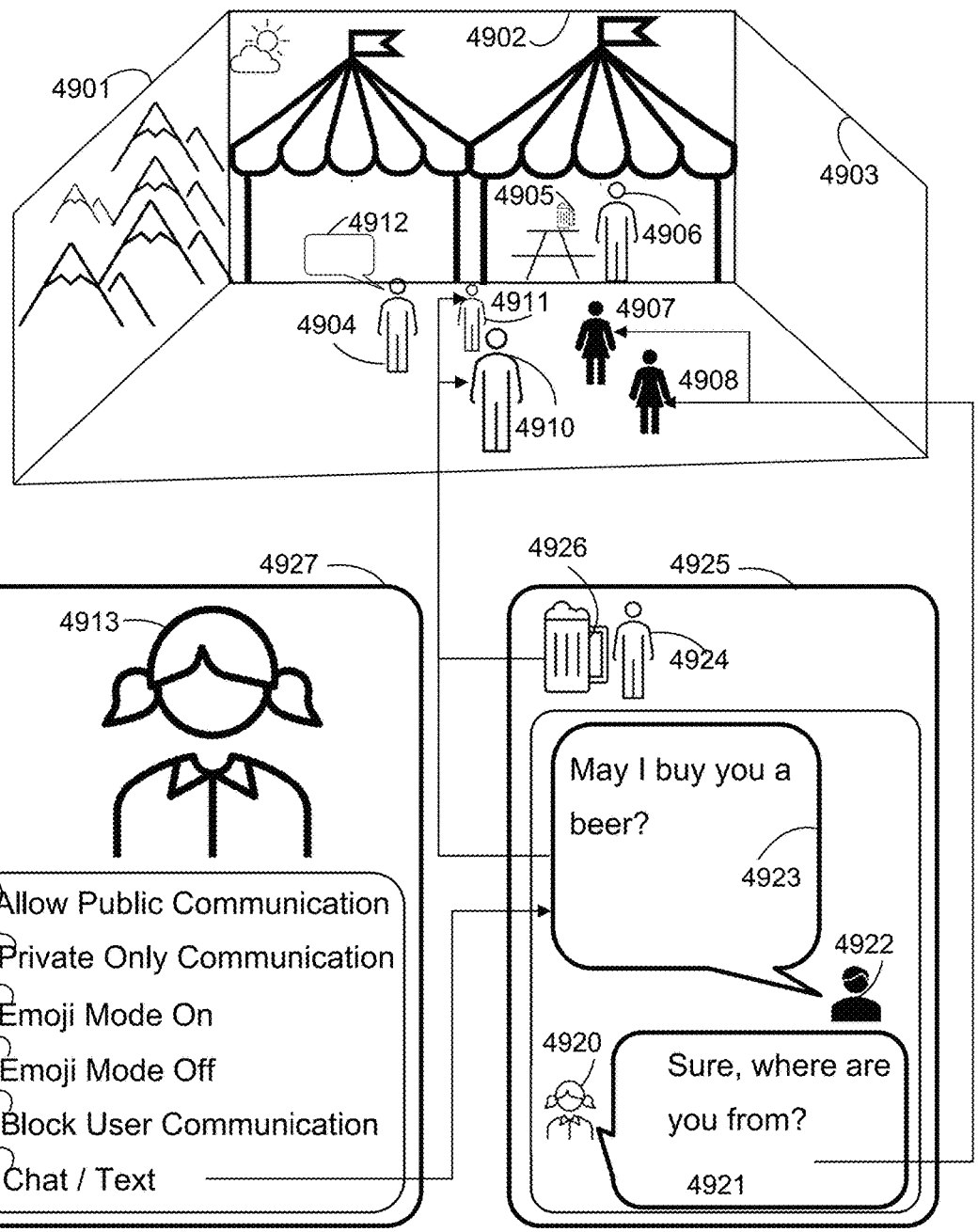
FIG. 49 illustrates an exemplary social network object of virtual objects, real objects, gaming objects and background virtual objects during rendering of virtual travel for the multi-dimension map database and data exchange linked with associated price-time priority queues in accordance with some embodiments highlighting multi linked virtual objects and texting between virtual objects and buying of food and beverage between virtual objects in a social network object community virtual combined experience and trip with a plurality of social network users to illustrate features of the multi-dimension map database and data exchange.

FIG. 49 illustrates an exemplary view from the multi-dimension map tile data exchange linked database 160. 4900 illustrates an exemplary three hundred and sixty degree public view of a Bier Garten in Muchen, Deutschland during Octoberfest with a natural environment where user may converse with other in the virtual environment while 4910 illustrates a user or virtual character option view while the user 4910 may also select to speak with another user 4911 while walking 4910 and other users 4904 may also join the conversation 4925 in the virtual environment 164 with public accessibility from network members 150 from the multi-dimension map tile data exchange linked database 160 as rendered with the virtual environment 164. In some embodiments, such as displayed in 4900, exemplary panels 4901 may display background mountain environments 4901 and additional panels 4902 may display additional network 150 members 4906 or friends 4907 in a live or archived buffer video in a user 4908 configured virtual environment 164. In some embodiments, the virtual environment 164 may display Bier Garten views 4905 and mountains 4901 and weather vectors as well as incremental scenery 4902. In some embodiments, an accelerometer 1100 associated with the user 4910 may gauge steps or movement into the virtual environment or movements in hand gestures from the user 4910 may gauge movement or steps or air altitude, longitude, latitude progress into the virtual environment. In some embodiments, incremental natural virtual objects 4905 may scale from image 4905 which is more distant to image 4926 which is more near with different scale vectors and matrices 4808 as the virtual user subject 44910 approaches the virtual object 4905 in multi-dimension map tile data exchange linked database 160. In some embodiments, incremental network 150 users 4904, 4911, 4907 may appear in the virtual environment 164 as the public view 4900 allows for many network 150 members to obtain virtual presence in the virtual environment 164 and even interaction between members, whereas the emoji selection view allows for exclusive or group conversation which may be served simultaneously by the network servers 160 without the other network members seeing each other from the multi-dimension map tile data exchange linked database 160. In some embodiments, the user 4910 may have the ability to converse with another network member 44911 who they know or a member who they do not know 4907 due to the organization of the multi-dimension map tile data exchange linked database 160 and machine learning missing tile proxy clustering CPU instructions 162 and proxy dimension database server 161. In other embodiments, a user 44913 may request a live stream of a coordinate spot on the map from the multi-dimension map tile data exchange linked database 160, 4800, and the user 4910 is a buyer on the data exchange and the user who provides the data to the multi-dimension map tile data exchange linked database 160 is the seller of the data view provided by the rendering engine 163. In some embodiments, a user 4910 may review the setting credentials 4914, 4915, 4916, 4917, 4918, 4919 with the setting selection 4927, similarly the user 4924 may participate in a virtual conversation 4925 with a virtual user 4922 to buy a beer 4923 in the multi-dimension map tile data exchange linked database 160 and rendered view 164.

Figure 50:
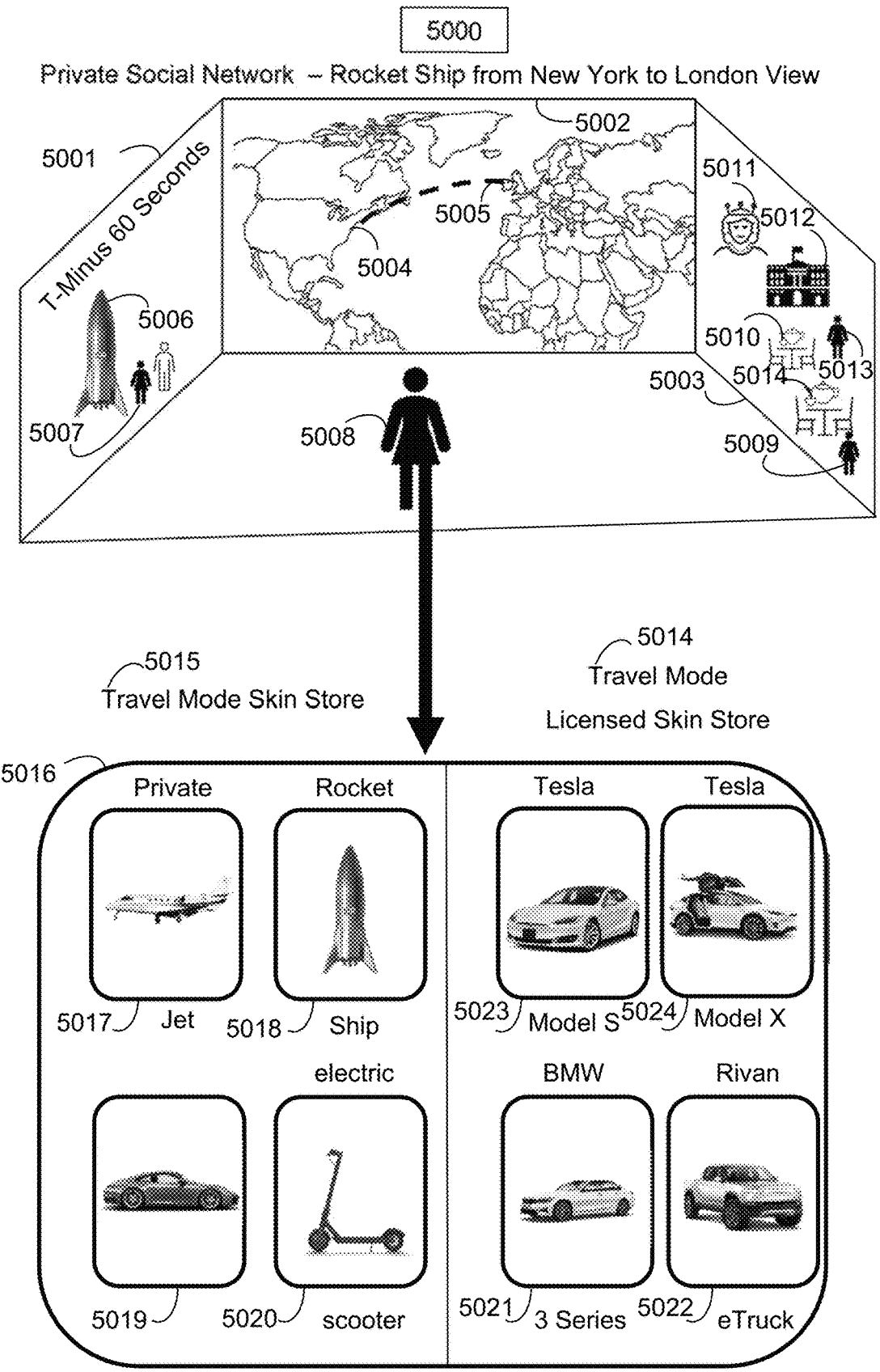
FIG. 50 illustrates an exemplary social network object of virtual objects, real objects, gaming objects and background virtual objects during rendering of virtual travel for the multi-dimension map database and data exchange linked with associated price-time priority queues in accordance with some embodiments highlighting rocket ship travel and travel object selection tools for virtual travel.

FIG. 50 illustrates an exemplary view from the multi-dimension map tile data exchange linked database 160. FIG. 50 illustrates an exemplary three hundred and sixty degree private view of high tea with the Queen of England view with a natural environment while 5016 illustrates the virtual travel mode skin option 5015 view while the user 5008 may also select from the major licensed store partnership view 5014 in the virtual environment 164 with public accessibility from network members 150 from the multi-dimension map tile data exchange linked database 160 as rendered with the virtual environment 164. In some embodiments, such as displayed in 5000, exemplary panels 5001 may display tea settings 5003, 5010 and additional panels 5002 may display virtual travel route sequences from New York 5004 to London via Mars 5005 in a live or archived buffer video in a user 5008 configured virtual environment 164. In some embodiments, the virtual environment 164 may display Buckingham Palace views 5012 and high tea 5014 and weather vectors as well as incremental scenery 5009, 5010. In some embodiments, an accelerometer 1100 associated with the user 5008 may gauge steps or movement into the virtual environment or movements in hand gestures from the user 5008 may gauge movement or steps or air altitude, longitude, latitude progress into the virtual environment. In some embodiments, a rocket ship virtual travel mode may be selected 5018 with launch mode 5001 on a rocket ship 5006 with network 150 members 5007 as the virtual user subject 5008 approaches the virtual object 5009 in multi-dimension map tile data exchange linked database 160. In some embodiments, incremental network 150 users 5013 may appear in the virtual environment 164 as the private view 5000 allows for invite only network 150 members to obtain virtual presence in the virtual environment 164 and even interaction between members, whereas the travel mode selection view allows for selection of jet travel 5017, auto travel 5019, scooter travel 5020, rocket ship travel 5018, Tesla model S vehicle 5023, Tesla Model X vehicle 5024, BMW three series 5021, Rivan eTruck 5022 or a plurality of additional travel modes which may be served simultaneously by the network servers 160 without the other network members seeing each other from the multi-dimension map tile data exchange linked database 160. In some embodiments, the user 5008 may have the ability to converse with another network member 5007 who they know or a member who they do not know 5009 due to the organization of the multi-dimension map tile data exchange linked database 160 and machine learning missing tile proxy clustering CPU instructions 162 and proxy dimension database server 161. In other embodiments, a user 5008 may request a live stream of a coordinate spot on the map from the multi-dimension map tile data exchange linked database 160, 4800, and the user 5008 is a buyer on the data exchange and the user who provides the data to the multi-dimension map tile data exchange linked database 160 is the seller of the data view provided by the rendering engine 163. In some embodiments, a user 5008 may also switch travel selection mid trip from Tesla 5023 to Rivan 5022.

Figure 51:
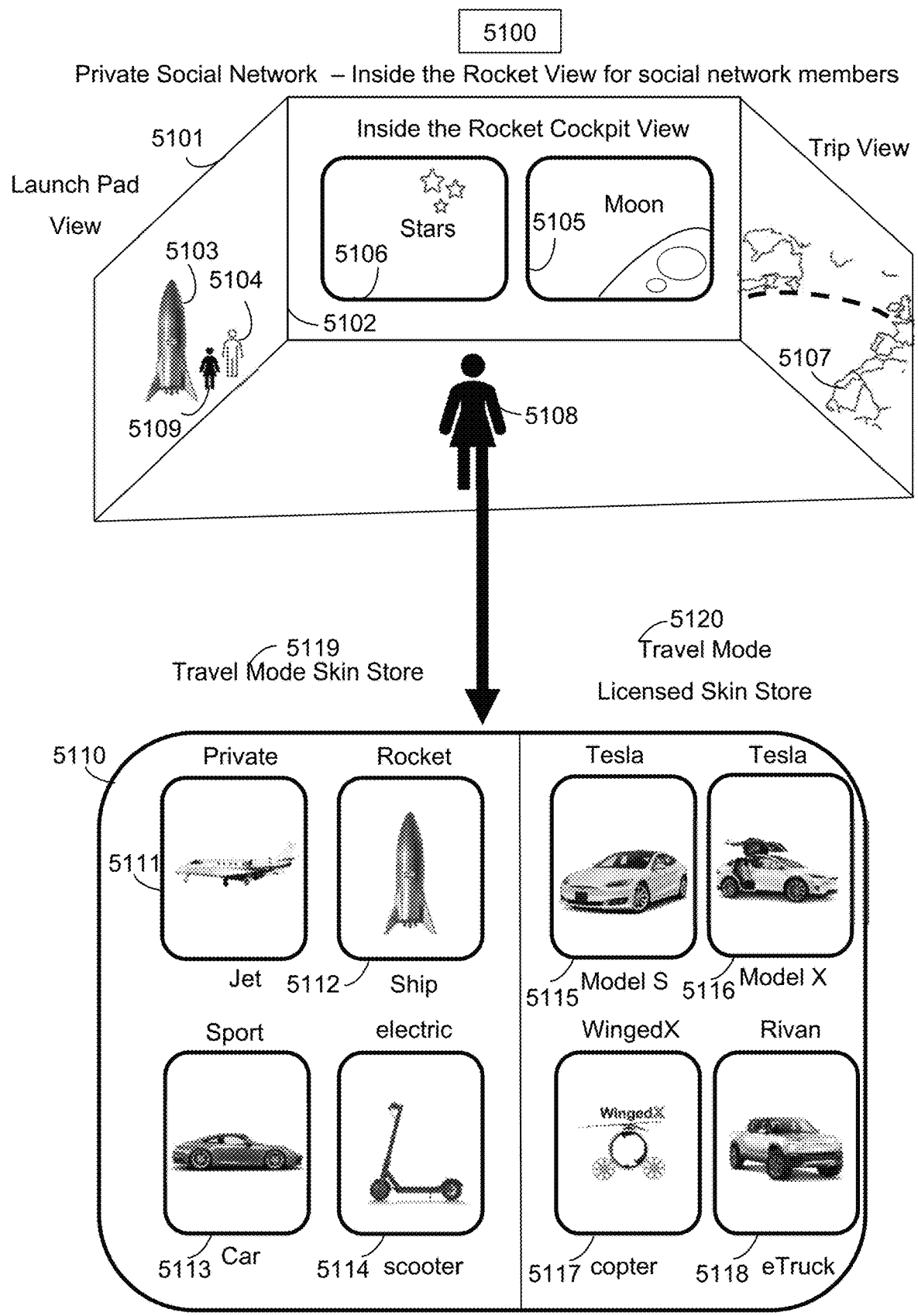
FIG. 51 illustrates an exemplary social network object of virtual objects, real objects, gaming objects and background virtual objects during rendering of virtual travel for the multi-dimension map database and data exchange linked with associated price-time priority queues in accordance with some embodiments highlighting inside rocket ship views for virtual travel and travel object selection tools for virtual travel.

FIG. 51 illustrates an exemplary view from the multi-dimension map tile data exchange linked database 160. FIG. 51 illustrates an exemplary three hundred and sixty degree private view of inside the rocket cockpit view 5102 for social network 150 members while 5110 illustrates the virtual travel mode skin option 5119 view while the user 5108 may also select from the major licensed store partnership view 5120 in the virtual environment 164 with private accessibility from network members 150 from the multi-dimension map tile data exchange linked database 160 as rendered with the virtual environment 164. In some embodiments, such as displayed in 5100, exemplary panels 5106 may display star view and additional panels 5105 may display moon view sequences from New York 5004 to London via Mars 5005 in a live or archived buffer video in a user 5008 configured virtual environment 164. In some embodiments, the virtual environment 164 may display earth views 5017 and weather vectors as well as incremental scenery 5105, 5106. In some embodiments, an accelerometer 1100 associated with the user 5108 may gauge steps or movement into the virtual environment or movements in hand gestures from the user 5108 may gauge movement or steps or air altitude, longitude, latitude progress into the virtual environment. In some embodiments, a rocket ship virtual travel mode may be selected 5112 with launch mode 5101 on a rocket ship 5103 with network 150 members 5109 as the virtual user subject 5108 approaches the virtual moon object 5105 in multi-dimension map tile data exchange linked database 160. In some embodiments, incremental network 150 users 5104 may appear in the virtual environment 164 as the private view 5100 allows for invite only network 150 members to obtain virtual presence in the virtual environment 164 and even interaction between members, whereas the travel mode selection view allows for selection of jet travel 5111, auto travel 5113, scooter travel 5114, rocket ship travel 5112, Tesla model S vehicle 5115, Tesla Model X vehicle 5116, Winged air copter 5117, Rivan eTruck 5118 or a plurality of additional travel modes which may be served simultaneously by the network servers 160 without the other network members seeing each other from the multi-dimension map tile data exchange linked database 160. In some embodiments, the user 5108 may have the ability to converse with another network member 5109 who they know or a member who they do not know 5104 due to the organization of the multi-dimension map tile data exchange linked database 160 and machine learning missing tile proxy clustering CPU instructions 162 and proxy dimension database server 161. In other embodiments, a user 5108 may request a live stream of a coordinate spot on the map from the multi-dimension map tile data exchange linked database 160, 4800, and the user 5108 is a buyer on the data exchange and the user who provides the data to the multi-dimension map tile data exchange linked database 160 is the seller of the data view provided by the rendering engine 163. In some embodiments, a user 5108 may also switch travel selection mid trip from Tesla 5115 to Rivan 5118.

Figure 52:
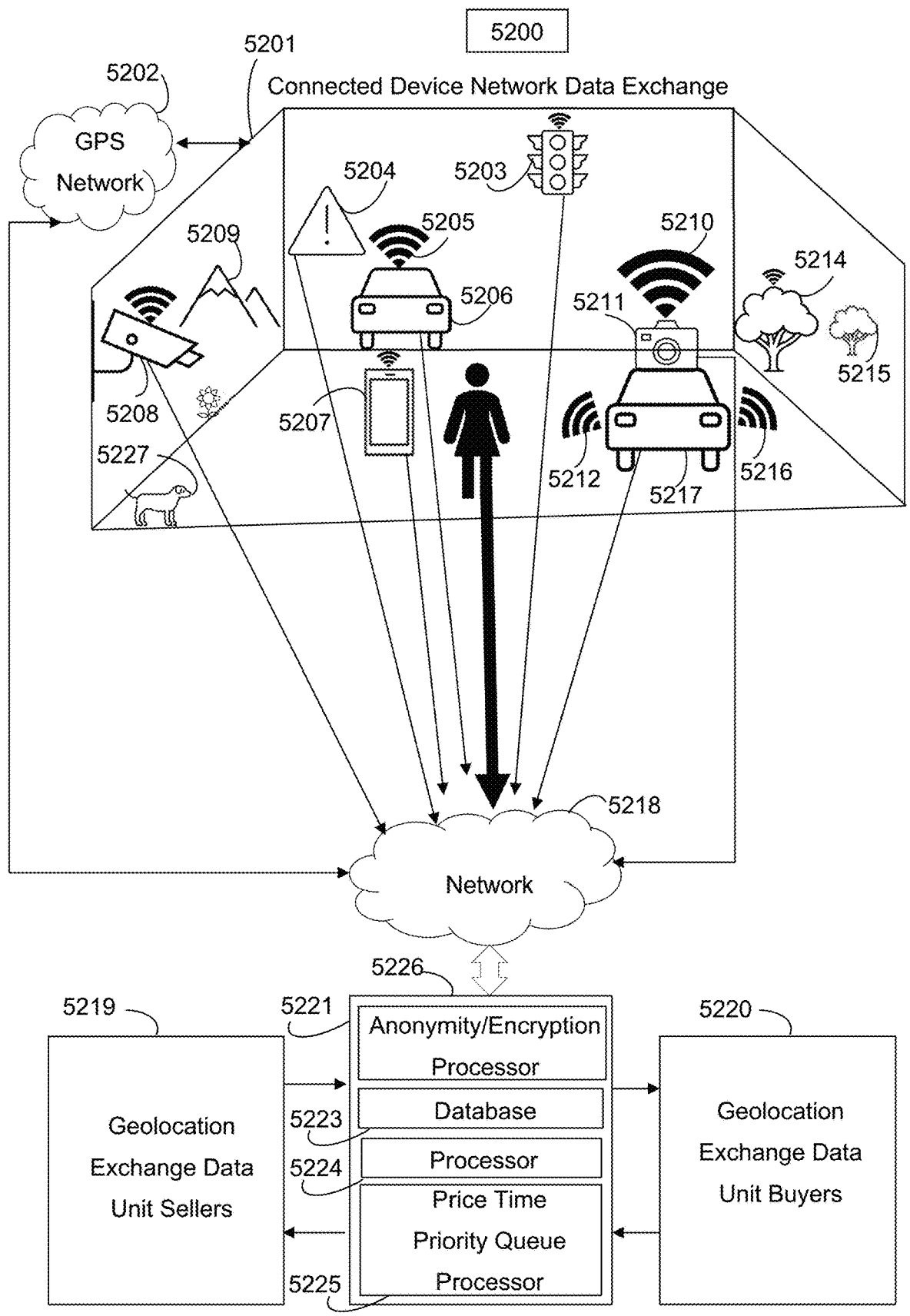
FIG. 52 illustrates an exemplary multi-object device capture and network communication on the data exchange for ingest of multi-dimension map database and data exchange linked with associated price-time priority queues in accordance with some embodiments highlighting data ingesting into the network from a plurality of devices and users under the organizational format of the data exchange price time priority queue with encryption processors and buyers and sellers of ingest data on the exchange.

FIG. 52 illustrates an exemplary connected device network data exchange where a plurality of network members 110 and devices 5208, 5204, 5206, 5217, 5214, 5207 send multi-dimension map tile database coordinate and dimension information data through a GPS network 5202 and a general network 5218 into a geolocation multi-dimension map tile data exchange where user 110 identity may be encrypted by the anonymity and encryption processor 5221 using a plurality of hash table or linear matrices transformations to encrypt user identity while storing the multi-dimension geolocation map tile data in the multi dimension database 5223, 160 and proxy dimension database 161 with the deep learning category processor 5224, 163 and the price time priority queue processor 5225 the multi-dimension geolocation exchange 5226. In some embodiments, users 110 may exchange multi-dimension data with the exchange for payment from the exchange 5219 or buyers may request to exchange multi-dimension data with the exchange for payment to the exchange 5220. In some embodiments, buyers and sellers may have ownership structure in the multi-dimension geolocation exchange as provided for in methods from U.S. patent application Ser. No. 16,183,647, "Financial Swap Structure method and system on transportation capacity units," filed Nov. 7, 2018, the entirety of the contents provided for as reference herein, and U.S. patent application Ser. No. 16,257,032, "Securitization of transportation units," filed Jan. 24, 2019, the entirety of the contents provided for as reference herein, and U.S. patent application Ser. No. 16,556,838, "Financial Swap and Index," filed Aug. 30, 2019, the entirety of the contents provided for as reference herein, and U.S. patent application Ser. No. 16,589,229, "Transportation Capacity Unit legal transformation," filed Oct. 1, 2019, the entirety of the contents provided for as reference herein, and U.S. provisional patent application Ser. No. 62,969,301, "Web browser and OS vault with advertising serving transportation database and geolocation meta data and price time priority queues," filed Feb. 3, 2020 the entirety of the contents provided for as reference herein, and U.S. provisional patent application Ser. No. 62,977,559, "method to transmit geolocation exchange based markets as news ticker," filed Feb. 17, 2020, the entirety of the contents provided for as reference herein, and U.S. provisional patent application Ser. No. 62,977,225, "IPOs for TMAs and associated price time priority queues for secondary market," filed Feb. 16, 2020, the entirety of the contents provided for as reference herein. In some embodiments, the connected device network data exchange overcomes many deficiencies of open source methods of data sharing as there is no oversight architecture in traditional open source projects such as linux or open street maps which then leave large problems in the maintenance, support and organization of open source projects. In yet other embodiments, the connected device network data exchange provides an efficient method to organize and acquire the missing data layers in the multi-dimension geolocation map tile data base 160 through use of the social network layer 4200 to organize communication activity for various data layers which must be acquired into the central multi-dimension geolocation map tile database 4801, 160 and associated price time priority queues to organize the priority, time and value of the data exchanged for the multi-dimension geolocation map tile database 160.

FIG. 53 illustrates exemplary user price-time priority queue 5300 for transacting or matching transformed multi-dimension geolocation data community linked transmission unit data, participating, transacting and/or trading multi-dimension geolocation data community linked transmission, representing the transformed multi-dimension geolocation data community linked transmission unit value as a homogeneous asset specification or multi-dimension geolocation data as a physical forward commodity security between combinations of virtual hubs over various transmission modes and nodes. In some embodiments, user transformed multi-dimension geolocation data community linked transmission unit(s) or transformed multi-dimension geolocation data community linked transmission unit(s) associated with multi-dimension geolocation data community linked route community objects interface 5300 includes the following instructions, transformations and elements, or a subset or superset thereof:

exemplary transformed multi-dimension geolocation data community linked transmission unit price-time priority sell queue 5320;

exemplary transformed multi-dimension geolocation data community linked transmission unit price-time priority buy queue 5321;

exemplary transformed multi-dimension geolocation data community linked transmission unit price priority bucket 5305 in the transmission unit buy queue of $5.10;

exemplary transformed multi-dimension geolocation data community linked transmission unit price priority bucket 5306 in the transmission unit buy queue of $5.30;

exemplary transformed multi-dimension geolocation data community linked transmission unit price priority bucket 5310 in the transmission unit buy queue of $5.60;

exemplary transformed multi-dimension geolocation data community linked transmission unit price priority bucket 5314 in the transmission unit sell queue of $5.70;

exemplary transformed multi-dimension geolocation data community linked transmission unit price priority bucket 5315 in the transmission unit sell queue of $5.80;

exemplary transformed multi-dimension geolocation data community linked transmission unit price priority bucket 5316 in the transmission unit sell queue of $6.60;

exemplary transformed multi-dimension geolocation data community linked transmission unit price-time priority buy price 5304 in the first time position of the price priority bucket 5305 of $5.10;

exemplary transformed multi-dimension geolocation data community linked transmission unit price-time priority buy price 5303 in the second time position of the price priority bucket 5305 of $5.10;

exemplary transformed multi-dimension geolocation data community linked transmission unit price-time priority buy price 5302 in the third time position of the price priority bucket 5305 of $5.10;

exemplary transformed multi-dimension geolocation data community linked transmission unit price-time priority buy price 5307 in the first time position of the price priority bucket 5306 of $5.30;

exemplary transformed multi-dimension geolocation data community linked transmission unit price-time priority buy price 5309 in the first time position of the price priority bucket 5310 of $5.60;

exemplary transformed multi-dimension geolocation data community linked transmission unit price-time priority buy price 5308 in the second time position of the price priority bucket 5310 of $5.60;

exemplary transformed multi-dimension geolocation data community linked transmission unit price-time priority sell price 5311 in the first time position of the price priority bucket 5314 of $5.70;

exemplary transformed multi-dimension geolocation data community linked transmission unit price-time priority sell price 5312 in the second time position of the price priority bucket 5314 of $5.70;

exemplary transformed multi-dimension geolocation data community linked transmission unit price-time priority sell price 5313 in the third time position of the price priority bucket 5314 of $5.70;

exemplary transformed multi-dimension geolocation data community linked transmission unit price-time priority sell price 5318 in the first time position of the price priority bucket 5315 of $5.80;

exemplary transformed multi-dimension geolocation data community linked transmission unit price-time priority sell price 5319 in the second time position of the price priority bucket 5315 of $5.80;

exemplary transformed multi-dimension geolocation data community linked transmission unit price-time priority sell price 5317 in the first time position of the price priority bucket 5316 of $6.60;

exemplary transformed multi-dimension geolocation data community linked transmission unit price time priority limit order book ("LOB") 5325 is represented by the vector q(t) 5301, such that the i-th coordinate for i>0, $q_i$ (t), is the number of sell limit orders of transformed transmission units that are waiting in the LOB at time t a price iδ (δ is the price unit tick size of the transformed multi-dimension geolocation data community linked transmission unit), the number of buy limit orders for transformed multi-dimension geolocation data community linked transmission units at iδ are represented with a negative sign $q_i$ (t);

exemplary benchmark price 5326 of all sell limit orders at time t are computed as s(t)=s(q(t))=min (min {0<iδ: $q_i$ (t)>0}), if $q_i$ (t) is less than or equal to 0 for all i>0, then s (q (t))=infinity;

exemplary benchmark price 5327 of all buy limit orders at time t are computed as b(t)=b (q (t))=max (max {iδ>0: $q_i$ (t)<0}), if $q_i$ (t) is greater than or equal to 0 for all i>0, then b(q (t))=negative infinity;

exemplary order match 5328 in the transformed multi-dimension geolocation data community linked transmission unit limit order book where s(t)=b(t), which then moves the method and system to the matched transformed multi-dimension geolocation data community linked transmission unit limit order confirmation and delivery process;

exemplary limit order book status of no order match 5329, where s (t)>b (t);

exemplary limit order book i-th $q_i$ (t) element 5330 of LOB is cancelled, remove from queue;

exemplary i-th $q_i$ (t) element is a new transformed multi-dimension geolocation data community linked transmission unit order 5331 in LOB, insert into respective limit order buy queue 5321 or limit order sell queue 5320 with priority of price, then time into the price time priority queues 5300.

In some embodiments, the price-time priority queue 5300 for transformed multi-dimension geolocation data community linked transmission units may be assigned to a multi-dimension geolocation data community linked commute community object 4200 which is a waypoint sequence of transformed multi-dimension geolocation data community linked transmission units. In some embodiments, the price-time priority queue 5300 may be assigned to two waypoints as an multi-dimension geolocation data community linked commute community object 4200 or the price-time prior queue 5300 may be assigned to an multi-dimension geolocation data community linked commute community waypoint object sequence of many waypoints 205 to 206 to 207 to 208 which have been added together to form one continuous multi-dimension geolocation data community linked commute community object 4200 and respective price-time priority queue for transformed multi-dimension geolocation data community linked transmission units through processing instructions from the multi-dimension geolocation data community linked Community Route Processor 216 and multi-dimension geolocation data community linked Transmission Sequence Route Processor 215, 217 via the network(s) 150. In some embodiments, the limit order book 5301 vector may be assigned to a specific date and time for the multi-dimension geolocation data community linked commute community waypoint object which is a forward market price for transformed multi-dimension geolocation data community linked transmission unit(s) 4200 and multi-dimension geolocation data community linked commute community waypoint object(s) 4200. In some embodiments, a specific transformed multi-dimension geolocation data community linked transmission unit price-time priority queue limit buy order 5304 with a specific price stamp bucket 5305 of $5.10, may be cancelled, if the 5304 order is cancelled, the 5303 price-time priority limit order book buy queue price then moves to the higher price-time priority queue position of 5304 and price-time priority price of 5302 moves to position 5303. In some embodiments, the price-time priority limit order sell price 5319 of price-time priority bucket price 5315 of $5.80 may be cancelled, if 5319 price-time priority of the transformed multi-dimension geolocation data community linked transmission unit is cancelled, then order 5317 moves to a higher position in the overall transformed multi-dimension geolocation data community linked transmission queue 5320 even though the limit order book price 5317 remains in the price bucket of 5316 which is $6.60. In some embodiments, price-time priority insertion may occur where a new order is inserted into either the transformed multi-dimension geolocation data community linked transmission unit buy queue 5320 or transformed multi-dimension geolocation data community linked transmission unit sell queue 5321. In some embodiments, by example but not limiting by example, a new price-time limit order for a transformed multi-dimension geolocation data community linked transmission unit may be inserted as a sell order at a price of $5.70 at position 5313 which would then assume order 5312 was also at a price of $5.70 and that order 5312 was placed with a time that was before order 5313 was placed. In the aforementioned example of the price-time order insertion of 5313, price-time orders of 5319, 5318 and 5317 have moved lower in their relative position even though they remain in distinctly different price buckets of 5315 and 5316 respectively as the price-time priority queue 5300, price is first priority, then time stamp in the price-time priority queue 5300 for transformed multi-dimension geolocation data community linked transmission units.

In some embodiments, the lowest selling price s(t) 5326 may equal the highest buying price b(t) 5327, in which case the highest transformed multi-dimension geolocation data community linked transmission unit buy queue price bucket 5310 is equal to the lowest transformed multi-dimension geolocation data community linked transmission unit sell queue 5320 selling bucket price 5314. In the example 5300 of the limit order book 5301, but not limiting by example, the highest transformed multi-dimension geolocation data community linked transmission unit buy price 5310 of $5.60 is lower than the lowest multi-dimension geolocation data community linked transmission unit sell queue 5320 lowest selling bucket 5314 of $5.70 so no match occurs because s (t)>b (t) 5329. In some embodiments, many order insertions 5331 or order cancellations 330 may occur for transformed multi-dimension geolocation data community linked transmission units from the multi-dimension geolocation data community linked transmission forward market database server 5224 associated with multi-dimension geolocation data community linked community objects which are series of waypoints 4200.

In some embodiments, the LOB 5300 for transformed multi-dimension geolocation data community linked transmission units may contain many different types of instruction structures and specifications such as limit orders, market orders, market if touched orders, snap market orders, snap mid orders, snap to primary orders, peg to benchmark orders, or adaptive custom orders which are custom customer designed instructions which are all standard order types for anyone skilled in the art of markets. In some embodiments, the LOB 5300 for transformed transmission units may also contain instructions for order times such as good for the day, good till cancelled, immediate or cancel, good till date, day till cancelled or a plurality of additional custom instructions for the timing of the order of the transformed transmission unit in the LOB 5300 that is associate with an multi-dimension geolocation data community linked commute community object 241. In some embodiments, a plurality of additional instructions and specifications may also be unique to each transformed multi-dimension geolocation data community linked transmission unit LOB 5300 such as virtual mode 1611, automobile mode 1630, air mode 1612, autonomous vehicle mode 1613, bike mode 1614, boat mode 1615, bus mode 1616, drone mode 1617, limo mode 1618, motorcycle mode 1619, moped mode 1620, shuttle mode 1612, spaceship mode 1622, subway mode 1623, fish mode 1624, train mode 1625, shark mode 1626 which may combine many modes 1610 or a single mode 1610 for a waypoint commute community object 4200 or waypoint multi-dimension geolocation data community linked sequence 205 to 206 to 207 to 208 of many multi-dimension geolocation data community linked commute communities 4200.

In some embodiments, the LOB 5300 may be assigned to transformed multi-dimension geolocation data community linked transmission unit T-Rex dinosaur mode 1628 that have associated multi-dimension geolocation data community linked commute community objects 4200. In some embodiments, the LOB 5300 for transformed transmission units may be assigned to in person 1629 for an actual in person meeting of a transformed multi-dimension geolocation data community linked transmission unit. In some embodiments, the LOB 5300 may even be assigned to the virtual transformed multi-dimension geolocation data community linked transmission unit 1611 which would be space along a packet moving medium such as a telecom pipeline, satellite telecom or wireless telecom that moves packets of power which are transformed transmission units. In some embodiments, the LOB 5300 may be assigned to a home or business at a certain transmission waypoint 205, 206, 207, 208.

FIG. 54 illustrates exemplary user price-time priority queue 5400 for transacting or matching transformed multi-dimension data mining community linked transmission unit data, participating, transacting and/or trading data mining geolocation data community linked transmission, representing the transformed data mining geolocation data community linked transmission unit value as a homogeneous asset specification or data mining geolocation data as a physical forward commodity security between combinations of virtual hubs over various transmission modes and nodes. In some embodiments, user transformed data mining geolocation data community linked transmission unit(s) or transformed data mining geolocation data community linked transmission unit(s) associated with data mining geolocation data community linked route community objects interface 5300 includes the following instructions, transformations and elements, or a subset or superset thereof:

exemplary transformed data mining geolocation data community linked transmission unit price-time priority sell queue 5420;

exemplary transformed data mining geolocation data community linked transmission unit price-time priority buy queue 5421;

exemplary transformed data mining geolocation data community linked transmission unit price priority bucket 5405 in the transmission unit buy queue of $5.10;

exemplary transformed data mining geolocation data community linked transmission unit price priority bucket 5406 in the transmission unit buy queue of $5.30;

exemplary transformed data mining geolocation data community linked transmission unit price priority bucket 5410 in the transmission unit buy queue of $5.60;

exemplary transformed data mining geolocation data community linked transmission unit price priority bucket 5414 in the transmission unit sell queue of $5.70;

exemplary transformed data mining geolocation data community linked transmission unit price priority bucket 5415 in the transmission unit sell queue of $5.80;

exemplary transformed data mining geolocation data community linked transmission unit price priority bucket 5416 in the transmission unit sell queue of $6.60;

exemplary transformed data mining geolocation data community linked transmission unit price-time priority buy price 5404 in the first time position of the price priority bucket 5405 of $5.10;

exemplary transformed data mining geolocation data community linked transmission unit price-time priority buy price 5403 in the second time position of the price priority bucket 5405 of $5.10;

exemplary transformed data mining geolocation data community linked transmission unit price-time priority buy price 5402 in the third time position of the price priority bucket 5405 of $5.10;

exemplary transformed data mining geolocation data community linked transmission unit price-time priority buy price 5407 in the first time position of the price priority bucket 5406 of $5.30;

exemplary transformed data mining geolocation data community linked transmission unit price-time priority buy price 5409 in the first time position of the price priority bucket 5410 of $5.60;

exemplary transformed data mining geolocation data community linked transmission unit price-time priority buy price 5308 in the second time position of the price priority bucket 5410 of $5.60;

exemplary transformed data mining geolocation data community linked transmission unit price-time priority sell price 5411 in the first time position of the price priority bucket 5414 of $5.70;

exemplary transformed data mining geolocation data community linked transmission unit price-time priority sell price 5412 in the second time position of the price priority bucket 5414 of $5.70;

exemplary transformed data mining geolocation data community linked transmission unit price-time priority sell price 5413 in the third time position of the price priority bucket 5414 of $5.70;

exemplary transformed data mining geolocation data community linked transmission unit price-time priority sell price 5418 in the first time position of the price priority bucket 5415 of $5.80;

exemplary transformed data mining geolocation data community linked transmission unit price-time priority sell price 5419 in the second time position of the price priority bucket 5415 of $5.80;

exemplary transformed data mining geolocation data community linked transmission unit price-time priority sell price 5417 in the first time position of the price priority bucket 5416 of $6.60;

exemplary transformed data mining geolocation data community linked transmission unit price time priority limit order book ("LOB") 5425 is represented by the vector q(t) 5401, such that the i-th coordinate for i>0, $q_i$ (t), is the number of sell limit orders of transformed transmission units that are waiting in the LOB at time t a price iδ (δ is the price unit tick size of the transformed data mining geolocation data community linked transmission unit), the number of buy limit orders for transformed data mining geolocation data community linked transmission units at iδ are represented with a negative sign $q_i$ (t);

exemplary benchmark price 5426 of all sell limit orders at time t are computed as s(t)=s(q(t))=min (min {0<iδ: $q_i$ (t)>0}), if $q_i$ (t) is less than or equal to 0 for all i>0, then s (q (t))=infinity;

exemplary benchmark price 5427 of all buy limit orders at time t are computed as b(t)=b (q (t))=max (max {iδ>0: $q_i$ (t)<0}), if $q_i$ (t) is greater than or equal to 0 for all i>0, then b(q (t))=negative infinity;

exemplary order match 5428 in the transformed data mining geolocation data community linked transmission unit limit order book where s(t)=b(t), which then moves the method and system to the matched transformed data mining geolocation data community linked transmission unit limit order confirmation and delivery process;

exemplary limit order book status of no order match 5429, where s (t)>b (t);

exemplary limit order book i-th $q_i$ (t) element 5430 of LOB is cancelled, remove from queue;

exemplary i-th $q_i$ (t) element is a new transformed data mining geolocation data community linked transmission unit order 5431 in LOB, insert into respective limit order buy queue 5421 or limit order sell queue 5420 with priority of price, then time into the price time priority queues 5400.

In some embodiments, the price-time priority queue 5400 for transformed data mining geolocation data community linked transmission units may be assigned to a data mining geolocation data community linked commute community object 4200 which is a waypoint sequence of transformed data mining geolocation data community linked transmission units. In some embodiments, the price-time priority queue 5400 may be assigned to two waypoints as an data mining geolocation data community linked commute community object 4200 or the price-time prior queue 5400 may be assigned to an data mining geolocation data community linked commute community waypoint object sequence of many waypoints 205 to 206 to 207 to 208 which have been added together to form one continuous data mining geolocation data community linked commute community object 4200 and respective price-time priority queue for transformed data mining geolocation data community linked transmission units through processing instructions from the data mining geolocation data community linked Community Route Processor 216 and data mining geolocation data community linked Transmission Sequence Route Processor 215, 217 via the network(s) 150. In some embodiments, the limit order book 5301 vector may be assigned to a specific date and time for the data mining geolocation data community linked commute community waypoint object which is a forward market price for transformed data mining geolocation data community linked transmission unit(s) 4200 and data mining geolocation data community linked commute community waypoint object(s) 4200. In some embodiments, a specific transformed data mining geolocation data community linked transmission unit price-time priority queue limit buy order 5404 with a specific price stamp bucket 5405 of $5.10, may be cancelled, if the 5404 order is cancelled, the 5403 price-time priority limit order book buy queue price then moves to the higher price-time priority queue position of 5404 and price-time priority price of 5402 moves to position 5403. In some embodiments, the price-time priority limit order sell price 5419 of price-time priority bucket price 5415 of $5.80 may be cancelled, if 5419 price-time priority of the transformed data mining geolocation data community linked transmission unit is cancelled, then order 5417 moves to a higher position in the overall transformed data mining geolocation data community linked transmission queue 5420 even though the limit order book price 5417 remains in the price bucket of 5416 which is $6.60. In some embodiments, price-time priority insertion may occur where a new order is inserted into either the transformed data mining geolocation data community linked transmission unit buy queue 5420 or transformed data mining geolocation data community linked transmission unit sell queue 5421. In some embodiments, by example but not limiting by example, a new price-time limit order for a transformed data mining geolocation data community linked transmission unit may be inserted as a sell order at a price of $5.70 at position 5313 which would then assume order 5412 was also at a price of $5.70 and that order 5312 was placed with a time that was before order 5413 was placed. In the aforementioned example of the price-time order insertion of 5413, price-time orders of 5419, 5418 and 5417 have moved lower in their relative position even though they remain in distinctly different price buckets of 5415 and 5416 respectively as the price-time priority queue 5400, price is first priority, then time stamp in the price-time priority queue 5400 for transformed data mining geolocation data community linked transmission units.

In some embodiments, the lowest selling price s(t) 5426 may equal the highest buying price b(t) 5427, in which case the highest transformed data mining geolocation data community linked transmission unit buy queue price bucket 5410 is equal to the lowest transformed data mining geolocation data community linked transmission unit sell queue 5420 selling bucket price 5414. In the example 5400 of the limit order book 5401, but not limiting by example, the highest transformed data mining geolocation data community linked transmission unit buy price 5410 of $5.60 is lower than the lowest data mining geolocation data community linked transmission unit sell queue 5420 lowest selling bucket 5414 of $5.70 so no match occurs because s(t)>b (t) 5429. In some embodiments, many order insertions 5431 or order cancellations 330 may occur for transformed data mining geolocation data community linked transmission units from the data mining geolocation data community linked transmission forward market database server 5424 associated with data mining geolocation data community linked community objects which are series of waypoints 4200.

In some embodiments, the LOB 5400 for transformed data mining geolocation data community linked transmission units may contain many different types of instruction structures and specifications such as limit orders, market orders, market if touched orders, snap market orders, snap mid orders, snap to primary orders, peg to benchmark orders, or adaptive custom orders which are custom customer designed instructions which are all standard order types for anyone skilled in the art of markets. In some embodiments, the LOB 5400 for transformed transmission units may also contain instructions for order times such as good for the day, good till cancelled, immediate or cancel, good till date, day till cancelled or a plurality of additional custom instructions for the timing of the order of the transformed transmission unit in the LOB 5400 that is associate with an data mining geolocation data community linked commute community object 241. In some embodiments, a plurality of additional instructions and specifications may also be unique to each transformed data mining geolocation data community linked transmission unit LOB 5400 such as virtual mode 1611, automobile mode 1630, air mode 1612, autonomous vehicle mode 1613, bike mode 1614, boat mode 1615, bus mode 1616, drone mode 1617, limo mode 1618, motorcycle mode 1619, moped mode 1620, shuttle mode 1612, spaceship mode 1622, subway mode 1623, fish mode 1624, train mode 1625, shark mode 1626 which may combine many modes 1610 or a single mode 1610 for a waypoint commute community object 4200 or waypoint data mining geolocation data community linked sequence 205 to 206 to 207 to 208 of many data mining geolocation data community linked commute communities 4200.

In some embodiments, the LOB 5400 may be assigned to transformed data mining geolocation data community linked transmission unit T-Rex dinosaur mode 1628 that have associated data mining geolocation data community linked commute community objects 4200. In some embodiments, the LOB 5400 for transformed transmission units may be assigned to in person 1629 for an actual in person meeting of a transformed data mining geolocation data community linked transmission unit. In some embodiments, the LOB 5400 may even be assigned to the virtual transformed data mining geolocation data community linked transmission unit 1611 which would be space along a packet moving medium such as a telecom pipeline, satellite telecom or wireless telecom that moves packets of power which are transformed transmission units. In some embodiments, the LOB 5400 may be assigned to a home or business at a certain transmission waypoint 205, 206, 207, 208.

Figure 55:
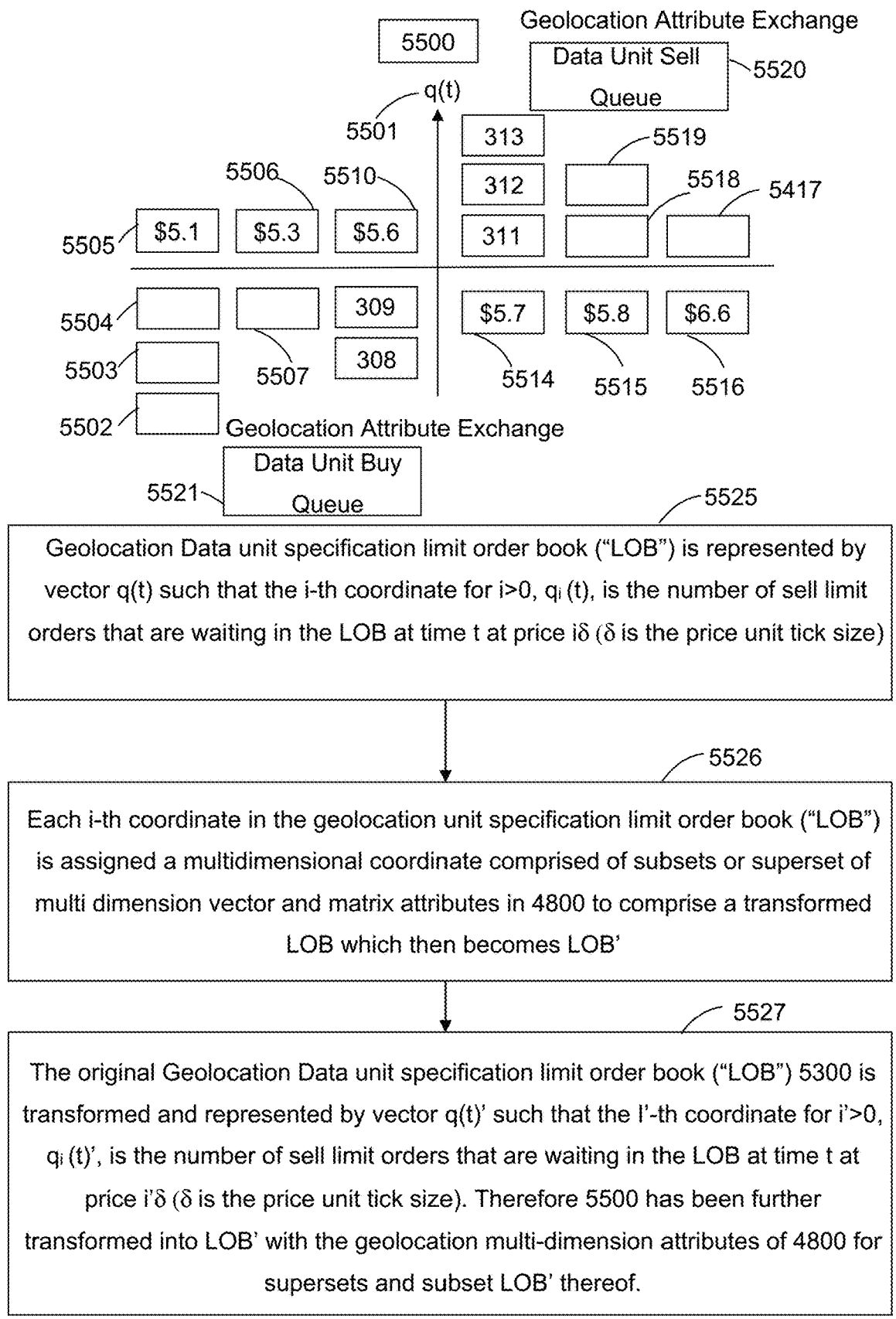
FIG. 55 illustrates an exemplary price time priority queue for a multi-dimension mapping data mining geolocation exchange data objects and construction of a limit order book to organize the value of the objects for the database to exchange to make data superset and subset objects which trade on the price time priority queue for a multi-dimension mapping data mining geolocation exchange.

FIG. 55 illustrates exemplary user price-time priority queue 5500 for transacting or matching transformed geolocation attribute exchange data community linked transmission unit data, participating, transacting and/or trading geolocation attribute exchange data community linked transmission, representing the transformed geolocation attribute exchange data community linked transmission unit value as a homogeneous asset specification or geolocation attribute exchange data as a physical forward commodity security between combinations of virtual hubs over various transmission modes and nodes. In some embodiments, user transformed geolocation attribute exchange data community linked transmission unit(s) or transformed geolocation attribute exchange data community linked transmission unit(s) associated with geolocation attribute exchange data community linked route community objects interface 5300 includes the following instructions, transformations and elements, or a subset or superset thereof:

exemplary transformed geolocation attribute exchange data community linked transmission unit price-time priority sell queue 5520;

exemplary transformed geolocation attribute exchange data community linked transmission unit price-time priority buy queue 5521;

exemplary transformed geolocation attribute exchange data community linked transmission unit price priority bucket 5505 in the transmission unit buy queue of $5.10;

exemplary transformed geolocation attribute exchange data community linked transmission unit price priority bucket 5506 in the transmission unit buy queue of $5.30;

exemplary transformed geolocation attribute exchange data community linked transmission unit price priority bucket 5510 in the transmission unit buy queue of $5.60;

exemplary transformed geolocation attribute exchange data community linked transmission unit price priority bucket 5514 in the transmission unit sell queue of $5.70;

exemplary transformed geolocation attribute exchange data community linked transmission unit price priority bucket 5515 in the transmission unit sell queue of $5.80;

exemplary transformed geolocation attribute exchange data community linked transmission unit price priority bucket 5516 in the transmission unit sell queue of $6.60;

exemplary transformed geolocation attribute exchange data community linked transmission unit price-time priority buy price 5504 in the first time position of the price priority bucket 5505 of $5.10;

exemplary transformed geolocation attribute exchange data community linked transmission unit price-time priority buy price 5503 in the second time position of the price priority bucket 5505 of $5.10;

exemplary transformed geolocation attribute exchange data community linked transmission unit price-time priority buy price 5502 in the third time position of the price priority bucket 5505 of $5.10;

exemplary transformed geolocation attribute exchange data community linked transmission unit price-time priority buy price 5507 in the first time position of the price priority bucket 5506 of $5.30;

exemplary transformed geolocation attribute exchange data community linked transmission unit price-time priority buy price 5509 in the first time position of the price priority bucket 5510 of $5.60;

exemplary transformed geolocation attribute exchange data community linked transmission unit price-time priority buy price 5508 in the second time position of the price priority bucket 5510 of $5.60;

exemplary transformed geolocation attribute exchange data community linked transmission unit price-time priority sell price 5511 in the first time position of the price priority bucket 5514 of $5.70;

exemplary transformed geolocation attribute exchange data community linked transmission unit price-time priority sell price 5512 in the second time position of the price priority bucket 5514 of $5.70;

exemplary transformed geolocation attribute exchange data community linked transmission unit price-time priority sell price 5513 in the third time position of the price priority bucket 5514 of $5.70;

exemplary transformed geolocation attribute exchange data community linked transmission unit price-time priority sell price 5518 in the first time position of the price priority bucket 5515 of $5.80;

exemplary transformed geolocation attribute exchange data community linked transmission unit price-time priority sell price 5519 in the second time position of the price priority bucket 5515 of $5.80;

exemplary transformed geolocation attribute exchange data community linked transmission unit price-time priority sell price 5517 in the first time position of the price priority bucket 5416 of $6.60;

exemplary transformed geolocation attribute exchange data community linked transmission unit price time priority limit order book ("LOB") 5425 is represented by the vector q(t) 5501, such that the i-th coordinate for i>0, $q_i$ (t), is the number of sell limit orders of transformed transmission units that are waiting in the LOB at time t a price iδ (δ is the price unit tick size of the transformed geolocation attribute exchange data community linked transmission unit), the number of buy limit orders for transformed geolocation attribute exchange data community linked transmission units at iδ are represented with a negative sign $q_i$ (t);

exemplary benchmark price 5426 of all sell limit orders at time t are computed as s(t)=s(q(t))=min (min {0<iδ: $q_i$ (t)>0}), if $q_i$ (t) is less than or equal to 0 for all i>0, then s (q (t))=infinity;

exemplary benchmark price 5427 of all buy limit orders at time t are computed as b(t)=b (q (t))=max (max {iδ>0: $q_i$ (t)<0}), if $q_i$ (t) is greater than or equal to 0 for all i>0, then b(q (t))=negative infinity;

exemplary order match 5428 in the transformed geolocation attribute exchange data community linked transmission unit limit order book where s(t)=b(t), which then moves the method and system to the matched transformed geolocation attribute exchange data community linked transmission unit limit order confirmation and delivery process;

exemplary limit order book status of no order match 5429, where s (t)>b (t);

exemplary limit order book i-th $q_i$ (t) element 5430 of LOB is cancelled, remove from queue;

exemplary i-th $q_i$ (t) element is a new transformed geolocation attribute exchange data community linked transmission unit order 5431 in LOB, insert into respective limit order buy queue 5521 or limit order sell queue 5520 with priority of price, then time into the price time priority queues 5500.

In some embodiments, the price-time priority queue 5500 for transformed geolocation attribute exchange data community linked transmission units may be assigned to a geolocation attribute exchange data community linked commute community object 4200 which is a waypoint sequence of transformed geolocation attribute exchange data community linked transmission units. In some embodiments, the price-time priority queue 5500 may be assigned to two waypoints as an geolocation attribute exchange data community linked commute community object 4200 or the price-time prior queue 5500 may be assigned to an geolocation attribute exchange data community linked commute community waypoint object sequence of many waypoints 205 to 206 to 207 to 208 which have been added together to form one continuous geolocation attribute exchange data community linked commute community object 4200 and respective price-time priority queue for transformed geolocation attribute exchange data community linked transmission units through processing instructions from the geolocation attribute exchange data community linked Community Route Processor 216 and geolocation attribute exchange data community linked Transmission Sequence Route Processor 215, 217 via the network(s) 150. In some embodiments, the limit order book 5501 vector may be assigned to a specific date and time for the geolocation attribute exchange data community linked commute community waypoint object which is a forward market price for transformed geolocation attribute exchange data community linked transmission unit(s) 4200 and geolocation attribute exchange data community linked commute community waypoint object(s) 4200. In some embodiments, a specific transformed geolocation attribute exchange data community linked transmission unit price-time priority queue limit buy order 5504 with a specific price stamp bucket 5505 of $5.10, may be cancelled, if the 5504 order is cancelled, the 5503 price-time priority limit order book buy queue price then moves to the higher price-time priority queue position of 5504 and price-time priority price of 5502 moves to position 5503. In some embodiments, the price-time priority limit order sell price 5519 of price-time priority bucket price 5515 of $5.80 may be cancelled, if 5519 price-time priority of the transformed geolocation attribute exchange data community linked transmission unit is cancelled, then order 5517 moves to a higher position in the overall transformed geolocation attribute exchange data community linked transmission queue 5520 even though the limit order book price 5517 remains in the price bucket of 5516 which is $6.60. In some embodiments, price-time priority insertion may occur where a new order is inserted into either the transformed geolocation attribute exchange data community linked transmission unit buy queue 5520 or transformed geolocation attribute exchange data community linked transmission unit sell queue 5521. In some embodiments, by example but not limiting by example, a new price-time limit order for a transformed geolocation attribute exchange data community linked transmission unit may be inserted as a sell order at a price of $5.70 at position 5513 which would then assume order 5512 was also at a price of $5.70 and that order 5512 was placed with a time that was before order 5513 was placed. In the aforementioned example of the price-time order insertion of 5513, price-time orders of 5519, 5518 and 5517 have moved lower in their relative position even though they remain in distinctly different price buckets of 5515 and 5516 respectively as the price-time priority queue 5500, price is first priority, then time stamp in the price-time priority queue 5500 for transformed geolocation attribute exchange data community linked transmission units.

In some embodiments, the lowest selling price s(t) 5426 may equal the highest buying price b(t) 5427, in which case the highest transformed geolocation attribute exchange data community linked transmission unit buy queue price bucket 5510 is equal to the lowest transformed geolocation attribute exchange data community linked transmission unit sell queue 5520 selling bucket price 5514. In the example 5500 of the limit order book 5501, but not limiting by example, the highest transformed geolocation attribute exchange data community linked transmission unit buy price 5510 of $5.60 is lower than the lowest geolocation attribute exchange data community linked transmission unit sell queue 5520 lowest selling bucket 5514 of $5.70 so no match occurs because s(t)>b(t) 5429. In some embodiments, many order insertions 5431 or order cancellations 330 may occur for transformed geolocation attribute exchange data community linked transmission units from the geolocation attribute exchange data community linked transmission forward market database server 5424 associated with geolocation attribute exchange data community linked community objects which are series of waypoints 4200.

In some embodiments, the LOB 5500 for transformed geolocation attribute exchange data community linked transmission units may contain many different types of instruction structures and specifications such as limit orders, market orders, market if touched orders, snap market orders, snap mid orders, snap to primary orders, peg to benchmark orders, or adaptive custom orders which are custom customer designed instructions which are all standard order types for anyone skilled in the art of markets. In some embodiments, the LOB 5500 for transformed transmission units may also contain instructions for order times such as good for the day, good till cancelled, immediate or cancel, good till date, day till cancelled or a plurality of additional custom instructions for the timing of the order of the transformed transmission unit in the LOB 5500 that is associate with an geolocation attribute exchange data community linked commute community object 241. In some embodiments, a plurality of additional instructions and specifications may also be unique to each transformed data mining geolocation data community linked transmission unit LOB 5500 such as virtual mode 1611, automobile mode 1630, air mode 1612, autonomous vehicle mode 1613, bike mode 1614, boat mode 1615, bus mode 1616, drone mode 1617, limo mode 1618, motorcycle mode 1619, moped mode 1620, shuttle mode 1612, spaceship mode 1622, subway mode 1623, fish mode 1624, train mode 1625, shark mode 1626 which may combine many modes 1610 or a single mode 1610 for a waypoint commute community object 4200 or waypoint data mining geolocation data community linked sequence 205 to 206 to 207 to 208 of many data mining geolocation data community linked commute communities 4200.

In some embodiments, the LOB 5500 may be assigned to transformed data mining geolocation data community linked transmission unit T-Rex dinosaur mode 1628 that have associated data mining geolocation data community linked commute community objects 4200. In some embodiments, the LOB 5500 for transformed transmission units may be assigned to in person 1629 for an actual in person meeting of a transformed data mining geolocation data community linked transmission unit. In some embodiments, the LOB 5500 may even be assigned to the virtual transformed data mining geolocation data community linked transmission unit 1611 which would be space along a packet moving medium such as a telecom pipeline, satellite telecom or wireless telecom that moves packets of power which are transformed transmission units. In some embodiments, the LOB 5500 may be assigned to a home or business at a certain transmission waypoint 205, 206, 207, 208. In some embodiments, the geolocation attribute exchange data may be transformed from a specific LOB 5525 and then assigned a transpose or cross product 4800 matrix 4812, 4813 which may transform LOB 5525 into LOB' 5527 with new LOB' contract pricing.

Figure 56:
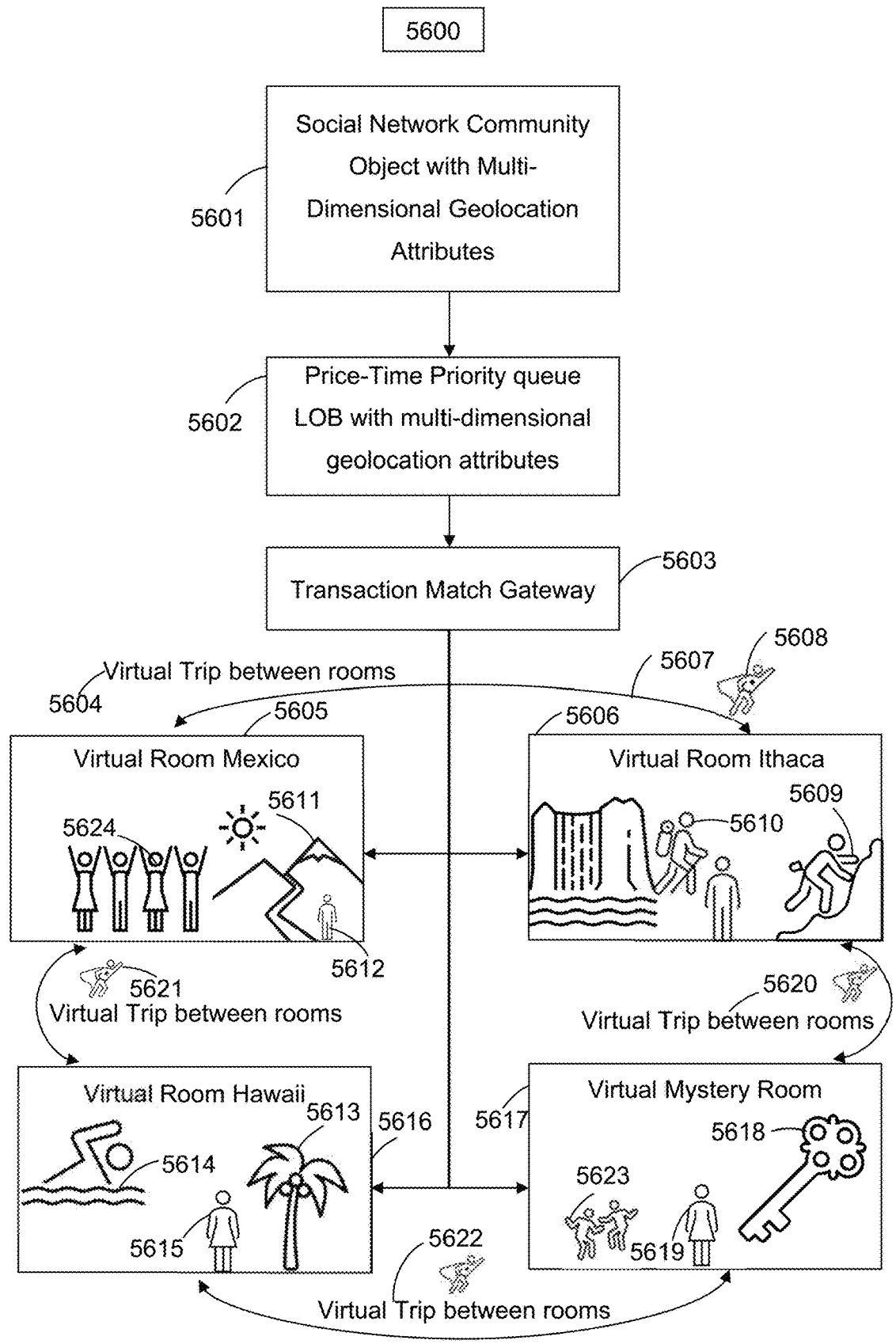
FIG. 56 illustrates an exemplary price time priority queue for a multi-dimension mapping data mining geolocation exchange data object with a secondary matching gateway to construct a plurality of virtual party rooms for the virtual travel experience and trip between rooms with a plurality of virtual object hosts and social network users as actual or virtual or augmented or mixed reality objects.

FIG. 56 illustrates an exemplary social network structure object 5601 with associated price time priority queue for multi dimension geolocation attribute data 5602 which serves as a transaction gateway 5603 to a plurality of party rooms 5605, 5606, 5616, 5617 with virtual trips 5607, 5621, 5622, 5620 between the rooms. In some embodiments, a user 110 or plurality of users of the network 150 may use the social network transaction gateway 5603 for virtual party rooms associated with the price-time priority queue exchange data 5602. In some embodiments, the plurality of users 5604, 5612 may commence the virtual experience in Mexico City 5605 with mountain scenery in the virtual background 5611. In some embodiments, the plurality of social network users may or may not know each other depending on the configuration settings. In some embodiments, the plurality of users 5604 may depart individually 5612 or collectively on a virtual journey 5621 to the Hawaii virtual room 5616 which may contain virtual palm trees 5616, virtual water 5616 and additional virtual social network members 5615. In some embodiments, the plurality of users 5624 may further continue on their single stop or multi-stop virtual journey to a mystery room 5617 which is to be unlocked 5618 with additional social network members 5623 and 5619. In some embodiments, a plurality of social network members may continue to extend their journey to a virtual party room in Ithaca, New York for hiking 5606 where a plurality of waterfalls and hiking 5609 and hiking network member users 5610 may be present. In some embodiments, network users 5610, 5623, 5614, 5624 may travel in different orders between the virtual party rooms on virtual journeys which may span many virtual transportation modes such as eagle view or drone view or boat view or train view as they import a plurality of virtual backgrounds through the multi-dimension map tile database exchange 160, 5602.

Figure 57:
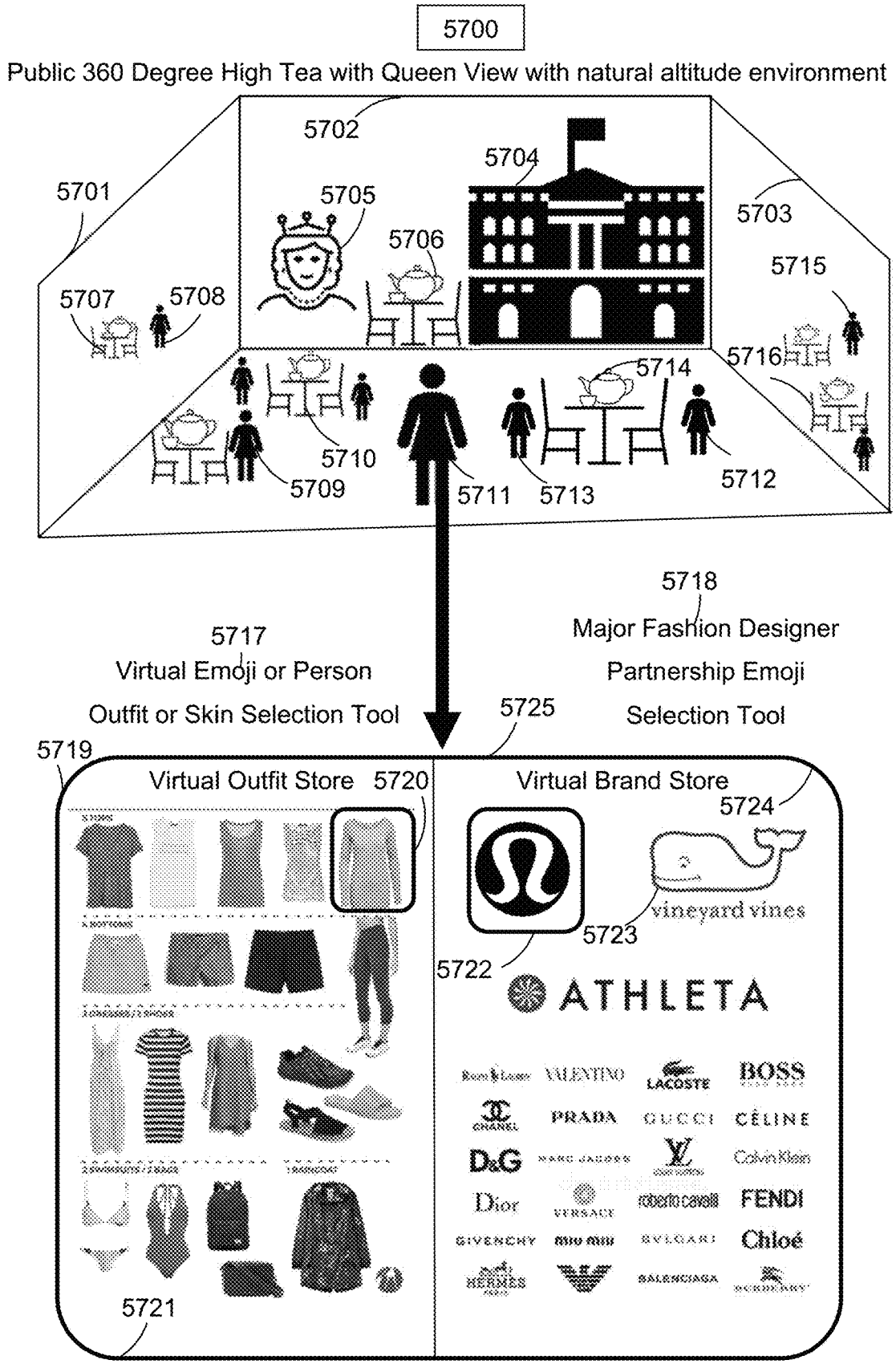
FIG. 57 illustrates an exemplary price time priority queue for a multi-dimension mapping data mining geolocation exchange data object with a secondary matching gateway to construct a plurality of virtual party rooms for the virtual travel experience and trip between rooms with a plurality of virtual object hosts and social network users as actual or virtual or augmented or mixed reality objects with associated skins and outfits for social network members to shop for virtual outfits and skins.

FIG. 57 illustrates an exemplary public 360' high tea with the Queen view 5700 with natural altitude environment coupled with a virtual emoji or person outfit or skin selection tool 5719 associated with many virtual store brands 5724. In some embodiments, the virtual room 164 rendered by the rendering engine 163 may host virtual network members 5708, 5709, 5711, 5713, 5712, 5715 to select a plurality of virtual outfits 5720 in a virtual store 5721 through the virtual selection tool graphical user interface 5719 for the emoji or virtual real life render 5717 of the network member which may select a plurality of major brand stores or major brands 5718 such as Athleta or LuLu 5722 or vineyard vines 5723 or a plurality of other names which may then adjust the store selection in the left side view 5721. In some embodiments the virtual room may render with multiple screens 5701, 2702, 5703 or single screen view 5702 which such background virtual elements as Buckingham palace 5704 or virtual tea 5706, 5716, 5707, 5710, 5714 with a plurality of network members 5708, 5709, 5711, 5713, 5712, 5715 or the Queen of England 5705 where users may know each other or they may be unknown to each other and they may talk or decide not to talk based on a plurality of virtual configuration settings. In some embodiments, users 5711 may change virtual outfits 5720 from the virtual store 5719 during a virtual meeting 5719. In some embodiments, user may have selected similar or matching outfits and users may decide to go shopping during the virtual meeting so that they are wearing unique outfits 5719. In some embodiments, virtual stores may upload multi dimension geolocation data which contains clothing dimensions for virtual appearance or emoji appearance to increase the variety and to transform the experience via the multi dimension geolocation data exchange method 5300, 5400, 5500.

Figure 58:
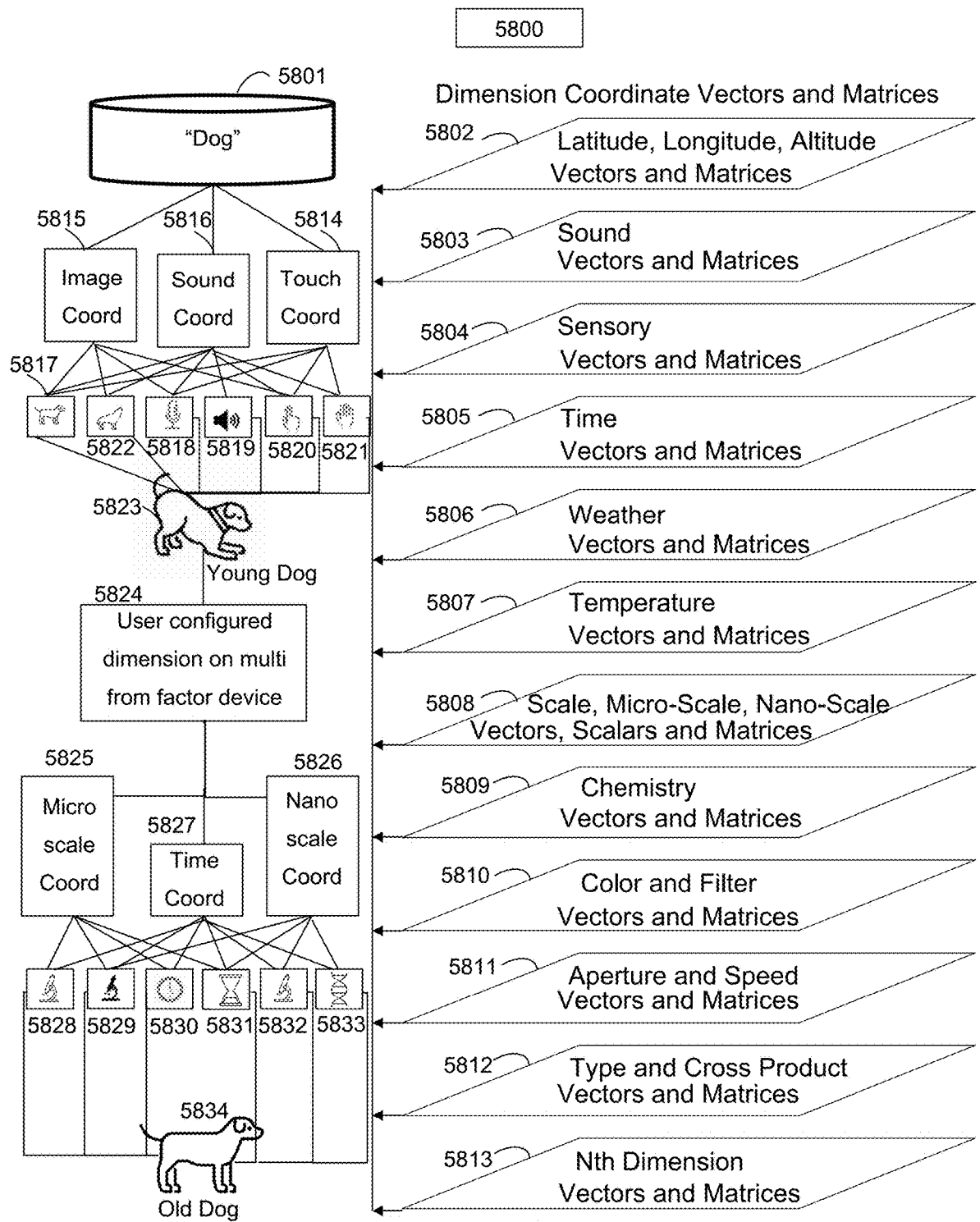
FIG. 58 illustrates an exemplary model where the multi dimension object coordinates optimize objective function weights from a plurality of multi dimension objects to optimize the object output utility function use case.

FIG. 58 illustrates an exemplary multi dimension coordinate object database with weight allocation of multi dimensional coordinate objects based on maximizing the expected value of the user objective function adjusting for variance and holding the multi dimension coordinate object portfolio variance at a minimum. The deep learning processor 4816 may call proxy data 4814 from a sound vector 5803 for the noise of dog paws walking in a forest with similar probability weights from actual dimension data 5801 that may link to the movement of the accelerometer 1100 in the CPU device 120, 6100. In some embodiments, the multi-dimension coordinate object map tile database may store dimension and vector coordinate data for latitude, longitude, altitude vectors and matrices 5802, sound vectors and matrices 5803, sensory vectors and matrices 5804, time or history vectors and matrices 5805, weather vectors and matrices 5806, temperature vectors and matrices 5807, scale, micro-scale, nano-scale vectors, scalars, and matrices 5808, chemistry vectors and matrices 5809, color and filter vectors and matrices 5810, aperture and speed vectors and matrices 5811, product type and cross product combination vectors and matrices 5812 and nth dimension vectors and matrices 5813. While most machine learning processes three dimensions or four dimensions such as color channel or color depth, height, width, and sample identification measured and stored as coordinates, the multi-dimension map-tile database also stores many additional dimensions such as longitude, latitude, altitude, sound, sensory feel, sensory smell, sensory touch, sensory electromagnetic waves, time dimension, time history dimension, time style dimension, time growth dimension, weather dimension, temperatures dimension, scale of picture dimension, microscopic scale dimension, nano-scale dimension, chemistry state dimension, chemistry feeling dimension, color depth dimension, filter color dimension, lens focus aperture dimension, lens speed dimension, type dimension, cross product blend dimension of multiple dimensions blended together to make a new dimension, or a yet to be defined nth dimension, in some embodiments, tensor storage vectors and matrices may exceed traditional three, four and five dimension tensors. In some embodiments, the classification engine and machine learning missing or change multi dimension coordinate object proxy clustering CPU or GPU 4816 and well as multi dimension coordinate object CPU or GPU rendering engine 4815 may optimize across dimensions to process by example but not limiting by example a dog 5801 which then may be segmented into an multi dimension image coordinate object 5815 and multi dimension sound coordinate object 5816 and multi dimension touch coordinate object 5814 which then may be optimized to obtain the highest multi dimension coordinate object utility function subject to a target multi-dimension coordinate object variance, or equivalently to minimize the multi dimension coordinate object variance subject to a target expected utility function. In some embodiments, under these assumptions, a user may assume their multi dimension coordinate object portfolio is the highest utility for a target variance of objects. In some embodiments, these optimization formulas are explained in detail from drawings 6400 to 7900, however, they may be represented as two equivalent portfolios of multi dimension coordinate objects:

$$\max_x \mu_p = X'\mu \text{ s.t.} \quad \text{or} \quad \min_x \sigma_{p,x} = X'\Sigma X \text{ s.t.}$$
$$\sigma_p^2 = X'\Sigma x = \sigma_{p,0}^2 \text{ and } X'1 = 1 \quad \mu_p = X'\mu = \mu_{p,0} \text{ and } X'1 = 1$$

In some embodiments, the equations in lines 00403 and 00404 above, let $\sigma_{p,0}^2$ denote a target level of variance for the equations on the left side of the page with the constrained maximization problem of maximizing the user multi dimension coordinate object portfolio utility for a target level of object variance. Or in other exemplary embodiments, the users problem may denote the objective to minimize risk or variance subject to a target level of multi dimension coordinate object portfolio utility such that we let $\mu_{p,0}$ to denote a target expected level of multi dimension coordinate object portfolio utility. In some embodiments, the component multi dimension coordinate objects may be broken down into further transformed subsets of objects as a object images 5817, 5822 and sound objects 5818, 5819 and sensory or touch coordinates objects 5820, 5821 which may then be optimized to render the object, Young Dog 5823. In some embodiments, the user may further configure the rendered object with multi dimension coordinate objects for time to make the object older or younger which would then re-iterate or re-optimize over the objects with additional multi dimension coordinate object parameters such as micro scalar coordinates 5825, time or age scalar coordinate objects 5827 and nano scalar coordinate objects 5826 which then may be optimized to minimize portfolio object variance for a given target utility for the user over a plurality of weighted objects such as micro scalars 5828, 5829 or time scalar coordinate objects 5830, 5831 or nano scalar coordinate objects 5832, 5833 to render the multi dimension coordinate portfolio object of an old dog 5834. In some embodiments, the user may adjust the time scalar coordinate 5827 of the object which would then boost the weight of the time scalar multi dimension coordinate object 5827, 5830, 5831 to hold the equation of optimizing user multi dimension coordinate object portfolio utility. In the aforementioned embodiment, the adjusted weights of the multi dimension coordinate object portfolio resulted in the transformation from the young dog multi dimension coordinate object portfolio 5823 to the old dog multi dimension coordinate object portfolio 5834.

Figure 59:
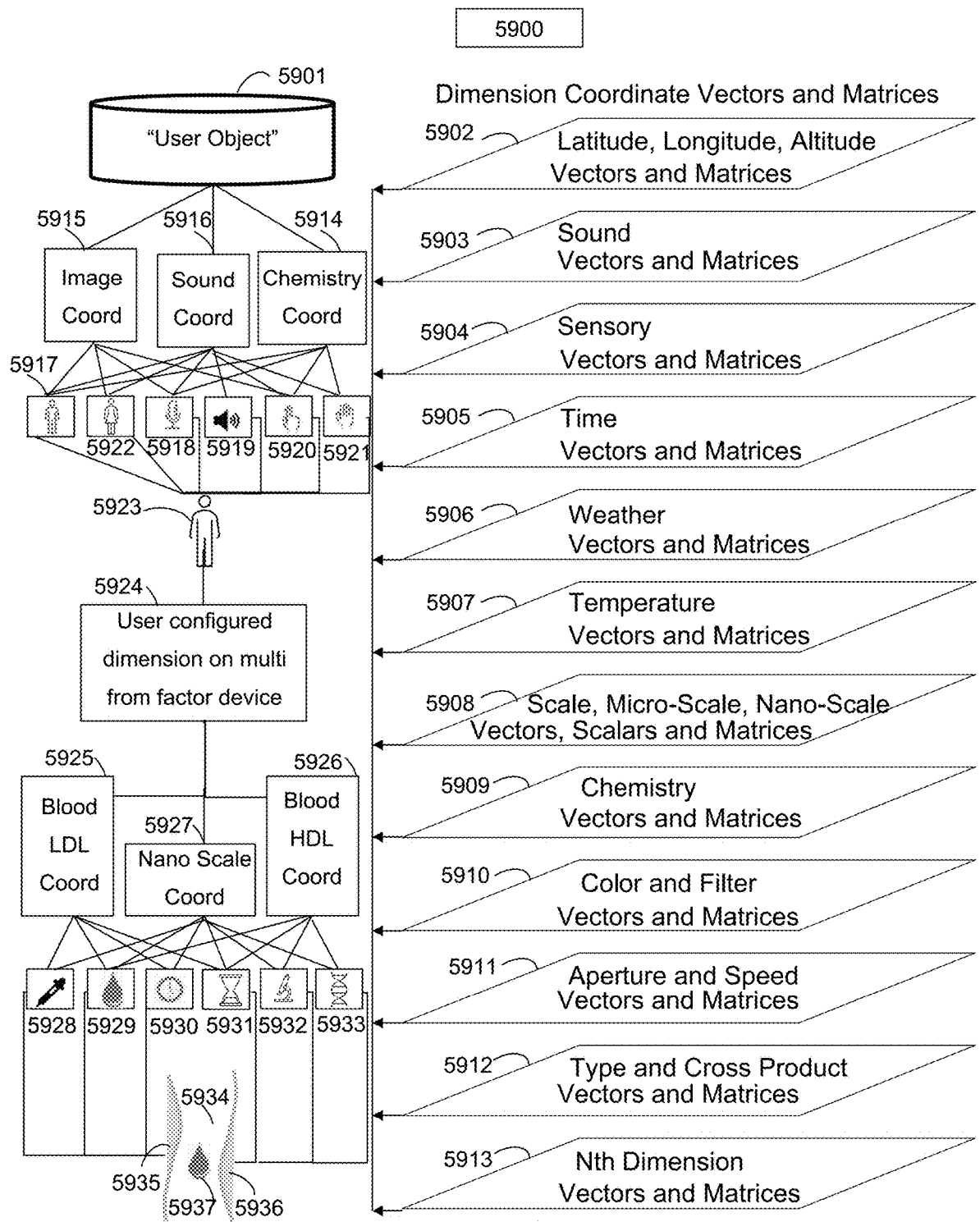
FIG. 59 illustrates an exemplary model where the multi dimension object coordinates optimize objective function weights from a plurality of multi dimension objects to optimize the object output utility function use case.

FIG. 59 illustrates an exemplary multi dimension coordinate object database with weight allocation of multi dimensional coordinate objects based on maximizing the expected value of the user objective function adjusting for variance and holding the multi dimension coordinate object portfolio variance at a minimum. The deep learning processor 4816 may call proxy data 4814 from a sound vector 5903 for the voice of a human user walking in a forest with similar probability weights from actual dimension data 5901 that may link to the movement of the accelerometer 1100 in the CPU device 120, 6100. In some embodiments, the multi-dimension coordinate object map tile database may store dimension and vector coordinate data for latitude, longitude, altitude vectors and matrices 5902, sound vectors and matrices 5903, sensory vectors and matrices 5904, time or history vectors and matrices 5905, weather vectors and matrices 5906, temperature vectors and matrices 5907, scale, micro-scale, nano-scale vectors, scalars, and matrices 5908, chemistry vectors and matrices 5909, color and filter vectors and matrices 5910, aperture and speed vectors and matrices 5911, product type and cross product combination vectors and matrices 5912 and nth dimension vectors and matrices 5913. While most machine learning processes three dimensions or four dimensions such as color channel or color depth, height, width, and sample identification measured and stored as coordinates, the multi-dimension map-tile database also stores many additional dimensions such as longitude, latitude, altitude, sound, sensory feel, sensory smell, sensory touch, sensory electromagnetic waves, time dimension, time history dimension, time style dimension, time growth dimension, weather dimension, temperatures dimension, scale of picture dimension, microscopic scale dimension, nano-scale dimension, chemistry state dimension, chemistry feeling dimension, color depth dimension, filter color dimension, lens focus aperture dimension, lens speed dimension, type dimension, cross product blend dimension of multiple dimensions blended together to make a new dimension, or a yet to be defined nth dimension, in some embodiments, tensor storage vectors and matrices may exceed traditional three, four and five dimension tensors. In some embodiments, the classification engine and machine learning missing or change multi dimension coordinate object proxy clustering CPU or GPU 4816 and well as multi dimension coordinate object CPU or GPU rendering engine 4815 may optimize across dimensions to process by example but not limiting by example, a user 5901 which then may be segmented into an multi dimension image coordinate object 5915 and multi dimension sound coordinate object 5916 and multi dimension touch coordinate object 5914 which then may be optimized to obtain the highest multi dimension coordinate object utility function subject to a target multi-dimension coordinate object variance, or equivalently to minimize the multi dimension coordinate object variance subject to a target expected utility function. In some embodiments, under these assumptions, a user may assume their multi dimension coordinate object portfolio is the highest utility for a target variance of objects. In some embodiments, these optimization formulas are explained in detail from drawings 6400 to 7900, however, they may be represented as two equivalent portfolios of multi dimension coordinate objects:

$$\max_x \mu_p = X'\mu \text{ s.t.} \quad \text{or} \quad \min_x \sigma_{p,x} = X'\Sigma X \text{ s.t.}$$
$$\sigma_p^2 = X'\Sigma X = \sigma_{p,0}^2 \text{ and } X'1 = 1 \quad \mu_p = X'\mu = \mu_{p,0} \text{ and } X'1 = 1$$

In some embodiments, the equations in lines 00407 and 00408 above, let $\sigma_{p,0}^2$ denote a target level of variance for the equations on the left side of the page with the constrained maximization problem of maximizing the user multi dimension coordinate object portfolio utility for a target level of object variance. Or in other exemplary embodiments, the users problem may denote the objective to minimize risk or variance subject to a target level of multi dimension coordinate object portfolio utility such that we let $\mu_{p,0}$ to denote a target expected level of multi dimension coordinate object portfolio utility. In some embodiments, the component multi dimension coordinate objects may be broken down into further transformed subsets of objects as an object images 5917, 5922 and sound objects 5918, 5919 and chemistry coordinates objects 5920, 5921 which may then be optimized to render the object, image of a user 5923. In some embodiments, the user may further configure the rendered object with multi dimension coordinate objects for blood HDL coordinate 5926 or LDL coordinate 5925 to render the joint probability image of a users 5923 atherosclerosis heart disease image 5934 or artery plaque build up 5935, 5936 at micro scale 5825, 5828, 5829 or nano scale 5927, 5930, 5931 which would then re-iterate or re-optimize over the objects with additional multi dimension coordinate object parameters such as micro scalar coordinates 5825, time or age scalar coordinate objects 5827 to see the disease progression and associated timeline towards heart attack or stroke and nano scalar coordinate objects 5826 which then may be optimized to minimize portfolio object variance for a given target utility for the user over a plurality of weighted objects such as micro scalars 5828, 5829 or time scalar coordinate objects 5830, 5831 or nano scalar coordinate objects 5832, 5833 to render the multi dimension coordinate portfolio object of an atherosclerosis heart condition or level of cardiovascular disease 5934, 5935, 5937, 5936. In some embodiments, the user may adjust the nano scalar coordinate 5927 of the object which would then boost the weight of the nano scalar multi dimension coordinate object 5927, 5930, 5931 to hold the equation of optimizing user multi dimension coordinate object portfolio utility. In the aforementioned embodiment, the adjusted weights of the multi dimension coordinate object portfolio resulted in the transformation from the standard user image multi dimension coordinate object portfolio 5923 to the internal biological and chemistry multi dimension coordinate object portfolio 5934 image. The aforementioned joint probability implementation of multi-dimensional data may allow a user to see heart disease or atherosclerosis build up without invasive procedures. In some embodiments, the multi dimensional coordinate object may also use the time scalar object 5827 concurrently with a chemistry scalar 5914 to increase multi dimension coordinate object portfolio weights to show the effects of a dietary reversal of atherosclerosis and the time and dietary change that would reverse the condition. In some embodiments, the multi dimensional coordinate object may contain nth dimension vectors and matrices 5913 such as insurance correlations and covariance effects on insurance pricing relative to setting the user multiple dimension coordinate object portfolio utility function. In yet other embodiments, the nth dimension 5913 may include the anatomy of the human body such that the rendering engine 4815 may utilize the multi dimension coordinate object optimization model 6400 thru 7900 to let a user explain a chemistry dimension object condition in the body through an anatomy map in the nth dimension 4813 of the multi dimension coordinate object portfolio by increasing appropriate object weights.

Figure 60:
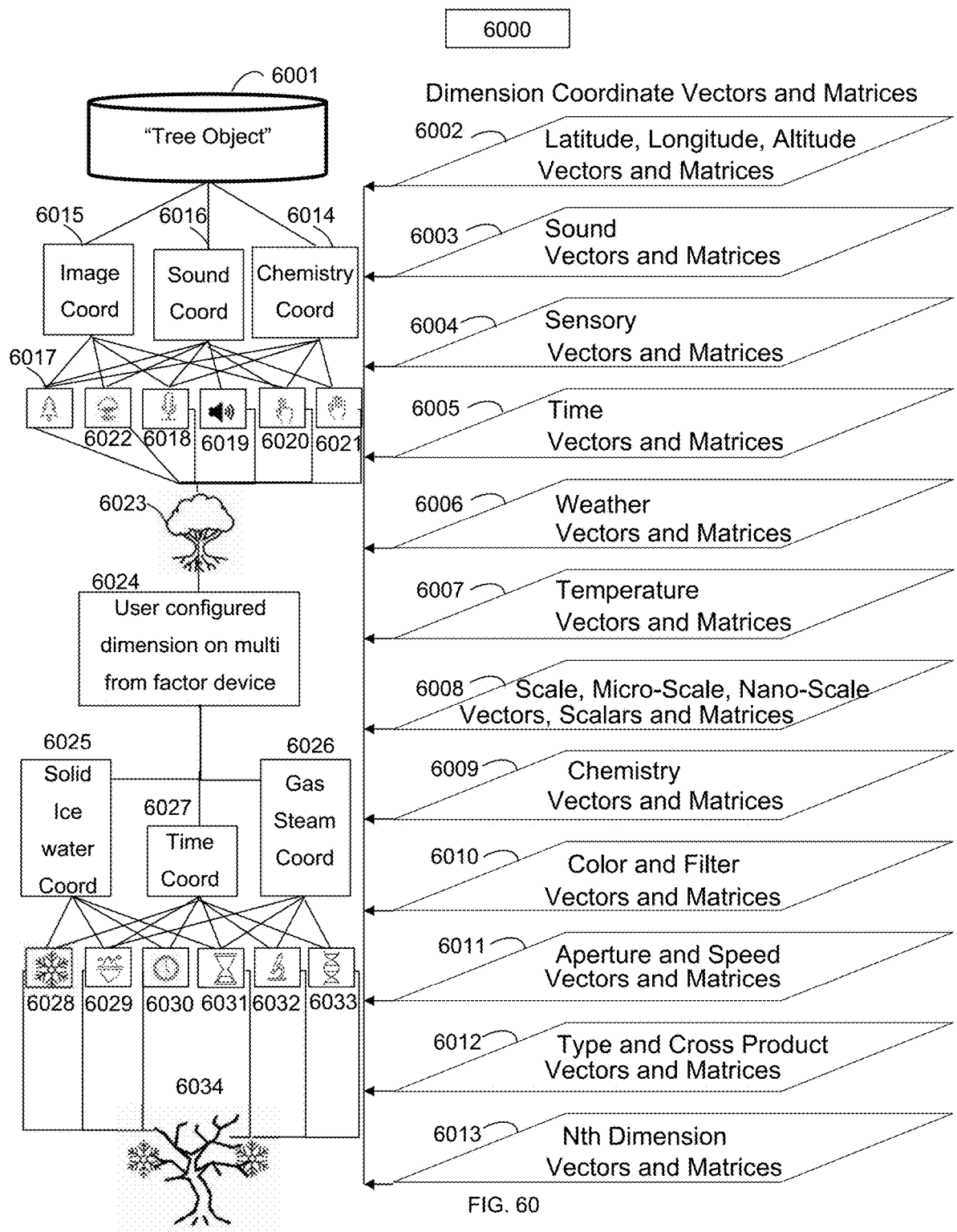
FIG. 60 illustrates an exemplary model where the multi dimension object coordinates optimize objective function weights from a plurality of multi dimension objects to optimize the object output utility function use case.

FIG. 60 illustrates an exemplary multi dimension coordinate object database with weight allocation of multi dimensional coordinate objects based on maximizing the expected value of the user objective function adjusting for variance and holding the multi dimension coordinate object portfolio variance at a minimum. The deep learning processor 4816 may call proxy data 4814 from a chemistry vector 6014 for the level of chloroplasts or chlorophyll with similar probability weights from actual dimension data 6001 that may link to the movement of the accelerometer 1100 in the CPU device 120, 6100. In some embodiments, the multi-dimension coordinate object map tile database may store dimension and vector coordinate data for latitude, longitude, altitude vectors and matrices 6002, sound vectors and matrices 6003, sensory vectors and matrices 6004, time or history vectors and matrices 6005, weather vectors and matrices 6006, temperature vectors and matrices 6007, scale, microscale, nano-scale vectors, scalars, and matrices 6008, chemistry vectors and matrices 6009, color and filter vectors and matrices 6010, aperture and speed vectors and matrices 6011, product type and cross product combination vectors and matrices 6012 and nth dimension vectors and matrices 6013. While most machine learning processes three dimensions or four dimensions such as color channel or color depth, height, width, and sample identification measured and stored as coordinates, the multi-dimension map-tile database also stores many additional dimensions such as longitude, latitude, altitude, sound, sensory feel, sensory smell, sensory touch, sensory electromagnetic waves, time dimension, time history dimension, time style dimension, time growth dimension, weather dimension, temperatures dimension, scale of picture dimension, microscopic scale dimension, nano-scale dimension, chemistry state dimension, chemistry feeling dimension, color depth dimension, filter color dimension, lens focus aperture dimension, lens speed dimension, type dimension, cross product blend dimension of multiple dimensions blended together to make a new dimension, or a yet to be defined nth dimension, in some embodiments, tensor storage vectors and matrices may exceed traditional three, four and five dimension tensors. In some embodiments, the classification engine and machine learning missing or change multi dimension coordinate object proxy clustering CPU or GPU 4816 and well as multi dimension coordinate object CPU or GPU rendering engine 4815 may optimize across dimensions to process by example but not limiting by example a tree 6001 which then may be segmented into an multi dimension image coordinate object 6015 and multi dimension sound coordinate object 6016 and multi dimension chemistry object 6014 which then may be optimized to obtain the highest multi dimension coordinate object utility function subject to a target multi-dimension coordinate object variance, or equivalently to minimize the multi dimension coordinate object variance subject to a target expected utility function. In some embodiments, under these assumptions, a user may assume their multi dimension coordinate object portfolio is the highest utility for a target variance of objects. In some embodiments, these optimization formulas are explained in detail from drawings 6400 to 7900, however, they may be represented as two equivalent portfolios of multi dimension coordinate objects:

$$\max_x \mu_p = X'\mu \text{ s.t.} \qquad \text{or} \qquad \min_x \sigma_{p,x} = X'\Sigma X \text{ s.t.}$$
$$\sigma_p^2 = X'\Sigma x = \sigma_{p,0}^2 \text{ and } X'1 = 1 \qquad \mu_p = X'\mu = \mu_{p,0} \text{ and } X'1 = 1$$

In some embodiments, the equations in lines 00411 and 00412 above, let $\sigma_{p,0}^2$ denote a target level of variance for the equations on the left side of the page with the constrained maximization problem of maximizing the user multi dimension coordinate object portfolio utility for a target level of object variance. Or in other exemplary embodiments, the users problem may denote the objective to minimize risk or variance subject to a target level of multi dimension coordinate object portfolio utility such that we let $\mu_{p,0}$ to denote a target expected level of multi dimension coordinate object portfolio utility. In some embodiments, the component multi dimension coordinate objects may be broken down into further transformed subsets of objects as an object images 6017, 6022 and sound objects 6018, 6019 and sensory or touch coordinates objects 6020, 6021 which may then be optimized to render the object, live oak tree 6023. In some embodiments, the user may further configure the rendered object with multi dimension coordinate objects for time to make the object change season or temperature 6007 or season or chemistry 6009 coordinate which would then re-iterate or re-optimize over the objects with additional multi dimension coordinate object parameters such as chemistry state of water as solid in the form of ice or snow coordinates 6025, time or age scalar coordinate objects 6027 and water as steam chemistry coordinate objects 6026 which then may be optimized to minimize portfolio object variance for a given target utility for the user over a plurality of weighted objects such as chemistry scalars 6028, 6029 or time scalar coordinate objects 6030, 6031 or water as steam scalar coordinate objects 6032, 6033 to render the multi dimension coordinate portfolio object of a tree without leaves 6034. In some embodiments, the user may adjust the ice or snow chemistry scalar coordinate 6025 of the object which would then boost the weight of the snow or ice scalar multi dimension coordinate object 6028, 6029, 6026 to hold the equation of optimizing user multi dimension coordinate object portfolio utility. In the aforementioned embodiment, the adjusted weights of the multi dimension coordinate object portfolio resulted in the transformation from the live oak tree multi dimension coordinate object portfolio 6023 to the live oak tree with no leaves and snow multi dimension coordinate object portfolio 6034.

Figure 61:
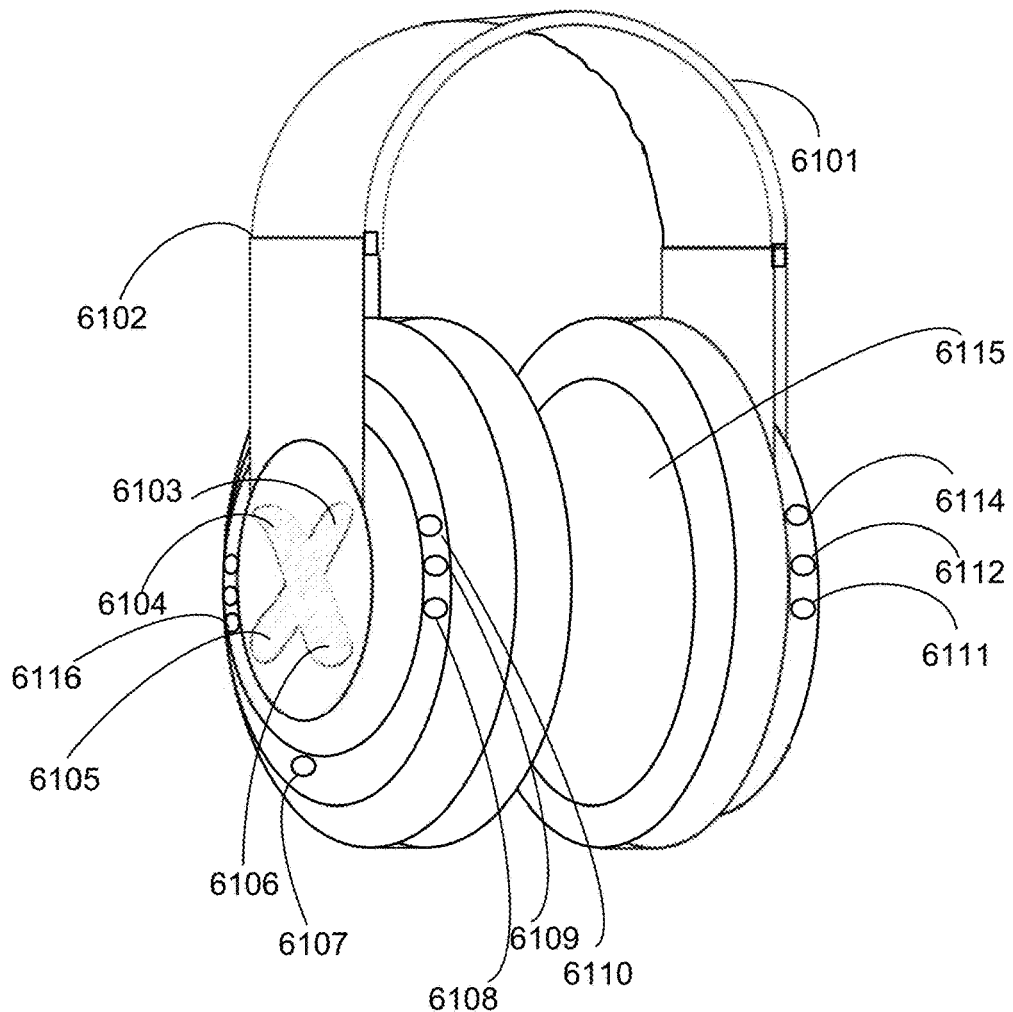
FIG. 61 illustrates an exemplary multi function mechanotransduction device for converting multi dimension objects into a plurality of multi dimension sound and audio objects.

FIG. 61 illustrates an exemplary multi function device for mechanotransduction transformation from image multi dimension coordinate objects to sound or audio multi dimension coordinate objects. In some embodiments, the left side 0.5× lens 6108, the 1× lens 6109 and the 2× lens 6110 work together to capture multiple depth dimensions from the same position. In some embodiments, the right side 0.5× projection lens 6111, the 1× projection lens 6112 and the 2× projection lens 6112 work together to project multiple depth dimensions towards a plurality of projection surfaces, including but not limited to eye glasses, sun glasses, contacts, screens, wifi enabled screens, projection screen surfaces, hologram projection surfaces and multi dimension coordinate image projection surfaces. In some embodiments, the rear view left side 0.5× lens 6116, the higher 1× lens 6116 and the highest 2× lens 6116 work together to capture multiple depth dimensions so that the user may capture multi dimension coordinate objects without fully turning their head with greater efficiency factors. In some embodiments, the band over the head 6101 may connect the multiple camera dimension capturing devices and have an adjustment feature for larger heads 6102. In some embodiments, the body and ear cover 6115 may contain all the component parts of the multi function CPU or GPU in 1100. In some embodiments, the "X" 6104 may press as a toggle between applications, functions or features. In some embodiments, "X" 6106 may allow for an increase in a multi dimension coordinate object whereas an "X" 6105 may allow for a decrease in a multi dimension coordinate object. In some embodiments, double tap of 6104 may allow for power on whereas triple tap of 6104 may allow for power off. In some embodiments, 6103 may allow for selection of a multi dimension coordinate object. In some embodiments, the microphone 6107 may be present or as a component of 6115 as rendered in 1100. Standard headphones are deficient of taking pictures or images or recording which is a major limitation in the device as cameras in headphones as a multi function device allow for hands free image capture, image processing for multi-dimension coordinates for visually impaired users or blind users and multi dimension coordinate object transformation into a multi dimension coordinate object database 4801. The multi function device 6100 solves the aforementioned deficiencies as a component of the multi dimension coordinate object system.

Figure 62:
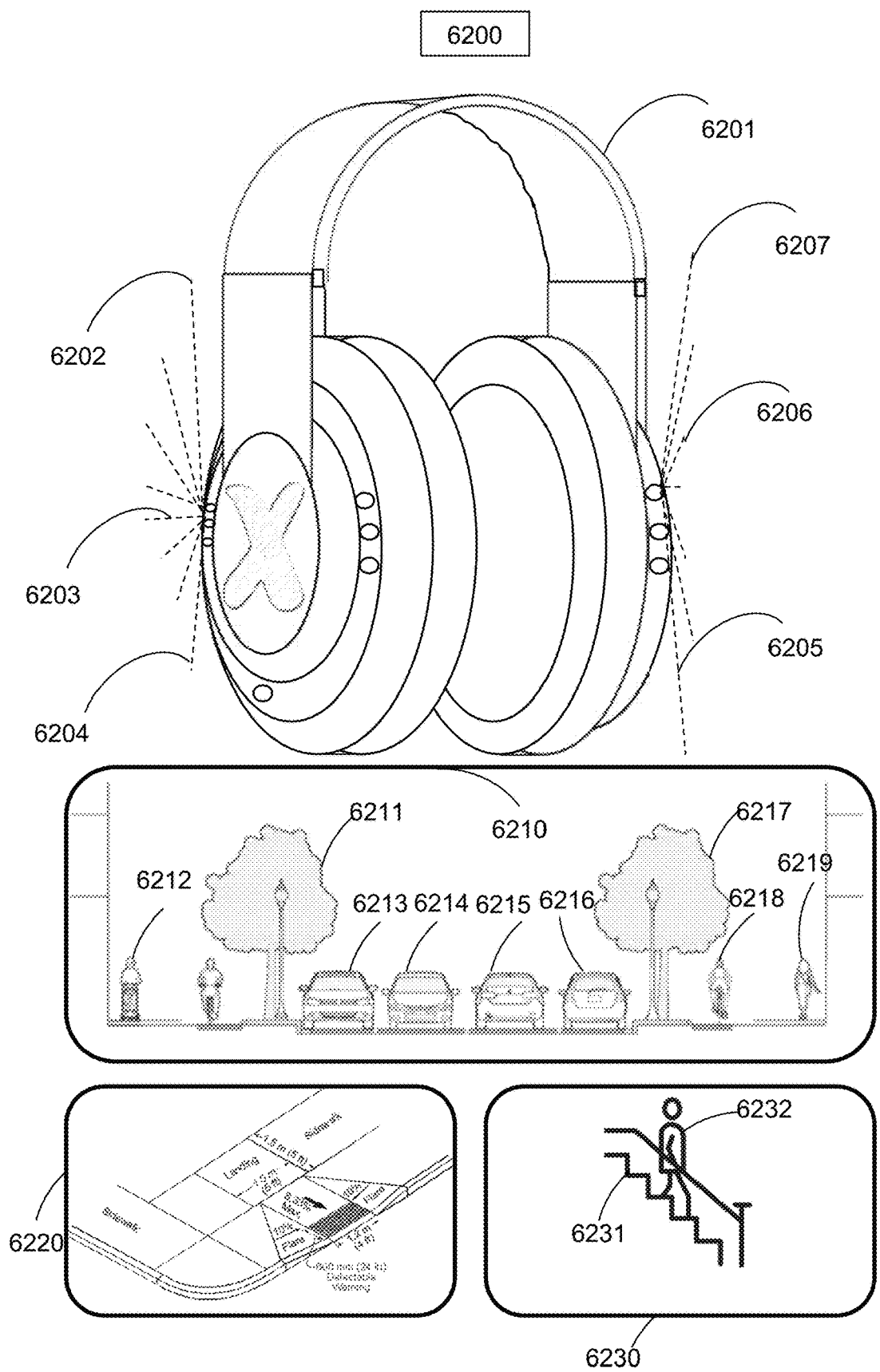
FIG. 62 illustrates an exemplary multi function mechanotransduction device for converting multi dimension objects into a plurality of multi dimension sound and audio objects.

FIG. 62 illustrates an exemplary multi function device 6200 to process and transform multi dimension image objects with multi dimension coordinate object cameras 6202, 6203, 6204 which may render multi dimension coordinate object projection 6207, 6206, 6205. In some embodiments, the multi function mechanotransduction multi dimension coordinate object device 6201 may capture images 6210 such as a person with a child in a stroller 6212, oak trees 6211, 6217, vehicles traveling on the road 6214, 6215 or parked 6213, 6216, bikers on bicycles 6218, pedestrians 6219 or a plurality of other multi dimension coordinate objects through use of the cameras 6116, 6108, 6109, 6110 or microphone or other CPU and GPU components to capture data 1100. In some embodiments, the multi function device 6201 may transform through the optimization model the image of a sidewalk step dimension 6220 which may then be converted or optimized into a multi dimension coordinate object instruction of "step up 0.5 feet as curb is coming in your next step" or "side walk is flat" or a plurality of other instructions from the processing of the multi dimension coordinate object from an image to a audio or sound command. In some embodiments, the multi function device 6201 may capture stairs 6231 and estimate the number of stairs for a user 6232 for walking in the dark at night.

Figure 63:
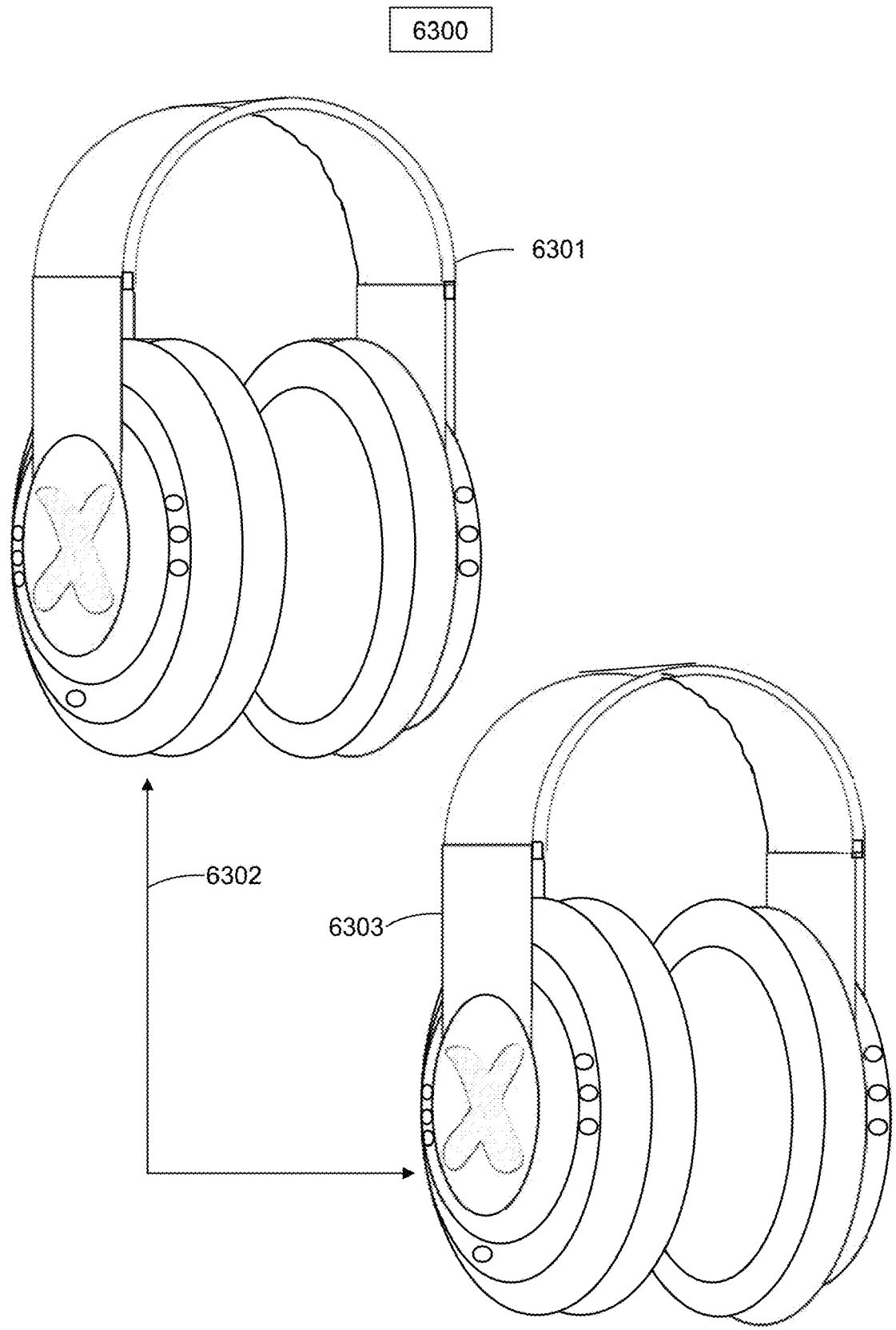
FIG. 63 illustrates an exemplary multi function mechanotransduction device for converting multi dimension objects into a plurality of multi dimension sound and audio objects.

FIG. 63 illustrates an exemplary pair of multi dimension coordinate object multi function devices 6301, 6303 which may translate one multi dimension coordinate objects from one dimension to another multi dimension coordinate object or portfolio of multi dimension coordinate objects. In some embodiments, the devices may link through blue tooth or wifi connections 6302.

FIGS. 64A and 64B illustrates an exemplary representative multi dimension coordinate object portfolio with heterogeneous expectations. Traditionally the buyer and seller have very different information or in another words, the buyer and seller have asymmetric information. In an exemplary scenario, the seller or producer or map data knows the attributes whereas the buyer or user may make a purchase without knowing the attributes of the map which is a large deficiency in current mapping software and hardware. Surely the buyer or user can do research on all the mapped destinations, but generally the buyer does not have the same resources as the producer or seller or map provider to understand the effects of the map attributes on the map rendering which may leave many deficiencies in the map. Incrementally, the seller may collect incremental information from the buyer without the buyers full consent or knowledge. The implementation of the method considers that it is very costly for buyers and sellers of mapping data or multi dimensional coordinate object data to have homogeneous information or even to reduce heterogeneous information so that people make less sub-optimal data choices as consumers or that providers offer the wrong types of data to their primary demographics and customers. The implementation of the method has provided a solution for these problems and has greatly reduced or nearly eliminated the problem of heterogeneous information on data relative to limited portions of multi dimension coordinate object data. The implementation of the method allows both the user and the data provider to speak the same language of data multi dimension coordinate objects for the multi dimension coordinate object utility function preferences. The implementation of the method allows both the user and data provider to speak the same language of data for the respective sound, sensory, image, latitude, longitude, altitude, time, weather, scale, micro scale, nano scale, chemistry, color, aperture, lens speed, type, cross product and additional nth dimension preferences. Invasive medical procedures and travel and even meetings have historically have been costly which add to the problem of heterogeneous information between provider and consumer. The method and system may reduce the overall travel pollution or even wasted medical procedures or misused data of the user by providing mathematically rigorous data for the respective sound, sensory, image, latitude, longitude, altitude, time, weather, scale, micro scale, nano scale, chemistry, color, aperture, lens speed, type, cross product and additional nth dimension preferences for the multi dimension coordinate object utility function preferences. To quantify embodiments of the method and system 6400, FIG. 64A illustrates a general utility function. The system and method assigns a utility function or "Multi Dimension Object Score" or MDOS 6410 to their multi dimension coordinate object preferences which ranks through a series of neural network feedback on respective sound, sensory, image, latitude, longitude, altitude, time, weather, scale, micro scale, nano scale, chemistry, color, aperture, lens speed, type, cross product and additional nth dimension preferences for the multi dimension coordinate object utility function preferences. The equation 6410 has the following variables, M(multi dimension object score) which is the utility function, E(B multi dimension coordinate object) which is the current expected utility value of a portfolio of multi dimension coordinate objects minus 0.005 which is a scaling convention that allows the system and method to express the current multi dimension coordinate object expected utility of a portfolio of multi dimension coordinate objects and the standard deviation of those multi dimension coordinate objects to be a percentage rather than a decimal. The term A in 6410, is an index of the users preference which is derived from using neural networks that have been trained on the users preferences. The term A in 6410 is continually updated in a recursive fashion to reflect the user's preferences in style, ethnicity, flavoring or other characteristics. The sigma term squared in 6410 is the variance is of the multi dimension coordinate objects of a portfolio of multi dimension coordinate objects. The utility function or multi dimension object score 6410 represents the notion that the user utility is enhanced or goes up when respective sound, sensory, image, latitude, longitude, altitude, time, weather, scale, micro scale, nano scale, chemistry, color, aperture, lens speed, type, cross product and additional nth dimension expected value is within target and diminished or reduced by high variance multi dimension coordinate objects or multi dimension coordinate objects which brings the user out of target ranges. The extent by which the user is negatively affected by multi dimension coordinate object variance or respective sound, sensory, image, latitude, longitude, altitude, time, weather, scale, micro scale, nano scale, chemistry, color, aperture, lens speed, type, cross product and additional nth dimension variance outside of target ranges depends on the term A in 6410 which is the user's preference index. More sensitive user's may have a higher term A index value as their respective sound, sensory, image, latitude, longitude, altitude, time, weather, scale, micro scale, nano scale, chemistry, color, aperture, lens speed, type, cross product and additional nth dimension is disadvantaged more by respective sound, sensory, image, latitude, longitude, altitude, time, weather, scale, micro scale, nano scale, chemistry, color, aperture, lens speed, type, cross product and additional nth dimension variance and out of range respective sound, sensory, image, latitude, longitude, altitude, time, weather, scale, micro scale, nano scale, chemistry, color, aperture, lens speed, type, cross product and additional nth dimension. User's may pick multi dimension coordinate objects or portfolios of multi dimension coordinate objects based on the highest M(multi dimension object score) in the equation 6410. In some embodiments, multi dimension coordinate objects or multi dimension coordinate object combinations may be node ranked based on the distance of the multi dimension coordinate object combination portfolio value and the user utility function 6410 or a plurality of other factors. If a multi dimension coordinate object or portfolio of multi dimension coordinate objects has no variance to multi dimension coordinate object of the user then a selection will have a utility or multi dimension object score of the expected multi dimension object score without variance as the sigma term in equation 6410 is equal to zero. Equation 6410 provides a benchmark for the system and method to evaluate multi dimension coordinate objects against user utility. In the implementation of the method according to equation 6410, the term A determines preferences of the user which then may cause as certain multi dimension coordinate object to be accepted or rejected based upon the effect to respective sound, sensory, image, latitude, longitude, altitude, time, weather, scale, micro scale, nano scale, chemistry, color, aperture, lens speed, type, cross product and additional nth dimension as a portfolio with respect to user utility.

The implementation of the system and method is further represented in equations 6420 to take a simple two state case of multi dimension coordinate objects for an exemplary user. If a user has an respective sound, sensory, image, latitude, longitude, altitude, time, weather, scale, micro scale, nano scale, chemistry, color, aperture, lens speed, type, cross product and additional nth dimension multi dimension coordinate object (each multi dimension coordinate object may be represented as short form "multi dimension coordinate object") represented as a vector of attributes and assume two possible results after including a multi dimension coordinate object or a portfolio of multi dimension coordinate objects with a vector of respective sound, sensory, image, latitude, longitude, altitude, time, weather, scale, micro scale, nano scale, chemistry, color, aperture, lens speed, type, cross product and additional nth dimension. The probability of state one is p for state of multi dimension coordinate object 1 and a probability of (1−p) for the state two of multi dimension coordinate object 2. Accordingly, the expected value of multi dimension coordinate object portfolio as illustrated in the set of equations 6430 is E(B multi dimension coordinate object) equals probability p multiplied by respective sound, sensory, image, latitude, longitude, altitude, time, weather, scale, micro scale, nano scale, chemistry, color, aperture, lens speed, type, cross product and additional nth dimension state 1 plus probability (1−p) multiplied by respective sound, sensory, image, latitude, longitude, altitude, time, weather, scale, micro scale, nano scale, chemistry, color, aperture, lens speed, type, cross product and additional nth dimension state 2. The variance or sigma squared of the respective sound, sensory, image, latitude, longitude, altitude, time, weather, scale, micro scale, nano scale, chemistry, color, aperture, lens speed, type, cross product and additional nth dimension is represented in 6440.

Figure 65A:
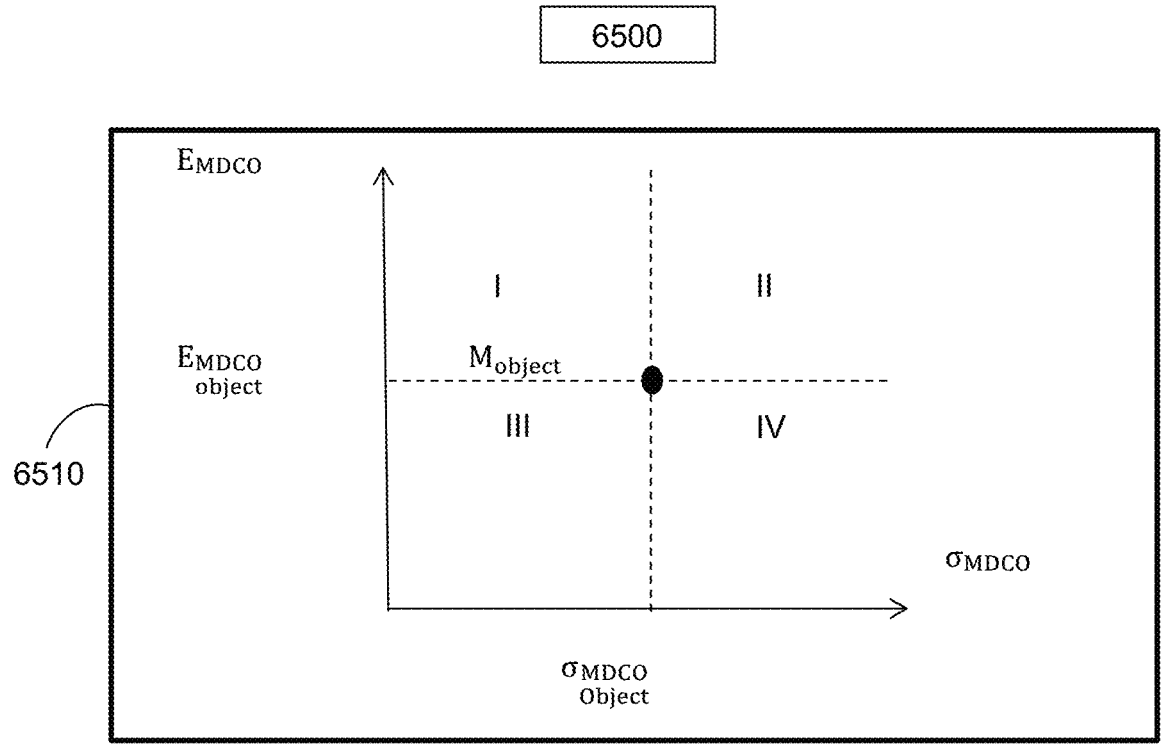
FIGS. 65A and 65B illustrate the embodiment of the method and system in FIG. 65A illustrate an exemplary implementation of methods utilizing a plurality of linear and non-linear equations to maximize multi dimension user portfolio object utility in accordance with some embodiments while 65B represents the inequality condition.
Figure 65B:
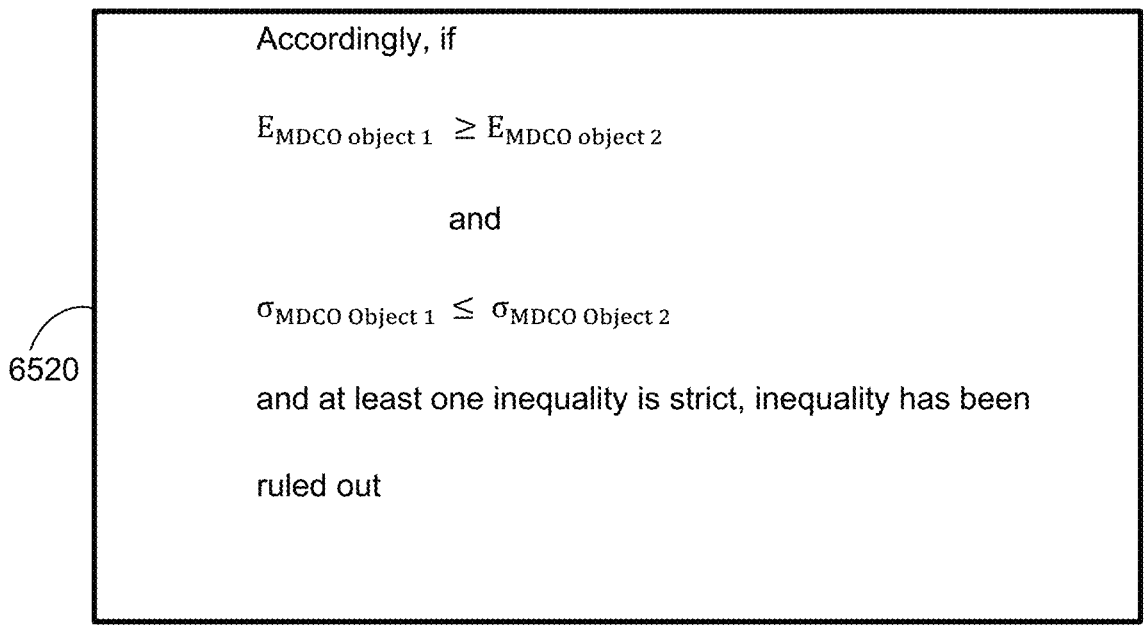

The embodiment of the method and system in FIG. 65A represents the tradeoff between the standard deviation of respective sound, sensory, image, latitude, longitude, altitude, time, weather, scale, micro scale, nano scale, chemistry, color, aperture, lens speed, type, cross product and additional nth dimension of a multi dimension coordinate object portfolio and the expected return of the respective sound, sensory, image, latitude, longitude, altitude, time, weather, scale, micro scale, nano scale, chemistry, color, aperture, lens speed, type, cross product and additional nth dimension of a portfolio 6510. Multi dimension coordinate object M 6510 is preferred by users with a high term A index value 6410 to any alternative multi dimension coordinate object in quadrant IV 6510 because the expected value of the multi dimension coordinate object is expected to be equal to or greater than any multi dimension coordinate object in quadrant IV and a standard deviation of the multi dimension coordinate object is smaller than any multi dimension coordinate object in that quadrant. Conversely, any multi dimension coordinate object portfolio M in quadrant I is preferable to multi dimension coordinate object portfolio M 6510 because its expected value of the multi dimension coordinate object is higher than or equal to multi dimension coordinate object M 6510 and the standard deviation of the multi dimension coordinate object M is equal to or smaller than multi dimension coordinate object M 6510. FIG. 65B represents the inequality condition. Accordingly, if the expected value of the multi dimension coordinate object of a certain multi dimension coordinate object 1 is greater than or equal to the expected value of the multi dimension coordinate object of a certain multi dimension coordinate object 2 6520 and the standard deviation of the multi dimension coordinate object of a certain multi dimension coordinate object 1 is less than or equal to the standard deviation of the multi dimension coordinate object of a certain multi dimension coordinate object 2 6520, at least one inequality is strict which rules out inequality 6520.

Figures 66A, 66B:
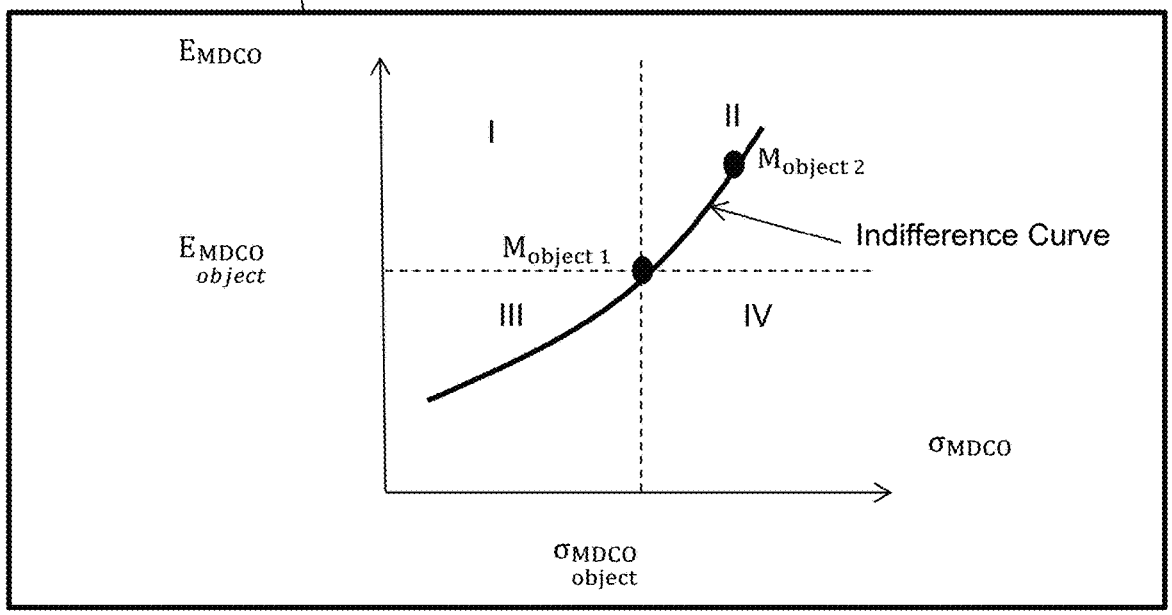
FIG. 66A in the form of a graph and 66B in the form of a table illustrate the points along a users indifference curve where object portfolios have equal utility to the user.

The embodiment of the method and system in FIG. 66A supposes a user identifies all the multi dimension coordinate objects that are equally attractive from a utility and multi dimension coordinate object perspective to multi dimension coordinate object M1 6610, starting at point multi dimension coordinate object M1 6610, an increase in standard deviation of the multi dimension coordinate object lowers utility and must be compensated for by an increase in the expected value of the multi dimension coordinate object. Thus multi dimension coordinate object M2 is equally desirable to the user as multi dimension coordinate object M1 along the indifference curve 6610. Users are equally attracted to multi dimension coordinate objects with higher expected value of multi dimension coordinate objects and higher standard deviation of multi dimension coordinate objects as compared to meals with lower expected value of multi dimension coordinate objects and lower standard deviation of multi dimension coordinate objects along the indifference curve 6610. Equally desirable multi dimension coordinate objects lie on the indifference multi dimension coordinate objects curve that connects all multi dimension coordinate objects with the same utility value 6610.

The embodiment of the method and system in FIG. 66B examines multi dimension coordinate object along a users indifference curve with utility values of several possible multi dimension coordinate objects for a user with a term A index value of 4, 6620. The table of combinations of multi dimension coordinate objects 6620 illustrates as one embodiment an expected value of multi dimension coordinate objects of a multi dimension coordinate object index of 10 and a standard deviation of the multi dimension coordinate objects of the multi dimension coordinate objects of 20% 6620. Accordingly the user score or utility function is therefore 10 minus 0.005 multiplied by 4 multiplied by 400 equals 2 as a utility score. FIG. 66B also illustrates 3 additional examples of various expected values of multi dimension coordinate objects and standard deviation of multi dimension coordinate objects 6620.

FIG. 64A, FIG. 64B, FIG. 65A, FIG. 65B, FIG. 66A, FIG. 66B discuss the multi dimension coordinate object utility for a particular user. Such multi dimension coordinate objects are composed of various types of multi dimension coordinate objects. Users may consume a single multi dimension coordinate object or multiple multi dimension coordinate objects which combine multi dimension coordinate objects. In some embodiments, adding a certain multi dimension coordinate object increased the utility of a user's multi dimension coordinate object utility, while in some embodiments adding an multi dimension coordinate objects decreases the utility. In many contexts, "clear images" offsets the effects of "blurry images" or "clear sounds" may translate into proxy image objects of higher image render quality. In one embodiment, user directives to increase the scale of a certain linked human image multi dimension coordinate object with the blood labs or chemistry of an additional multi dimension coordinate object. The scale vector of the multi dimension coordinate object may then look into a person with the proxy map for invasive cardiovascular conditions with similar proxy data for a patient with three years of 190 LDL cholesterol to show the proxy effects inside the body for a similar patient. Such aforementioned benefits allow users to have an immediate sense of their proxy condition without invasive time or procedure that may be less effective. In some embodiments, chocolate may raise HDL cholesterol and protect LDL cholesterol against oxidization. Too much chocolate may lower the utility of multi dimension coordinate objects as it is high in saturated fat and sugar. Excessive sugar spikes the blood glucose chemistry which contributes to calories that do not have much nutrient value for the multi dimension coordinate objects utility function which puts at risk weight gain and other health complications. In one implementation of the method and system, a user may think it is counterintuitive adding multi dimension coordinate object in the chemistry dimension to the image, however the additional proxy dimension may save the patients life thereby adding a large utility to the user. The helpful effects come from a negative correlation of individual multi dimension coordinate objects. The negative correlation has the effect of smoothing multi dimension coordinate objects variance for a certain user.

The embodiment of the method and system in FIG. 67A examines one exemplary probability distribution of a particular multi dimension coordinate object affecting the multi dimension coordinate object portfolio of a user 6710. State 1 probability of the multi dimension coordinate object is 0.5 in table 6710 and the expected value of the multi dimension coordinate object is to increase the multi dimension coordinate object portfolio by 25% towards the target multi dimension coordinate object portfolio range 6710, State 2 probability of the multi dimension coordinate object is 0.3 in table 6710 and the expected value of the multi dimension coordinate object is to increase the multi dimension coordinate object portfolio by 10% towards the target multi dimension coordinate object portfolio range 6710, State 3 probability of the multi dimension coordinate object is 0.2 in table 6710 and the expected value of the multi dimension coordinate object is to decrease the multi dimension coordinate object portfolio by 25% towards the target multi dimension coordinate object portfolio range 6710. Accordingly the effect on the user's multi dimension coordinate object portfolio is the mean or expected return on multi dimension coordinate objects of the multi dimension coordinate object is a probability weighted average of expected return on multi dimension coordinate objects in all scenarios 6720. Calling Pr(s) the probability scenario s and r(s) the multi dimension coordinate object return in scenario s, we may write the expected return E(r) of the ingredient on multi dimension coordinate object, as is done in 6720. In FIG. 67B applying the formula of expected return of multi dimension coordinate object on multi dimension coordinate object portfolio 6720 with the three possible scenarios in 6710 the expected return of multi dimension coordinate object on multi dimension coordinate object portfolio of the user is 10.5% toward the target range in example 6720. The embodiment of the method and system in FIG. 67C illustrates the variance and standard deviation of multi dimension coordinate objects is 357.25 for variance and 18.99% for standard deviation 6730.

Exemplary embodiments of scenario probabilities vary amongst users and composites so the method and system is not limited to a single set of weights, but rather the system learns new weights using neural network probability weightings with iterative feedback from blood sampling to ascertain recursive effects of multi dimension coordinate object onto multi dimension coordinate object portfolios.

In an exemplary embodiment in FIG. 68A, the blood chemistry of a vector of multi dimension coordinate object is the weighted average of the multi dimension coordinate object of each individual multi dimension coordinate object, so the expected value of the multi dimension coordinate object of the multi dimension coordinate object portfolio is the weighted average of the multi dimension coordinate object of each individual multi dimension coordinate object 6810. In the exemplary two multi dimension coordinate object combination of multi dimension coordinate object 1 and 2 in 6810, the expected value of the combined multi dimension coordinate objects is 7.75% toward the target multi dimension coordinate objects range. The weight of an multi dimension coordinate object may be represented 6810 of how each multi dimension coordinate object effects the multi dimension coordinate object portfolio.

In an exemplary embodiment in FIG. 68B, the standard deviation of the multi dimension coordinate object of the combined multi dimension coordinate objects is represented in 6820.

Because the variance reduction in the combination since the multi dimension coordinate objects were not perfectly correlated, the exemplary implementation of the method and system illustrates that a User may be better off in their multi dimension coordinate object portfolio by adding multi dimension coordinate objects which have a negative correlation yet positive expected value gain to multi dimension coordinate objects because the variance of the multi dimension coordinate objects has been reduced. To quantify the diversification of various multi dimension coordinate objects we discuss the terms of covariance and correlation. The covariance measures how much the multi dimension coordinate object portfolio of two multi dimension coordinate objects or move in tandem. A positive covariance means the multi dimension coordinate objects move together with respect to the effects on multi dimension coordinate object portfolios. A negative covariance means the multi dimension coordinate objects move inversely with their effect on multi dimension coordinate object portfolios. To measure covariance we look at surprises of deviations to multi dimension coordinate object portfolios in each scenario. In the following implementation of the method and system as stated in 6830 the product will be positive if the multi dimension coordinate object portfolio of the two multi dimension coordinate objects move together across scenarios, that is, if both multi dimension coordinate objects exceed their expectations on effect on multi dimension coordinate object portfolios or both multi dimension coordinate objects fall short together. If the multi dimension coordinate objects effect on the multi dimension coordinate object portfolio move in such a way that when a multi dimension coordinate object has a positive effect on multi dimension coordinate objects portfolio and multi dimension coordinate object 2 has a negative effect on multi dimension coordinate objects portfolio then the product of the equation in 6830 would be negative. Equation 6840 in FIG. 68D is thus a good measure of how the two multi dimension coordinate objects move together to effect multi dimension coordinate object portfolios across all scenarios which is defined as the covariance.

In an exemplary embodiment in FIG. 69A, an easier statistic to interpret than covariance is the correlation coefficient which scales the covariance to a value between negative 1 (perfect negative correlation) and positive 1 (perfect positive correlation). The correlation coefficient between two ingredients equals their covariance divided by the product of the standard deviations. In FIG. 69A, using the Greek letter rho, we find in equation 6910 the formula for correlation in an exemplary embodiment. The correlation equation 6910 can be written to solve for covariance or correlation. Studying equation 6910, one may observe that multi dimension coordinate objects which have a perfect correlation term of 1, have their expected value of multi dimension coordinate object as just the weighted average of the any two multi dimension coordinate objects. If the correlation term in 1910 has a negative value, then the combination of multi dimension coordinate objects lowers the standard deviation of the combined multi dimension coordinate objects. The mathematics of equations 6910 and 6920 show that multi dimension coordinate objects can have offsetting effects which can help overall target multi dimension coordinate object readings and multi dimension coordinate object portfolios. Combinations of multi dimension coordinate objects where the multi dimension coordinate objects are not perfectly correlated always offer a better combination to reduce multi dimension coordinate object portfolio volatility while moving more efficiently toward target ranges.

In an exemplary embodiment in FIG. 69B, the impact of the covariance of individual multi dimension coordinate objects on multi dimension coordinate object portfolios is apparent in the following formula 6920 for multi dimension coordinate object portfolio variance.

The most fundamental decision of a user is how much of each multi dimension coordinate object should you add or subtract? And how will it affect multi dimension coordinate object portfolio utility. Therefore one implementation of the method and system covers the multi dimension coordinate object tradeoff between combinations of multi dimension coordinate objects or various portfolios of multi dimension coordinate objects.

In an exemplary embodiment in FIG. 69C, recalling the user score or utility equation of a user 6410, the user attempts to maximize his or her utility level or multi dimension object score by choosing the best allocation of a portfolio of multi dimension coordinate objects or menu selection written as equation 6930.

Constructing the optimal portfolio of multi dimension coordinate objects is a complicated statistical task. The principle that the method and system follow is the same used to construct a simple two multi dimension coordinate object or combination in an exemplary scenario or for millions of multi dimension coordinate objects. To understand the formula for the variance of a portfolio of multi dimension coordinate objects more clearly, we must recall that the covariance of an multi dimension coordinate object with itself is the variance of that ingredient such as written in FIG. 70A. Wobj1 and Wobj2 7010 are short for the weight associated with multi dimension coordinate object or multi dimension coordinate object portfolio 1 and multi dimension coordinate object or multi dimension coordinate object portfolio 2. The matrix 7010 is simply the bordered covariance matrix of the two multi dimension coordinate objects or multi dimension coordinate object portfolios.

In the embodiment of the method and system in FIG. 70B, the descriptive statistics for two multi dimension coordinate objects are listed as the expected value and standard deviation as well as covariance and correlation between the exemplary multi dimension coordinate objects 7020. The parameters for the joint probability distribution of returns is shown in FIG. 70B.

Figures 71A, 71B:
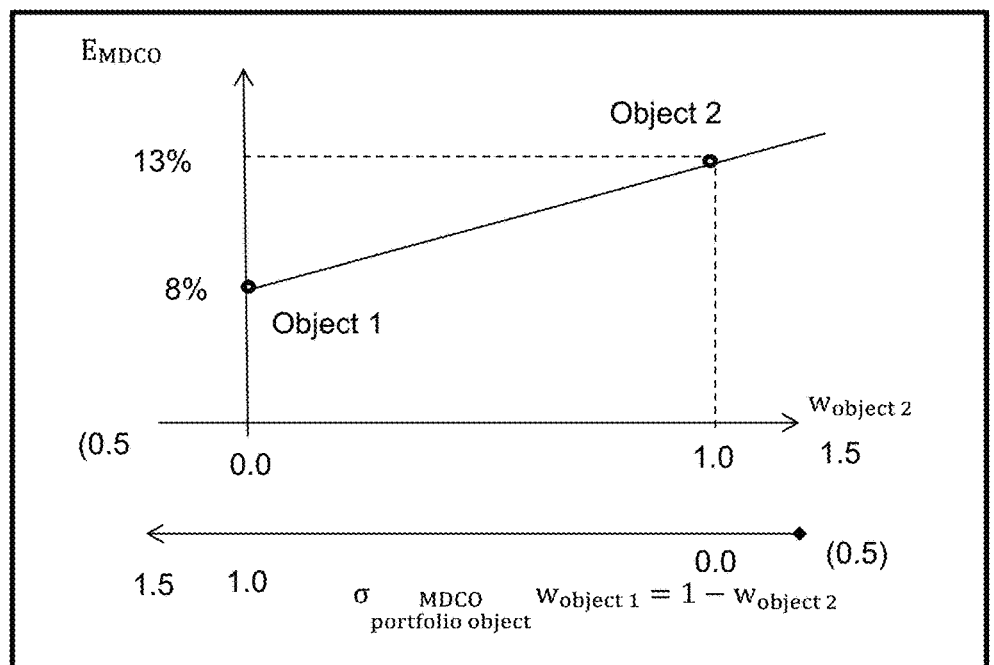
FIGS. 71A and 71B illustrate an exemplary scenario of an experiment with different object proportions to observe the effect on the expected value of the multi dimension coordinate objects and object portfolios with various weightings.

The embodiments of the method and system in FIG. 71A and FIG. 71B illustrate an exemplary scenario of experiment with different proportions to observe the effect on the expected multi dimension coordinate object portfolios and variance of multi dimension coordinate object portfolios. Suppose the proportion of the multi dimension coordinate object portfolio weight of multi dimension coordinate object 1 is changed. The effect on the multi dimension coordinate object portfolio is plotted in FIG. 71A. When the proportion of the multi dimension coordinate object that is multi dimension coordinate object 1 varies from a weight of zero to one, the effect on multi dimension coordinate object portfolio change as toward the target goes from 13% (expected multi dimension coordinate object 1) to 8% (expected multi dimension coordinate object 1 value). Of course, varying proportions of a multi dimension coordinate object portfolio also has an effect on the standard deviation of multi dimension coordinate object utility. FIG. 71B presents various standard deviation for various weights of multi dimension coordinate object 1 and multi dimension coordinate object 2, 7120.

Figure 72A:
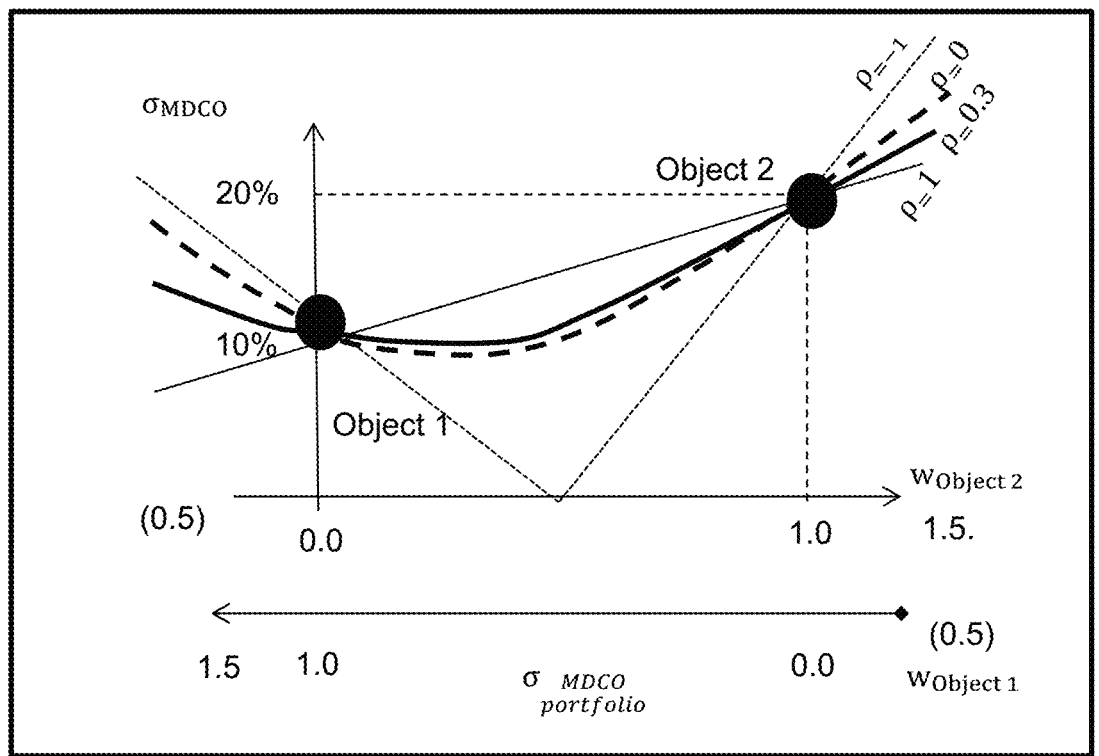
FIGS. 72A and 72B illustrate an exemplary case of the multi dimension coordinate object combinations of standard deviation when correlation rho is at 0.30.

In the exemplary case of the multi dimension coordinate object combination multi dimension coordinate object portfolio standard deviation when correlation rho is at 0.30 in FIG. 72A. The thick curved black line labeled rho=0.3 in FIG. 7210. Note that the combined multi dimension coordinate object portfolio of multi dimension coordinate object 1 and multi dimension coordinate object 2 is a minimum variance combination that has a standard deviation smaller than that of either multi dimension coordinate object 1 or multi dimension coordinate object 2 as individual multi dimension coordinate objects. FIG. 72A highlights the effect of multi dimension coordinate object combinations lowering overall standard deviation. The other three lines in FIG. 72A show how multi dimension coordinate object portfolio standard deviation varies for other values of the correlation coefficient, holding the variances of the multi dimension coordinate objects constant. The dotted curve where rho=0 in FIG. 72A depicts the standard deviation of multi dimension coordinate object portfolios with uncorrelated multi dimension coordinate objects. With the lower correlation between the two multi dimension coordinate objects, combination is more effective and multi dimension coordinate object portfolio standard deviation is lower. We can see that the minimum standard deviation of the multi dimension coordinate object combination in table 7120 shows a value of 10.29% when rho=0. Finally the upside down triangular broken dotted line represents the potential case where rho=−1 and the multi dimension coordinate objects are perfectly negatively correlated 2210. In the rho=−1 case 2210, the solution for the minimum variance combination is a multi dimension coordinate object 1 weight of 0.625 and a multi dimension coordinate object 2 weight of 0.375 in FIG. 72A. The method and system can combine FIG. 71A and FIG. 72A to demonstrate the relationship between the multi dimension coordinate object combination's level of standard deviation to multi dimension coordinate object portfolio and the expected improvement or decline in expected multi dimension coordinate object portfolio value given the multi dimension coordinate object combination parameters 7220.

Figure 72B:
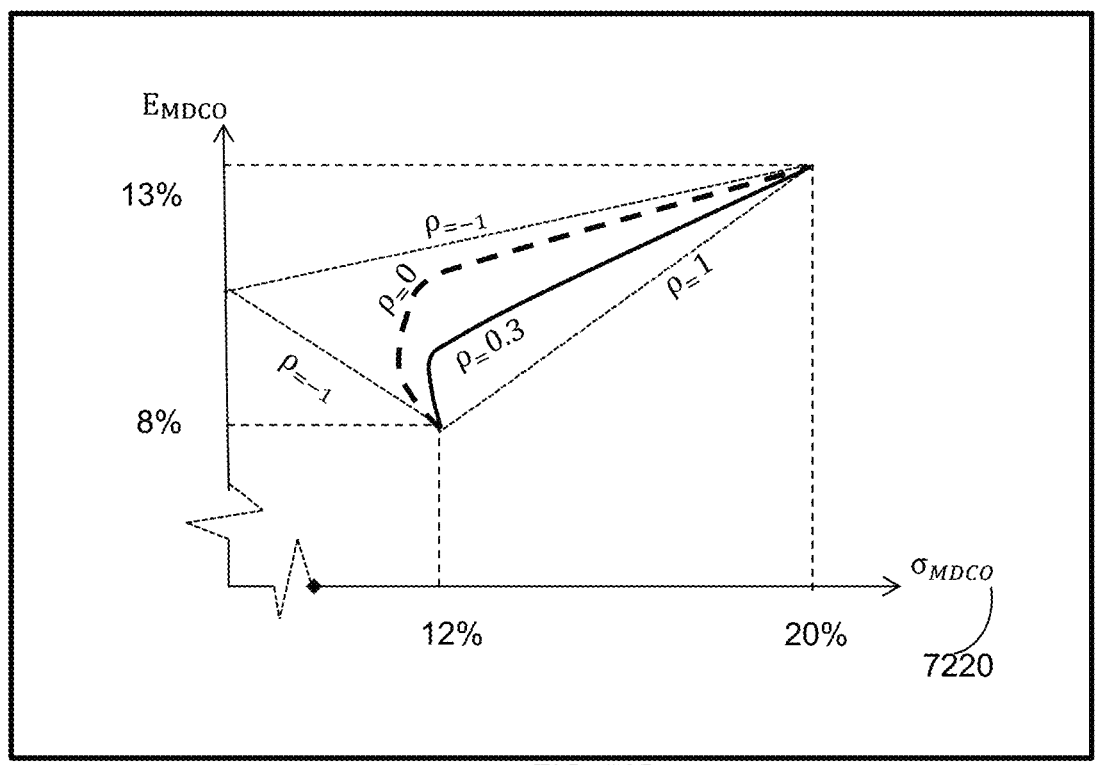

The embodiment illustrated in FIG. 72B shows for any pair of multi dimension coordinate objects or multi dimension coordinate object portfolios which may be illustrated for an exemplary case, but not limited to the exemplary case w(multi dimension coordinate object 2) and w(multi dimension coordinate object 1), the resulting pairs of combinations from 7210 and 7120 and 7110 are plotted in 7220. The solid curved line in 7220 labeled with rho=0.3 shows the combination opportunity set while correlation equals 0.3. The name opportunity set is used because it shows the combination of expected value of a multi dimension coordinate object portfolio and standard deviation of a multi dimension coordinate object portfolio of all combinations that can be constructed from the two available multi dimension coordinate objects. The broken dotted lines show the combination opportunity set for the other values of the correlation coefficient. The line farthest to the right, which is the straight line connecting the combinations where the term rho equals one, shows there are no benefits to a multi dimension coordinate object portfolio from combinations between ingredients where the correlation between the two multi dimension coordinate objects is perfectly positive or where the term rho equals one. The opportunity set is not "pushed" to the northwest. The curved dotted line to the left of the curved solid line where the term rho equals zero shows that there are greater benefits to a multi dimension coordinate object portfolio when the correlation coefficient between the two multi dimension coordinate objects is zero than when the correlation coefficient is positive 7220. Finally the broken line where the term rho equals negative one shows the effect of perfectly negative correlation between multi dimension coordinate objects. The combination opportunity set is linear, but offers the perfect offset between multi dimension coordinate objects to move toward target multi dimension coordinate object portfolio 7220. In summary, although the expected multi dimension coordinate object portfolio value of any combination of multi dimension coordinate objects is simply the weighted average of the ingredients expected multi dimension coordinate object portfolio value, this is not true for the combination of ingredients standard deviation. Potential benefits from combinations of ingredients arise when correlation is less than perfectly positive. The lower the correlation coefficient, the greater the potential benefit of combinations. In the extreme case of perfect negative correlation between multi dimension coordinate objects, the method and system show a perfect offset to a multi dimension coordinate object portfolio and we can construct a zero-variance combination of multi dimension coordinate objects 7220.

Suppose the exemplary case where the user wishes to select the optimal combination from the opportunity set. The best combination will depend upon the user's preferences and aversion to the standard deviation of multi dimension coordinate objects. Combinations of multi dimension coordinate objects to the northeast in FIG. 72B provide higher movements towards expected target multi dimension coordinate object portfolio value, but impose greater levels of volatility of multi dimension coordinate objects on multi dimension coordinate object portfolios. The best trade-off among these choices is a matter of personal preference. User's with greater desire to avoid volatility in their multi dimension coordinate object portfolio will prefer combinations of ingredients in the southwest, with lower expected movement toward target multi dimension coordinate object expected value, but lower standard deviation of multi dimension coordinate object portfolios 7220.

Figures 73A, 73B:
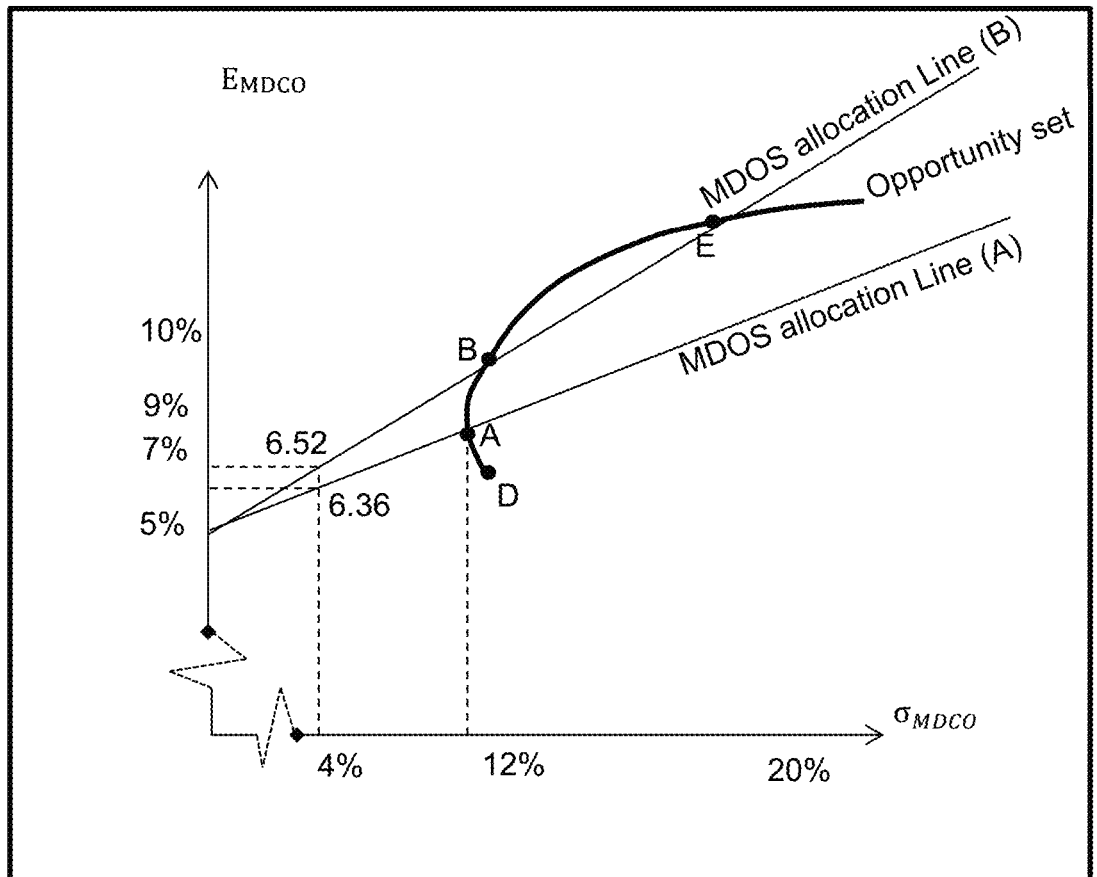
FIGS. 73A and 73B illustrate the opportunity set generated from the joint probability distribution of the combination of multi dimension object coordinates of object 1 and object 2 using the data from FIG. 70B as well as the slope of the reward to variability ratio or multi dimension object score allocation line (A).

In the embodiment illustrated in FIG. 72B, most user's recognize the really critical decision is how to divvy up their selection amongst multi dimension coordinate objects or multi dimension coordinate object combinations. In the embodiment of the method and system in FIG. 73A, the exemplary diagram is a graphical solution. FIG. 73A shows the opportunity set generated from the joint probability distribution of the combination of multi dimension coordinate object 1 and multi dimension coordinate object 2 using the data from FIG. 71B. Two possible allocation lines are drawn and labeled "MDOS allocation line". The first MDOS allocation line (A) is drawn through the minimum variance multi dimension coordinate object combination point A which is divided as 82% multi dimension coordinate object 1 and 18% multi dimension coordinate object 2. The multi dimension coordinate object combination has an expected multi dimension coordinate object portfolio value movement of 8.9% and its standard deviation is 11.45% for the multi dimension coordinate object portfolio 7310. The reward to variability ratio or slope of the MDOS allocation line combining a zero variance multi dimension coordinate object (which may be certain types of images, sounds, chemistry, latitude, longitude, altitude, time, temperature, or a plurality of other dimension vectors) with multi dimension coordinate object 1 and multi dimension coordinate object 2 with the aforementioned weights of 82% multi dimension coordinate object 1 and 18% multi dimension coordinate object 2, forms an equation listed in FIG. 73B. Accordingly the exemplary slope 7320 of MDOS Allocation Line (A) is 0.34. Considering the embodiment in FIG. 73A of MDOS allocation line (B), the multi dimension coordinate object combination was 70% multi dimension coordinate object 1 and 30% multi dimension coordinate object 2, the expected value movement towards target multi dimension coordinate object is 9.5%. Thus the reward to variability ration or slope of MDOS allocation line(B) is 9.5 minus 5 divided by 11.7 which equals 0.38 or a steeper slope as illustrated in FIG. 23A. If the MDOS allocation line (B) has a better reward to variability ratio than the MDOS allocation line (A), then for any level of standard deviation that a Foodie is willing to bear, the expected target multi dimension coordinate object movement value is higher with the combination of point B. FIG. 73B illustrates the aforementioned exemplary case, showing that MDOS allocation line (B) intersection with the opportunity set at point B is above the MDOS allocation line (A) intersection with the opportunity set point A. In this case, point B allocation combination dominates point A allocation combination. In fact, the difference between the reward to variability ratio is the difference between the two MDOS allocation line (A) and (B) slopes 7320. The difference between the two MDOS allocation line slopes is 0.38−0.34=0.04. This means that the user gets four extra basis points of expected multi dimension coordinate object value movement toward the target with MDOS allocation line (B) for each percentage point increase in standard deviation of multi dimension coordinate object portfolio 7310. If the user is willing to bear a standard deviation of multi dimension coordinate object portfolio of 4%, the user can achieve a 5.36% (5+4×0.34) expected multi dimension coordinate object portfolio value movement to the target range along MDOS allocation line (A) and with MDOS allocation line (B) the MDOS can achieve an expected movement of multi dimension coordinate object portfolio to the target of 6.52% (5+4×0.38) 7310. Why stop at point B? The user can continue to ratchet up the MDOS allocation line until it ultimately reaches the point of tangency with the Opportunity set 7310. This aforementioned exemplary scenario in FIG. 73A must yield the MDOS allocation line with the highest feasible reward to variability ratio.

The embodiment illustrated in exemplary scenario FIG. 74A shows the highest sloping MDOS allocation line (C) at point P intersecting with the opportunity set. Point P is the tangency combination of multi dimension coordinate objects where the expected multi dimension coordinate object portfolio target movement is the highest relative to the opportunity set and standard deviation of multi dimension coordinate objects or multi dimension coordinate object combinations 7410. The optimal combination or allocation of multi dimension coordinate objects is labeled point P. At Point P, the expected value multi dimension coordinate object portfolio movement to the target is 11% while the standard deviation of point P is 14.2%. In practice, we obtain the solution to the method and system with a computer program with instructions to perform the calculations for the user 7410. The method process to obtain the solution to the problem of the optimal mix of multi dimension coordinate objects or multi dimension coordinate object combinations of weight multi dimension coordinate object 1 and weight multi dimension coordinate object 2 or any other combination of multi dimension coordinate objects is the objective of the method and system. In some embodiments, node rankings from the multi dimension coordinate objects database may be determined by the relative ranking of the ratio of expected multi dimension coordinate object targets to the opportunity set and standard deviation of the multi dimension coordinate objects and multi dimension coordinate object combinations 7410.

There are many approaches toward optimization which are covered under method and system to optimize multi dimension coordinate object portfolios through multi dimension coordinate objects which are may be utilized for computational efficiency, but the method and system may use as one approach of many approaches where the method finds the weights for various multi dimension coordinate objects that result in the highest slope of the MDOS allocation line (C) 7410. In other words, the method and system may find the weights that result in the variable multi dimension coordinate object combination with the highest reward to variability ratio. Therefore the objective function of the method and system may maximize the slope of the MDOS allocation line for any possible combination of multi dimension coordinate objects 7410. Thus the objective function of the method and system may show the slope as the ratio of the expected multi dimension coordinate object portfolio of the combination of multi dimension coordinate objects less the multi dimension coordinate object of a zero standard deviation multi dimension coordinate object (perhaps an high res image or a very clear dog barking or a plurality of other high quality multi dimension coordinate objects) divided by the standard deviation of the combination of multi dimension coordinate objects illustrated in FIG. 74B. For the combination of multi dimension coordinate objects with just two multi dimension coordinate objects, the expected multi dimension coordinate object value movement toward the target and standard deviation of multi dimension coordinate object of the combination of multi dimension coordinate objects is illustrated in FIG. 74B. When the method and system maximize the objective function which is the slope of the user allocation line subject to the constraint that the combination weights sum to one or one hundred percent 7420. In other words the weight of the multi dimension coordinate object 1 plus the weight of the multi dimension coordinate object 2 must sum to one. Accordingly, the method and system may solve a mathematical problem formulated as FIG. 75A which is the standard problem in calculus. Maximize the slope of the MDOS allocation line subject to the condition that the sum of the weight of all the ingredients will sum to one.

In the embodiment case illustrated in FIG. 75B, the exemplary case may include two multi dimension coordinate objects or multi dimension coordinate object portfolio combinations, but the system and method are able to process any amount of multi dimension coordinate object or multi dimension coordinate object combinations with an extension of the calculus equations 7510. In the exemplary case of only two multi dimension coordinate objects, FIG. 75B illustrates the solution for the weights of the optimal multi dimension coordinate object combination of multi dimension coordinate objects. Data from 7110, 7120, 7310, 7410, 7420, 7510 have been substituted in to give the weights of multi dimension coordinate object 1 and multi dimension coordinate object 2 in FIG. 75B an exemplary case. The expected multi dimension coordinate object value has moved 11% toward the target multi dimension coordinate object value which incorporates the optimal weights for multi dimension coordinate object 1 and multi dimension coordinate object 2 in this exemplary case 7410 and the standard deviation is 14.2% in FIG. 74A. The MDOS allocation line using the optimal combination in 7510 and 7520 has a slope of 0.42=(11−5)/14.2 which is the reward to variability ratio of multi dimension coordinate objects. Notice how the slope of the MDOS allocation line exceeds the slope of MDOS allocation line (B) and MDOS allocation line (A) in FIG. 73A as it must if it is to be the slope of the best feasible MDOS allocation line. A user with a coefficient term A in FIG. 74A equal to 4 would then make a combination as follows in FIG. 75C. Thus the user would select 74.39% of her/his multi dimension coordinate object allocation in the combination of multi dimension coordinate object 1 and multi dimension coordinate object 2 and 25.61% in a base stable high quality multi dimension coordinate object image or an multi dimension coordinate object which has zero standard deviation to multi dimension coordinate object 7530. Of the 74.39% of the multi dimension coordinate object selection, 40% of the 74.39% or (0.4×0.7439=0.2976) would go to multi dimension coordinate object 1 and 60% of 74.39% or (0.60×0.7439=0.4463) would go toward multi dimension coordinate object 2. The graphical solution of the equations in FIG. 75A, FIG. 75B and FIG. 75C is illustrated in FIG. 76A.

Once the specific two multi dimension coordinate object case has been explained for the method and system, generalizing the embodiment to the case of many multi dimension coordinate objects is straightforward. The summarization of steps are outlined in FIG. 76B.

Figure 77A:
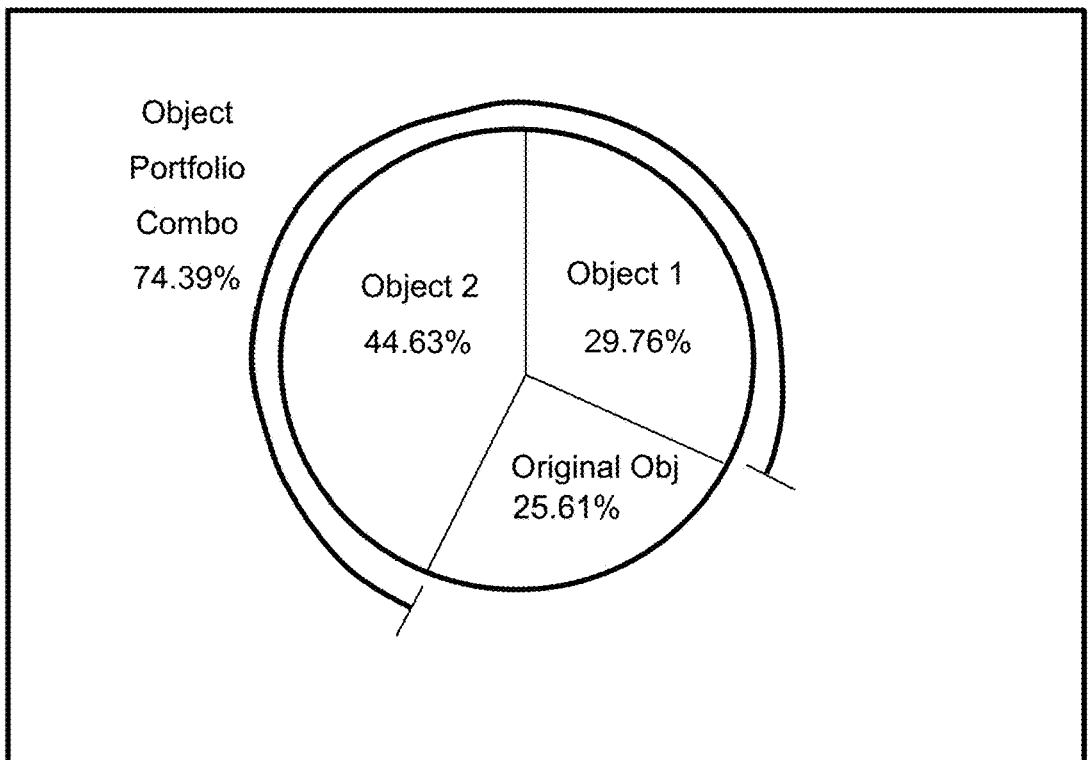
FIGS. 77A and 77B illustrate the graphical solution of the user multi dimension coordinate object allocation method as well as the minimum variance frontier of multi dimension coordinate objects which is the graph of the lowest possible multi dimension coordinate object variance combination for a given target user multi dimension object score.

The embodiment of FIG. 77A illustrates a combination of multi dimension coordinate objects for the optimal combination in the form of a pie chart. Before moving on it is important to understand that the two multi dimension coordinate objects described could be multi dimension coordinate objects or combinations of multi dimension coordinate objects. Accordingly the method and system may consider the multi dimension coordinate object characteristics of single multi dimension coordinate object or combinations of multi dimension coordinate objects which can then form an multi dimension coordinate object portfolio which would act as an ingredient which characteristics such as expected multi dimension coordinate object value, variance and covariance and correlation. Accordingly there can be diversification within multi dimension coordinate objects as some multi dimension coordinate objects are combinations of multi dimension coordinate objects.

Now we can generalize the two multi dimension coordinate object embodiment of the method and system to the case of many multi dimension coordinate objects alongside an multi dimension coordinate object with near zero multi dimension coordinate object variance or standard deviation. As in the case of the two multi dimension coordinate object embodiment, the problem is solved by the method and system in three parts. First, we identify the expected multi dimension coordinate object contribution of the multi dimension coordinate object and standard deviation of that multi dimension coordinate object contribution to the multi dimension coordinate object portfolio. Second, the method and system identifies the optimal combination of multi dimension coordinate objects by finding the combination weights that result in the steepest MDOS allocation line. Last, the method and system may choose an appropriate complete combination by mixing the combination of a zero multi dimension coordinate object standard deviation multi dimension coordinate object with the combination of multi dimension coordinate objects that carry various standard deviation and correlations. The multi dimension coordinate object opportunities available to the user must be determined in the method and system. These multi dimension coordinate object opportunities are summarized by the minimum variance multi dimension coordinate object portfolio frontier of multi dimension coordinate objects. This frontier is a graph of the lowest possible combination variances that can be attained for a given combination of expected multi dimension coordinate object value. Given the set of data for expected multi dimension coordinate object value contribution, variances and covariance's of multi dimension coordinate object and expected covariance's of multi dimension coordinate objects of combinations, we can calculate the minimum multi dimension coordinate object variance combination for any targeted multi dimension coordinate object contribution. Performing such as calculation for many such expected multi dimension coordinate object combinations results in a paring between expected multi dimension coordinate object value contributions and minimum variance multi dimension coordinate object contribution that offer the expected multi dimension coordinate object value contributions. The plot of these expected multi dimension coordinate object contribution and standard deviation pairs are presented in FIG. 77B. Notice that all multi dimension coordinate objects lie to the right of the frontier. This tells us that combinations that consist only of a single multi dimension coordinate object are inefficient relative to combinations. Adding many ingredients leads to combinations with higher expected multi dimension coordinate object contribution and lower standard deviations 7720. All the combinations in FIG. 77B that lie on the minimum variance frontier from the global minimum variance multi dimension coordinate object portfolio and upward, provide the best expected multi dimension coordinate object value contribution and standard deviation of multi dimension coordinate object combinations and thus are candidates for the optimal combination 7720. The part of the frontier that lies above the global minimum variance combination is called the efficient frontier 7720. For any combination on the lower portion of the minimum variance frontier, there is a combination with the same standard deviation of blood chemistry but higher expected blood chemistry contribution positioned directly above it. Hence the bottom part of the minimum variance frontier is inefficient.

The second part of the optimization plan involves a zero standard deviation multi dimension coordinate object. As before, the method and system search for the MDOS allocation line with the highest reward to variability ratio (that is the steepest slope) as shown in FIG. 76A. The MDOS allocation line that is supported by the optimal combination point P 7610, is, as before, the combination that is tangent to the efficient frontier. This MDOS allocation line dominates all alternative feasible lines. Therefore, combination P in FIG. 76A is the optimal multi dimension coordinate object combination.

Finally, the last part of the embodiment of the method and system, the user choses the appropriate mix between the optimal multi dimension coordinate object combination and a zero multi dimension coordinate object portfolio variance multi dimension coordinate object which may include a zero variance multi dimension coordinate object. In FIG. 76A, the point where MDOS allocation line (C) has a zero standard deviation value is where the expected multi dimension coordinate object target movement is 5% or point F 7610.

Now let us consider in the method and system each part of the combination construction problem in more detail. In the first part of the user problem, the analysis of the expected multi dimension coordinate object value of the multi dimension coordinate object, the user needs as inputs, a set of estimates of expected multi dimension coordinate object value target movement for each multi dimension coordinate object and a set of estimates for the covariance matrix which the method and system provide for the user through the system application.

Suppose that the time period of the analysis for the combination of multi dimension coordinate objects between time scalar tests was one year. Therefore all calculations and estimates pertain to a one year plan under the method and system. The database system contains the variable n multi dimension coordinate objects where n could be any amount of multi dimension coordinate objects. As of now, time zero, we observed the expected multi dimension coordinate object value of the multi dimension coordinate objects such that each multi dimension coordinate object is given the variable label i and an index number of n at time zero. Then the system and method determine how the multi dimension coordinate object effects the users multi dimension coordinate object utility at the end of one year or time equal to one year. The covariance's of the multi dimension coordinate objects effects on multi dimension coordinate object portfolios are usually estimated from historical data for both the user and from users in the database with similar characteristics. Through the method and system, the user is now armed with the n estimates of the expected effect on multi dimension coordinate objects of each ingredient and then the n×n estimates in the covariance matrix in which the n diagonal elements are estimates of the variances of each multi dimension coordinate object and then the n squared minus n equals n multiplied by the quantity of n minus 1 off diagonal elements are the estimates of the covariances between each pair of multi dimension coordinate object portfolios. We know that each covariance appears twice in the aforementioned table, so actually we have $n(n-1)/2$ different covariance estimates. If the user considers 50 multi dimension coordinate objects or multi dimension coordinate object combinations, the method and system needs to provide 50 estimates of multi dimension coordinate object results for each respective multi dimension coordinate object or multi dimension coordinate object combination and $(50 \times 49)/2=1,225$ estimates of covariance's which is a daunting task without the assistance of the method and system computer application program. Once these estimates are compiled by the method and system, the expected multi dimension coordinate object value and variance of any combination of multi dimension coordinate objects with weights for any of the respective multi dimension coordinate objects can be calculated by the general formulas in FIG. 78A.

Figure 77B:
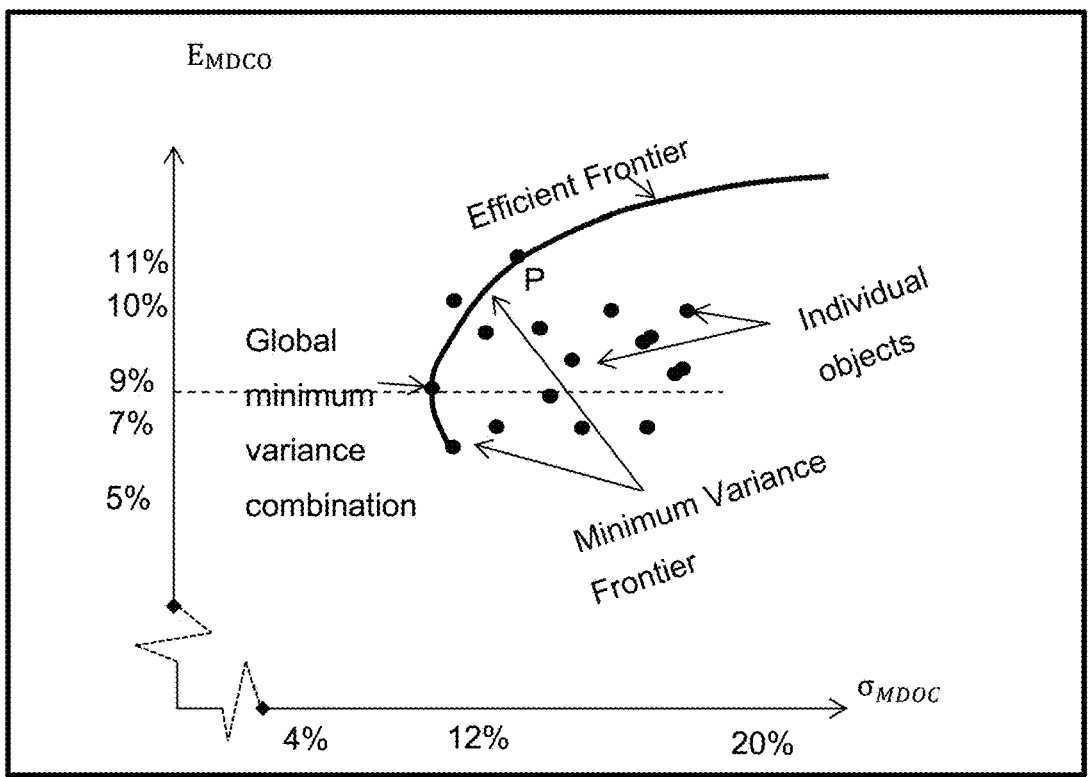
Figures 78A, 78B:
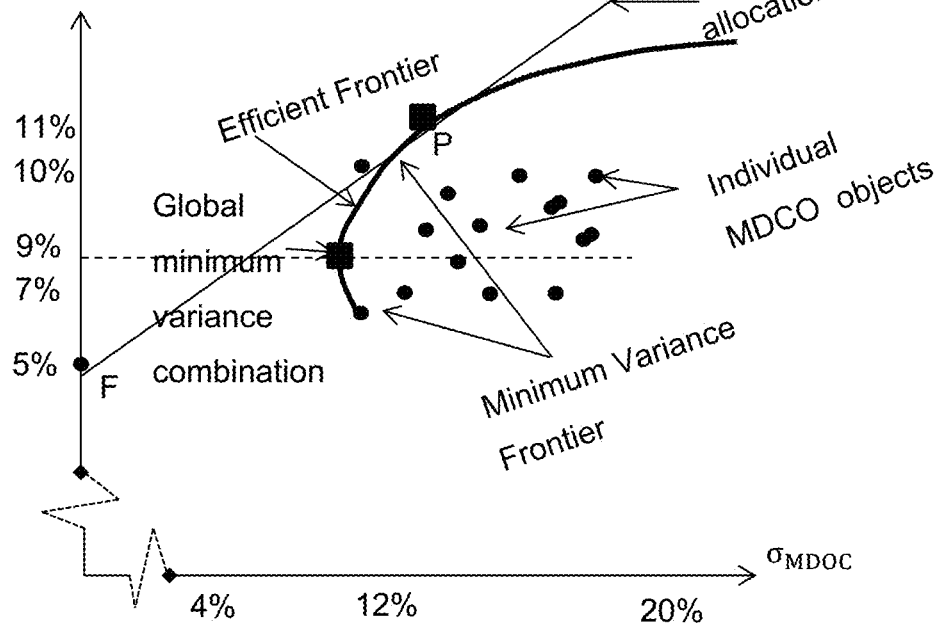
FIGS. 78A and 78B illustrate the expected movement of a users multi dimension coordinate object portfolio.

The general embodiment of an exemplary case of the method and system in FIG. 78A states the expected multi dimension coordinate object value toward the target multi dimension coordinate object value of each multi dimension coordinate object and the variance of the multi dimension coordinate object of each multi dimension coordinate object such that the weights of each multi dimension coordinate object can be calculated 7810. The principle behind the method and system is that a user or users can quantify the set of multi dimension coordinate object combinations that give the highest multi dimension coordinate object expected value result to maximize user utility. Alternatively, the efficient frontier in FIG. 77B is the set of multi dimension coordinate object combinations that minimize the variance of multi dimension coordinate object portfolio for any target multi dimension coordinate object portfolio expected value. In some embodiments, node rankings from the multi dimension coordinate object database 4801 may be determined by the relative ranking of the ratio of expected value multi dimension coordinate object targets to the opportunity set and standard deviation of the multi dimension coordinate objects and multi dimension coordinate object combinations which are represented by the plurality of multi dimension coordinate object combinations that are points with expected multi dimension coordinate object values and multi dimension coordinate object variances in the opportunity set from the machine learning optimization instruction CPU or GPU 4816. The result is the most efficient method empirically and quantitatively to render the multi dimension coordinate object space.

The points marked by rectangles in the exemplary embodiment in FIG. 78B are the result of variance—minimization calculations in the method and system. First, we draw the constraint, that is, a horizontal line at the level of required expected multi dimension coordinate object value target. We then look for the combination of multi dimension coordinate objects (point P) with the lowest standard deviation that plots on the user allocation line 7820. We then discard the bottom of the minimum variance frontier below the global minimum variance combination as it is inefficient 7820 and points above the global minimum variance combination have higher multi dimension coordinate object expected value contribution to the target, but a similar standard deviation. Restating the solution that the method and system has completed thus far. The estimate generated by the user utilizing the method and system transformed multi dimension coordinate objects and multi dimension coordinate object combinations into a set of expected multi dimension coordinate object statistics toward the users multi dimension coordinate object portfolio utility and a covariance matrix of how the multi dimension coordinate objects are correlated. This group of estimates shall be called the input list. This input list is then fed into the optimization system and method. Before we proceed to the second step of choosing the optimal combination of multi dimension coordinate objects for multi dimension coordinate object portfolios, some users may have additional constraints. For example, many users have hearing or sight constraints which preclude certain multi dimension coordinate object types. The list of potential constraints is large and the method and system allows for the addition of constraints in the optimization method and system. Users of the system and method may tailor the efficient set of ingredients to conform to any desire of the user. Of course, each constraint carries a price tag in the sense that an efficient frontier constructed subject to extra constraints may offer a reward to variability ratio inferior to that of a less constrained set. The user is made aware of this cost through the system and method application and should carefully consider constraints that are not mandated by law or specific physical limitations.

Proceeding to step two in the method and system, this step introduces a zero variance multi dimension coordinate object that has positive multi dimension coordinate object attributes. As before, we ratchet up the MDOS allocation line by selecting different combinations of multi dimension coordinate objects until combination P is reached 7820 which is the tangency point of a line from point F to the efficient frontier 7820. multi dimension coordinate objects combination P maximizes the reward to variability ratio, the slope of the MDOS allocation line from point F to combinations on the efficient frontier set 7820.

The method and system embodiment of the general exemplary case may be written in one form as in FIG. 79. Vectors are used to capture variable d inputs or as many inputs as are required to weight in FIG. 79. The method as system may use other techniques to express combination multi dimension coordinate object expected target multi dimension coordinate object values and variances, but it is convenient to handle large combinations of multi dimension coordinate objects in matrix form in FIG. 79.

What is claimed is:

1. A method, comprising:
    receiving request data from a user device, wherein the request data comprises data corresponding to a request for a plurality of optimized data objects relating to one or more multidimensional objects, and wherein the plurality of optimized data objects comprises one or more image objects and one or more audio objects;
    determining a plurality of optimized weight values for a plurality of coordinate objects stored in one or more multidimensional object databases based on the request data;
    identifying the plurality of optimized data objects based on the plurality of optimized weight values, wherein the plurality of optimized data objects is a subset of the plurality of coordinate objects;
    retrieving the identified plurality of optimized data objects from the one or more multidimensional object databases; and
    transmitting the plurality of optimized data objects to the user device, wherein the user device is configured to generate the one or more multidimensional objects based on the plurality of optimized data objects.

2. The method of claim 1, wherein the user device comprises a mobile computing device, a tablet computing device, a laptop computing device, a stationary computing device, an AR computing device, an MR computing device, a VR computing device, an Internet of Things (IoT) computing device, or combinations thereof.

3. The method of claim 1, wherein the plurality of optimized data objects further comprises one or more data objects relating to color channel, color depth, height, width, longitude, latitude, altitude, sensory feel, sensory smell, sensory touch, sensory electromagnetic waves, time, historical data, time style, time growth, weather, temperature, image scaling, microscopic image scaling, nanoscopic image scaling, chemistry state, chemistry feeling, color depth, filter color, lens focus, aperture, lens speed, type, cross product blend, or combinations thereof.

4. The method of claim 1, wherein:
    the one or more image objects comprises one or more data objects for use in generating one or more images relating to the one or more multidimensional objects;
    the one or more audio objects comprises one or more data objects for use in generating one or more sounds relating to the one or more multidimensional objects; or combinations thereof.

5. The method of claim 1, wherein the plurality of coordinate objects comprises a plurality of data objects for use in generating the one or more multidimensional objects, wherein the plurality of data objects relate to coordinate data, matrices data, vector data, or combinations thereof.

6. The method of claim 1, wherein the one or more multidimensional object databases comprise one or more multidimension map tile databases, one or more proxy dimension databases, or combinations thereof.

7. The method of claim 1, wherein determining the plurality of optimized weight values comprises:
    determining a plurality of expected values for the plurality of coordinate objects for a user associated with the user device, wherein a respective expected value corresponds to an expected utility of one or more respective coordinate objects for the user;
    determining a plurality of standard deviation values for the plurality of coordinate objects for the user based on the plurality of expected values;
    determining a plurality of ratios for the plurality of coordinate objects based on the plurality of expected values and the plurality of standard deviation values; and
    determining the plurality of optimized weight values for the user based on the plurality of ratios.

8. The method of claim 7, wherein determining the plurality of expected values comprises:
    determining a plurality of utility values for the plurality of coordinate objects for the user based on one or more utility functions, wherein the one or more utility functions correspond to one or more user preferences of the user, and wherein a respective utility value corresponds to a utility of the one or more respective coordinate objects for the user;
    determining a plurality of probability weight values for the plurality of utility values based on historical data for the user; and
    determining the plurality of expected values based on the plurality of probability weight values and the plurality of utility values.

9. The method of claim 8, wherein determining the plurality of probability weight values comprises determining the plurality of probability weight values based on the historical data using neural network feedback.

10. The method of claim 7, wherein determining the plurality of ratios comprises:
    determining a plurality of opportunity sets based on the plurality of coordinate objects, wherein a respective opportunity set corresponds to a plurality of candidate weight values for a respective subset of the plurality of coordinate objects; and
    determining the plurality of ratios based on the plurality of opportunity sets, the plurality of expected values, and the plurality of standard deviation values, wherein a respective ratio corresponds to a ratio of a respective expected value and a respective standard deviation value for the respective opportunity set.

11. The method of claim 10, wherein determining the plurality of optimized weight values based on the plurality of ratios comprises:

determining a ranking of the plurality of ratios;
determining an optimized ratio of the plurality of ratios based on the ranking;
determining an optimized opportunity set of the plurality of opportunity sets based on the optimized ratio; and
determining the plurality of optimized weight values based on the optimized opportunity set, wherein the plurality of optimized weight values corresponds to a respective subset of the plurality of candidate weight values for the optimized opportunity set.

12. The method of claim 1, wherein a sum of the plurality of optimized weight values is equal to one.

13. The method of claim 1, wherein identifying the plurality of optimized data objects comprises:
determining one or more user preferences for a user associated with the user device based on neural network feedback; and
identifying the plurality of optimized data objects based on the plurality of optimized weight values and the one or more user preferences.

14. The method of claim 1, wherein identifying the plurality of optimized data objects comprises:
determining a plurality of allocations for the plurality of coordinate objects; and
identifying the plurality of optimized data objects based on the plurality of optimized weight values and the plurality of allocations.

15. The method of claim 1, wherein the user device is further configured to generate one or more images and one or more sounds relating to the one or more multidimensional objects based on the plurality of optimized data objects.

16. A computing system, comprising:
one or more processors; and
at least one memory comprising program instructions executable by the one or more processors to:
receive request data from a user device, wherein the request data comprises data corresponding to a request for a plurality of optimized data objects relating to one or more multidimensional objects, and wherein the plurality of optimized data objects comprises one or more image objects and one or more audio objects;
determine a plurality of optimized weight values for a plurality of coordinate objects stored in one or more multidimensional object databases based on the request data;
identify the plurality of optimized data objects based on the plurality of optimized weight values, wherein the plurality of optimized data objects is a subset of the plurality of coordinate objects;
retrieve the identified plurality of optimized data objects from the one or more multidimensional object databases; and
transmit the plurality of optimized data objects to the user device, wherein the user device is configured to generate the one or more multidimensional objects based on the plurality of optimized data objects.

17. The computing system of claim 16, wherein the plurality of optimized data objects further comprises one or more data objects relating to color channel, color depth, height, width, longitude, latitude, altitude, sensory feel, sensory smell, sensory touch, sensory electromagnetic waves, time, historical data, time style, time growth, weather, temperature, image scaling, microscopic image scaling, nanoscopic image scaling, chemistry state, chemistry feeling, color depth, filter color, lens focus, aperture, lens speed, type, cross product blend, or combinations thereof.

18. The computing system of claim 16, wherein:
the one or more image objects comprises one or more data objects for use in generating one or more images relating to the one or more multidimensional objects;
the one or more audio objects comprises one or more data objects for use in generating one or more sounds relating to the one or more multidimensional objects; or
combinations thereof.

19. A non-transitory computer-readable medium having stored thereon a plurality of computer-executable instructions which, when executed by a computer, cause the computer to:
receive request data from a user device, wherein the request data comprises data corresponding to a request for a plurality of optimized data objects relating to one or more multidimensional objects, and wherein the plurality of optimized data objects comprises one or more image objects and one or more audio objects;
determine a plurality of optimized weight values for a plurality of coordinate objects stored in one or more multidimensional object databases based on the request data;
identify the plurality of optimized data objects based on the plurality of optimized weight values, wherein the plurality of optimized data objects is a subset of the plurality of coordinate objects;
retrieve the identified plurality of optimized data objects from the one or more multidimensional object databases; and
transmit the plurality of optimized data objects to the user device, wherein the user device is configured to generate the one or more multidimensional objects based on the plurality of optimized data objects.

20. The non-transitory computer-readable medium of claim 19, wherein the plurality of coordinate objects comprises a plurality of data objects for use in generating the one or more multidimensional objects, wherein the plurality of data objects relate to coordinate data, matrices data, vector data, or combinations thereof.

* * * * *